US012780845B2

(12) United States Patent
Achab et al.

(10) Patent No.: US 12,780,845 B2
(45) Date of Patent: Nov. 3, 2026

(54) ARGINASE INHIBITORS AND METHODS OF USE

(71) Applicant: MERCK SHARP & DOHME LLC, Rahway, NJ (US)

(72) Inventors: Abdelghani Abe Achab, Melrose, MA (US); Matthew L. Childers, Medfield, MA (US); Christian Fischer, Natick, MA (US); Symon Gathiaka, Waltham, MA (US); Derun Li, West Roxbury, MA (US); Min Lu, Brookline, MA (US); Anandan Palani, Needham, MA (US); Rachel L Palte, Melrose, MA (US); Qinglin Pu, Needham, MA (US); David L. Sloman, Newton, MA (US); Hongjun Zhang, Boston, MA (US)

(73) Assignee: Merck Sharpe & Dohme LLC, Rahway, NJ (US)

( * ) Notice: Subject to any disclaimer, the term of this patent is extended or adjusted under 35 U.S.C. 154(b) by 1129 days.

(21) Appl. No.: 17/789,374

(22) PCT Filed: Dec. 18, 2020

(86) PCT No.: PCT/US2020/065798

§ 371 (c)(1),
(2) Date: Jun. 27, 2022

(87) PCT Pub. No.: WO2021/141751

PCT Pub. Date: Jul. 15, 2021

(65) Prior Publication Data

US 2023/0140132 A1 May 4, 2023

Related U.S. Application Data

(60) Provisional application No. 62/958,056, filed on Jan. 7, 2020.

(51) Int. Cl.
*C07F 5/02* (2006.01)

(52) U.S. Cl.
CPC .................................... *C07F 5/025* (2013.01)

(58) Field of Classification Search
CPC ....................................................... C07F 5/025
See application file for complete search history.

(56) References Cited

U.S. PATENT DOCUMENTS

| | | | |
|---|---|---|---|
| 7,488,802 | B2 | 2/2009 | Collins et al. |
| 7,521,051 | B2 | 4/2009 | Collins et al. |
| 7,595,048 | B2 | 9/2009 | Honjo et al. |
| 8,008,449 | B2 | 8/2011 | Korman et al. |
| 8,168,757 | B2 | 5/2012 | Finnefroch et al. |
| 8,354,509 | B2 | 1/2013 | Carven et al. |
| 8,383,796 | B2 | 2/2013 | Korman et al. |
| 2008/0025979 | A1 | 1/2008 | Honjo et al. |
| 2011/0271358 | A1 | 11/2011 | Freeman et al. |
| 2017/0121352 | A1 | 5/2017 | Sjogren et al. |
| 2017/0319536 | A1 | 11/2017 | Blaszczyk et al. |
| 2022/0056051 | A1 | 2/2022 | Achab et al. |

FOREIGN PATENT DOCUMENTS

| | | | |
|---|---|---|---|
| EP | 3034509 | B1 | 4/2020 |
| WO | 2001002369 | A2 | 1/2001 |
| WO | 2002010192 | A2 | 2/2002 |
| WO | 2002068470 | A2 | 9/2002 |
| WO | 2004004771 | A1 | 1/2004 |
| WO | 2004056875 | A1 | 7/2004 |
| WO | 2004072286 | A1 | 8/2004 |
| WO | 2010027827 | A2 | 3/2010 |
| WO | 2010077634 | A1 | 7/2010 |
| WO | 2011066342 | A2 | 6/2011 |
| WO | 2013019906 | A1 | 2/2013 |
| WO | 2017075363 | A1 | 5/2017 |
| WO | 2019177873 | A1 | 9/2019 |
| WO | 2019245890 | A1 | 12/2019 |
| WO | 2020131598 | A1 | 6/2020 |

OTHER PUBLICATIONS

Schafer et al. Drug Discovery Today 2008, 13 (21/22), 913-916 (Year: 2008).*
Horig et al. Journal of Translational Medicine 2004, 2(44) (Year: 2004).*
Bianchi et al. (Current Opinion in Cell Biology. 2020; 63:135-143) (Year: 2020).*
Ye et al. Am J Cancer Res. May 15, 2023;13(5):1952-1969. (Year: 2023).*
Ortiz et al. (Tetrahedron. 2005;61(7):1699-1707). (Year: 2005).*
Baggio, Ricky et al., Biochemical and Functional Profile of a Newly Developed Potent and Isozyme-Selective Arginase Inhibitor, J. Pharm. Exp. Ther., 1999, 1409-1416, 290(3).
Berkowitz, Dan E. et al., Arginase Reciprocally Regulates Nitric Oxide Synthase Activity and Contributes to Endothelial Dysfunction in Aging Blood Vessels, Circulation, 2003, 2000-2006, 108.

(Continued)

*Primary Examiner* — Clinton A Brooks
*Assistant Examiner* — Jerica Katlynn Wilson
(74) *Attorney, Agent, or Firm* — Su Kyung Suh; Andrew W. Custer

(57) ABSTRACT

Described herein are compounds of Formula I or a pharmaceutically acceptable salt thereof. The compounds of Formula I act as arginase inhibitors and can be useful in preventing, treating or acting as a remedial agent for arginase-related diseases.

(I)

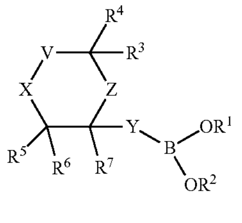

3 Claims, No Drawings

(56) References Cited

OTHER PUBLICATIONS

Bivalacqua, Trinity J.et al., Evaluation of Nitric Oxide Synthase and Arginase in the Induction of a Peyronie's-Like Condition in the Rat, Journal of Andrology, 2001, 497-506, 22.
Bivalacqua, Trinity J.et al., Increased Expression of Arginase II in Human Diabetic Corpus Cavernosum: In Diabetic-Associated Erectile Dysfunction, Biochemical and Biophysical Research Communications, 2001, 923-927, 283.
Bivalacqua, Trinity J.et al., Overexpression of arginase in the aged mouse penis impairs erectile function and decreases eNOS activity: influence of in vivo gene therapy of anti-arginase, Am J Physiol Heart Circ Physiol, 2007, H1340-H1351, 292.
Bronte, Vincenzo et al., Boosting antitumor responses of T lymphocytes infiltrating human prostate cancers, J. Exp. Med., 2005, 1257-1268, 201.
Bronte, Vincenzo et al., Regulation of Immune Responses by I-Arginine Metabolism, Nature Rev. Immunol., 2005, 641-654, 5.
Bruch-Gerharz, Daniela et al., Arginase 1 Overexpression in Psoriasis Limitation of Inducible Nitric Oxide Synthase Activity as a Molecular Mechanism for Keratinocyte Hyperproliferation, Am. J. Pathology, 2003, 203-211, 162.
Cama, Evis et al., Human Arginase II: Crystal Structure and Physiological Role in Male and Female Sexual Arousal, Biochemistry, 2003, 8445-8451, 42.
Corraliza, Ines et al., Increased Expression of Arginase II in Patients with Different Forms of Arthritis. Implications of the Regulation of Nitric Oxide, J. Rheumatol., 2002, 2261-2265, 29.
Cox, J. David et al., Arginase-boronic acid complex highlights a physiological role in erectile function, Nature Structural Biology, 1999, 1043-1047, 6(11).
Demougeot, Celine et al., Arginase inhibition reduces endothelial dysfunction and blood pressure rising in spontaneously hypertensive rats, J Hypertens, 2005, 971-978, 23.
Endo, Motoyoshi et al., Induction of arginase I and II in bleomycin-induced fibrosis of mouse lung, Am J Physiol Lung Cell Mol Physiol, 2003, L313-L321, 285.
Erb, William et al., An Easy Route to (Hetero)arylboronic Acids, Chemistry A European Journal, 2014, 6608-6612, 20.
Gobert, Alain P. et al., Helicobacter pylori arginase inhibits nitric oxide production by eukaryotic cells: A strategy for bacterial survival, PNAS, 2001, 13844-13849, 98(24).
Gokmen, Selma Suer et al., Significance of arginase and ornithine in malignant tumors of the human skin, J. Lab. Clin. Med., 2001, 340-344, 137.
Grasemann, Hartmut et al., Increased Arginase Activity in Cystic Fibrosis Airways, Am J Respir Crit Care Med, 2005, 1523-1528, 172.
Heby, O. et al., Polyamine biosynthetic enzymes as drug targets in parasitic protozoa, Biochem. Soc. Trans., 2003, 415-419, 31.
Holowatz, Lacy A. et al., L-Arginine supplementation or arginase inhibition augments reflex cutaneous vasodilatation in aged human skin, J. Physiol., 2006, 573-581, 574.
Horowitz, Scott et al., Increased arginase activity and endothelial dysfunction in human inflammatory bowel disease, Am J Physiol Gastrointest Liver Physiol, 2007, G1323-G1336, 292.
International Search Report for PCT/US20/65798 dated May 27, 2021, 4 pages.
Leu, Shuh-Yan et al., Clinical Significance of Arginase in Colorectal Cancer, Cancer, 1992, 733-736, 70.
Maarsingh, Harm et al., Arginase Inhibition Protects against Allergen-induced Airway Obstruction, Hyperresponsiveness, and Inflammation, Am J Respir Crit Care Med, 2008, 565-573, 178.
Maarsingh,, Arginase: A Novel Key Enzyme in the Pathophysiology of Allergic Asthma, University of Groningen, Netherlands, 2006, 127-144, Chapter 9 (Dissertation).
Marx, Jean, Cancer's Bulwark Against Immune Attack: MDS Cells, Science, 2008, 154-156, 319.
Melichar, Bohuslav et al., rIFN-γ-mediated growth suppression of platinum-sensitive and -resistant ovarian tumor cell lines not dependent upon arginase inhibition, J. Translational Med., 2003, 1-5, 1.
Mora, Ana L. et al., Activation of Alveolar Macrophages via the Alternative Pathway in Herpesvirus-Induced Lung Fibrosis, Am J Respir Cell Mol Biol, 2006, 466-473, 35.
Morris, Claudia R. et al., Pulmonary Hypertension in Thalassemia: Association with Hemolysis, Arginine Metabolism Dysregulation, and a Hypercoagulable State, Adv. Pulmonary Hypertension, 2007, 31-36, 5.
Ochoa, Augusto C. et al., Arginase, Prostaglandins, andMyeloid-Derived Suppressor Cells in Renal Cell Carcinoma, Clin Cancer Res, 2007, 721s-726s, 13(2 Suppl).
PubChem Compound Record for CID 87392280, '1,2-Dioxaspiro[4.5]dec-7-en-4-ylboronic acid', U.S. National Library of Medicine, Feb. 12, 2012J, pp. 1-7 (https://pubchem.ncbi.nlm.nih.gov/compound/87392280); p. 2 (7 pages).
Roberts, Sigrid C. et al., Arginase Plays a Pivotal Role in Polyamine Precursor Metabolism in Leishmania, J. Biol. Chem., 2004, 23668-23678, 279(22).
Rodriguez, Paulo C. et al., Arginase I in myeloid suppressor cells is induced by COX-2 in lung carcinoma, J. Exp. Med., 2005, 931-939, 202.
Romero, Maritza J. et al., Diabetes-induced Coronary Vascular Dysfunction Involves Increased Arginase Activity, Circ Res, 2008, 95-102, 102.
Wu, Chew-Wun et al., Regulation of Arginase Production by Glucocorticoid in Three Human Gastric Cancer Cell Lines, Life Sciences, 1992, 1355-1361, 51.
Xu, Lingyun et al., Arginase and autoimmune inflammation in the central nervous system, Immunology, 2003, 141-148, 110.
Yang, Zhihong et al., Endothelial Arginase: A New Target in Atherosclerosis, Current Hypertension Reports, 2006, 54-59, 8.
Yang, Zhihong et al., Recent Advances in Understanding Endothelial Dysfunction in Atherosclerosis, Clinical Medicine & Research, 2006, 53-65, 4(1).
Zea, Arnold H. et al., Arginase-Producing Myeloid Suppressor Cells in Renal Cell Carcinoma Patients: A Mechanism of Tumor Evasion, Cancer Research, 2005, 3044-3048, 65.
Zimmermann, Nives et al., The arginine-arginase balance in asthma and lung inflammation, European Journal of Pharmacology, 2006, 253-262, 553.
Huang, Li-Wen et al., Arginase Levels Are Increased in Patients With Rheumatoid Arthritis, Kaohsiung J Med Sci, 2001, 358-363, 17.
Singh, Rajan et al., Arginase Activity in Human Breast Cancer Cell Lines: Nω-Hydroxy-L-arginine Selectively Inhibits Cell Proliferation and Induces Apoptosis in MDA-MB-468 Cells, Cancer Research, 2000, 3305-3312, 60.

* cited by examiner

ARGINASE INHIBITORS AND METHODS OF USE

CROSS-REFERENCE TO RELATED APPLICATIONS

This application is a 371 of PCT/US2020/065798, filed Dec. 18, 2020, which claims priority under 35 U.S.C. § 365(b) from U.S. Provisional Patent Application No. 62/958,056, filed Jan. 7, 2020.

TECHNICAL FIELD

The present invention is directed to arginase inhibitors. Specifically, the arginase inhibitors described herein can be useful in preventing, treating or acting as a remedial agent for arginase-related diseases.

BACKGROUND

Arginase is an enzyme that metabolizes L-arginine to L-ornithine and urea. There are two types of arginase, and they are both products of distinct genes that are regulated independently and located on different chromosomes. Arginase I is a cytosolic protein (34.7 kDa) and is dominant in the liver, but also expressed extrahepatically. Arginase II is a mitochondrial protein and is expressed in kidney, small intestine, brain, monocytes and macrophages.

In addition to its fundamental role in the hepatic urea cycle, arginase also influences the immune systems in humans and mice. Arginase participates in many inflammatory disorders by decreasing the synthesis of nitric oxide and inducing fibrosis and tissue regeneration. L-Arginine deficiency, which is modulated by myeloid cell arginase, suppresses T-cell immune response. This mechanism plays a fundamental role in inflammation-associated immunosuppression.

Arginase expression and L-arginine depletion is also a known immune-suppressive pathway of the mammalian immune system. The depletion of arginine in the tumor microenvironment renders cytotoxic T-cells unable to proliferate and therefore unable to effectively mount an anti-tumor attack. Similarly, M2 macrophages and polymorphonuclear cells (PMNs) express high levels of arginase and may contribute to the local suppression of immune responses. Restoration of arginine levels in the tumor microenvironment via arginase inhibition would be expected to allow T-cell activation and proliferation to occur and result in T-cell mediated anti-tumor responses.

Small-molecule arginase inhibitors are currently described as promising therapeutics for the treatment of several diseases, including allergic asthma, inflammatory bowel disease, ulcerative colitis, cardiovascular diseases (atherosclerosis and hypertension), diseases associated with pathogens (e.g., *Helicobacter pylori, Trypanosoma cruzi, Leishmania, Mycobacterium tuberculosis and Salmonella*), cancer and induced or spontaneous immune disorders. Development of potent and specific inhibitors of arginase would be useful for the treatment of diseases where depletion of L-arginine from the microenvironment and/or induction of arginase pathway is involved in the evasion of anti-tumor immunity, especially for immuno-oncology indications.

SUMMARY

Compounds of Formula I:

I

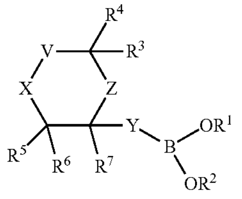

Described herein are arginase inhibitors, which can be useful in the prevention, treatment or amelioration of diseases where depletion of L-arginine from the microenvironment and/or induction of arginase pathway is involved in the evasion of anti-tumor immunity, especially for immuno-oncology indications.

Also described herein are methods of treating cancer comprising administering to a patient in need thereof a compound described herein, or a pharmaceutically acceptable salt thereof.

Also described herein are methods of treating fibrosis related diseases such as nonalcoholic fatty liver disease comprising administering to a patient in need thereof a compound described herein, or a pharmaceutically acceptable salt thereof.

Also described herein are uses of a compound described herein, or a pharmaceutically acceptable salt thereof, to treat cancer in a patient in need thereof.

Also described herein are pharmaceutical compositions comprising a compound described herein, or a pharmaceutically acceptable salt thereof and a pharmaceutically acceptable carrier. Also described herein are pharmaceutical compositions comprising a compound described herein and a pharmaceutically acceptable carrier.

DETAILED DESCRIPTION

Described herein are compounds of Formula I:

I

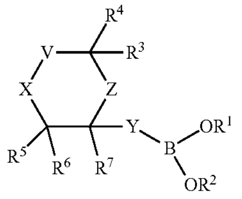

or a pharmaceutically acceptable salt thereof, wherein:

Y is a straight or branched ($C_1$-$C_5$)alkylene or cycloalkyl ($C_1$-$C_5$)alkylene, wherein one or more —$CH_2$— groups in Y are optionally and independently replaced with a moiety selected from the group consisting of O, S and NH;

Z is a bond, or $CH_2$;

V is O, $NR^8$, or $CR^9R^{10}$, wherein X and V cannot be simultaneously O or S and O or $NR^8$, respectively;

X is O, S, $NR^{11}$, $CH_2$, or $CR^{12}R^{13}$, wherein V and X cannot be simultaneously O and S, O or $NR^{11}$, respectively;

$R^1$ is hydrogen, $C_3$-$C_6$cycloalkyl or $C_1$-$C_6$alkyl or, taken with $R^2$ forms a $C_3$-$C_8$cycloalkyl, wherein the $C_3$-$C_8$cycloalkyl is unsubstituted or substituted with one to four substituents selected from the group consisting of halogen, $C_1$-$C_6$alkyl or OH;

$R^2$ is hydrogen, $C_3$-$C_6$cycloalkyl or $C_1$-$C_6$alkyl or, taken with $R^1$ forms a $C_3$-$C_8$cycloalkyl, wherein the $C_3$-$C_8$cycloalkyl is unsubstituted or substituted with one to four substituents selected from the group consisting of halogen, $C_1$-$C_6$alkyl or OH;

$R^3$ is hydrogen, halogen, $C_1$-$C_6$alkyl, halo$C_1$-$C_6$alkyl, OH, $C_1$-$C_6$alkylOH, $C_1$-$C_6$alkylO$C_1$-$C_6$alkyl, $C_1$-$C_6$alkoxy, COOH, $NH_2$ or COO$C_1$-$C_6$alkyl, or taken with $R^4$ forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl;

$R^4$ is hydrogen, halogen, $C_1$-$C_6$alkyl, halo$C_1$-$C_6$alkyl, OH, $C_1$-$C_6$alkylOH, $C_1$-$C_6$alkylO$C_1$-$C_6$alkyl, $C_1$-$C_6$alkoxy, COOH, $NH_2$ or COO$C_1$-$C_6$alkyl or when taken with $R^3$, $R^7$ or $R^{10}$, forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl, or taken with $R^6$, $R^7$ or $R^{12}$ forms an ($C_1$-$C_5$)alkylene bridge, wherein one or more —$CH_2$— groups are optionally and independently replaced with a moiety selected from the group consisting of O, S and $NR^{14}$;

$R^5$ is hydrogen, halogen, $C_1$-$C_6$alkyl, halo$C_1$-$C_6$alkyl, OH, $C_1$-$C_6$alkylOH, $C_1$-$C_6$alkylO$C_1$-$C_6$alkyl, $C_1$-$C_6$alkoxy, COOH or COO$C_1$-$C_6$alkyl or when taken with $R^6$ forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl;

$R^6$ is hydrogen, halogen, $C_1$-$C_6$alkyl, halo$C_1$-$C_6$alkyl, OH, $C_1$-$C_6$alkylOH, $C_1$-$C_6$alkylO$C_1$-$C_6$alkyl, COOH, $C_1$-$C_6$alkoxy, COOH or COO$C_1$-$C_6$alkyl or when taken with $R^5$, $R^7$ or $R^{12}$ forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl, or taken with $R^4$ or $R^{10}$ forms an ($C_1$-$C_5$)alkylene bridge, wherein one or more —$CH_2$— groups are optionally and independently replaced with a moiety selected from the group consisting of O, S and $NR^{14}$;

$R^7$ is hydrogen, halogen, $C_1$-$C_6$alkyl, $C_3$-$C_6$cycloalkyl, halo$C_1$-$C_6$alkyl, OH, $C_1$-$C_6$alkylOH, $C_1$-$C_6$alkylO$C_1$-$C_6$alkyl, COOH, $C_1$-$C_6$alkoxy or COO$C_1$-$C_6$alkyl or when taken with $R^4$, or $R^6$ forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, $C_3$-$C_6$cycloalkyl, oxo, $C_1$-$C_6$alkyl, $C_1$-$C_6$haloalkyl, CO$C_1$-$C_6$alkyl, $NH_2$, $C_1$-$C_6$alkyl$NH_2$, $C_1$-$C_6$alkylphenyl, CO($C_1$-$C_6$alkyl)$NH_2$ and COOH, or taken with $R^4$, $R^{10}$ or $R^{12}$ forms an ($C_1$-$C_5$)alkylene bridge, wherein one or more —$CH_2$— groups are optionally and independently replaced with a moiety selected from the group consisting of O, S and $NR^{14}$;

$R^8$ is hydrogen, $C_3$-$C_6$cycloalkyl, $C_1$-$C_6$alkyl, $C_1$-$C_6$alkylaryl, $C_1$-$C_6$alkyl$NH_2$, CO$C_1$-$C_6$alkyl$NH_2$, CO$C_1$-$C_6$alkylNH($C_1$-$C_6$alkyl), CO$C_1$-$C_6$alkylN($C_1$-$C_6$alkyl)$_2$, $C_1$-$C_6$haloalkyl, $C_1$-$C_6$alkylOH or CO$C_1$-$C_6$alkyl;

$R^9$ is hydrogen, halogen, $C_1$-$C_6$alkyl, halo$C_1$-$C_6$alkyl, OH, $C_1$-$C_6$alkylOH, $C_1$-$C_6$alkylO$C_1$-$C_6$alkyl, $C_1$-$C_6$alkoxy, COOH or COO$C_1$-$C_6$alkyl;

$R^{10}$ is hydrogen, halogen, $C_1$-$C_6$alkyl, halo$C_1$-$C_6$alkyl, OH, $C_1$-$C_6$alkylOH, $C_1$-$C_6$alkylO$C_1$-$C_6$alkyl, COOH, $C_1$-$C_6$alkoxy, COOH or COO$C_1$-$C_6$alkyl or when taken with $R^4$ or $R^2$ forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl, or taken with $R^6$ or $R^7$ forms an ($C_1$-$C_5$)alkylene bridge, wherein one or more —$CH_2$— groups are optionally and independently replaced with a moiety selected from the group consisting of O, S and NH;

$R^{11}$ is hydrogen, $C_3$-$C_6$cycloalkyl, $C_1$-$C_6$alkyl, $C_1$-$C_6$alkylaryl, $C_1$-$C_6$alkyl$NH_2$, CO$C_1$-$C_6$alkyl$NH_2$, CO$C_1$-$C_6$alkylNH($C_1$-$C_6$alkyl), CO$C_1$-$C_6$alkylN($C_1$-$C_6$alkyl)$_2$, $C_1$-$C_6$haloalkyl, $C_1$-$C_6$alkylOH or CO$C_1$-$C_6$alkyl;

$R^{12}$ is halogen, $C_1$-$C_6$alkyl, halo$C_1$-$C_6$alkyl, OH, $C_1$-$C_6$alkylOH, $C_1$-$C_6$alkylO$C_1$-$C_6$alkyl, COOH, $C_1$-$C_6$alkoxy, COOH or COO$C_1$-$C_6$alkyl or when taken with $R^6$ or $R^{10}$, forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl, or taken with $R^4$ or $R^7$ forms an ($C_1$-$C_5$)alkylene bridge, wherein one or more —$CH_2$— groups are optionally and independently replaced with a moiety selected from the group consisting of O, S and NH;

$R^{13}$ is halogen, $C_1$-$C_6$alkyl, halo$C_1$-$C_6$alkyl, OH, $C_1$-$C_6$alkylOH, $C_1$-$C_6$alkylO$C_1$-$C_6$alkyl, $C_1$-$C_6$alkoxy, COOH or COO$C_1$-$C_6$alkyl; and $R^{14}$ is hydrogen, $C_3$-$C_6$cycloalkyl, $C_1$-$C_6$alkyl, $C_1$-$C_6$alkylaryl, $C_1$-$C_6$alkyl$NH_2$, CO$C_1$-$C_6$alkyl$NH_2$, CO$C_1$-$C_6$alkylNH($C_1$-$C_6$alkyl), CO$C_1$-$C_6$alkylN($C_1$-$C_6$alkyl)$_2$, $C_1$-$C_6$haloalkyl, $C_1$-$C_6$alkylOH, CO$C_1$-$C_6$alkyl or COheterocycle wherein the heterocycle is a 3-7 membered nitrogen containing ring.

With regard to the compounds described herein, Y is a straight or branched ($C_1$-$C_5$)alkylene or cycloalkyl($C_1$-$C_5$) alkylene, wherein one or more —$CH_2$— groups in Y are optionally and independently replaced with a moiety selected from the group consisting of O, S and NH.

In certain embodiments, Y is selected from the group consisting of straight or branched $(C_1\text{-}C_5)$alkylene, wherein one or more —$CH_2$— groups in Y are optionally and independently replaced with a moiety selected from the group consisting of O, S or NH. In certain embodiments, Y is selected from the group consisting of straight or branched $(C_1\text{-}C_5)$alkylene, wherein, when there is at least two —$CH_2$— groups, one or more —$CH_2$— groups in Y are optionally and independently replaced with a moiety selected from the group consisting of O, S or NH. In certain embodiments, Y is methenyl, ethelenyl, propylenyl, butylenyl or pentylenyl. In certain embodiments Y is methenyl. In certain embodiments Y is ethelenyl. In certain embodiments Y is propylenyl. In other embodiments, one or more —$CH_2$— groups in Y are optionally and independently replaced with a moiety selected from the group consisting of O, S or NH. In certain embodiments, Y is $(C_1\text{-}C_5)$alkylene or O—$C_1\text{-}C_4$alkylene,

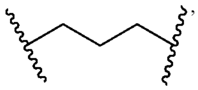,
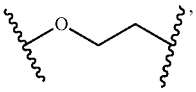,
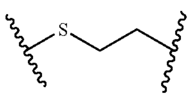
or
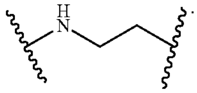.

In certain embodiments, Y is a straight or branched cycloalkyl$(C_1\text{-}C_5)$alkylene, wherein one or more —$CH_2$— groups in Y are optionally and independently replaced with a moiety selected from the group consisting of O, S and NH. In certain embodiments, Y is

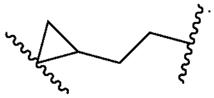.

In certain embodiments Y is

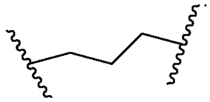 [SMILES: *CCC*].

In certain embodiments, Y is

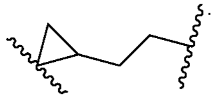.

In certain embodiments, Y is

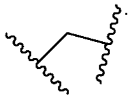 [SMILES: *C*].

With regard to the compounds described herein, Z is a bond or $CH_2$. In certain embodiments, Z is a bond. In certain embodiments, Z is $CH_2$.

With regard to the compounds described herein, V is O, $NR^8$, or $CR^9R^{10}$. In certain embodiments, V is O. In certain embodiments, V is $NR^8$. In certain embodiments, V is $CR^9R^{10}$. In certain embodiments, V is $CH_2$.

With regard to the compounds described herein, X is O, S, $NR^1$, $CH_2$, or $CR^{12}R^{13}$. In certain embodiments, X is O. In certain embodiments, X is S. In certain embodiments, X is $CH_2$. In certain embodiments, X is $NR^{11}$. In certain embodiments, X is $CR^{12}R^{13}$.

In embodiments of the compounds described herein, V and X cannot be simultaneously O or S and O or $NR^{11}$. In embodiments of the compounds described herein, X and V cannot be simultaneously O or S and O or $NR^8$.

With regard to the compounds described herein, $R^1$ is hydrogen, $C_3\text{-}C_6$cycloalkyl or $C_1\text{-}C_6$alkyl, or when taken with $R^2$ forms a $C_3\text{-}C_8$cycloalkyl, wherein the $C_3\text{-}C_8$cycloalkyl is unsubstituted or substituted with one to four substituents selected from the group consisting of halogen, $C_1\text{-}C_6$alkyl or —OH. In certain embodiments, $R^1$ is hydrogen. In certain embodiments, $R^1$ is $C_3\text{-}C_6$cycloalkyl. Suitable cycloalkyl groups include, but are not limited to, cyclopropyl, cyclobutyl, cyclopentyl, cyclohexyl. In certain embodiments, $R^1$ is $C_1\text{-}C_6$alkyl. Examples of suitable $C_1\text{-}C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^1$ and $R^2$ taken together form a $C_3\text{-}C_8$cycloalkyl, wherein the $C_3\text{-}C_8$cycloalkyl is unsubstituted or substituted with one to four substituents selected from the group consisting of halogen, $C_1\text{-}C_6$alkyl or —OH. In certain embodiments, the $C_3\text{-}C_8$cycloalkyl is a six or seven-membered carbon ring. In certain embodiments, the $C_3\text{-}C_8$cycloalkyl is a six or seven-membered, saturated carbon ring. In certain embodiments, the $C_3\text{-}C_8$cycloalkyl is a bridged ring. In certain embodiments, the $C_3\text{-}C_8$cycloalkyl is substituted with one substituent selected from the group consisting of halogen, $C_1\text{-}C_6$alkyl or —OH. In certain embodiments, the $C_3\text{-}C_8$cycloalkyl is substituted with two substituents selected from the group consisting of halogen, $C_1\text{-}C_6$alkyl or —OH. In certain embodiments, the $C_3\text{-}C_8$cycloalkyl is substituted with three substituents selected from the group consisting of halogen, $C_1\text{-}C_6$alkyl or —OH. In certain embodiments, the $C_3\text{-}C_8$cycloalkyl is substituted with four substituents selected from the group consisting of halogen, $C_1\text{-}C_6$alkyl or —OH. In certain embodiments, the $C_3\text{-}C_8$cycloalkyl is substituted with three substituents, wherein all the substituents are $C_1\text{-}C_6$alkyl groups. In certain embodiments, the $C_3\text{-}C_8$cycloalkyl is substituted with three substituents, wherein all the substituents are methyl. In certain embodiments, the $C_3\text{-}C_8$cycloalkyl is substituted with four substituents, wherein all the substituents are $C_1\text{-}C_6$alkyl groups. In certain embodiments, the $C_3\text{-}C_8$cycloalkyl is substituted with four substituents, wherein all the substituents are methyl.

In certain embodiments, $R^1$ and $R^2$, when taken together form a $C_3\text{-}C_8$cycloalkyl selected from the group consisting of:

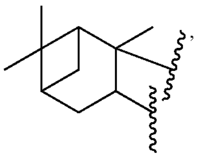,
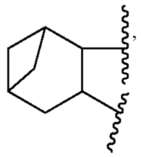,
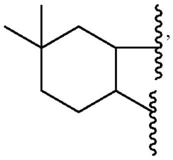, and
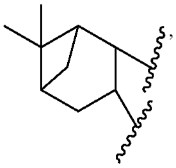,

In certain embodiments, $R^1$ and $R^2$ when taken together form the following $C_3$-$C_8$cycloalkyl

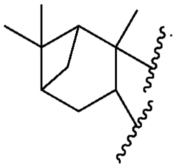 [SMILES: *C1CC2CC(C1(*)C)C2(C)C].

In certain embodiments, $R^1$ and $R^2$ when taken together along with the oxygens to which $R^1$ and $R^2$ are attached and the boron to which the oxygens are attached from a fused or multicyclic ring. Such an embodiment is shown in Example 9. With regard to the compounds described herein, $R^2$ is hydrogen, $C_3$-$C_6$cycloalkyl or $C_1$-$C_6$alkyl, or when taken with $R^1$ forms a $C_3$-$C_8$cycloalkyl, wherein the $C_3$-$C_8$cycloalkyl is unsubstituted or substituted with one to four substituents selected from the group consisting of halogen, $C_1$-$C_6$alkyl or —OH. In certain embodiments, $R^2$ is hydrogen. In certain embodiments, $R^2$ is $C_3$-$C_6$cycloalkyl. Suitable cycloalkyl groups include, but are not limited to, cyclopropyl, cyclobutyl, cyclopentyl, cyclohexyl. In certain embodiments, $R^2$ is $C_1$-$C_6$alkyl. Examples of suitable $C_1$-$C_6$alkyl groups can include but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^2$ when taken with $R^1$ forms a $C_3$-$C_8$cycloalkyl, wherein the $C_3$-$C_8$cycloalkyl is unsubstituted or substituted with one to four substituents selected from the group consisting of halogen, $C_1$-$C_6$alkyl or —OH. In certain embodiments, the $C_3$-$C_8$cycloalkyl is a six or seven carbon ring. In certain embodiments, the $C_3$-$C_8$cycloalkyl is a six or seven-membered saturated carbon ring. In certain embodiments, the $C_3$-$C_8$cycloalkyl is a bridged ring. In certain embodiments, the $C_3$-$C_8$cycloalkyl is substituted with one substituent selected from the group consisting of halogen, $C_1$-$C_6$alkyl or —OH. In certain embodiments, the $C_3$-$C_8$cycloalkyl is substituted with two substituents selected from the group consisting of halogen, $C_1$-$C_6$alkyl or —OH. In certain embodiments, the $C_3$-$C_8$cycloalkyl is substituted with three substituents selected from the group consisting of halogen, $C_1$-$C_6$alkyl or —OH. In certain embodiments, the $C_3$-$C_8$cycloalkyl is substituted with four substituents selected from the group consisting of halogen, $C_1$-$C_6$alkyl or —OH. In certain embodiments, the $C_3$-$C_8$cycloalkyl is substituted with three substituents, wherein all the substituents are $C_1$-$C_6$alkyl groups. In certain embodiments, the $C_3$-$C_8$cycloalkyl is substituted with three substituents, wherein all the substituents are methyl. In certain embodiments, the $C_3$-$C_8$cycloalkyl is substituted with four substituents, wherein all the substituents are $C_1$-$C_6$alkyl groups. In certain embodiments, the $C_3$-$C_8$cycloalkyl is substituted with four substituents, wherein all the substituents are methyl.

In certain embodiments, $R^1$ and $R^2$, when taken together form a $C_3$-$C_8$cycloalkyl selected from the group consisting of:

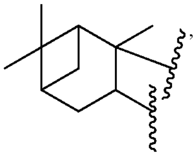,
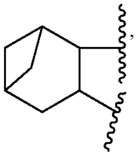,
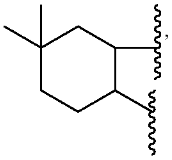, and
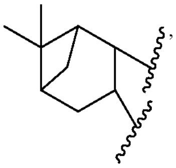,

In certain embodiments, $R^1$ and $R^2$ when taken to ether form the following $C_3$-$C_8$cycloalkyl

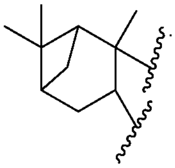 [SMILES: *C1CC2CC(C1(*)C)C2(C)C].

In certain embodiments, $R^1$ and $R^2$ are both hydrogen. In certain embodiments, $R^1$ and $R^2$ are each hydrogen or taken together form a pinane.

With regard to the compounds described herein, $R^3$ is hydrogen, halogen, $C_1$-$C_6$alkyl, halo$C_1$-$C_6$alkyl, OH, $C_1$-$C_6$alkylOH, $C_1$-$C_6$alkylO$C_1$-$C_6$alkyl, $C_1$-$C_6$alkoxy, COOH, $NH_2$ or COO$C_1$-$C_6$alkyl, or taken with $R^4$ forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl. In certain embodiments, $R^3$ is hydrogen. In certain embodiments described herein, $R^3$ is halogen. Examples of suitable halogens include, but are not limited to, chlorine, bromine, fluorine and iodine. In certain embodiments described herein, $R^3$ is $C_1$-$C_6$alkyl. Examples of suitable $C_1$-$C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^3$ is halo$C_1$-$C_6$alkyl. Suitable halo$C_1$-$C_6$alkyls include but are not limited to, fluoromethyl, difluoromethyl, trifluoromethyl, 2-fluoroethyl, 1,2-difluoroethyl and 2,2-difluoroethyl. In certain embodiments, $R^3$ is OH. In certain embodiments, $R^3$ is $C_1$-$C_6$alkylOH. Examples of suitable alcohols, include, but are not limited to, methanol, ethanol, propanol, butanol and iso-butanol. In certain embodiments, $R^3$ is $C_1$-$C_6$alkylO$C_1$-$C_6$alkyl. Suitable $C_1$-$C_6$alkylO$C_1$-$C_6$alkyls include but are not limited to, dimethyl ether, ethyl methyl ether, diethyl ether, dipropyl ether, dibutyl ether and diisopropyl ether. In certain embodiments, $R^3$ is COOH.

In certain embodiments, $R^3$ is $C_1$-$C_6$alkoxy. Examples of suitable alkoxys, include but are not limited to, methoxy, ethoxy, butoxy and propoxy. In certain embodiments, $R^3$ is COO$C_1$-$C_6$alkyl. Examples of suitable COO$C_1$-$C_6$alkyl groups include, but are not limited to, methoxycarbonyl, ethoxycarbonyl and butoxycarbonyl.

In certain embodiments, $R^3$ is hydrogen or COOH. In certain embodiments, $R^3$ is $NH_2$. In certain embodiments, $R^3$ is hydrogen, $NH_2$ or COOH.

In certain embodiments, $R^3$ is taken with $R^4$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl. In certain embodiments, $R^3$ is taken with $R^4$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^3$ is taken with $R^4$ and forms a heterocycle. Suitable heterocycles include but are not limited to, nitrogen-containing heterocycles such as pyrrolidine and piperidine. In certain embodiments, $R^3$ is taken with $R^4$ to form a $C_3$-$C_6$cycloalkyl or heterocycle, wherein the $C_3$-$C_6$cycloalkyl or heterocycle is unsubstituted. In certain embodiment, $R^3$ is taken with $R^4$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl. In certain embodiments, $R^3$ is taken with $R^4$ to form a pyrrolidine, wherein the pyrrolidine is substituted with COOH.

With regard to the compounds described herein, $R^4$ is hydrogen, halogen, $C_1$-$C_6$alkyl, halo$C_1$-$C_6$alkyl, OH, $C_1$-$C_6$alkylOH, $C_1$-$C_6$alkylO$C_1$-$C_6$alkyl, $C_1$-$C_6$alkoxy, COOH, $NH_2$ or COO$C_1$-$C_6$alkyl or when taken with $R^3$, $R^7$ or $R^{10}$, forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl, or taken with $R^6$, $R^7$ or $R^{12}$ forms an ($C_1$-$C_5$)alkylene bridge, wherein one or more —$CH_2$-groups are optionally and independently replaced with a moiety selected from the group consisting of O, S and $NR^{14}$.

In certain embodiments, $R^4$ is hydrogen. In certain embodiments described herein, $R^4$ is halogen. Examples of suitable halogens include, but are not limited to, chlorine, bromine, fluorine and iodine. In certain embodiments described herein, $R^4$ is $C_1$-$C_6$alkyl. Examples of suitable $C_1$-$C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^4$ is halo$C_1$-$C_6$alkyl. Suitable halo$C_1$-$C_6$alkyls include but are not limited to, fluoromethyl, difluoromethyl, trifluoromethyl, 2-fluoroethyl, 1,2-difluoroethyl and 2,2-difluoroethyl. In certain embodiments, $R^4$ is OH. In certain embodiments, $R^4$ is $C_1$-$C_6$alkylOH. Examples of suitable alcohols, include, but are not limited to, methanol, ethanol, propanol, butanol and iso-butanol. In certain embodiments, $R^4$ is $C_1$-$C_6$alkylO$C_1$-$C_6$alkyl. Suitable $C_1$-$C_6$alkylO$C_1$-$C_6$alkyls include but are not limited to, dimethyl ether, ethyl methyl ether, diethyl ether, dipropyl ether, dibutyl ether and diisopropyl ether. In certain embodiments, $R^4$ is COOH.

In certain embodiments, $R^4$ is $C_1$-$C_6$alkoxy. Examples of suitable alkoxys, include but are not limited to, methoxy, ethoxy, butoxy and propoxy. In certain embodiments, $R^4$ is COO$C_1$-$C_6$alkyl. Examples of suitable COO$C_1$-$C_6$alkyl groups include, but are not limited to, methoxycarbonyl, ethoxycarbonyl and butoxycarbonyl.

In certain embodiments, $R^4$ is hydrogen or COOH. In certain embodiments, $R^4$ is $NH_2$. In certain embodiments, $R^4$ is hydrogen, $NH_2$ or COOH.

In certain embodiments, $R^4$ is taken with $R^3$, $R^7$ or $R^{10}$ and forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl.

In certain embodiments, $R^4$ is taken with $R^3$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl. In certain embodiments, $R^4$ is taken with $R^3$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^4$ is taken with $R^3$ and forms a heterocycle. Suitable heterocycles include but are not limited to, nitrogen-containing heterocycles such as pyrrolidine and piperidine. In certain embodiments, $R^4$ is taken with $R^3$ to form a $C_3$-$C_6$cycloalkyl or heterocycle, wherein the $C_3$-$C_6$cycloalkyl or heterocycle is unsubstituted. In certain embodiment, $R^4$ is taken with $R^3$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl. In certain embodiments, $R^4$ is taken with $R^3$ to form a pyrrolidine, wherein the pyrrolidine is substituted with COOH.

In certain embodiments, $R^4$ is taken with $R^7$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6alkyl)NH_2$ and $COOC_1$-$C_6$alkyl. In certain embodiments, $R^4$ is taken with $R^7$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^4$ is taken with $R^7$ and forms a heterocycle. Suitable heterocycles include, but are not limited to, pyrrolidine, azetidine, thiolane, thietane, oxetane, tetrahydrofurane and piperidine. Suitable heterocycles include but are not limited to, nitrogen-containing heterocycles such as pyrrolidine and piperidine. In certain embodiments, $R^4$ is taken with $R^7$ to form a $C_3$-$C_6$cycloalkyl or heterocycle, wherein the $C_3$-$C_6$cycloalkyl or heterocycle is unsubstituted. In certain embodiment, $R^4$ is taken with $R^7$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6alkyl)NH_2$ and $COOC_1$-$C_6$alkyl. In certain embodiments, $R^4$ is taken with $R^7$ to form a pyrrolidine, wherein the pyrrolidine is unsubstituted or substituted with

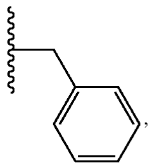, 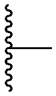, 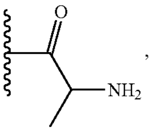,

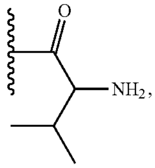, 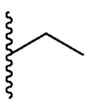 or 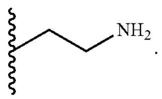.

In certain embodiments, $R^4$ is taken with $R^7$ to form a piperidine, wherein the piperidine is unsubstituted or substituted with

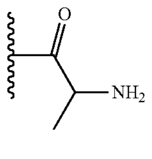 or 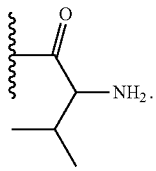.

In certain embodiments, $R^4$ is taken with $R^7$ to form thietane. In certain embodiments, $R^4$ is taken with $R^7$ to form oxetane. In certain embodiments, $R^4$ is taken with $R^7$ to form thiolane. In certain embodiments, $R^4$ is taken with $R^7$ to form tetrahydrofurane.

In certain embodiments, $R^4$ is taken with $R^7$ to form:

Ia

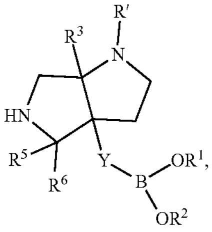

Ib

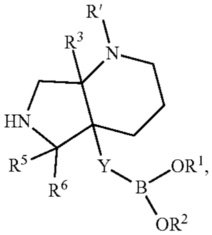

Ic

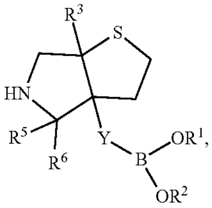

Id

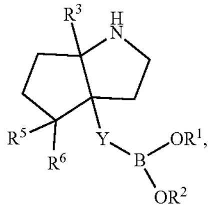

If

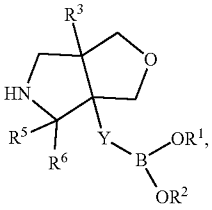

Ig

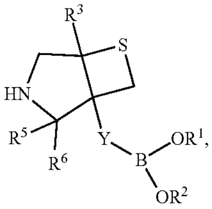 and

Ih

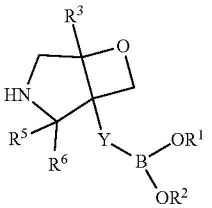

wherein, R' is halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl.

In certain embodiments, $R^4$ is taken with $R^{10}$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl. In certain embodiments, $R^4$ is taken with $R^{10}$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^4$ is taken with $R^{10}$ and forms a heterocycle. Suitable heterocycles include but are not limited to, nitrogen-containing heterocycles such as pyrrolidine and piperidine. In certain embodiments, $R^4$ is taken with $R^{10}$ to form a $C_3$-$C_6$cycloalkyl or heterocycle, wherein the $C_3$-$C_6$cycloalkyl or heterocycle is unsubstituted. In certain embodiment, $R^4$ is taken with $R^{10}$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl. In certain embodiments, $R^4$ is taken with $R^{10}$ to form a cyclopropyl or cyclobutyl, wherein the cyclopropyl or cyclobutyl is unsubstituted. In certain embodiments, $R^{10}$ is taken with $R^4$ to form a cyclopropyl or cyclobutyl, wherein the cyclopropyl or cyclobutyl is substituted with OH.

In certain embodiments, $R^4$ is taken with $R^6$, $R^7$ or $R^{12}$ to form an ($C_1$-$C_5$)alkylene bridge, wherein one or more —$CH_2$— groups are optionally and independently replaced with a moiety selected from the group consisting of O, S and $NR^{14}$. In certain embodiments, $R^4$, when taken with $R^6$ forms a ($C_1$-$C_5$)alkylene bridge. Examples of suitable bridges include, but are not limited to,

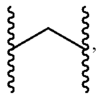, 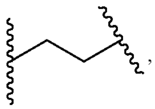, and 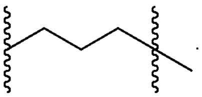.

In certain embodiments, $R^4$, when taken with $R^6$ forms a ($C_1$-$C_5$)alkylene bridge, wherein the bridge is

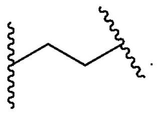.

In certain embodiments, $R^4$, when taken with $R^6$ forms a ($C_1$-$C_5$)alkylene bridge, wherein one or more —$CH_2$— groups are optionally and independently replaced with $NR^{14}$. Examples of suitable bridges include, but are n limited to,

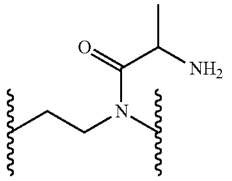 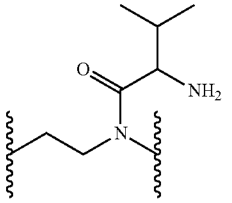 or

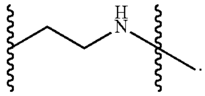.

In certain embodiments, $R^4$ is taken with $R^7$ to form an ($C_1$-$C_5$)alkylene bridge, wherein one or more —$CH_2$— groups are optionally and independently replaced with a moiety selected from the group consisting of O, S and $NR^{14}$.

In certain embodiments, $R^4$ is taken with $R^{12}$ to form an ($C_1$-$C_5$)alkylene bridge, wherein one or more —$CH_2$— groups are optionally and independently replaced with a moiety selected from the group consisting of O, S and $NR^{14}$. In certain embodiments, $R^4$, when taken with $R^{12}$ forms a ($C_1$-$C_5$)alkylene bridge. Examples of suitable bridges include, but are not limited to,

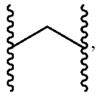, 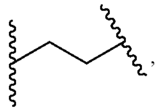, and 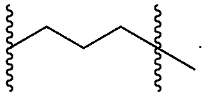.

In certain embodiments, $R^4$, when taken with $R^{12}$ forms a ($C_1$-$C_5$)alkylene bridge, wherein the bridge is

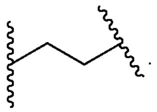 [SMILES: *CC*].

In certain embodiments, $R^4$, when taken with $R^{12}$ forms a ($C_1$-$C_5$)alkylene bridge, wherein one or more —$CH_2$— groups are optionally and independently replaced with $NR^{14}$. Examples of suitable bridges include, but are not limited to,

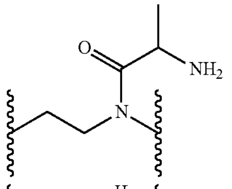 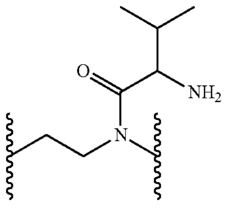 or

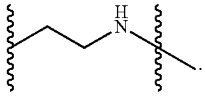.

With regard to the compounds described herein, $R^5$ is hydrogen, halogen, $C_1$-$C_6$alkyl, halo$C_1$-$C_6$alkyl, OH, $C_1$-$C_6$alkylOH, $C_1$-$C_6$alkyl$OC_1$-$C_6$alkyl, $C_1$-$C_6$alkoxy, COOH or $COOC_1$-$C_6$alkyl, or taken with $R^6$ forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl. In certain embodiments, $R^5$ is hydrogen. In certain embodiments described herein, $R^5$ is halogen. Examples of suitable halogens include, but are not limited to, chlorine, bromine, fluorine and iodine. In certain embodiments described herein, $R^5$ is $C_1$-$C_6$alkyl. Examples of suitable $C_1$-$C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^5$ is halo$C_1$-$C_6$alkyl. Suitable halo$C_1$-$C_6$alkyls include but are not limited to, fluoromethyl, difluoromethyl, trifluoromethyl, 2-fluoroethyl, 1,2-difluoroethyl and 2,2-difluoroethyl. In certain embodiments, $R^5$ is OH. In certain embodiments, $R^5$ is $C_1$-$C_6$alkylOH. Examples of suitable alcohols, include, but are not limited to, methanol, ethanol, propanol, butanol and iso-butanol. In certain embodiments, $R^5$ is $C_1$-$C_6$alkyl$OC_1$-$C_6$alkyl. Suitable $C_1$-$C_6$alkyl$OC_1$-$C_6$alkyls include but are not limited to, dimethyl ether, ethyl methyl ether, diethyl ether, dipropyl ether, dibutyl ether and diisopropyl ether. In certain embodiments, $R^5$ is COOH.

In certain embodiments, $R^5$ is $C_1$-$C_6$alkoxy. Examples of suitable alkoxys, include but are not limited to, methoxy, ethoxy, butoxy and propoxy. In certain embodiments, $R^5$ is $COOC_1$-$C_6$alkyl. Examples of suitable $COOC_1$-$C_6$alkyl groups include, but are not limited to, methoxycarbonyl, ethoxycarbonyl and butoxycarbonyl.

In certain embodiments, $R^5$ is taken with $R^6$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl. In certain embodiments, $R^5$ is taken with $R^6$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^5$ is taken with $R^6$ and forms a heterocycle. Suitable heterocycles include but are not limited to, nitrogen-containing heterocycles such as pyrrolidine and piperidine. In certain embodiments, $R^5$ is taken with $R^6$ to form a $C_3$-$C_6$cycloalkyl or heterocycle, wherein the $C_3$-$C_6$cycloalkyl or heterocycle is unsubstituted. In certain embodiment, $R^5$ is taken with $R^6$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl. In certain embodiments, $R^5$ is taken with $R^6$ to form a pyrrolidine, wherein the pyrrolidine is substituted with COOH.

With regard to the compounds described herein, $R^6$ is hydrogen, halogen, $C_1$-$C_6$alkyl, halo$C_1$-$C_6$alkyl, OH, $C_1$-$C_6$alkylOH, $C_1$-$C_6$alkyl$OC_1$-$C_6$alkyl, $C_1$-$C_6$alkoxy, COOH or $COOC_1$-$C_6$alkyl or when taken with $R^5$, $R^7$ or $R^{12}$, forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl, or taken with $R^4$ or $R^{10}$ forms an ($C_1$-$C_5$)alkylene bridge, wherein one or more —$CH_2$-groups are optionally and independently replaced with a moiety selected from the group consisting of O, S and $NR^{14}$.

In certain embodiments, $R^6$ is hydrogen. In certain embodiments described herein, $R^6$ is halogen. Examples of suitable halogens include, but are not limited to, chlorine, bromine, fluorine and iodine. In certain embodiments described herein, $R^6$ is $C_1$-$C_6$alkyl. Examples of suitable $C_1$-$C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^6$ is halo$C_1$-$C_6$alkyl. Suitable halo$C_1$-$C_6$alkyls include but are not limited to, fluoromethyl, difluoromethyl, trifluoromethyl, 2-fluoroethyl, 1,2-difluoroethyl and 2,2-difluoroethyl. In certain embodiments, $R^6$ is OH. In certain embodiments, $R^6$ is $C_1$-$C_6$alkylOH. Examples of suitable alcohols, include, but are not limited to, methanol, ethanol, propanol, butanol and iso-butanol. In certain embodiments, $R^6$ is $C_1$-$C_6$alkyl$OC_1$-$C_6$alkyl. Suitable $C_1$-$C_6$alkyl$OC_1$-$C_6$alkyls include but are not limited to, dimethyl ether, ethyl methyl ether, diethyl ether, dipropyl ether, dibutyl ether and diisopropyl ether. In certain embodiments, $R^6$ is COOH.

In certain embodiments, $R^6$ is $C_1$-$C_6$alkoxy. Examples of suitable alkoxys, include but are not limited to, methoxy, ethoxy, butoxy and propoxy. In certain embodiments, $R^6$ is $COOC_1$-$C_6$alkyl. Examples of suitable $COOC_1$-$C_6$alkyl groups include, but are not limited to, methoxycarbonyl, ethoxycarbonyl and butoxycarbonyl.

In certain embodiments, $R^6$ is taken with $R^5$, $R^7$ or $R^{12}$ and forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl.

In certain embodiments, $R^6$ is taken with $R^5$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl. In certain embodiments, $R^6$ is taken with $R^5$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^6$ is taken with $R^5$ and forms a heterocycle. Suitable heterocycles include but are not limited to, nitrogen-containing heterocycles such as pyrrolidine and piperidine. In certain embodiments, $R^6$ is taken with $R^5$ to form a $C_3$-$C_6$cycloalkyl or heterocycle, wherein the $C_3$-$C_6$cycloalkyl or heterocycle is unsubstituted. In certain embodiment, $R^6$ is taken with $R^5$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6$alkyl)$NH_2$ and $COOC_1$-$C_6$alkyl. In certain embodiments, $R^6$ is taken with $R^5$ to form a pyrrolidine, wherein the pyrrolidine is substituted with COOH.

In certain embodiments, $R^6$ is taken with $R^7$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6$alkyl)$NH_2$ and $COOC_1$-$C_6$alkyl. In certain embodiments, $R^6$ is taken with $R^7$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^6$ is taken with $R^7$ and forms a heterocycle. Suitable heterocycles include, but are not limited to, pyrrolidine, azetidine, thiolane, thietane, oxetane, tetrahyrdrofurane and piperidine. Suitable heterocycles include but are not limited to, nitrogen-containing heterocycles such as pyrrolidine and piperidine. In certain embodiments, $R^6$ is taken with $R^7$ to form a cyclopentyl ring. In certain embodiments, $R^6$ is taken with $R^7$ to form a $C_3$-$C_6$cycloalkyl or heterocycle, wherein the $C_3$-$C_6$cycloalkyl or heterocycle is unsubstituted. In certain embodiment, $R^6$ is taken with $R^7$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6$alkyl)$NH_2$ and $COOC_1$-$C_6$alkyl.

In certain embodiments, $R^6$ is taken with $R^{12}$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6$alkyl)$NH_2$ and $COOC_1$-$C_6$alkyl. In certain embodiments, $R^6$ is taken with $R^{12}$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^6$ is taken with $R^{12}$ and forms a heterocycle. Suitable heterocycles include but are not limited to, nitrogen-containing heterocycles such as pyrrolidine and piperidine. In certain embodiments, $R^6$ is taken with $R^{12}$ to form a piperidine. In certain embodiments, $R^6$ is taken with $R^{12}$ to form a $C_3$-$C_6$cycloalkyl or heterocycle, wherein the $C_3$-$C_6$cycloalkyl or heterocycle is unsubstituted. In certain embodiment, $R^6$ is taken with $R^{12}$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6$alkyl)$NH_2$ and $COOC_1$-$C_6$alkyl.

In certain embodiments, $R^6$ is taken with $R^4$ or $R^{10}$ to form an $(C_1$-$C_5)$alkylene bridge, wherein one or more —$CH_2$— groups are optionally and independently replaced with a moiety selected from the group consisting of O, S and $NR^{14}$. In certain embodiments, $R^6$, when taken with $R^4$ forms a $(C_1$-$C_5)$alkylene bridge. Examples of suitable bridges include, but are not limited to,

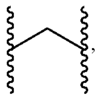
,
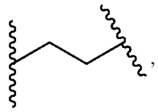
, and
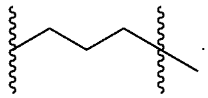
.

In certain embodiments, $R^6$, when taken with $R^4$ forms a $(C_1$-$C_5)$alkylene bridge, wherein one or more —$CH_2$— groups is independently replaced with $NR^{14}$.

In certain embodiments, $R^6$, when taken with $R^4$ forms a $(C_1$-$C_5)$alkylene bridge, wherein the bridge is

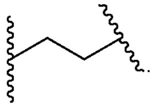 [SMILES: *CC*]
.

In certain embodiments, $R^6$, when taken with $R^4$ forms a $(C_1$-$C_5)$alkylene bridge, wherein one or more —$CH_2$— groups are optionally and independently replaced with $NR^{14}$. Examples of suitable bridges include, but are not limited to,

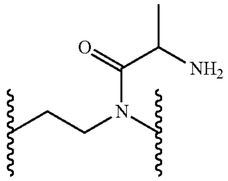

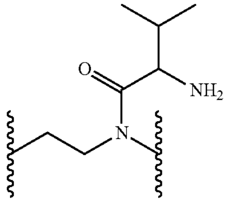
or
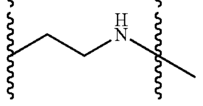
.

In certain embodiments, $R^6$ is taken with $R^{10}$ to form an $(C_2$-$C_5)$alkylene bridge, wherein one or more —$CH_2$— groups are optionally and independently replaced with a moiety selected from the group consisting of O, S and $NR^{14}$. In certain embodiments, $R^6$, when taken with $R^{10}$ forms a $(C_1$-$C_5)$alkylene bridge. Examples of suitable bridges include, but are not limited to,

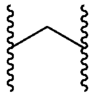
,
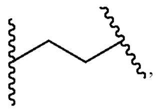
, and
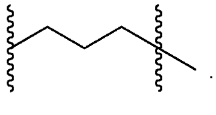
.

In certain embodiments, $R^6$, when taken with $R^{10}$ forms a $(C_1\text{-}C_5)$alkylene bridge, wherein the bridge is

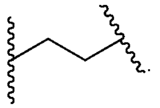 [SMILES: *CC*]

With regard to the compounds described herein, $R^7$ is hydrogen, halogen, $C_1\text{-}C_6$alkyl, $C_3\text{-}C_6$cycloalkyl, halo$C_1\text{-}C_6$alkyl, OH, $C_1\text{-}C_6$alkylOH, $C_1\text{-}C_6$alkyl$OC_1\text{-}C_6$alkyl, $C_1\text{-}C_6$alkoxy, COOH or $COOC_1\text{-}C_6$alkyl or when taken with $R^4$ or $R^6$, forms a $C_3\text{-}C_6$cycloalkyl or heterocycle, wherein the $C_3\text{-}C_6$cycloalkyl or heterocycle is unsubstituted or substituted with 1 to 3 substituents selected from the group consisting of halogen, OH, $C_1\text{-}C_6$alkylOH, oxo, $C_1\text{-}C_6$alkyl, $C_1\text{-}C_6$haloalkyl, $COC_1\text{-}C_6$alkyl, $C_1\text{-}C_6$alkoxy, COOH, $NH_2$, $C_1\text{-}C_6$alkyl$NH_2$, $C_1\text{-}C_6$alkylphenyl, $CO(C_1\text{-}C_6alkyl)NH_2$ and $COOC_1\text{-}C_6$alkyl, or taken with $R^4$, $R^{10}$ or $R^{12}$ forms an $(C_1\text{-}C_5)$alkylene bridge, wherein one or more —$CH_2$— groups are optionally and independently replaced with a moiety selected from the group consisting of O, S and $NR^{14}$.

In certain embodiments, $R^7$ is hydrogen. In certain embodiments described herein, $R^7$ is halogen. Examples of suitable halogens include, but are not limited to, chlorine, bromine, fluorine and iodine. In certain embodiments described herein, $R^7$ is $C_1\text{-}C_6$alkyl. Examples of suitable $C_1\text{-}C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^7$ is $C_3\text{-}C_6$cycloalkyl. Suitable cycloalkyl groups include, but are not limited to, cyclopropyl, cyclobutyl, cyclopentyl, cyclohexyl. In certain embodiments, $R^7$ is halo$C_1\text{-}C_6$alkyl. Suitable halo$C_1\text{-}C_6$alkyls include but are not limited to, fluoromethyl, difluoromethyl, trifluoromethyl, 2-fluoroethyl, 1,2-difluoroethyl and 2,2-difluoroethyl. In certain embodiments, $R^7$ is OH. In certain embodiments, $R^7$ is $C_1\text{-}C_6$alkylOH. Examples of suitable alcohols, include, but are not limited to, methanol, ethanol, propanol, butanol and iso-butanol. In certain embodiments, $R^7$ is $C_1\text{-}C_6$alkyl$OC_1\text{-}C_6$alkyl. Suitable $C_1\text{-}C_6$alkyl$OC_1\text{-}C_6$alkyls include but are not limited to, dimethyl ether, ethyl methyl ether, diethyl ether, dipropyl ether, dibutyl ether and diisopropyl ether. In certain embodiments, $R^7$ is COOH.

In certain embodiments, $R^7$ is $C_1\text{-}C_6$alkoxy. Examples of suitable alkoxys, include but are not limited to, methoxy, ethoxy, butoxy and propoxy. In certain embodiments, $R^7$ is $COOC_1\text{-}C_6$alkyl. Examples of suitable $COOC_1\text{-}C_6$alkyl groups include, but are not limited to, methoxycarbonyl, ethoxycarbonyl and butoxycarbonyl.

In certain embodiments, $R^7$ is methyl.

In certain embodiments, $R^7$ is taken with $R^4$ or $R^6$ and forms a $C_3\text{-}C_6$cycloalkyl or heterocycle, wherein the $C_3\text{-}C_6$cycloalkyl or heterocycle is unsubstituted or substituted with 1 to 3 substituents selected from the group consisting of halogen, OH, $C_1\text{-}C_6$alkylOH, oxo, $C_1\text{-}C_6$alkyl, $C_1\text{-}C_6$haloalkyl, $COC_1\text{-}C_6$alkyl, $C_1\text{-}C_6$alkoxy, COOH, $NH_2$, $C_1\text{-}C_6$alkyl$NH_2$, $C_1\text{-}C_6$alkylphenyl, $CO(C_1\text{-}C_6alkyl)NH_2$ and $COOC_1\text{-}C_6$alkyl.

In certain embodiments, $R^7$ is taken with $R^4$ to form a $C_3\text{-}C_6$cycloalkyl or heterocycle, wherein the $C_3\text{-}C_6$cycloalkyl or heterocycle is unsubstituted or substituted with 1 to 3 substituents selected from the group consisting of halogen, OH, $C_1\text{-}C_6$alkylOH, oxo, $C_1\text{-}C_6$alkyl, $C_1\text{-}C_6$haloalkyl, $COC_1\text{-}C_6$alkyl, $C_1\text{-}C_6$alkoxy, COOH, $NH_2$, $C_1\text{-}C_6$alkyl$NH_2$, $C_1\text{-}C_6$alkylphenyl, $CO(C_1\text{-}C_6alkyl)NH_2$ and $COOC_1\text{-}C_6$alkyl. In certain embodiments, $R^7$ is taken with $R^4$ and forms a $C_3\text{-}C_6$cycloalkyl. Suitable cycloalkyl groups include, but are not limited to, cyclopropyl, cyclobutyl, cyclopentyl, cyclohexyl. In certain embodiments, $R^7$ is taken with $R^4$ and forms a heterocycle. Suitable heterocycles include, but are not limited to, pyrrolidine, azetidine, thiolane, thietane, oxetane, tetrahyrdrofurane and piperidine. Suitable heterocycles include but are not limited to, nitrogen-containing heterocycles such as pyrrolidine and piperidine. In certain embodiments, $R^4$ is taken with $R^7$ to form a $C_3\text{-}C_6$cycloalkyl or heterocycle, wherein the $C_3\text{-}C_6$cycloalkyl or heterocycle is unsubstituted. In certain embodiment, $R^7$ is taken with $R^4$ to form a $C_3\text{-}C_6$cycloalkyl or heterocycle, wherein the $C_3\text{-}C_6$cycloalkyl or heterocycle is substituted with 1 to 3 substituents selected from the group consisting of halogen, OH, $C_1\text{-}C_6$alkylOH, oxo, $C_1\text{-}C_6$alkyl, $C_1\text{-}C_6$haloalkyl, $COC_1\text{-}C_6$alkyl, $C_1\text{-}C_6$alkoxy, COOH, $NH_2$, $C_1\text{-}C_6$alkyl$NH_2$, $C_1\text{-}C_6$alkylphenyl, $CO(C_1\text{-}C_6alkyl)NH_2$ and $COOC_1\text{-}C_6$alkyl. In certain embodiments, $R^7$ is taken with $R^4$ to form a pyrrolidine, wherein the pyrrolidine is unsubstituted or substituted with

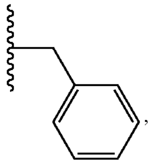,
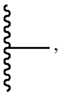,
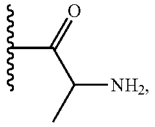
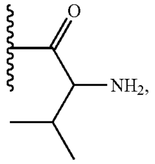
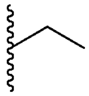
or
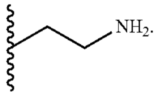

In certain embodiments, $R^7$ is taken with $R^4$ to form a piperidine, wherein the piperidine is unsubstituted or substituted with

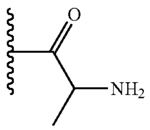
or
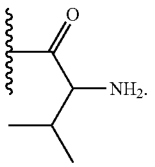

In certain embodiments, $R^7$ is taken with $R^4$ to form thietane. In certain embodiments, $R^7$ is taken with $R^4$ to form oxetane. In certain embodiments, $R^7$ is taken with $R^4$ to form thiolane. In certain embodiments, $R^7$ is taken with $R^4$ to form tetrahydrofurane.

In certain embodiments, $R^7$ is taken with $R^4$ to form:

Ia'

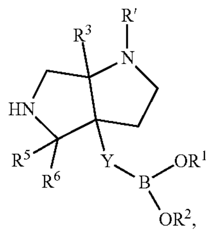

Ib

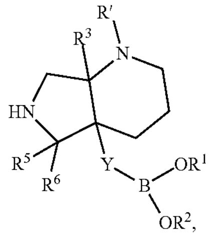

Ic

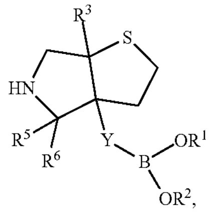

Id

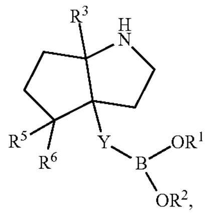

If

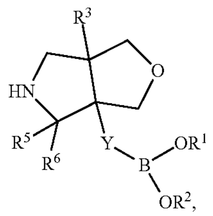

Ig

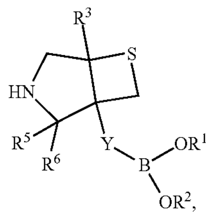

and

-continued

Ih

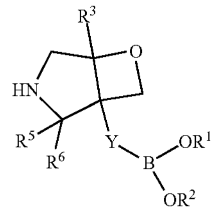

wherein, R' is halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl.

In certain embodiments, $R^7$ is taken with $R^6$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl. In certain embodiments, $R^7$ is taken with $R^6$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^7$ is taken with $R^6$ and forms a heterocycle. Suitable heterocycles include, but are not limited to, pyrrolidine, azetidine, thiolane, thietane, oxetane, tetrahyrdrofurane and piperidine. Suitable heterocycles include but are not limited to, nitrogen-containing heterocycles such as pyrrolidine and piperidine. In certain embodiments, $R^7$ is taken with $R^6$ to form a $C_3$-$C_6$cycloalkyl or heterocycle, wherein the $C_3$-$C_6$cycloalkyl or heterocycle is unsubstituted. In certain embodiment, $R^7$ is taken with $R^6$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and $COOC_1$-$C_6$alkyl. In certain embodiments, $R^7$ is taken with $R^6$ to form a cyclopentyl.

In certain embodiments, $R^7$ is taken with $R^4$, $R^{10}$ or $R^{12}$ to form an ($C_1$-$C_5$)alkylene bridge, wherein one or more $—CH_2—$ groups are optionally and independently replaced with a moiety selected from the group consisting of O, S and $NR^{14}$. In certain embodiments, $R^7$, when taken with $R^4$ forms a ($C_1$-$C_5$)alkylene bridge. Examples of suitable bridges include, but are not limited to,

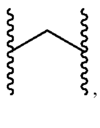

,

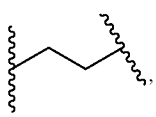

, and

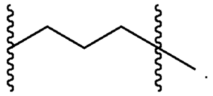

.

In certain embodiments, $R^7$, when taken with $R^4$ forms a ($C_1$-$C_5$)alkylene bridge, wherein one or more $—CH_2—$ groups is independently replaced with $NR^{14}$. Examples of suitable bridges include, but are not limited to,

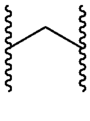, 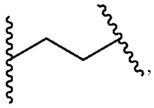, and

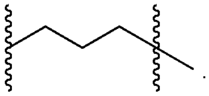.

In certain embodiments $R^7$, when taken with $R^4$ forms a ($C_1$-$C_5$)alkylene bridge, wherein the bridge is

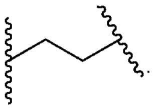.

In certain embodiments, $R^7$ is taken with $R^{10}$ to form an ($C_1$-$C_5$)alkylene bridge, wherein one or more —$CH_2$— groups are optionally and independently replaced with a moiety selected from the group consisting of O, S and $NR^{14}$. In certain embodiments, $R^7$, when taken with $R^{10}$ forms a ($C_1$-$C_5$)alkylene bridge. Examples of suitable bridges include, but are not limited to,

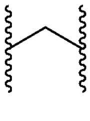, 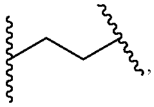, and

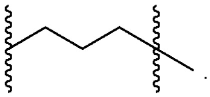.

In certain embodiments, $R^7$, when taken with $R^{10}$ forms a ($C_1$-$C_5$)alkylene bridge, wherein the bridge is

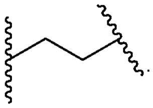.

In certain embodiments, $R^7$ is taken with $R^{12}$ to form an ($C_1$-$C_5$)alkylene bridge, wherein one or more —$CH_2$— groups are optionally and independently replaced with a moiety selected from the group consisting of O, S and $NR^{14}$. In certain embodiments, $R^7$, when taken with $R^{12}$ forms a ($C_1$-$C_5$)alkylene bridge. Examples of suitable bridges include, but are not limited to,

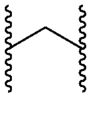, 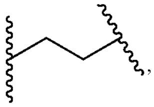, and

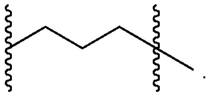.

In certain embodiments, $R^7$, when taken with $R^{12}$ forms a ($C_1$-$C_5$)alkylene bridge, wherein the bridge is

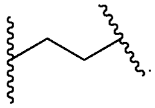.

With regard to the compounds described herein, $R^8$ is hydrogen, $C_3$-$C_6$cycloalkyl, $C_1$-$C_6$alkyl, $C_1$-$C_6$alkylaryl, $C_1$-$C_6$alkyl$NH_2$, $COC_1$-$C_6$alkyl$NH_2$, $COC_1$-$C_6$alkylNH($C_1$-$C_6$alkyl), $COC_1$-$C_6$alkylN($C_1$-$C_6$alkyl)$_2$, $C_1$-$C_6$haloalkyl, $C_1$-$C_6$alkylOH or $COC_1$-$C_6$alkyl.

In certain embodiments described herein, $R^8$ is hydrogen. In certain embodiments, $R^8$ is $C_3$-$C_6$cycloalkyl. Suitable cycloalkyl groups include, but are not limited to, cyclopropyl, cyclobutyl, cyclopentyl, cyclohexyl. In certain embodiments described herein, $R^8$ is $C_1$-$C_6$alkyl. Examples of suitable $C_1$-$C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^8$ is $C_1$-$C_6$aryl. Suitable examples include, but are not limited to, $CH_2$phenyl. In certain embodiments, $R^8$ is $C_1$-$C_6$alkyl$NH_2$. Examples of suitable $C_1$-$C_6$alkyl$NH_2$ groups include, but are not limited to, $CH_2NH_2$, $CH_2$ $CH_2NH_2$ and $CH_2CH_2CH_2NH_2$. In certain embodiments, $R^8$ is $COC_1$-$C_6$alkyl$NH_2$. In certain embodiments, $R^8$ is $COC_1$-$C_6$alkylNH($C_1$-$C_6$alkyl). In certain embodiments, $R^8$ is $COC_1$-$C_6$alkylN($C_1$-$C_6$alkyl)$_2$.

In certain embodiments, $R^8$ is halo$C_1$-$C_6$alkyl. Suitable halo$C_1$-$C_6$alkyls include but are not limited to, fluoromethyl, difluoromethyl, trifluoromethyl, 2-fluoroethyl, 1,2-difluoroethyl and 2,2-difluoroethyl. In certain embodiments, $R^8$ is $C_1$-$C_6$alkylOH. Examples of suitable alcohols, include, but are not limited to, methanol, ethanol, propanol, butanol and iso-butanol. In certain embodiments, $R^8$ is $COC_1$-$C_6$alkyl.

With regard to the compounds described herein, $R^9$ is halogen, $C_1$-$C_6$alkyl, halo$C_1$-$C_6$alkyl, OH, $C_1$-$C_6$alkylOH, $C_1$-$C_6$alkyl$OC_1$-$C_6$alkyl, $C_1$-$C_6$alkoxy, COOH or $COOC_1$-$C_6$alkyl.

In certain embodiments described herein, $R^9$ is halogen. Examples of suitable halogens include, but are not limited to, chlorine, bromine, fluorine and iodine. In certain embodiments described herein, $R^9$ is $C_1$-$C_6$alkyl. Examples of suitable $C_1$-$C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^9$ is halo$C_1$-$C_6$alkyl. Suitable halo$C_1$-$C_6$alkyls include but are not limited to, fluoromethyl, difluoromethyl, trifluoromethyl, 2-fluoroethyl, 1,2-difluoroethyl and 2,2-difluoroethyl. In certain embodiments, $R^9$ is OH. In certain embodiments, $R^9$ is $C_1$-$C_6$alkylOH. Examples of suitable alcohols, include, but are not limited to, methanol, ethanol, propanol, butanol and iso-butanol. In certain embodiments, $R^9$ is $C_1$-$C_6$alkylO$C_1$-$C_6$alkyl. Suitable $C_1$-$C_6$alkylO$C_1$-$C_6$alkyls include but are not limited to, dimethyl ether, ethyl methyl ether, diethyl ether, dipropyl ether, dibutyl ether and diisopropyl ether. In certain embodiments, $R^9$ is COOH.

In certain embodiments, $R^9$ is $C_1$-$C_6$alkoxy. Examples of suitable alkoxys, include but are not limited to, methoxy, ethoxy, butoxy and propoxy. In certain embodiments, $R^9$ is COO$C_1$-$C_6$alkyl. Examples of suitable COO$C_1$-$C_6$alkyl groups include, but are not limited to, methoxycarbonyl, ethoxycarbonyl and butoxycarbonyl.

With regard to the compounds described herein, $R^{10}$ is halogen, $C_1$-$C_6$alkyl, halo$C_1$-$C_6$alkyl, OH, $C_1$-$C_6$alkylOH, $C_1$-$C_6$alkylO$C_1$-$C_6$alkyl, COOH, $C_1$-$C_6$alkoxy, or COO$C_1$-$C_6$alkyl or when taken with $R^4$ or $R^2$, forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl, or taken with $R^6$ or $R^7$ forms an ($C_1$-$C_5$)alkylene bridge, wherein one or more —$CH_2$— groups are optionally and independently replaced with a moiety selected from the group consisting of O, S and $NR^{14}$.

In certain embodiments described herein, $R^{10}$ is halogen. Examples of suitable halogens include, but are not limited to, chlorine, bromine, fluorine and iodine. In certain embodiments described herein, $R^{10}$ is $C_1$-$C_6$alkyl. Examples of suitable $C_1$-$C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^{10}$ is halo$C_1$-$C_6$alkyl. Suitable halo$C_1$-$C_6$alkyls include but are not limited to, fluoromethyl, difluoromethyl, trifluoromethyl, 2-fluoroethyl, 1,2-difluoroethyl and 2,2-difluoroethyl. In certain embodiments, $R^{10}$ is OH. In certain embodiments, $R^{10}$ is $C_1$-$C_6$alkylOH. Examples of suitable alcohols, include, but are not limited to, methanol, ethanol, propanol, butanol and iso-butanol. In certain embodiments, $R^{10}$ is $C_1$-$C_6$alkylO$C_1$-$C_6$alkyl. Suitable $C_1$-$C_6$alkylO$C_1$-$C_6$alkyls include but are not limited to, dimethyl ether, ethyl methyl ether, diethyl ether, dipropyl ether, dibutyl ether and diisopropyl ether. In certain embodiments, $R^{10}$ is COOH.

In certain embodiments, $R^{10}$ is $C_1$-$C_6$alkoxy. Examples of suitable alkoxys, include but are not limited to, methoxy, ethoxy, butoxy and propoxy. In certain embodiments, $R^{10}$ is COO$C_1$-$C_6$alkyl. Examples of suitable COO$C_1$-$C_6$alkyl groups include, but are not limited to, methoxycarbonyl, ethoxycarbonyl and butoxycarbonyl.

In certain embodiments, $R^{10}$ is taken with $R^4$ or $R^{12}$ and forms a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl.

In certain embodiments, $R^{10}$ is taken with $R^4$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl. In certain embodiments, $R^{10}$ is taken with $R^4$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^{10}$ is taken with $R^4$ and forms a heterocycle. Suitable heterocycles include but are not limited to, nitrogen-containing heterocycles such as pyrrolidine and piperidine. In certain embodiments, $R^{10}$ is taken with $R^4$ to form a $C_3$-$C_6$cycloalkyl or heterocycle, wherein the $C_3$-$C_6$cycloalkyl or heterocycle is unsubstituted. In certain embodiment, $R^{10}$ is taken with $R^4$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl.

In certain embodiments, $R^{10}$ is taken with $R^4$ to form a cyclopropyl or cyclobutyl, wherein the cyclopropyl or cyclobutyl is unsubstituted. In certain embodiments, $R^{10}$ is taken with $R^4$ to form a cyclopropyl or cyclobutyl, wherein the cyclopropyl or cyclobutyl is substituted with OH.

In certain embodiments, $R^{10}$ is taken with $R^{12}$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl. Suitable cycloalkyl groups include, but are not limited to, cyclopropyl, cyclobutyl, cyclopentyl, cyclohexyl. In certain embodiments, $R^{10}$ is taken with $R^{12}$ and forms a heterocycle. Suitable heterocycles include, but are not limited to, pyrrolidine, azetidine, thiolane, thietane, oxetane, tetrahyrdrofurane and piperidine. Suitable heterocycles include but are not limited to, nitrogen-containing heterocycles such as pyrrolidine and piperidine. In certain embodiments, $R^{10}$ is taken with $R^{12}$ to form a $C_3$-$C_6$cycloalkyl or heterocycle, wherein the $C_3$-$C_6$cycloalkyl or heterocycle is unsubstituted. In certain embodiment, $R^{10}$ is taken with $R^{12}$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, CO$C_1$-$C_6$alkyl, $C_1$-$C_6$alkoxy, COOH, $NH_2$, $C_1$-$C_6$alkyl$NH_2$, $C_1$-$C_6$alkylphenyl, CO($C_1$-$C_6$alkyl)$NH_2$ and COO$C_1$-$C_6$alkyl.

In certain embodiments, $R^{10}$ is taken with $R^{12}$ to form a cyclopropyl or cyclobutyl, wherein the cyclopropyl or cyclobutyl is unsubstituted. In certain embodiments, $R^{10}$ is taken with $R^{12}$ to form a cyclopropyl or cyclobutyl, wherein the cyclopropyl or cyclobutyl is substituted with OH.

In certain embodiments, $R^{10}$ is taken with $R^6$ or $R^7$ to form an ($C_1$-$C_5$)alkylene bridge, wherein one or more —$CH_2$— groups are optionally and independently replaced with a moiety selected from the group consisting of O, S and $NR^{14}$. In certain embodiments, $R^{10}$, when taken with $R^6$ forms a ($C_1$-$C_5$)alkylene bridge. Examples of suitable bridges include, but are not limited to,

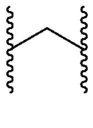, 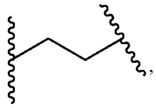, and

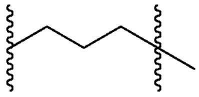.

In certain embodiments, $R^{10}$, when taken with $R^6$ forms a $(C_1\text{-}C_5)$alkylene bridge, wherein the bridge is

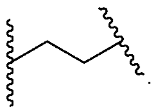 [SMILES: *CC*].

In certain embodiments, $R^{10}$ is taken with $R^7$ to form an $(C_1\text{-}C_5)$alkylene bridge, wherein one or more —$CH_2$— groups are optionally and independently replaced with a moiety selected from the group consisting of O, S and $NR^{14}$. In certain embodiments, $R^{10}$, when taken with $R^7$ forms a $(C_1\text{-}C_5)$alkylene bridge. Examples of suitable bridges include but are not limited to,

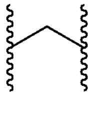, 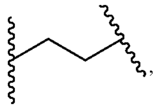, and

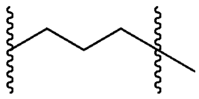.

In certain embodiments $R^{10}$, when taken with $R^7$ forms a $(C_1\text{-}C_5)$alkylene bridge, wherein the bridge is

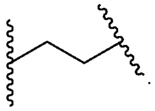 [SMILES: *CC*].

With regard to the compounds described herein, $R^{11}$ is hydrogen, $C_3\text{-}C_6$cycloalkyl, $C_1\text{-}C_6$alkyl, $C_1\text{-}C_6$alkylaryl, $C_1\text{-}C_6$alkyl$NH_2$, $COC_1\text{-}C_6$alkyl$NH_2$, $COC_1\text{-}C_6$alkylNH$(C_1\text{-}C_6$alkyl), $COC_1\text{-}C_6$alkylN$(C_1\text{-}C_6$alkyl$)_2$, $C_1\text{-}C_6$haloalkyl, $C_1\text{-}C_6$alkylOH or $COC_1\text{-}C_6$alkyl.

In certain embodiments described herein, $R^{11}$ is hydrogen. In certain embodiments, $R^{11}$ is $C_3\text{-}C_6$cycloalkyl. Suitable cycloalkyl groups include, but are not limited to, cyclopropyl, cyclobutyl, cyclopentyl, cyclohexyl. In certain embodiments described herein, $R^{11}$ is $C_1\text{-}C_6$alkyl. Examples of suitable $C_1\text{-}C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^{11}$ is $C_1\text{-}C_6$aryl. Suitable examples include, but are not limited to, $CH_2$phenyl. In certain embodiments, $R^{11}$ is $C_1\text{-}C_6$alkyl$NH_2$. Examples of suitable $C_1\text{-}C_6$alkyl$NH_2$ groups include, but are not limited to, $CH_2NH_2$, $CH_2$ $CH_2NH_2$ and $CH_2CH_2CH_2NH_2$. In certain embodiments, $R^{11}$ is $COC_1\text{-}C_6$alkyl$NH_2$. In certain embodiments, $R^{11}$ is $COC_1\text{-}C_6$alkylNH$(C_1\text{-}C_6$alkyl). In certain embodiments, $R^{11}$ is $COC_1\text{-}C_6$alkylN$(C_1\text{-}C_6$alkyl$)_2$.

In certain embodiments, $R^{11}$ is halo$C_1\text{-}C_6$alkyl. Suitable halo$C_1\text{-}C_6$alkyls include but are not limited to, fluoromethyl, difluoromethyl, trifluoromethyl, 2-fluoroethyl, 1,2-difluoroethyl and 2,2-difluoroethyl. In certain embodiments, $R^{11}$ is $C_1\text{-}C_6$alkylOH. Examples of suitable alcohols, include, but are not limited to, methanol, ethanol, propanol, butanol and iso-butanol. In certain embodiments, $R^{11}$ is $COC_1\text{-}C_6$alkyl.

With regard to the compounds described herein, $R^{12}$ is halogen, $C_1\text{-}C_6$alkyl, halo$C_1\text{-}C_6$alkyl, OH, $C_1\text{-}C_6$alkylOH, $C_1\text{-}C_6$alkyl$OC_1\text{-}C_6$alkyl, COOH, $C_1\text{-}C_6$alkoxy, or $COOC_1\text{-}C_6$alkyl or when taken with $R^6$ or $R^{10}$, forms a $C_3\text{-}C_6$cycloalkyl or heterocycle, wherein the $C_3\text{-}C_6$cycloalkyl or heterocycle is unsubstituted or substituted with 1 to 3 substituents selected from the group consisting of halogen, OH, $C_1\text{-}C_6$alkylOH, oxo, $C_1\text{-}C_6$alkyl, $C_1\text{-}C_6$haloalkyl, $COC_1\text{-}C_6$alkyl, $C_1\text{-}C_6$alkoxy, COOH, $NH_2$, $C_1\text{-}C_6$alkyl$NH_2$, $C_1\text{-}C_6$alkylphenyl, $CO(C_1\text{-}C_6$alkyl$)NH_2$ and $COOC_1\text{-}C_6$alkyl, or taken with $R^6$ or $R^7$ forms an $(C_1\text{-}C_5)$alkylene bridge, wherein one or more —$CH_2$— groups are optionally and independently replaced with a moiety selected from the group consisting of O, S and $NR^{14}$.

In certain embodiments described herein, $R^{12}$ is halogen. Examples of suitable halogens include, but are not limited to, chlorine, bromine, fluorine and iodine. In certain embodiments described herein, $R^{12}$ is $C_1\text{-}C_6$alkyl. Examples of suitable $C_1\text{-}C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^{12}$ is halo$C_1\text{-}C_6$alkyl. Suitable halo$C_1\text{-}C_6$alkyls include but are not limited to, fluoromethyl, difluoromethyl, trifluoromethyl, 2-fluoroethyl, 1,2-difluoroethyl and 2,2-difluoroethyl. In certain embodiments, $R^{12}$ is OH. In certain embodiments, $R^{12}$ is $C_1\text{-}C_6$alkylOH. Examples of suitable alcohols, include, but are not limited to, methanol, ethanol, propanol, butanol and iso-butanol. In certain embodiments, $R^{12}$ is $C_1\text{-}C_6$alkyl$OC_1\text{-}C_6$alkyl. Suitable $C_1\text{-}C_6$alkyl$OC_1\text{-}C_6$alkyls include but are not limited to, dimethyl ether, ethyl methyl ether, diethyl ether, dipropyl ether, dibutyl ether and diisopropyl ether. In certain embodiments, $R^{12}$ is COOH.

In certain embodiments, $R^{12}$ is $C_1\text{-}C_6$alkoxy. Examples of suitable alkoxys, include but are not limited to, methoxy, ethoxy, butoxy and propoxy. In certain embodiments, $R^{12}$ is $COOC_1\text{-}C_6$alkyl. Examples of suitable $COOC_1\text{-}C_6$alkyl groups include, but are not limited to, methoxycarbonyl, ethoxycarbonyl and butoxycarbonyl.

In certain embodiments, $R^{12}$ is taken with $R^6$ or $R^{10}$ and forms a $C_3\text{-}C_6$cycloalkyl or heterocycle, wherein the $C_3\text{-}C_6$cycloalkyl or heterocycle is unsubstituted or substituted with 1 to 3 substituents selected from the group consisting of halogen, OH, $C_1\text{-}C_6$alkylOH, oxo, $C_1\text{-}C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6$alkyl)$NH_2$ and $COOC_1$-$C_6$alkyl.

In certain embodiments, $R^{12}$ is taken with $R^6$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6$alkyl)$NH_2$ and $COOC_1$-$C_6$alkyl. Suitable cycloalkyl groups include, but are not limited to, cyclopropyl, cyclobutyl, cyclopentyl, cyclohexyl. In certain embodiments, $R^{12}$ is taken with $R^6$ and forms a heterocycle. Suitable heterocycles include but are not limited to, nitrogen-containing heterocycles such as pyrrolidine and piperidine. In certain embodiments, $R^{12}$ is taken with $R^6$ to form a $C_3$-$C_6$cycloalhkyl or heterocycle, wherein the $C_3$-$C_6$cycloalkyl or heterocycle is unsubstituted. In certain embodiment, $R^{12}$ is taken with $R^6$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6$alkyl)$NH_2$ and $COOC_1$-$C_6$alkyl.

In certain embodiments, $R^{12}$ is taken with $R^{10}$ to form a $C_3$-$C_6$cycloalkyl or heterocycle, wherein the $C_3$-$C_6$cycloalkyl or heterocycle is unsubstituted or substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6$alkyl)$NH_2$ and $COOC_1$-$C_6$alkyl. In certain embodiments, $R^{12}$ is taken with $R^{10}$ and forms a $C_3$-$C_6$cycloalkyl. Suitable cycloalkyl groups include, but are not limited to, cyclopropyl, cyclobutyl, cyclopentyl, cyclohexyl. In certain embodiments, $R^{12}$ is taken with $R^{10}$ and forms a heterocycle. Suitable heterocycles include, but are not limited to, pyrrolidine, azetidine, thiolane, thietane, oxetane, tetrahyrdrofurane and piperidine. Suitable heterocycles include but are not limited to, nitrogen-containing heterocycles such as pyrrolidine and piperidine. In certain embodiments, $R^{12}$ is taken with $R^{10}$ to form a $C_3$-$C_6$cycloalkyl or heterocycle, wherein the $C_3$-$C_6$cycloalkyl or heterocycle is unsubstituted. In certain embodiment, $R^{12}$ is taken with $R^{10}$ to form a $C_3$-$C_6$cycloalkyl or heterocycle, wherein the $C_3$-$C_6$cycloalkyl or heterocycle is substituted with 1 to 3 substituents selected from the group consisting of halogen, OH, $C_1$-$C_6$alkylOH, oxo, $C_1$-$C_6$alkyl, $C_1$-$C_6$haloalkyl, $COC_1$-$C_6$alkyl, $C_1$-$C_6$alkoxy, COOH, $NH_2$, $C_1$-$C_6$alkyl$NH_2$, $C_1$-$C_6$alkylphenyl, $CO(C_1$-$C_6$alkyl)$NH_2$ and $COOC_1$-$C_6$alkyl. In certain embodiments, $R^{12}$ is taken with $R^{10}$ to form a cyclopentyl.

In certain embodiments, $R^{12}$ is taken with $R^4$ or $R^7$ to form an $(C_1$-$C_5)$alkylene bridge, wherein one or more —$CH_2$— groups are optionally and independently replaced with a moiety selected from the group consisting of O, S and $NR^{14}$. In certain embodiments, $R^{12}$, when taken with $R^4$ forms a $(C_1$-$C_5)$alkylene bridge. Examples of suitable bridges include, but are not limited to,

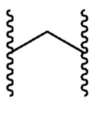
,
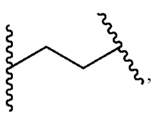
, and

-continued

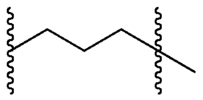
.

In certain embodiments, $R^{12}$, when taken with $R^4$ forms a $(C_1$-$C_5)$alkylene bridge, wherein the bridge is

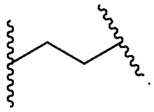 [SMILES: *CC*]
.

In certain embodiments, $R^{12}$ is taken with $R^7$ to form an $(C_1$-$C_5)$alkylene bridge, wherein one or more —$CH_2$— groups are optionally and independently replaced with a moiety selected from the group consisting of O, S and $NR^{14}$. In certain embodiments, $R^{12}$, when taken with $R^7$ forms a $(C_1$-$C_5)$alkylene bridge. Examples of suitable bridges include, but are not limited to,

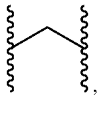
,
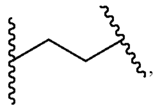
, and

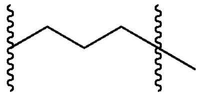
.

In certain embodiments, $R^{12}$, when taken with $R^7$ forms a $(C_1$-$C_5)$alkylene bridge, wherein the bridge is

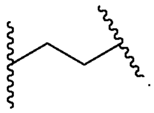 [SMILES: *CC*]
.

With regard to the compounds described herein, $R^{13}$ is halogen, $C_1$-$C_6$alkyl, halo$C_1$-$C_6$alkyl, OH, $C_1$-$C_6$alkylOH, $C_1$-$C_6$alkyl$OC_1$-$C_6$alkyl, $C_1$-$C_6$alkoxy, COOH or $COOC_1$-$C_6$alkyl.

In certain embodiments described herein, $R^{13}$ is halogen. Examples of suitable halogens include, but are not limited to, chlorine, bromine, fluorine and iodine. In certain embodiments described herein, $R^{13}$ is $C_1$-$C_6$alkyl. Examples of suitable $C_1$-$C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^{13}$ is halo$C_1$-$C_6$alkyl. Suitable halo$C_1$-$C_6$alkyls include but are not limited to, fluoromethyl, difluoromethyl, trifluoromethyl, 2-fluoroethyl, 1,2-difluoroethyl and 2,2-difluoroethyl. In certain embodiments, $R^{13}$ is OH. In certain embodiments, $R^3$ is $C_1$-$C_6$alkylOH.

Examples of suitable alcohols, include, but are not limited to, methanol, ethanol, propanol, butanol and iso-butanol. In certain embodiments, $R^3$ is $C_1$-$C_6$alkylO$C_1$-$C_6$alkyl. Suitable $C_1$-$C_6$alkylO$C_1$-$C_6$alkyls include but are not limited to, dimethyl ether, ethyl methyl ether, diethyl ether, dipropyl ether, dibutyl ether and diisopropyl ether. In certain embodiments, $R^3$ is COOH.

In certain embodiments, $R^{13}$ is $C_1$-$C_6$alkoxy. Examples of suitable alkoxys, include but are not limited to, methoxy, ethoxy, butoxy and propoxy. In certain embodiments, $R^3$ is COO$C_1$-$C_6$alkyl. Examples of suitable COO$C_1$-$C_6$alkyl groups include, but are not limited to, methoxycarbonyl, ethoxycarbonyl and butoxycarbonyl.

With regard to the compounds described herein, $R^{14}$ is hydrogen, $C_3$-$C_6$cycloalkyl, $C_1$-$C_6$alkyl, $C_1$-$C_6$alkylaryl, $C_1$-$C_6$alkyl$NH_2$, CO$C_1$-$C_6$alkyl$NH_2$, CO$C_1$-$C_6$alkylNH($C_1$-$C_6$alkyl), CO$C_1$-$C_6$alkylN($C_1$-$C_6$alkyl)$_2$, $C_1$-$C_6$haloalkyl, $C_1$-$C_6$alkylOH, CO$C_1$-$C_6$alkyl or COheterocycle wherein the heterocycle is a 3-7 membered nitrogen containing ring.

In certain embodiments described herein, $R^{14}$ is hydrogen. In certain embodiments, $R^{14}$ is $C_3$-$C_6$cycloalkyl. Suitable cycloalkyl groups include, but are not limited to, cyclopropyl, cyclobutyl, cyclopentyl, cyclohexyl. In certain embodiments described herein, $R^{14}$ is $C_1$-$C_6$alkyl. Examples of suitable $C_1$-$C_6$alkyl groups can include, but are not limited to, methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl and 1-ethyl-1-methylpropyl.

In certain embodiments, $R^{14}$ is $C_1$-$C_6$aryl. Suitable examples include, but are not limited to, $CH_2$phenyl. In certain embodiments, $R^{14}$ is $C_1$-$C_6$alkyl$NH_2$. Examples of suitable $C_1$-$C_6$alkyl$NH_2$ groups include, but are not limited to, $CH_2NH_2$, $CH_2$ $CH_2NH_2$ and $CH_2CH_2CH_2NH_2$. In certain embodiments, $R^{14}$ is CO$C_1$-$C_6$alkyl$NH_2$. In certain embodiments, $R^{14}$ is CO$C_1$-$C_6$alkylNH($C_1$-$C_6$alkyl). In certain embodiments, $R^{14}$ is CO$C_1$-$C_6$alkylN($C_1$-$C_6$alkyl)$_2$.

In certain embodiments, $R^{14}$ is halo$C_1$-$C_6$alkyl. Suitable halo$C_1$-$C_6$alkyls include but are not limited to, fluoromethyl, difluoromethyl, trifluoromethyl, 2-fluoroethyl, 1,2-difluoroethyl and 2,2-difluoroethyl. In certain embodiments, $R^{14}$ is $C_1$-$C_6$alkylOH. Examples of suitable alcohols, include, but are not limited to, methanol, ethanol, propanol, butanol and iso-butanol. In certain embodiments, $R^{14}$ is CO$C_1$-$C_6$alkyl.

In certain embodiments, $R^{14}$ is COheterocycle wherein the heterocycle is a 3-7 membered nitrogen containing ring. Examples include but are not limited to,

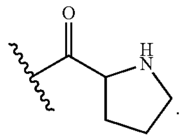 [SMILES: *C(=O)C1CCCN1]

In certain embodiments, described herein are the following compounds:

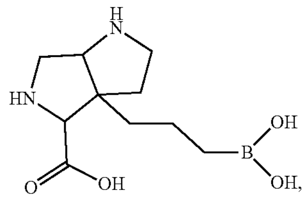

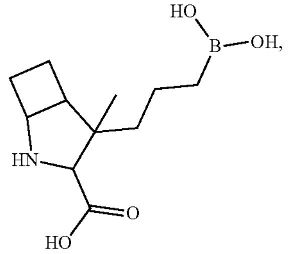

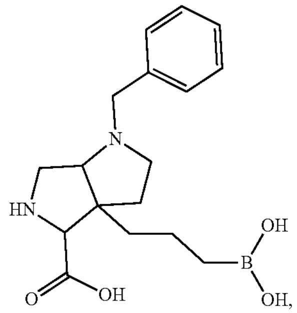

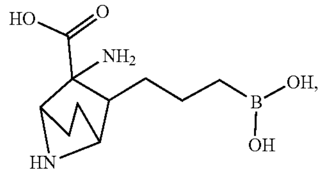

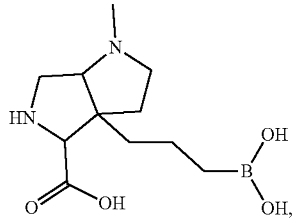

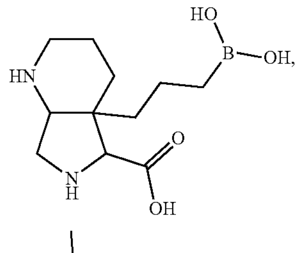

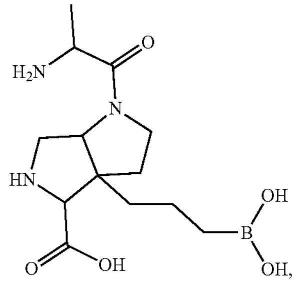

-continued
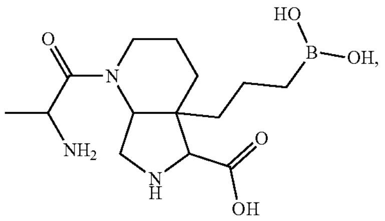
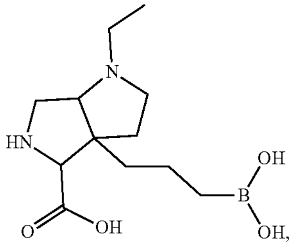
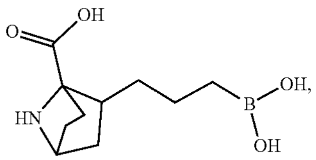
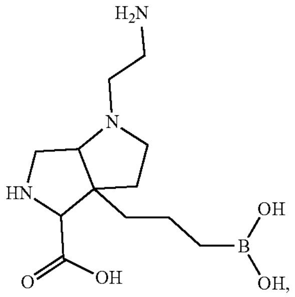
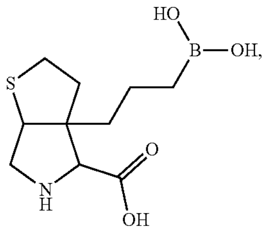
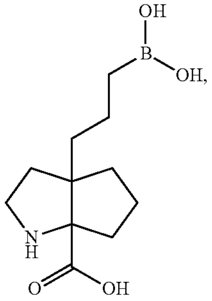
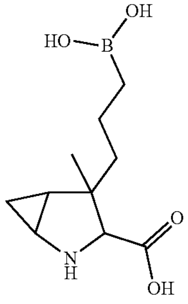
,
-continued
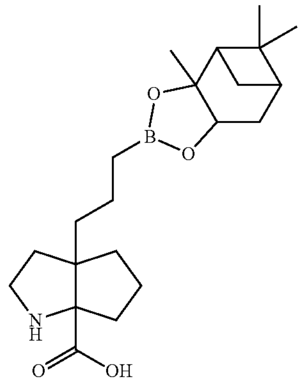
,
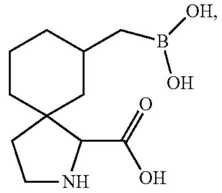
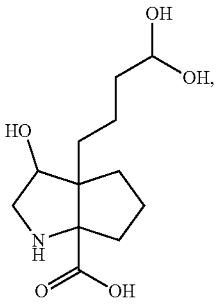
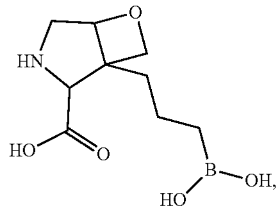
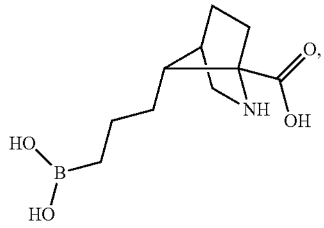
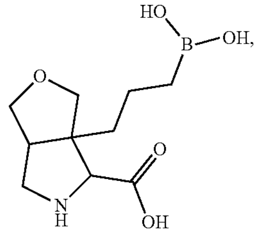
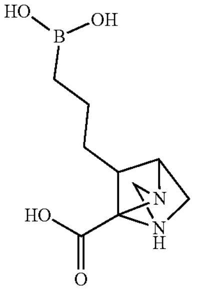
,
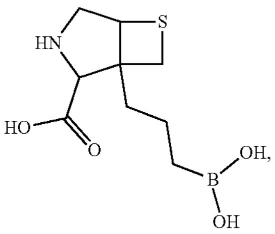

-continued
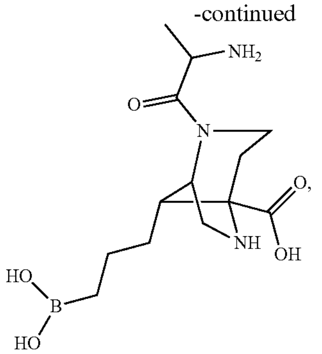
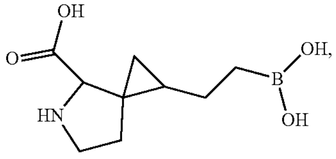
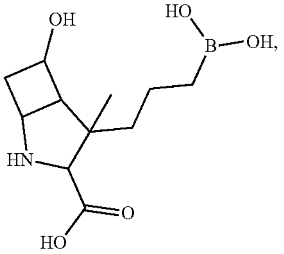
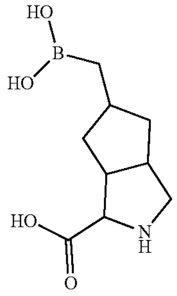
,
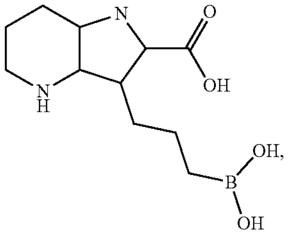
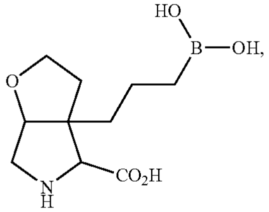
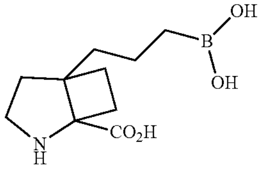
and
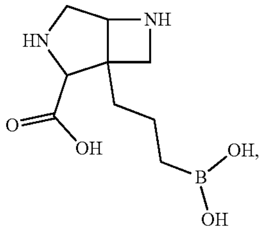
or a pharmaceutically acceptable salt thereof.
In other embodiments, described herein are the following compounds:
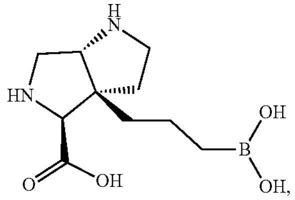
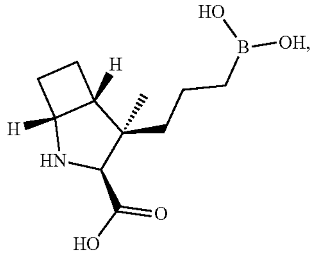
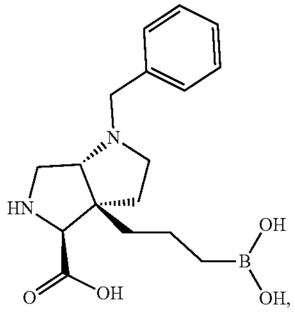
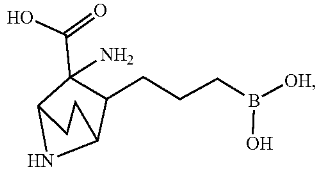
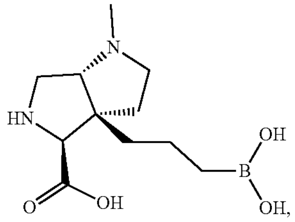
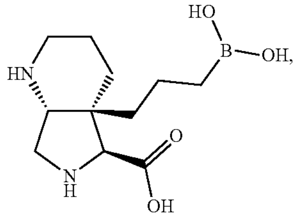
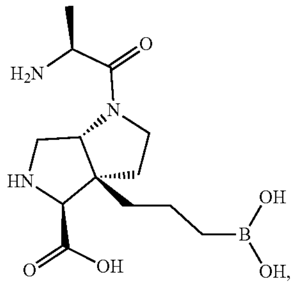

-continued
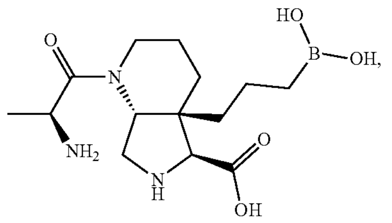
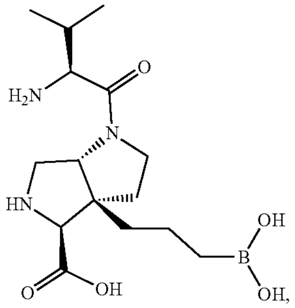
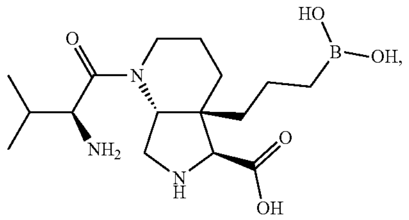
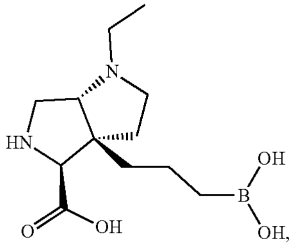
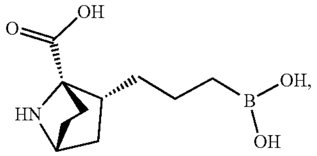
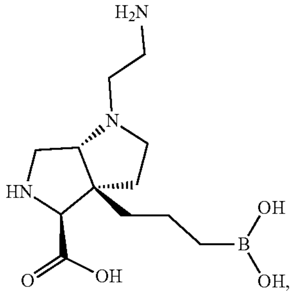
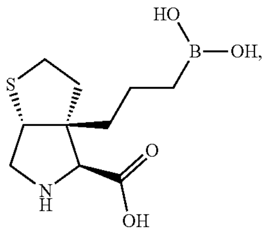
-continued
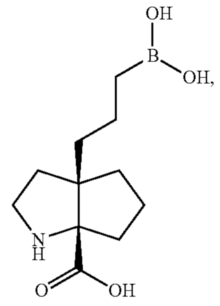
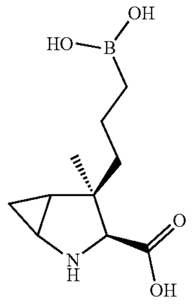
,
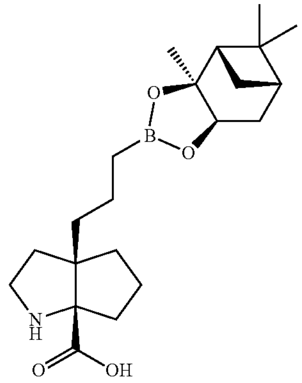
,
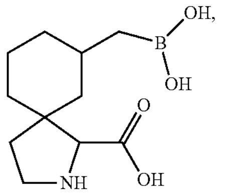
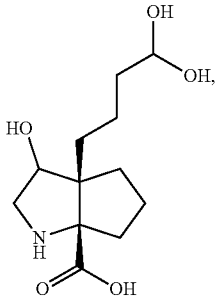
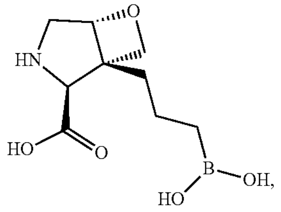
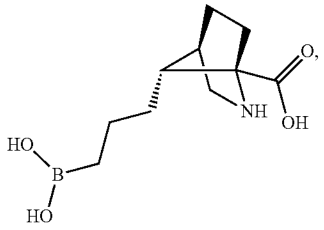
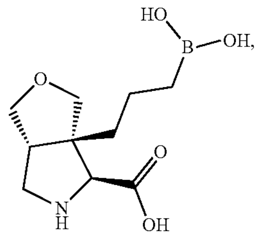

-continued

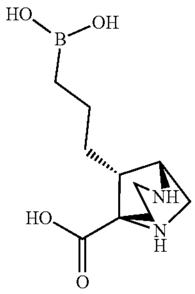

,

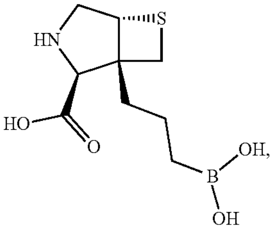

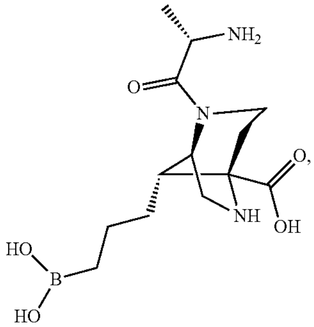

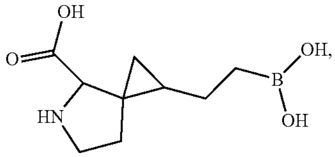

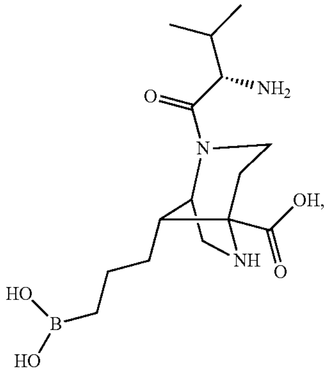

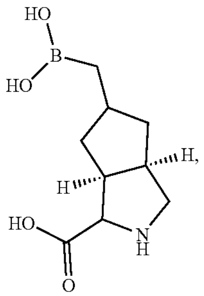

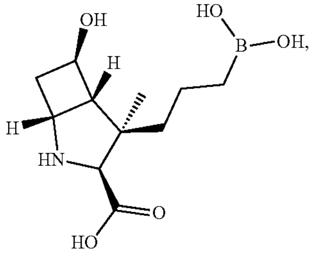

-continued

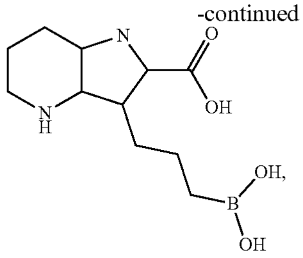

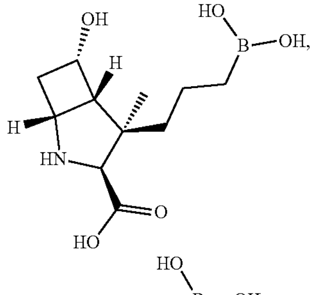

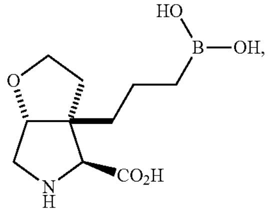

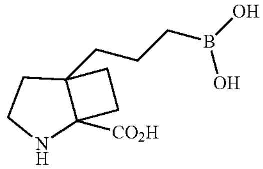

and

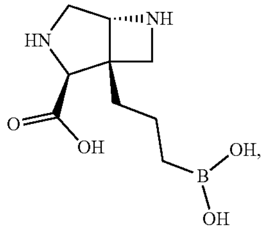

or pharmaceutically acceptable salts thereof.

Definitions

The term "alkylene," or "alkylenyl" or "alkyl" by itself or as part of another substituent means a divalent straight, branched or cyclic chain hydrocarbon radical having the stated number of carbon atoms. For example, —($C_1$-$C_5$) alkylene, would include, e.g., —$CH_2$—, —$CH_2CH_2$—, —$CH_2CH_2CH_2$—, —$CH_2CH_2CH_2CH_2$—, —$CH_2CH(CH_3)CH_2$— or —$CH_2CH_2CH_2CH_2CH_2$—.

The term "halogen" includes a fluorine, a chlorine, a bromine or an iodine radical.

The term "$C_1$-$C_6$alkyl" encompasses straight alkyl having a carbon number of 1 to 6 and branched alkyl having a carbon number of 3 to 6. Specific examples thereof include methyl, ethyl, n-propyl, isopropyl, n-butyl, isobutyl, sec-butyl, tert-butyl, n-pentyl, isopentyl, neopentyl, tert-pentyl, 1-methylbutyl, 2-methylbutyl, 1,2-dimethylpropyl, 1-ethylpropyl, n-hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl, 1-ethyl-1-methylpropyl, and the like.

The term "$C_1$-$C_6$haloalkyl" means an $C_1$-$C_6$alkyl as defined above wherein one or more hydrogen atoms on the alkyl is replaced by a halo group defined above.

The term "$C_1$-$C_6$alkoxy" refers to an alkyl group having 1 to 6 carbons linked to oxygen. Examples include methoxy, ethoxy, butoxy, isopropoxy and propoxy.

The term "$COOC_1$-$C_6$alkyl" refers to a —COOH group wherein the —OH is replaced with an alkoxy group as defined above. Examples include methoxycarbonyl, ethoxycarbonyl, isopropylcarbonyl and butoxycarbonyl.

The term "$COC_1$-$C_6$alkyl$NH_2$ refers to a CO attached to a linear or branched alkyl group any hydrogen on the alkyl group is replaced with a $NH_2$ group. Examples include, but are not limited to:

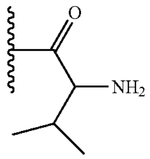

and

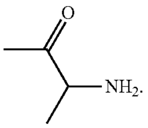

The term "$C_3$-$C_8$cycloalkyl" encompasses bridged, saturated or unsaturated cycloalkyl groups having 3 to 8 carbons. "Cycloalkyl" also includes non-aromatic rings as well as monocyclic, non-aromatic rings fused to a saturated cycloalkyl group. Examples of cycloalkyl include cyclopropyl, cyclobutyl, cyclopentyl, cyclohexyl, cycloheptyl, tetrahydronaphthyl, decahydronaphthyl, indanyl and the like.

The term "heterocycle" means mono- or bicyclic or bridged partially unsaturated and saturated rings containing at least one heteroatom selected from N, S and O, each of said ring having from 3 to 10 atoms in which the point of attachment may be carbon or nitrogen. Examples include azetidinyl, thiolanyl, thietanyl, oxetanyl, tetrahydropyranyl, tetrahydrofuranyl, pyrrolidinyl, piperidinyl, piperazinyl, dioxanyl, imidazolidinyl, 2,3-dihydrofuro(2,3-b)pyridyl, benzoxazinyl, benzoxazolinyl, 2-H-phthalazinyl, isoindolinyl, benzoxazepinyl, 5,6-dihydroimidazo[2,1-b]thiazolyl, tetrahydroquinolinyl, morpholinyl, tetrahydroisoquinolinyl, dihydroindolyl, tetrahydropyran, and the like. The term also includes partially unsaturated monocyclic rings that are not aromatic, such as 2- or 4-pyridones attached through the nitrogen or N-substituted-(1H, 3H)-pyrimidine-2,4-diones (N-substituted uracils). The term also includes bridged rings such as 5-azabicyclo[2.2.1]heptyl, 2,5-diazabicyclo[2.2.1]heptyl, 2-azabicyclo[2.2.1]heptyl, 7-azabicyclo[2.2.1]heptyl, 2,5-diazabicyclo[2.2.2]octyl, 2-azabicyclo[2.2.2]octyl, and 3-azabicyclo[3.2.2]nonyl, and azabicyclo[2.2.1]heptanyl.

The term "pharmaceutically acceptable salt" refers to salts prepared from pharmaceutically acceptable non-toxic bases or acids including inorganic or organic bases and inorganic or organic acids. Salts of basic compounds encompassed within the term "pharmaceutically acceptable salt" refer to non-toxic salts of the compounds of this invention which are generally prepared by reacting the free base with a suitable organic or inorganic acid. Representative salts of basic compounds of the present invention include, but are not limited to, the following: acetate, benzenesulfonate, benzoate, bicarbonate, bisulfate, bitartrate, borate, bromide, camsylate, carbonate, chloride, clavulanate, citrate, dihydrochloride, edetate, edisylate, estolate, esylate, fumarate, gluceptate, gluconate, glutamate, glycollylarsanilate, hexylresorcinate, hydrabamine, hydrobromide, hydrochloride, hydroxynaphthoate, iodide, isothionate, lactate, lactobionate, laurate, malate, maleate, mandelate, mesylate, methylbromide, methylnitrate, methylsulfate, mucate, napsylate, nitrate, N-methylglucamine ammonium salt, oleate, oxalate, pamoate (embonate), palmitate, pantothenate, phosphate/diphosphate, polygalacturonate, salicylate, stearate, sulfate, subacetate, succinate, tannate, tartrate, teoclate, tosylate, triethiodide and valerate. Furthermore, where the compounds of the invention carry an acidic moiety, suitable pharmaceutically acceptable salts thereof include, but are not limited to, salts derived from inorganic bases including aluminum, ammonium, calcium, copper, ferric, ferrous, lithium, magnesium, manganic, mangamous, potassium, sodium, zinc, and the like.

Particularly preferred are the ammonium, calcium, magnesium, potassium, and sodium salts. Salts derived from pharmaceutically acceptable organic non-toxic bases include salts of primary, secondary, and tertiary amines, cyclic amines, and basic ion-exchange resins, such as arginine, betaine, caffeine, choline, N,N-dibenzylethylenediamine, diethylamine, 2-diethylaminoethanol, 2-dimethylaminoethanol, ethanolamine, ethylenediamine, N-ethylmorpholine, N-ethylpiperidinyl, glucamine, glucosamine, histidine, hydrabamine, isopropylamine, lysine, methylglucamine, morpholine, piperazine, piperidinyl, polyamine resins, procaine, purines, theobromine, triethylamine, trimethylamine, tripropylamine, tromethamine, and the like.

The term "patient" refers to a mammalian patient, preferably a human patient, receiving or about to receive medical treatment.

The term "rac" means a mixture.

The compounds of the present invention may contain one or more asymmetric centers and can thus occur as racemates, racemic mixtures, single enantiomers, diastereomeric mixtures, and individual diastereomers. The present invention is meant to comprehend all such isomeric forms of these compounds.

Some of the compounds described herein contain olefinic double bonds, and unless specified otherwise, are meant to include both E and Z geometric isomers.

Some of the compounds described herein contain substituted cycloalkanes having cis- and trans-isomers, and unless specified otherwise, are meant to include both cis- and trans-geometric isomers.

The independent syntheses of these diastereomers or their chromatographic separations may be achieved as known in the art by appropriate modification of the methodology disclosed herein. Their absolute stereochemistry may be determined by the X-ray crystallography of crystalline products or crystalline intermediates which are derivatized, if necessary, with a reagent containing an asymmetric center of known absolute configuration. If desired, racemic mixtures of the compounds may be separated so that the individual enantiomers are isolated. The separation can be carried out by methods well known in the art, such as the coupling of a racemic mixture of compounds to an enantiomerically pure compound to form a diastereomeric mixture, followed by separation of the individual diastereomers by standard methods, such as fractional crystallization or chromatography. The coupling reaction is often the formation of salts using an enantiomerically pure acid or base. The diasteromeric derivatives may then be converted to the pure enantiomers by cleavage of the added chiral residue. The racemic mixture of the compounds can also be separated directly by chromatographic methods utilizing chiral stationary phases, which methods are well known in the art.

Alternatively, any enantiomer of a compound may be obtained by stereoselective synthesis using optically pure starting materials or reagents of known configuration by methods well known in the art.

It will be understood that the present invention is meant to include the pharmaceutically acceptable salts, and also salts that are not pharmaceutically acceptable, of the compounds described herein, when they are used as precursors to the free compounds or their pharmaceutically acceptable salts or in other synthetic manipulations.

Solvates, and in particular, the hydrates of the compounds of the structural formulas described herein are included in the present invention as well.

Some of the compounds described herein may exist as tautomers, which have different points of attachment of hydrogen accompanied by one or more double bond shifts. For example, a ketone and its enol form are keto-enol tautomers. The individual tautomers as well as mixtures thereof are encompassed with compounds of the present invention.

The compounds of the present invention may also exist in open-chain or cyclized forms. In some cases one or more of the cyclized forms may result in loss of water. The specific composition of the open-chain and cyclized forms may be dependent on how the compound is isolated, stored or administered. For example, the compound may exist primarily in an open-chained form under acidic conditions but cyclize under neutral conditions. All forms are included in the invention.

In the compounds described herein, the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the compounds of the formulas described herein. For example, different isotopic forms of hydrogen (H) include protium ($^1H$) and deuterium ($^2H$). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds can be prepared without undue experimentation by conventional techniques well known to those skilled in the art or by processes analogous to those described in the Schemes and Examples herein using appropriate isotopically-enriched reagents and/or Intermediates.

Methods of Treatment

Also encompassed by the present invention are methods of treating arginase-related diseases. The compounds described herein can be effective in preventing or treating various arginase-related diseases, such as gastrointestinal diseases, pulmonary inflammatory diseases, sexual arousal disorders, cardiovascular disorders, diseases caused by pathogenic microorganisms, immunological disorders, cancer, pre-term labor, Reynaud's disease, psoriasis, rheumatoid arthritis, and Peyronie's Disease, among others.

An increase in arginase activity has been associated with the pathophysiology of a number of conditions including impairment in non-adrenergic and non-cholinergic (NANC) nerve-mediated relaxation of gastrointestinal smooth muscle. An arginase inhibitor can be used to alleviate such impairment by administering the inhibitor to a mammal experiencing such impairment or a mammal which is anticipated to experience such impairment (e.g., a human afflicted with a gastrointestinal motility disorder).

Accordingly, the compounds of the invention may be useful in the treatment or prevention of gastrointestinal motility disorders, which is based on the observation that arginase is present in opossum internal anal sphincter muscle and the known arginase inhibitor, (S)-2-amino-6-boronohexanoic acid (ABH), has been shown to relax this muscle. See, e.g., Baggio et al., J. Pharm. Exp. Ther. 290, 1409-16 (1999).

The compounds of the invention may also be useful in the treatment or prevention of inflammatory bowel disease (IBD, e.g., Crohn's disease and ulcerative colitis). In fact, IBD has been shown to be characterized by increased arginase activity and endothelial dysfunction. See, e.g., Horowitz et al., Am. J. Physiol. Gastrointest. Liver Physiol. 292, G1323-36 (2007).

Likewise, the compounds of the invention may be useful in the treatment or prevention of gastric ulcers, because the bacterium that causes stomach ulcers, *Helicobacter pylori*, exhibits increased arginase activity upon colonization in order to evade the human immune response. See, e.g., Gobert et al., Proc. Natl. Acad. Sci. (USA) 98, 13844-49 (2001).

The compounds of the invention may be useful in the treatment or prevention of asthma based on the observation that arginase is upregulated in the asthmatic airway. See, e.g., Zimmermann and Rothenberg, Eur. J. Pharmacol. 533, 253-62 (2006). Furthermore, nebulizer treatment of guinea pigs with ABH in an allergic asthma model prevents airway hyperresponsiveness. See, e.g., Maarsingh, "Arginase: A Novel Key Enzyme in the Pathophysiology of Allergic Asthma," Ph. D. dissertation, Chapter 9, University of Groningen, Netherlands (2006); Maarsingh et al., Am. J. Respir. Crit. Care Med. 178, 565-73 (2008). The asthma phenotype is characterized by airway constriction, airway smooth muscle hyperplasia, and the chronic accumulation of fibrotic tissue; an arginase inhibitor can relax airway smooth muscle and attenuate cellular hyperplasia and fibrosis.

Additionally, the compounds of the invention may be useful in the treatment or prevention of chemically-induced lung fibrosis because arginase I and II are induced in bleomycin-induced lung fibrosis in order to provide more L-ornithine for collagen biosynthesis. See, e.g., Endo et al., Am. J. Physiol. Lung Cell Mol. Physiol. 285, L313-21 (2003).

The compounds of the invention may also be useful in the treatment or prevention of idiopathic pulmonary fibrosis, based on the observation that virus-induced upregulation of arginase I is observed in an animal model. See, e.g., Mora et al., Am. J. Respir. Cell Mol. Biol. 35, 466-73 (2006).

Furthermore, the compounds of the invention may be useful in the treatment or prevention of cystic fibrosis. Increased sputum arginase activity contributes to nitric oxide deficiency in cystic fibrosis lung disease; arginase activity also contributes to fibrosis. See, e.g., Graseman et al., Am. J. Respir. Crit. Care Med. 172, 1523-28 (2005).

Erectile dysfunction afflicts one-half of the male population over the age of forty. This malady often results from defects in the complex cascade of enzyme-catalyzed reactions governing blood flow into and out of the corpus cavernosum, a chamber of muscular, spongy tissue that becomes engorged with blood in the erect penis. Defects that compromise cavernosal blood flow often occur as secondary complications related to other health conditions, such as heart disease, hypertension, diabetes, use of certain medications, and the like.

In an important embodiment, the invention relates to use of an arginase inhibitor described herein for enhancing penile erectile function in a mammal (preferably a male human) or for alleviating erectile dysfunction in a mammal. Nitric oxide is an important regulator of erectile function and mediates NANC neurotransmission in penile corpus cavernosum smooth muscle, leading to rapid relaxation, which in turn leads to erection. Nitric oxide synthase, which catalyzes oxidation of L-arginine to form L-citrulline and nitric oxide, is for this reason a key enzyme in penile smooth muscle physiology. Arginase catalyzes hydrolysis of L-arginine to form L-ornithine and urea. Arginase regulates nitric oxide synthase activity by affecting the amount of L-arginine available for oxidation catalyzed by nitric oxide synthase activity. Thus, inhibition of arginase activity can enhance nitric oxide synthase activity, thereby enhancing nitric oxide-dependent smooth muscle relaxation in the corpus cavernosum and enhancing penile erection.

Arginase is present in rabbit and human penile corpus cavernosum and ABH enhances the nitric oxide-dependent relaxation of this tissue. See, e.g., Cox et al., Nature Struct. Biol. 6, 1043-47 (1999). The arginase inhibitor, ABH, enhances the erectile response in live male rabbits. See, e.g., Cama et al., Biochemistry 42, 8445-51 (2003). Arginase II is upregulated in the corpus cavernosum of the diabetic man, resulting in reduced nitric oxide biosynthesis which, in turn, leads to erectile dysfunction; administration of ABH in ex vivo experiments restores nitric oxide biosynthesis. See, e.g., Bivalacqua et al., Biochem. Biophys. Res. Commun. 283, 923-27 (2001). Arginase I is upregulated in the penis of aged mice and impairs erectile function. See, e.g., Bivalacqua et al., Am. J. Physiol. Heart Circ. Physiol. 292, H1340-51 (2007).

The compounds of the invention may also be useful in the treatment or prevention of female sexual arousal disorder. The arginase inhibitor, ABH, enhances the engorgement response in the genitalia of live female rabbits. See, e.g., Cama et al., Biochemistry 42, 8445-51 (2003).

The compounds of the invention may be useful in the treatment or prevention of endothelial vascular dysfunction in atherosclerosis, hypertension, hypercholesterolemia, and diabetes. Arginase modulates NOS activity by regulation of L-arginine availability, and the deleterious effects of arginase can be blocked by an arginase inhibitor. See, e.g., Berkowitz et al., Circulation 108, 2000-06 (2003); Yang and Ming, Clin. Med. Res. 4, 53-65 (2006). Increased arginase activity in diabetes contributes to vascular endothelial dysfunction by decreasing L-arginine availability to nitric oxide synthase. See, e.g., Romero et al., Circ. Res. 102, 95-102 (2008). Arginase inhibition attenuates hypertension in spontaneously hypertensive rats. See, e.g., Demougeot et al., J. Hypertens. 23, 971-78 (2005). Other relevant conditions include ischemia-reperfusion injury, peripheral vascular disease (PVD), peripheral arterial disease (PAD), and subarachnoid hemorrhage. Arginase has been identified as a new drug target for the treatment of atherosclerosis. See, e.g., Yang and Ming, Curr. Hypertension Rep. 8, 54-59 (2006).

The compounds of the invention may be useful in the treatment or prevention of pulmonary arterial hypertension. Elevated arginase activity contributes to vascular endothelial dysfunction by compromising L-arginine availability to nitric oxide synthase. See, e.g., Morris et al., Adv. Pulmonary Hypertension 5, 31-36 (2007).

The compounds of the invention may be useful in the treatment or prevention of African sleeping sickness, Chagas' disease, leishmaniasis, malaria, and other diseases caused by pathogenic microorganisms. Polyamine biosynthetic enzymes are essential for growth and survival of protozoa. See, e.g., Heby et al., Biochem. Soc. Trans. 31, 415-19 (2003). Arginase is essential for viability. See, e.g., Roberts et al., J. Biol. Chem. 279, 23668-78 (2004). Therefore, inhibitors of protozoan arginases can kill the protozoa.

The compounds of the invention may be useful in the treatment or prevention of multiple sclerosis, and possibly other autoimmune diseases, based upon the observation that arginase I is upregulated in an animal model of multiple sclerosis (experimental autoimmune encephalomyelitis) and administration of the arginase inhibitor ABH improves the disease score of animals. See, e.g., Xu et al., Immunology 110, 141-48 (2003).

Tumor-induced tolerance impairs the therapeutic efficacy of immunotherapy; one mechanism leading to T-cell tolerance is the generation of myeloid-derived suppressor cells (MDSCs), which produce arginase, thereby depleting the tumor microenvironment of L-arginine, which impairs T-cell signal transduction and function. Notably, arginase activity is a mechanism of immune system evasion that is also shared by certain bacteria, e.g., *Helicobacter pylori*. MDSCs are regarded as "cancer's bulwark against immune attack." See, e.g., Marx, Science 319, 154-56 (2008).

Accordingly, arginase is upregulated in the following types of cancers, which may be treated with an arginase inhibitor described herein: Renal cell carcinoma (see, e.g., Zea et al., Cancer Res. 65, 3044-48 (2005); Ochoa et al., Clin. Cancer Res. 13, 721s-26s (2007)); prostate cancer (see, e.g., Bronte et al., J. Exp. Med. 201, 1257-68 (2005) (arginase inhibition with N-hydroxy-L-arginine facilitates tumor immunotherapy); colorectal cancer (see, e.g., Leu and Wang, Cancer 70, 733-36 (1992); Bronte and Zanovello, Nature Rev. Immunol. 5, 641-54 (2005)); breast cancer (see, e.g., Singh et al., Cancer Res. 60, 3305-12 (2000); Bronte and Zanovello, Nature Rev. Immunol. 5, 641-54 (2005) (the arginase inhibitor, N-hydroxy-L-arginine, inhibits cell proliferation and induces apoptosis)); skin cancer (squamous cell and basal cell cancers) (see, e.g., Gokmen et al., J. Lab. Clin. Med. 137, 340-44 (2001); Bronte and Zanovello, Nature Rev. Immunol. 5, 641-54 (2005)); lung cancer (see, e.g., Rodriguez et al., J. Exp. Med. 202, 931-39 (2005); Bronte and Zanovello, Nature Rev. Immunol. 5, 641-54 (2005)); ovarian cancer (see, e.g., Melichar et al., J. Translational Med. 1, 1-5 (2003) (doi:10.11861479-5876-1-5)); and gastric cancer (see, e.g., Wu et al., Life Sci. 51, 1355-61 (1992)); among others.

Enhancement of uterine smooth muscle relaxation with an arginase inhibitor may be useful in the management of pre-term labor.

Reynaud's disease is a disease of the microvasculature. Because subcutaneous administration of the arginase inhibitor (S)-(2-Boronoethyl)-L-cysteine (BEC, which is an analogue of ABH) in humans is vasodilatory and enhances circulation, an arginase inhibitor may be useful in treating Reynaud's disease. See, e.g., Holowatz et al., J. Physiol. 574, 573-81 (2006).

Arginase I is highly overexpressed in the hyperproliferative psoriatic epidermis in human skin, and therefore arginase inhibitors may be useful in the treatment of psoriasis. See, e.g., Bruch-Gerharz et al., Am. J. Pathology 162, 203-11 (2003).

Arginase II is upregulated in synovial fluid from human patients, and therefore arginase inhibitors may be useful in the treatment of arthritis. See, e.g., Huang et al., Kaohsiung J. Med. Sci. 17, 358-63 (2001); Corraliza and Moncada, J. Rheumatol. 29, 2261-65 (2002).

The compounds of the invention may be useful in the treatment or prevention of Peyronie's disease. Arginase II is upregulated in the rat penis in an animal model for this disease. See, e.g., Bivalacqua et al., J. Andrology 22, 497-506 (2001). While this disorder can contribute to erectile dysfunction, it is principally an inflammatory condition in which fibrotic tissue builds up in the penis.

The composition of the invention can be used to treat a disorder in a mammal, wherein the disorder is associated with expression of an abnormally high level of arginase activity in a tissue of the mammal. Because nitric oxide synthase activity is regulated in a reciprocal fashion with respect to arginase activity in mammals, more particularly humans, the compounds and compositions of the invention can be used to treat a disorder in a mammal, wherein the disorder is associated with expression of an abnormally low level of nitric oxide synthase activity in a tissue of the mammal. Since the reciprocal interaction of arginase and nitric oxide synthase has implications for the function of smooth muscle, the use of the compounds described herein for the regulation of smooth muscle activity in an animal is also contemplated in the invention. Of course, a compound of the invention or a composition comprising the compound of the invention which comprises an arginase inhibitor described herein can also be used to inhibit arginase in a mammal having normal levels of arginase and nitric oxide synthase activity, particularly where the physiology which is desired to be effected is one which is affected by arginase or nitric oxide synthase activity, or where a disorder which is not caused by aberrant arginase or nitric oxide synthase activity levels can nonetheless be alleviated or inhibited by inhibiting arginase activity (e.g., certain forms of erectile dysfunction).

The invention also includes a method of enhancing smooth muscle relaxation comprising contacting the smooth muscle with an arginase inhibitor. The smooth muscle is preferably within the body of an animal. The type of smooth muscle to be relaxed includes, but is not limited to, gastrointestinal smooth muscle, anal sphincter smooth muscle, esophageal sphincter muscle, sphincter of Oddi, arterial smooth muscle, heart smooth muscle, pulmonary smooth muscle, kidney smooth muscle, uterine smooth muscle, vaginal smooth muscle, cervical smooth muscle, placental smooth muscle, and ocular smooth muscle. When the smooth muscle is gastrointestinal smooth muscle, the type of gastrointestinal smooth muscle includes, but is not limited to, the internal anal sphincter muscle.

When the smooth muscle is within the body of the animal, the invention includes a method of alleviating (e.g., reducing the incidence or severity) or inhibiting (e.g., reducing the likelihood of developing, or preventing) an arginase-related disorder in an animal. In a preferred embodiment, the animal is a human.

To alleviate an arginase-related disorder in a mammal, an arginase inhibitor described herein is administered to a mammal afflicted with the disorder. The inhibitor is preferably administered in combination with one or more pharmaceutically acceptable carriers, as described in further detail herein. The inhibitor (preferably in combination with a carrier) can also be administered to a mammal afflicted with a disorder characterized by aberrant nitric oxide synthase activity, or to one which exhibits normal (i.e. non-diseased) levels of arginase and nitric oxide synthase activities, but in which inhibition of arginase activity is desired. The invention also contemplates use of an arginase inhibitor in an in vitro arginase inhibition/smooth muscle relaxation functional assay, for the purpose of identifying compounds which affect smooth muscle function.

Accordingly, in certain embodiments, the invention is directed to methods of inhibiting arginase in a mammal, comprising the step of administering to said mammal an effective amount of a compound of the formulas described herein or a pharmaceutically acceptable salt thereof.

Accordingly, in certain embodiments, the invention is directed to methods of treating an arginase-related disorder in a mammal, comprising the step of administering to said mammal an effective amount of a compound of any of the formulas described herein or a pharmaceutically acceptable salt thereof. In certain preferred embodiments, the arginase-related disorder is a disorder associated with an abnormally low level of nitric oxide synthase activity in a tissue of the human, a disorder associated with an abnormally high level of arginase activity in a tissue of the human, or combinations thereof, including heart disease, systemic hypertension, pulmonary hypertension, erectile dysfunction, autoimmune encephalomyelitis, chronic renal failure, gastrointestinal motility disorders, gastric cancers, reduced hepatic blood flow, insufficient hepatic blood flow, cerebral vasospasm, or a combination thereof.

In still other certain embodiments, the invention is directed to methods of relaxing smooth muscle in a mammal, comprising the step of administering to said mammal an effective amount of a compound of the formulas described herein or a pharmaceutically acceptable salt thereof. In certain preferred embodiments, the smooth muscle which is relaxed according to this method is at least one selected from the group consisting of a gastrointestinal smooth muscle, anal sphincter smooth muscle, esophageal sphincter muscle, corpus cavemosum, sphincter of Oddi, arterial smooth muscle, heart smooth muscle, pulmonary smooth muscle, kidney smooth muscle, uterine smooth muscle, vaginal smooth muscle, cervical smooth muscle, placental smooth muscle, and ocular smooth muscle.

In certain embodiments, the invention is directed to methods of treating a disease or condition associated with upregulation of arginase in a mammal, comprising the step of administering to said mammal an effective amount of a compound of the formulas described herein or a pharmaceutically acceptable salt thereof, wherein said disease or condition is a gastrointestinal disease, a pulmonary inflammatory disease, a sexual arousal disorder, a cardiovascular disorder, a hemolytic disorder, an autoimmune disease, wound healing, a cancer, pre-term labor, psoriasis, or a combination thereof.

In certain embodiments, the invention is directed to methods of treating a disease or condition caused by parasitic protozoa, a disease caused by bacteria, or a combination thereof.

Inhibiting arginase impacts cancer in two ways. The first way is relief from immune-suppression that leads to tolerance of the tumor, and the second way is by restricting the production of ornithine and subsequent polyamines, which have a role in proliferation.

In certain preferred embodiments, the gastrointestinal disease is a gastrointestinal motility disorder, inflammatory bowel disease, Crohn's disease, ulcerative colitis, gastric ulcer, adenotonsilar disease or a combination thereof.

In certain preferred embodiments, the pulmonary inflammatory disease is asthma, chemically-induced lung fibrosis, idiopathic pulmonary fibrosis, cystic fibrosis, chronic obstructive pulmonary disease (COPD) or a combination thereof.

In certain preferred embodiments, the sexual arousal disorder is male erectile dysfunction, Peyronie's Disease, or a female sexual arousal disorder.

In certain preferred embodiments, the cardiovascular disorder is endothelial vascular dysfunction in atherosclerosis, hypertension, ischemia reperfusion injury, peripheral vascular disease, peripheral arterial disease, subarachnoid hemorrhage, hypercholesterolemia, diabetes, or a combination thereof, diabetic cardiovascular disease, pulmonary arterial hypertension, Reynaud's disease, or a combination thereof.

In certain preferred embodiments, the hemolytic disorder is paroxysmal nocturnal hemoglobinuria (PNH), sickle-cell disease, thalassemias, hereditary spherocytosis and stomatocytosis, microangiopathic hemolytic anemias, pyruvate kinase deficiency, ABO mismatch transfusion reaction, paroxysmal cold hemoglobinuria, severe idiopathic autoimmune hemolytic anemia, infection-induced anemia, malaria, cardiopulmonary bypass, mechanical heart valve-induced anemia, chemical induced anemia, or a combination thereof.

In certain preferred embodiments, the autoimmune disease is encephalomyelitis, multiple sclerosis, anti-phospholipid syndrome 1, autoimmune hemolytic anaemia, chronic inflammatory demyelinating polyradiculoneuropathy, dermatitis herpetiformis ("Celiac Disease"), dermatomyositis, myasthenia gravis, pemphigus, rheumatoid arthritis, stiff-person syndrome, type 1 diabetes, ankylosing spondylitis, or a combination thereof.

In certain preferred embodiments, the condition is wound healing.

In certain preferred embodiments, the disease caused by parasitic protozoa is African sleeping sickness, Chagas' disease, leishmaniasis, malaria, or a combination thereof.

In certain preferred embodiments, the cancer is renal cell carcinoma, prostate cancer, colorectal cancer, breast cancer, skin cancer, lung cancer, ovarian cancer, gastric cancer, or a combination thereof. In certain embodiments, the skin cancer is a squamous cell cancer, basal cell cancer, or a combination thereof.

In certain preferred embodiments, the condition is preterm labor.

In certain preferred embodiments, the condition is Reynaud's disease.

In certain embodiments, the invention is directed to methods of providing relief from immune suppression in a mammal, comprising the step of administering to said mammal an effective amount of a compound of the formulas described herein or a pharmaceutically acceptable salt thereof, wherein said mammal is suffering from a disease or condition selected from the group consisting of a chronic infectious disease, a bacterial infection, a parasitic infection, trauma, leprosy, tuberculosis, liver transplantation, a cancer, and combinations thereof.

In certain embodiments, the invention is directed to methods of inhibiting the production of ornithine or other related metabolites (e.g. agmatine, putrescine, spermine, spermidine, citruline, proline, glutamate, etc.) in a mammal suffering from at least one tumor, comprising the step of administering to said mammal an effective amount of a compound of the formulas described herein or a pharmaceutically acceptable salt thereof.

Pharmaceutical Compositions

Compounds described herein may be administered orally or parenterally. As formulated into a dosage form suitable for administration, the compounds described herein can be used as a pharmaceutical composition for the prevention, treatment, or remedy of the above diseases.

In clinical use of the compounds described herein, usually, the compound is formulated into various preparations together with pharmaceutically acceptable additives according to the dosage form, and may then be administered. By "pharmaceutically acceptable" it is meant the additive, carrier, diluent or excipient must be compatible with the other ingredients of the formulation and not deleterious to the recipient thereof. As such, various additives ordinarily used in the field of pharmaceutical preparations are usable. Specific examples thereof include gelatin, lactose, sucrose, titanium oxide, starch, crystalline cellulose, hydroxypropyl methylcellulose, carboxymethylcellulose, corn starch, microcrystalline wax, white petrolatum, magnesium metasilicate aluminate, anhydrous calcium phosphate, citric acid, trisodium citrate, hydroxypropylcellulose, sorbitol, sorbitan fatty acid ester, polysorbate, sucrose fatty acid ester, polyoxyethylene, hardened castor oil, polyvinylpyrrolidone, magnesium stearate, light silicic acid anhydride, talc, vegetable oil, benzyl alcohol, gum arabic, propylene glycol, polyalkylene glycol, cyclodextrin, hydroxypropyl cyclodextrin, and the like.

Preparations to be formed with those additives include, for example, solid preparations such as tablets, capsules, granules, powders, suppositories; and liquid preparations such as syrups, elixirs, injections. These may be formulated according to conventional methods known in the field of pharmaceutical preparations. The liquid preparations may also be in such a form that may be dissolved or suspended in water or in any other suitable medium in their use. Especially for injections, if desired, the preparations may be dissolved or suspended in physiological saline or glucose liquid, and a buffer or a preservative may be optionally added thereto.

The pharmaceutical compositions may contain the compound of the invention in an amount of from 1 to 99.9% by weight, preferably from 1 to 60% by weight of the composition. The compositions may further contain any other therapeutically-effective compounds.

In case where the compounds of the invention are used for prevention or treatment for the above-mentioned diseases, the dose and the dosing frequency may be varied, depending on the sex, the age, the body weight and the disease condition of the patient and on the type and the range of the intended remedial effect. In general, when orally administered, the dose may be from 0.001 to 50 mg/kg of body weight/day, and it may be administered at a time or in several times. In specific embodiments, the dose is from about 0.01 to about 25 mg/kg/day, in particular embodiments, from about 0.05 to about 10 mg/kg/day. For oral administration, the compositions are preferably provided in the form of tablets or capsules containing from 0.01 mg to 1,000 mg. In specific embodiments, the dose is 0.01, 0.05, 0.1, 0.2, 0.5, 1.0, 2.5, 5, 10, 15, 20, 25, 30, 40, 50, 75, 100, 125, 150, 175, 200, 225, 250, 500, 750, 850 or 1,000 milligrams of a compound described herein. This dosage regimen may be adjusted to provide the optimal therapeutic response.

Combination Therapy

The compounds of the present invention are further useful in methods for the prevention or treatment of the aforementioned diseases, disorders and conditions in combination with other therapeutic agents.

The compounds of the present invention may be used in combination with one or more other drugs in the treatment, prevention, suppression or amelioration of diseases or conditions for which compounds described herein or the other drugs may have utility, where the combination of the drugs together are safer or more effective than either drug alone. Such other drug(s) may be administered in an amount commonly used therefore, contemporaneously or sequentially with a compound described herein or a pharmaceutically acceptable salt thereof. When a compound described herein is used contemporaneously with one or more other drugs, the pharmaceutical composition may in specific embodiments contain such other drugs and the compound described herein or its pharmaceutically acceptable salt in unit dosage form. However, the combination therapy may also include therapies in which the compound described herein or its pharmaceutically acceptable salt and one or more other drugs are administered on different overlapping schedules. It is also contemplated that when used in combination with one or more other active ingredients, the compounds of the present invention and the other active ingredients may be used in lower doses than when each is used singly. Accordingly, the pharmaceutical compositions of the present invention include those that contain one or more other active ingredients, in addition to a compound described herein or a pharmaceutically acceptable salt thereof.

Examples of other active ingredients that may be administered in combination with a compound of any of the Formulas described herein or a pharmaceutically acceptable salt thereof and either administered separately or in the same pharmaceutical composition, include, but are not limited to pain relieving agents, anti-angiogenic agents, anti-neoplastic agents, anti-diabetic agents, anti-infective agents, or gastrointestinal agents, or combinations thereof.

Suitable compounds that may be used in combination with a compound according to the present invention include without limitation sildenafil, vardenafil, tadalafil and alprostadil, epoprostenol, iloprost, bosentan, amlodipine, diltiazem, nifedipine, ambrisentan and warfarin, fluticasone, budesonide, mometasone, flunisolide, beclomethasone, montelukast, zafirlukast, zileuton, salmeterol, formoterol, theophylline, albuterol, levalbuterol, pirbuterol, ipratropium, prednisone, methylprednisolone, omalizumab, corticosteroid and cromolyn, atorvastatin, lovastatin, simvastatin, pravastatin, fluvastatin, rosuvastatin, gemfibrozil, fenofibrate, nicotinic acid and clopidogrel.

Additionally, a compound of any of the Formulas disclosed herein may be used in combination with one or more other active agents, including but not limited to, other anti-cancer agents that are used in the prevention, treatment, control, amelioration, or reduction of risk of a particular disease or condition (e.g., cell proliferation disorders). In one embodiment, a compound disclosed herein is combined with one or more other anti-cancer agents for use in the prevention, treatment, control amelioration, or reduction of risk of a particular disease or condition for which the compounds disclosed herein are useful. Such other active agents may be administered, by a route and in an amount commonly used therefor, contemporaneously or sequentially with a compound of the present invention.

In one embodiment, the other active agent is selected from the group consisting of vascular endothelial growth factor (VEGF) receptor inhibitors, topoisomerase II inhibitors, smoothen inhibitors, alkylating agents, anti-tumor antibiotics, anti-metabolites, retinoids, immunomodulatory agents including but not limited to anti-cancer vaccines, CTLA-4, LAG-3 and PD-1 antagonists.

Examples of vascular endothelial growth factor (VEGF) receptor inhibitors include, but are not limited to, bevacizumab (sold under the trademark AVASTIN by Genentech/Roche), axitinib, (N-methyl-2-({3-[(1E)-2-(pyridin-2-yl)ethenyl]-1H-indazol-6-yl}sulfanyl)benzamide, also known as AG013736, and described in PCT Publication No. WO 01/002369), Brivanib Alaninate ((S)—((R)-1-(4-(4-Fluoro-2-methyl-1H-indol-5-yloxy)-5-methylpyrrolo[2,1-f][1,2,4]triazin-6-yloxy)propan-2-yl)2-aminopropanoate, also known as BMS-582664), motesanib (N-(3,3-dimethyl-1,2-dihydroindol-6-yl)-2-(pyridin-4-ylmethylamino)pyridine-3-carboxamide and described in PCT Publication No. WO 02/068470), pasireotide (also known as SO 230, and described in PCT Publication No. WO 02/010192), and sorafenib (sold under the tradename NEXAVAR).

Examples of topoisomerase II inhibitors include but are not limited to, etoposide (also known as VP-16 and Etoposide phosphate, sold under the tradenames TOPOSAR, VEPESID and ETOPOPHOS), and teniposide (also known as VM-26, sold under the tradename VUMON).

Examples of alkylating agents include but are not limited to, 5-azacytidine (sold under the trade name VIDAZA), decitabine (sold under the trade name of DECOGEN), temozolomide (sold under the trade names TEMODAR and TEMODAL by Schering-Plough/Merck), dactinomycin (also known as actinomycin-D and sold under the tradename COSMEGEN), melphalan (also known as L-PAM, L-sarcolysin, and phenylalanine mustard, sold under the tradename ALKERAN), altretamine (also known as hexamethylmelamine (HMM), sold under the tradename HEXALEN), carmustine (sold under the tradename BCNU), bendamustine (sold under the tradename TREANDA), busulfan (sold under the tradenames BUSULFEX and MYLERAN), carboplatin (sold under the tradename PARAPLATIN), lomustine (also known as CCNU, sold under the tradename CeeNU), cisplatin (also known as CDDP, sold under the tradenames PLATINOL and PLATINOL-AQ), chlorambucil (sold under the tradename LEUKERAN), cyclophosphamide (sold under the tradenames CYTOXAN and NEOSAR), dacarbazine (also known as DTIC, DIC and imidazole carboxamide, sold under the tradename DTIC-DOME), altretamine (also known as hexamethylmelamine (HMM) sold under the tradename HEXALEN), ifosfamide (sold under the tradename IFEX), procarbazine (sold under the tradename MATULANE), mechlorethamine (also known as nitrogen mustard, mustine and mechloroethamine hydrochloride, sold under the tradename MUSTARGEN), streptozocin (sold under the tradename ZANOSAR), thiotepa (also known as thiophosphoamide, TESPA and TSPA, and sold under the tradename THIOPLEX).

Examples of anti-tumor antibiotics include, but are not limited to, doxorubicin (sold under the tradenames ADRIAMYCIN and RUB EX), bleomycin (sold under the tradename LENOXANE), daunorubicin (also known as dauorubicin hydrochloride, daunomycin, and rubidomycin hydrochloride, (2-CdA) sold under the tradename CERUBIDINE), daunorubicin liposomal (daunorubicin citrate liposome, sold under the tradename DAUNOXOME), mitoxantrone (also known as DHAD, sold under the tradename NOVANTRONE), epirubicin (sold under the tradename ELLENCE), idarubicin (sold under the tradenames IDAMYCIN, IDAMYCIN PFS), and mitomycin C (sold under the tradename MUTAMYCIN).

Examples of anti-metabolites include, but are not limited to 5-fluorouracil (sold under the tradename ADRUCIL), 6-thioguanine (sold under the tradename PURINETHOL), pemetrexed (sold under the tradename ALIMTA), cytarabine (also known as arabinosylcytosine (Ara-C), sold under the tradename CYTOSAR-U), cytarabine liposomal (also known as Liposomal Ara-C, sold under the tradename DEPOCYT), decitabine (sold under the tradename DACO- GEN), hydroxyurea (sold under the tradenames HYDREA, DROXIA and MYLOCEL), fludarabine (sold under the tradename FLUDARA), floxuridine (sold under the tradename FUDR), cladribine (also known as 2-chlorodeoxyadenosine (2-CdA) sold under the tradename LEUSTATIN), methotrexate (also known as amethopterin, methotrexate sodium (MTX), sold under the tradenames RHEUMATREX and TREXALL), and pentostatin (sold under the tradename NIPENT).

Examples of retinoids include, but are not limited to, alitretinoin (sold under the tradename PANRETIN), tretinoin (all-trans retinoic acid, also known as ATRA, sold under the tradename VESANOID), Isotretinoin (13-c/s-retinoic acid, sold under the tradenames ACCUTANE, AMNESTEEM, CLARAVIS, CLARUS, DECUTAN, ISOTANE, IZOTECH, ORATANE, ISOTRET, and SOTRET), and bexarotene (sold under the tradename TARGRETIN).

"PD-1 antagonist" means any chemical compound or biological molecule that blocks binding of PD-L1 expressed on a cancer cell to PD-1 expressed on an immune cell (T cell, B cell or NKT cell) and preferably also blocks binding of PD-L2 expressed on a cancer cell to the immune-cell expressed PD-1. Alternative names or synonyms for PD-1 and its ligands include: PDCD1, PD1, CD279 and SLEB2 for PD-1; PDCD1L1, PDL1, B7H1, B7-4, CD274 and B7-H for PD-L1; and PDCD1L2, PDL2, B7-DC, Btdc and CD273 for PD-L2. In any of the treatment method, medicaments and uses of the present invention in which a human individual is being treated, the PD-1 antagonist blocks binding of human PD-L1 to human PD-1, and preferably blocks binding of both human PD-L1 and PD-L2 to human PD-1. Human PD-1 amino acid sequences can be found in NCBI Locus No.: NP 005009. Human PD-L1 and PD-L2 amino acid sequences can be found in NCBI Locus No.: NP_054862 and NP_079515, respectively.

PD-1 antagonists useful in any of the treatment method, medicaments and uses of the present invention include a monoclonal antibody (mAb), or antigen binding fragment thereof, which specifically binds to PD-1 or PD-L1, and preferably specifically binds to human PD-1 or human PD-L1. The mAb may be a human antibody, a humanized antibody or a chimeric antibody, and may include a human constant region. In some embodiments the human constant region is selected from the group consisting of IgG1, IgG2, IgG3 and IgG4 constant regions, and in preferred embodiments, the human constant region is an IgG1 or IgG4 constant region. In some embodiments, the antigen binding fragment is selected from the group consisting of Fab, Fab'-SH, F(ab')2, scFv and Fv fragments. Examples of PD-1 antagonists include, but are not limited to, pembrolizumab (sold under the tradename KEYTRUDA) and nivolumab (sold under the tradename OPDIVO).

Examples of mAbs that bind to human PD-1, and useful in the treatment method, medicaments and uses of the present invention, are described in U.S. Pat. Nos. 7,488,802, 7,521,051, 8,008,449, 8,354,509, 8,168,757, WO2004/004771, WO2004/072286, WO2004/056875, and US2011/0271358.

Examples of mAbs that bind to human PD-L1, and useful in the treatment method, medicaments and uses of the present invention, are described in WO2013/019906, WO2010/077634 A1 and U.S. Pat. No. 8,383,796. Specific anti-human PD-L1 mAbs useful as the PD-1 antagonist in the treatment method, medicaments and uses of the present invention include MPDL3280A, BMS-936559, MEDI4736 and MSB0010718C of WO2013/019906.

Other PD-1 antagonists useful in any of the treatment method, medicaments and uses of the present invention include an immunoadhesin that specifically binds to PD-1 or PD-LI, and preferably specifically binds to human PD-1 or human PD-L1, e.g., a fusion protein containing the extracellular or PD-1 binding portion of PD-L1 or PD-L2 fused to a constant region such as an Fc region of an immunoglobulin molecule. Examples of immunoadhesion molecules that specifically bind to PD-1 are described in WO2010/027827 and WO2011/066342. Specific fusion proteins useful as the PD-1 antagonist in the treatment method, medicaments and uses of the present invention include AMP-224 (also known as B7-DCIg), which is a PD-L2-FC fusion protein and binds to human PD-1.

Examples of other cytotoxic agents include, but are not limited to, arsenic trioxide (sold under the tradename TRISENOX), asparaginase (also known as L-asparaginase, and Erwinia L-asparaginase, sold under the tradenames ELSPAR and KIDROLASE)

When a compound of the present invention is used contemporaneously with one or more other drugs a specific embodiment hereof pertains to, a pharmaceutical composition containing such other drugs in addition to the compound of the present invention. Accordingly, the pharmaceutical compositions of the present invention include those that also contain one or more other active ingredients, in addition to a compound of the present invention.

The weight ratio of the compound of the present invention to the second active ingredient may be varied and will depend upon the effective dose of each ingredient. Generally, an effective dose of each will be used. Thus, for example, when a compound of the present invention is combined with another agent, the weight ratio of the compound of the present invention to the other agent will generally range from about 1000:1 to about 1:1000, in particular embodiments from about 200:1 to about 1:200. Combinations of a compound of the present invention and other active ingredients will generally also be within the aforementioned range, but in each case, an effective dose of each active ingredient should be used.

In such combinations the compound of the present invention and other active agents may be administered separately or in conjunction. In addition, the administration of one element may be prior to, concurrent to, or subsequent to the administration of other agent(s).

EXAMPLES

The meanings of the abbreviations in Examples are shown below.

ACN=MeCN=$CH_3CN$=acetonitrile
AcOH=acetic acid
AIBN=Azobisisobutyronitrile
Ar=argon
$BBr_3$=Boron tribromide
$BF_3$ $Et_2O$=Boron trifluoride etherate
$Boc_2O$=di-tert-butyl dicarbonate
Cbz=carboxybenzyl
CbzOSu=N-(Benzyloxycarbonyloxy)succinimide
$CBr_4$=Tetrabromomethane
$CCl_4$=carbontetrachloride
CELITE=diatomaceous earth
Conc.=concentrated
$Cs_2CO_3$=Cesium carbonate
DBU=1,8-Diazabicyclo[5.4.0]undec-7-ene
DCE=dichloroethane
DCM=dichloromethane DDQ=2,3-Dichloro-5,6-dicyano-1,4-benzoquinone
DIBALH=diisobutylaluminum hydride
DIPEA=DIEA=N, N-Diisopropylethylamine, or Hunig's base
DMA=dimethylacetamide
DMAP=4-dimethylaminopyridine
DMF=N,N-Dimethylformamide
DMP=Dess-Martin periodinane
DMSO=dimethyl sulfoxide
DPPE=1,2-Bis(diphenylphosphino)ethane
DPPF=1,1'-Bis(diphenylphosphino)ferrocene
EDCI=1-ethyl-3-(3-dimethylaminopropyl)carbodiimide
$Et_2O$=diethyl ether
EtOAc=ethyl acetate
EtOH=ethanol
h=hours
$H_2$=hydrogen
HATU=1-[Bis(dimethylamino)methylene]-1H-1,2,3-triazolo[4,5-b]pyridinium 3-oxid hexafluorophosphate
HCl=hydrochloric acid
HFBA=Heptafluorobutyric acid
HOAc=acetic acid
$I_2$=iodine
IPA=isopropyl alcohol
$[Ir(cod)Cl]_2$=cyclooctadiene iridium chloride dimer
$K_2CO_3$=potassium carbonate
$K_3PO_4$=Tripotassium phosphate
KF=Potassium fluoride
KHMDS=Potassium bis(trimethylsilyl)amide
KOTMS=Potassium trimethylsilanolate
LCMS=Liquid chromatography-mass spectrometry
LHMDS=LiHMDS=lithium bis(trimethylsilyl)amide
$LiAlH_4$=lithium aluminum hydride
LiOH=lithium hydroxide
min=minutes
Me=methyl
MeOH=methanol
$MgSO_4$=Magnesium sulfate
MsCl=methanesulfonyl chloride
$N_2$=nitrogen
$NaBH_4$=sodium borohydrate
NaH=sodium hydride
$NaHCO_3$=Sodium hydrogencarbonate
$NaIO_4$=sodium periodate
NaOH=sodium hydroxide
$Na_2CO_3$=sodium carbonate
$Na_2SO_3$=sodium sulfite
$Na_2SO_4$=sodium sulfate
$NH_4Cl$=Ammonium chloride
$NH_4OH$=Ammonium hydroxide
$NH_4OAc$=Ammonium acetate
NaHMDS=sodium bis(trimethylsilyl)amide
$Pd(OH)_2/C$=Pearlman's Catalyst—Palladium hydroxide on carbon-C
Pd/C=Palladium on carbon-C
$[Pd(C_3H_5)Cl_2]$=Allylpalladium(II) chloride dimer
$PdCl_2(dppf)-CH_2Cl_2$=[1,1'-Bis(diphenylphosphino)ferrocene]dichloropalladium(II)
$PPh_3$=Triphenylphosphine
$RuO_2 \cdot H_2O$=ruthenium(IV)oxide hydrate
RP-HPLC=reverse phase high performance liquid chromatography
SFC=Supercritical Fluid Chromatography
TBDPS-Cl=TBSCl=tert-Butyl(chloro)diphenylsilane
TEA=$Et_3N$=triethylamine
TBAF=Tetra-n-butylammonium fluoride
TFA=trifluoroacetic acid
THF=tetrahydrofuran
TMS=Trimethylsilylb
TsOH=p-Toluenesulfonic acid
$CDCl_3$=heavy chloroform
$CD_3OD$=heavy methanol 1 Standard atmosphere [atm]=101325 pascal [Pa]
=14.6959488 psi The meanings of the abbreviations in the nuclear magnetic resonance spectra are shown below:

s=singlet, d=doublet, dd=double doublet, dt=double triplet, ddd=double double doublet, Sept=septet, t=triplet, m=multiplet, br=broad, brs=broad singlet, q=quartet J=coupling constant and Hz=hertz.

Compounds of this invention can be prepared using the intermediates and processes outlined below. The various starting materials used are commercially available or are readily made by persons skilled in the art. An asterisk (*) may be used in a chemical structure drawing that indicates the location of a chiral center.

Example 1: (3aS,4S,6aR)-3a-(3-boronopropyl)octahydropyrrolo[3,4-b]pyrrole-4-carboxylic Acid

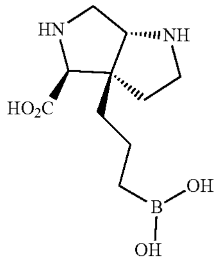 [SMILES: O=C(O)[C@H]1NC[C@@H]2NCC[C@@]21CCCB(O)O]

Step 1: 1-(tert-butyl) 2-methyl (2S)-3-allyl-4-hydroxy-3-(2-hydroxyethyl)pyrrolidine-1,2-dicarboxylate

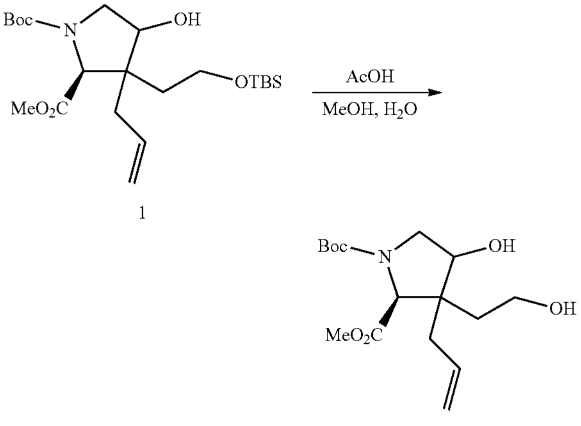

1

2

1-(tert-butyl) 2-methyl (2S)-3-allyl-3-(2-((tert-butyldimethylsilyl)oxy)ethyl)-4-hydroxypyrrolidine-1,2-dicarboxylate (23 g, 52 mmol) was taken up in a mixture of MeOH (58 mL), water (58 mL) and AcOH (58 mL). The reaction mixture was stirred at ambient temperature for 19 hours then diluted with water and ethyl acetate. The organic layer was separated, dried over $Na_2SO_4$, filtered and concentrated under reduced pressure. The resulting residue was purified by silica gel chromatography (MeOH in DCM) to afford 1-(tert-butyl) 2-methyl (2S)-3-allyl-4-hydroxy-3-(2-hydroxyethyl)pyrrolidine-1,2-dicarboxylate (mixture of diastereomers). LCMS ($C_{11}H_{20}NO_4^+$) (ES, m/z): 230 $[M-Boc+H]^+$.

Step 2: 1-(tert-butyl) 2-methyl (2S)-3-allyl-4-oxo-3-(2-oxoethyl)pyrrolidine-1,2-dicarboxylate

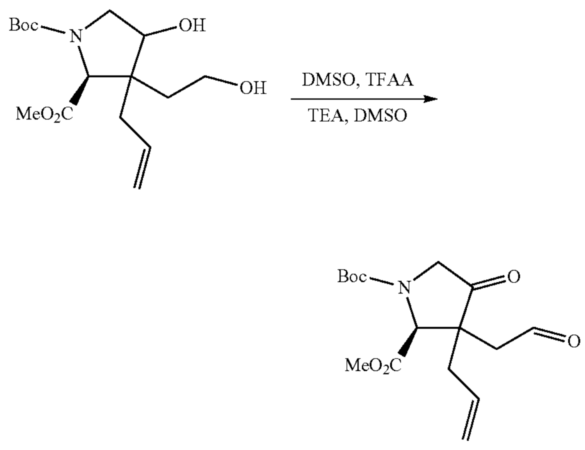

A solution of trifluoroacetic anhydride (13 mL, 91 mmol) in DCM (40 mL) was added to a solution of DMSO (8.6 mL, 120 mmol) in DCM (120 mL) at −78° C. The resulting solution was held at −78° C. for 45 minutes. A solution of 1-(tert-butyl) 2-methyl (2S)-3-allyl-4-hydroxy-3-(2-hydroxyethyl)pyrrolidine-1,2-dicarboxylate (mixture of diastereomers, 10 g, 30 mmol) in DCM (40 mL) was added and the reaction mixture was held at −78° C. for 1 hour. Triethylamine (21 mL, 150 mmol) was added, and the reaction mixture was warmed to ambient temperature and held for 3 hours. The reaction mixture was concentrated under reduced pressure affording crude 1-(tert-butyl) 2-methyl (2S)-3-allyl-4-oxo-3-(2-oxoethyl)pyrrolidine-1,2-dicarboxylate (mixture of diastereomers) which was used in the next step without purification. LCMS ($C_{11}H_{16}NO_4^+$) (ES, m/z): 226 $[M-Boc+H]^+$.

Step 3: 5-(tert-butyl) 4-methyl (4S)-3a-allyl-1-benzylhexahydropyrrolo[3,4-b]pyrrole-4,5(1H)-dicarboxylate

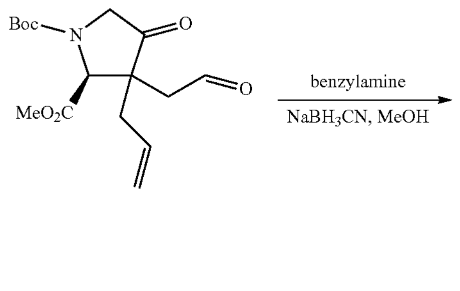

-continued

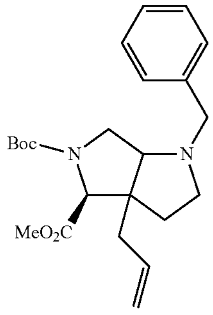

Benzylamine (3.5 mL, 32 mmol) was added to a solution of 1-(tert-butyl) 2-methyl (2S)-3-allyl-4-oxo-3-(2-oxoethyl)pyrrolidine-1,2-dicarboxylate (mixture of diastereomers) (9.9 g, 30 mmol) in MeOH (610 mL) at 0° C. followed by portion wise addition of sodium cyanoborohydride (7.6 g, 120 mmol). The reaction mixture was warmed to ambient temperature and held for 19 hours. The reaction was diluted with water and ethyl acetate. The organic layer was separated, dried over $Na_2SO_4$, filtered and concentrated under reduced pressure. The resulting oil was purified by silica gel chromatography (EtOAc in hexanes) to afford 5-(tert-butyl) 4-methyl (4S)-3a-allyl-1-benzylhexahydropyrrolo[3,4-b]pyrrole-4,5(1H)-dicarboxylate (mixture of diastereomers). LCMS ($C_{23}H_{33}N_2O_4^+$) (ES, m/z): 401 $[M+H]^+$.

Step 4: 5-(tert-butyl) 4-methyl (3aS,4S,6aR)-1-benzyl-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate

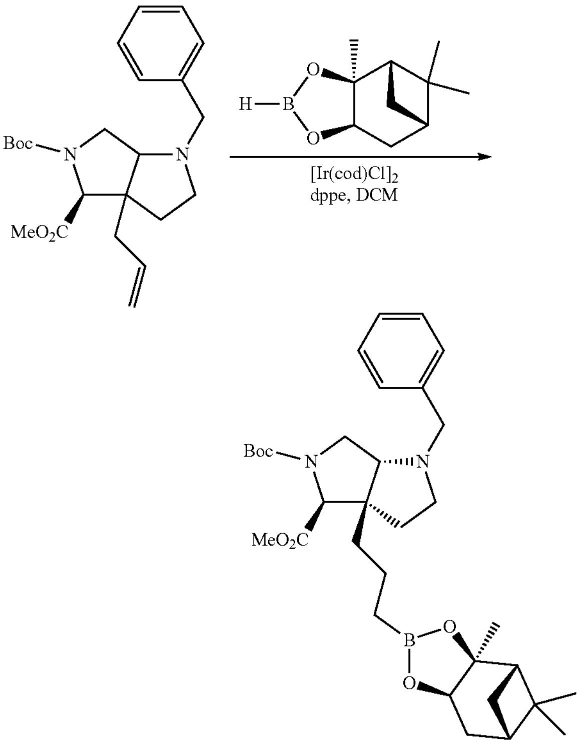

(3aS,4S,6S,7aR)-3a,5,5-trimethylhexahydro-4,6-methanobenzo[d][1,3,2]dioxaborole (6.2 g, mmol), chloro(1,5-cyclooctadiene)Iridium(I) dimer (0.58 g, 0.86 mmol) and 1,2-bis(diphenylphosphino)ethane (0.69 g, 1.7 mmol) in anhydrous DCM (230 mL) were placed under an atmosphere of argon, and the resulting mixture was stirred at ambient temperature for 20 minutes, followed by addition of a solution of 5-(tert-butyl) 4-methyl (4S)-3a-allyl-1-benzyl-hexahydropyrrolo[3,4-b]pyrrole-4,5(1H)-dicarboxylate (mixture of diastereomers) (6.9 g, 17 mmol) in DCM (120 mL). The reaction mixture was stirred at ambient temperature for 1.5 hours under argon. The reaction was quenched by slow addition of methanol then diluted with water and DCM. The organic layer was separated, washed with brine, dried over $Na_2SO_4$, filtered and concentrated under reduced pressure. The resulting residue was purified by silica gel chromatography (EtOAc in hexanes) to afford 5-(tert-butyl) 4-methyl (4S)-1-benzyl-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate (mixture of diastereomers). The product was further purified by chiral SFC (Regis (R,R)-Whelk-O1 column, 20%/80% methanol+0.1% $NH_4OH/CO_2$). Retention time for desired material was 3.2 min. 5-(tert-butyl) 4-methyl (3aS,4S,6aR)-1-benzyl-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate was isolated. LCMS ($C_{33}H_{50}BN_2O_6^+$) (ES, m/z): 581 $[M+H]^+$.

Step 5: 5-(tert-butyl) 4-methyl (3aS,4S,6aR)-3a-(3-((3aS,4S,6S,7aR)-3a,5,5-trimethylhexahydro-4,6-methanobenzo[d][1,3,2]dioxaborol-2-yl)propyl) hexahydropyrrolo[3,4-b]pyrrole-4,5(1H)-dicarboxylate

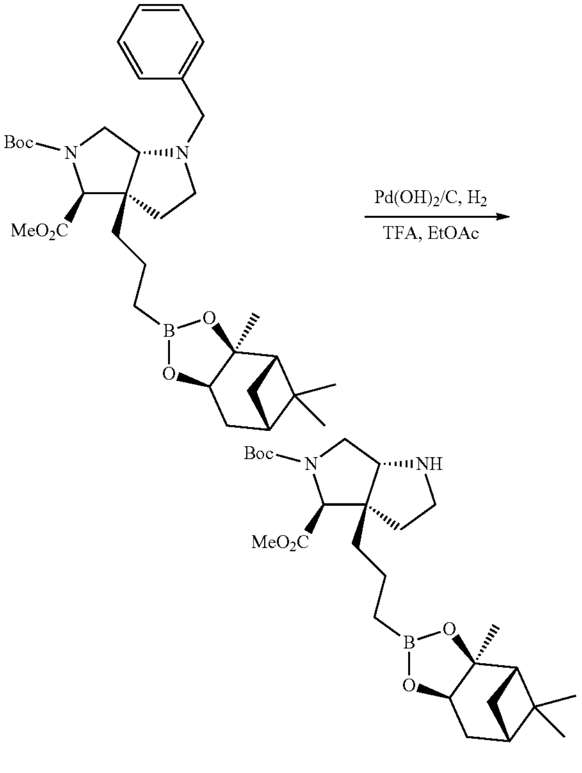

Pd(OH)$_2$/C (0.33 g, 0.47 mmol) was added to a solution of 5-tert-butyl) 4-methyl (3aS,4S,6aR)-1-benzyl-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate (5.5 g, 9.4 mmol) in EtOAc (100 mL). The reaction mixture was degassed and backfilled with $H_2$ three times then stirred under an atmosphere of $H_2$ for 40 hours. The mixture was filtered and concentrated under reduced pressure. The resulting residue was purified by silica gel chromatography (3:1 EtOAc/EtOH in hexanes) to afford 5-(tert-butyl) 4-methyl (3aS,4S,6aR)-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate as the TFA salt. LCMS ($C_{26}H_{44}BN_2O_6^+$) (ES, m/z): 491 $[M+H]^+$.

Step 6: (3aS,4S,6aR)-3a-(3-boronopropyl)octahydropyrrolo[3,4-b]pyrrole-4-carboxylic Acid

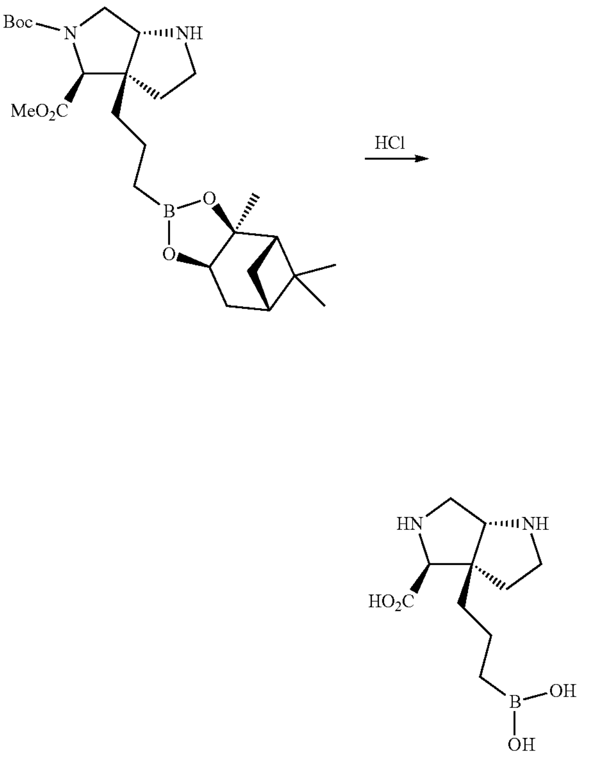

A mixture of 5-(tert-butyl) 4-methyl (3aS,4S,6aR)-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate (1.1 g, 1.7 mmol) and 6 M HCl (10 mL, 60 mmol) was heated in a microwave reactor with stirring at 120° C. for 1.5 hours. The reaction mixture was washed with DCM and the resulting aqueous layer was concentrated to give (3aS,4S,6aR)-3a-(3-boronopropyl)octahydropyrrolo[3,4-b]pyrrole-4-carboxylic acid as an HCl salt. LCMS ($C_{10}H_{18}BN_2O_3^+$) (ES, m/z): 225 $[M-H_2O+H]^+$. $^1H$ NMR (499 MHz, $D_2O$) δ 4.27 (dd, 1H), 4.13-4.07 (m, 1H), 3.95 (dd, J=14.0, 8.3 Hz, 1H), 3.61-3.47 (m, 3H), 2.37-2.27 (m, 1H), 2.24-2.13 (m, 1H), 1.64-1.49 (m, 2H), 1.47-1.27 (m, 2H), 0.77-0.69 (m, 2H).

Step 7: (3aS,4S,6aR)-3a-(3-boronopropyl)octahydropyrrolo[3,4-b]pyrrole-4-carboxylic Acid (Free Base)

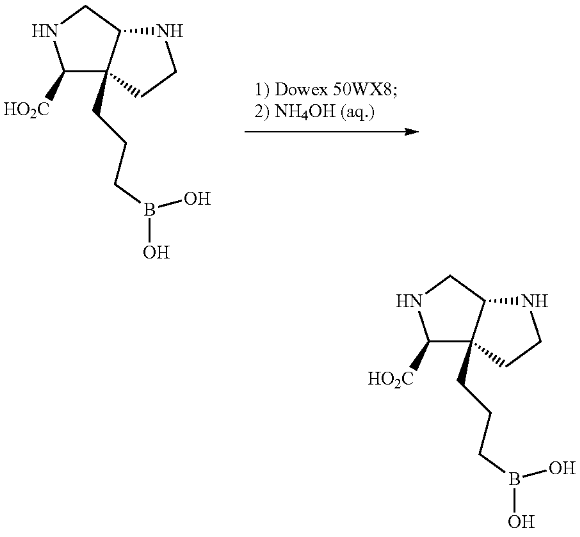

Example 1

(3aS,4S,6aR)-3a-(3-boronopropyl)octahydropyrrolo[3,4-b]pyrrole-4-carboxylic acid (2HCl salt, 0.64 g, 2.0 mmol) was purified on 39 g of Dowex 50WX8 acidic resin (washed with water until pH neutral, then eluted with 2N aqueous ammonium hydroxide) to afford (3aS,4S,6aR)-3a-(3-boronopropyl)octahydropyrrolo[3,4-b]pyrrole-4-carboxylic acid as a free base. LCMS ($C_{10}H_{18}BN_2O_3^+$) (ES, m/z): 225 $[M-H_2O+H]^+$. $^1H$ NMR (499 MHz, $D_2O$) δ 3.91-3.81 (m, 1H), 3.61 (dd, J=13.1, 8.0 Hz, 1H), 3.48 (s, 1H), 3.33-3.26 (m, 1H), 3.26-3.17 (m, 1H), 2.82 (dd, J=13.2, 5.7 Hz, 1H), 2.12-2.04 (m, 1H), 1.97-1.88 (m, 1H), 1.52-1.26 (m, 4H), 0.74-0.67 (m, 2H).

Example 2: (3aR,4S,6aR)-1-benzyl-3a-(3-boronopropyl)octahydropyrrolo[3,4-b]pyrrole-4-carboxylic Acid

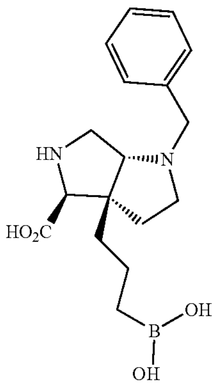 [SMILES: O=C(O)[C@H]1NC[C@@H]2N(Cc3ccccc3)CC[C@]12CCCB(O)O]

Step 1: 5-(tert-butyl) 4-methyl (3aR,4S)-3a-allyl-6a-hydroxyhexahydro-5H-furo[2,3-c]pyrrole-4,5-dicarboxylate

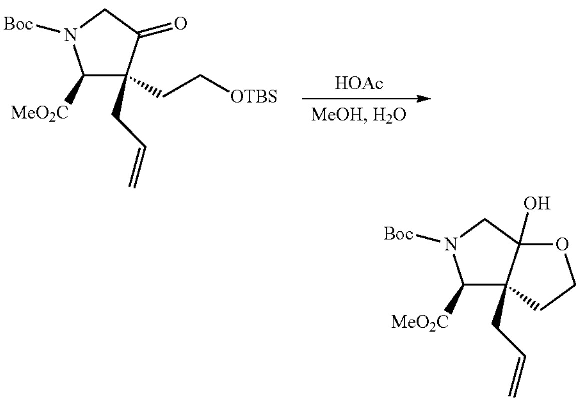

1-(tert-butyl) 2-methyl (2S,3R)-3-allyl-3-(2-((tert-butyldimethylsilyl)oxy)ethyl)-4-oxopyrrolidine-1,2-dicarboxylate (600 mg, 1.4 mmol) was taken up in a mixture of MeOH (1.5 mL), water (1.5 mL) and AcOH (1.5 mL). The reaction mixture was stirred at ambient temperature for 19 hours then diluted with water and ethyl acetate. The organic layer was separated, dried over $Na_2SO_4$, filtered and concentrated under reduced pressure. The resulting residue was purified by silica gel chromatography (EtOAc in hexanes) to afford 5-(tert-butyl) 4-methyl (3aR,4S)-3a-allyl-6a-hydroxyhexahydro-5H-furo[2,3-c]pyrrole-4,5-dicarboxylate. LCMS ($C_{11}H_{18}NO_4^+$) (ES, m/z): 228 $[M-Boc+H]^+$.

Step 2: 1-(tert-butyl) 2-methyl (2S,3R)-3-allyl-4-hydroxy-3-(2-hydroxyethyl)pyrrolidine-1,2-dicarboxylate

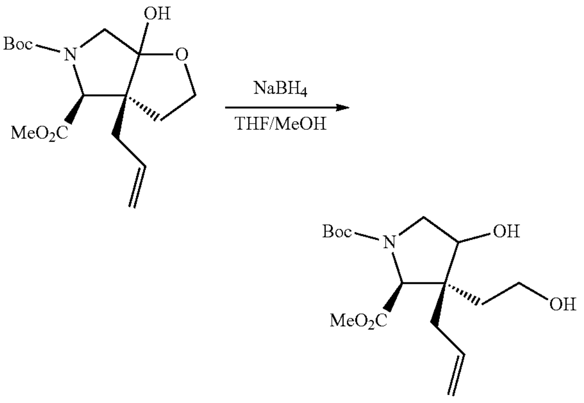

Sodium borohydride (110 mg, 2.8 mmol) was added to a solution of 5-(tert-butyl) 4-methyl (3aR,4S)-3a-allyl-6a-hydroxyhexahydro-5H-furo[2,3-c]pyrrole-4,5-dicarboxylate (230 mg, 0.71 mmol) in THF (2.3 mL) and MeOH (2.3 mL) at 0° C. Reaction mixture was held at 0° C. for 1 hour then diluted with saturated aqueous ammonium chloride. The resulting mixture was made acidic by addition of 1N citric acid and extracted with EtOAc. The organic layer was separated, dried over $Na_2SO_4$, filtered and concentrated under reduced pressure. The resulting oil was purified by silica gel chromatography (MeOH in DCM) to afford 1-(tert-butyl) 2-methyl (2S,3R)-3-allyl-4-hydroxy-3-(2-hydroxyethyl)pyrrolidine-1,2-dicarboxylate. LCMS ($C_{11}H_{20}NO_4^+$) (ES, m/z): 230 [M−Boc+H]$^+$.

Step 3: 1-(tert-butyl) 2-methyl (2S,3R)-3-allyl-4-oxo-3-(2-oxoethyl)pyrrolidine-1,2-dicarboxylate

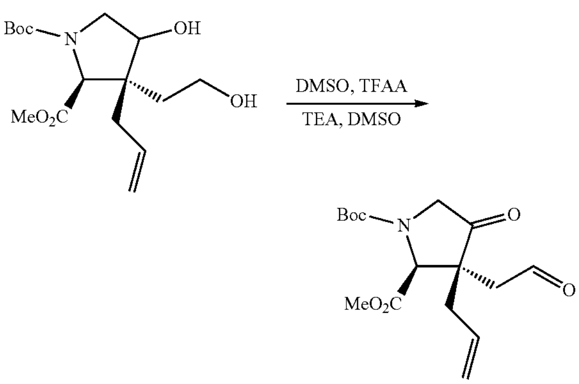

A solution of trifluoroacetic anhydride (0.26 mL, 1.8 mmol) in DCM (0.8 mL) was added to a solution of DMSO (0.17 mL, 2.4 mmol) in DCM (2.4 mL) at −78° C. The resulting solution was held at −78° C. for 15 minutes. A solution of 1-(tert-butyl) 2-methyl (2S,3R)-3-allyl-4-hydroxy-3-(2-hydroxyethyl)pyrrolidine-1,2-dicarboxylate (200 mg, 0.6 mmol) in DCM (0.8 mL) was added and the reaction mixture was held at −78° C. for 45 minutes. Triethylamine (0.42 mL, 3.0 mmol) was added and the reaction mixture was warmed to ambient temperature and held for 1.5 hours. Reaction mixture was concentrated under reduced pressure affording crude 1-(tert-butyl) 2-methyl (2S,3R)-3-allyl-4-oxo-3-(2-oxoethyl)pyrrolidine-1,2-dicarboxylate which was used in the next step without purification. LCMS ($C_{11}H_{16}NO_4^+$) (ES, m/z): 226 [M−Boc+H]$^+$.

Step 4: 5-(tert-butyl) 4-methyl (3aS,4S,6aR)-3a-allyl-1-benzylhexahydropyrrolo[3,4-b]pyrrole-4,5(1H)-dicarboxylate

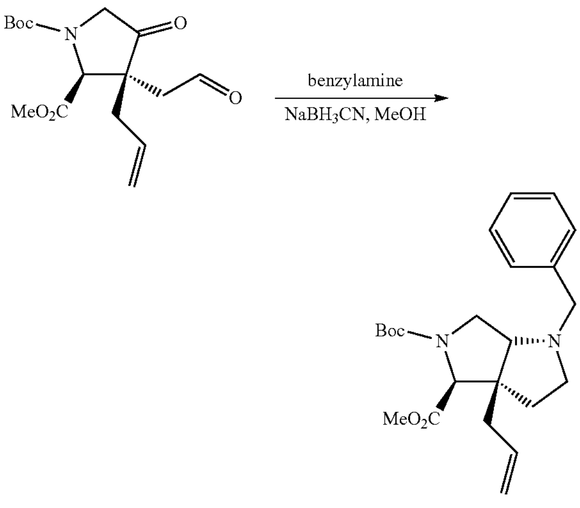

Benzylamine (0.066 mL, 0.6 mmol) was added to a solution of 1-(tert-butyl) 2-methyl (2S,3R)-3-allyl-4-oxo-3-(2-oxoethyl)pyrrolidine-1,2-dicarboxylate (0.2 g, 0.6 mmol) in MeOH (30 mL) at 0° C. followed by addition of sodium cyanoborohydride (0.15 g, 2.4 mmol). The reaction mixture was warmed to ambient temperature and held for 66 hours. The reaction concentrated under reduced pressure and the resulting residue was purified by silica gel chromatography (EtOAc in hexanes) to afford 5-(tert-butyl) 4-methyl (3aS,4S,6aR)-3a-allyl-1-benzylhexahydropyrrolo[3,4-b]pyrrole-4,5(1H)-dicarboxylate. LCMS ($C_{23}H_{33}N_2O_4^+$) (ES, m/z): 401 [M+H]$^+$.

Step 5: 5-(tert-butyl) 4-methyl (3aS,4S,6aR)-1-benzyl-3a-(3-(4,4,5,5-tetramethyl-1,3,2-dioxaborolan-2-yl)propyl)hexahydropyrrolo[3,4-b]pyrrole-4,5(1H)-dicarboxylate

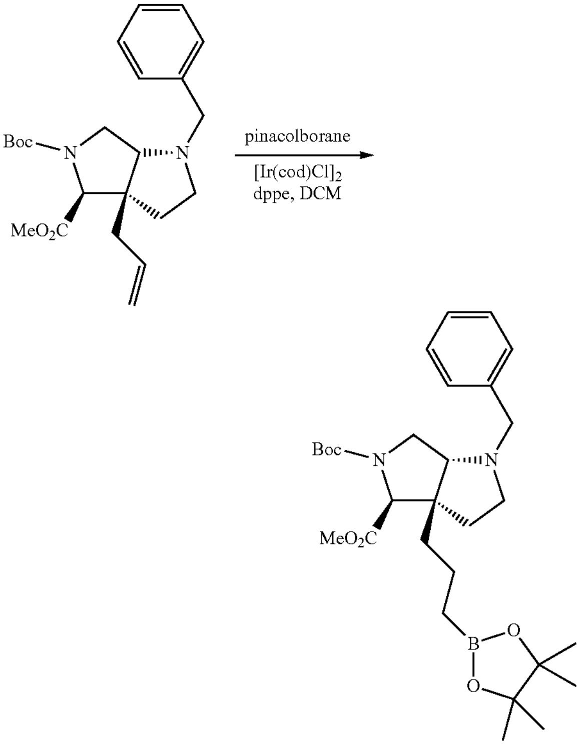

Pinacolborane (1M in THF) (0.67 mL, 0.67 mmol), chloro(1,5-cyclooctadiene)Iridium(I) dimer (0.009 g, 0.013 mmol) and 1,2-bis(diphenylphosphino)ethane (0.011 g, 0.027 mmol) in anhydrous DCM (3.5 mL) was placed under an atmosphere of argon and the resulting mixture was stirred at ambient temperature for 30 minutes, followed by addition of a solution of 5-(tert-butyl) 4-methyl (3aS,4S,6aR)-3a-allyl-1-benzylhexahydropyrrolo[3,4-b]pyrrole-4,5(1H)-dicarboxylate (0.11 g, 0.27 mmol) in DCM (1.8 mL). The reaction mixture was stirred at ambient temperature for 2 hours under argon. Reaction was quenched by slow addition of methanol then diluted with water and EtOAc. The organic layer was separated, washed with brine, dried over $Na_2SO_4$, filtered and concentrated under reduced pressure. The resulting residue was purified by silica gel chromatography (EtOAc in hexanes) to afford 5-(tert-butyl) 4-methyl (3aS,4S,6aR)-1-benzyl-3a-(3-(4,4,5,5-tetramethyl-1,3,2-dioxaborolan-2-yl)propyl)hexahydropyrrolo[3,4-b]pyrrole-4,5(1H)-dicarboxylate. LCMS ($C_{29}H_{46}BN_2O_6^+$) (ES, m/z): 529 $[M+H]^+$.

Step 6: (3aR,4S,6aR)-1-benzyl-3a-(3-boronopropyl)octahydropyrrolo[3,4-b]pyrrole-4-carboxylic Acid

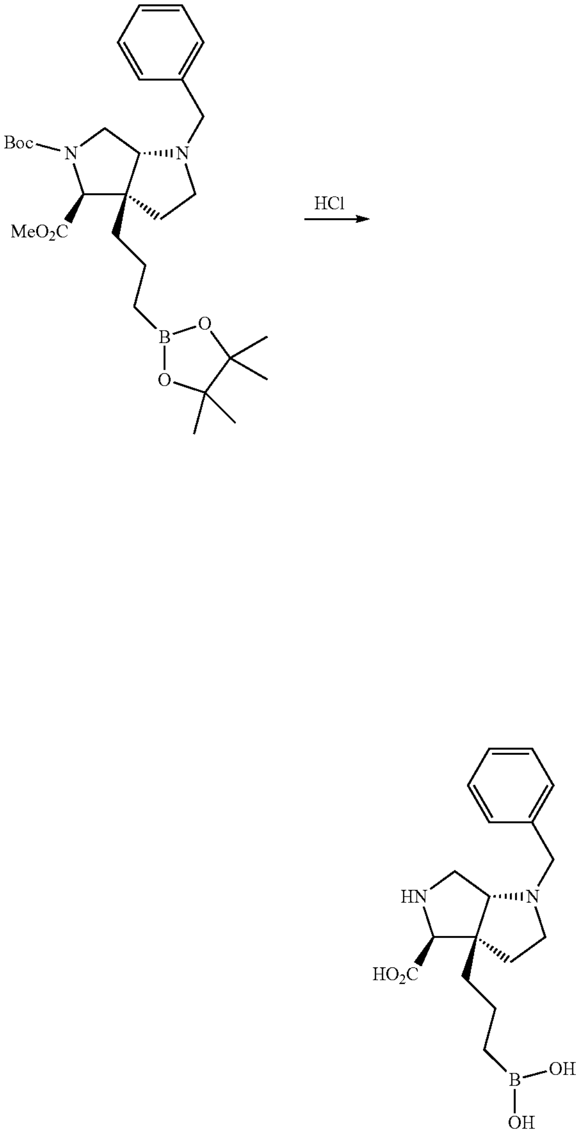

A mixture of 5-(tert-butyl) 4-methyl (3aS,4S,6aR)-1-benzyl-3a-(3-(4,4,5,5-tetramethyl-1,3,2-dioxaborolan-2-yl)propyl)hexahydropyrrolo[3,4-b]pyrrole-4,5(1H)-dicarboxylate (0.0059 g, 0.011 mmol) and 6 M HCl (0.5 mL, 3 mmol) was heated in a microwave reactor while stirring at 120° C. for 1 hour. The reaction mixture was concentrated to give (3aR,4S,6aR)-1-benzyl-3a-(3-boronopropyl)octahydropyrrolo[3,4-b]pyrrole-4-carboxylic acid as an HCl salt. LCMS ($C_{17}H_{24}BN_2O_3^+$) (ES, m/z): 315 $[M-H_2O+H]^+$. $^1H$ NMR (499 MHz, $D_2O$) δ 7.55-7.41 (m, 5H), 4.49 (d, J=13.0 Hz, 1H), 4.38 (d, J=13.0 Hz, 1H), 4.20 (dd, J=8.0, 4.5 Hz, 1H), 4.10 (s, 1H), 3.88-3.75 (m, 1H), 3.63-3.48 (m, 2H), 3.19-3.08 (m, 1H), 2.38-2.25 (m, 2H), 1.62-1.47 (m, 2H), 1.47-1.31 (m, 2H), 0.81-0.67 (m, 2H).

Example 3: (3aR,4S,6aR)-3a-(3-boronopropyl)-1-methyloctahydropyrrolo[3,4-b]pyrrole-4-carboxylic Acid

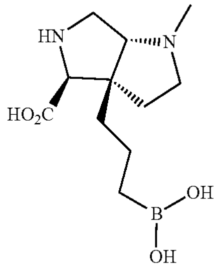 [SMILES: CN1CC[C@]2(CCCB(O)O)[C@@H](C(=O)O)NC[C@H]12]

Step 1: 5-(tert-butyl) 4-methyl (3aS,4S,6aR)-1-methyl-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate

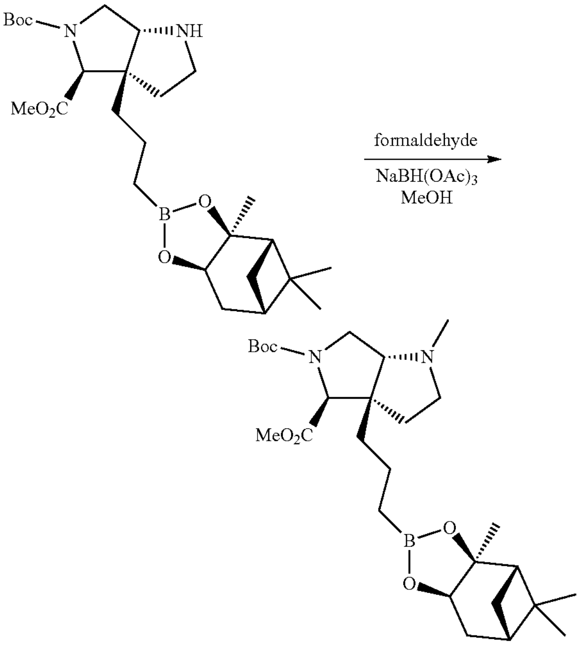

Formaldehyde (37 wt % in water) (16 μL, 0.22 mmol) followed by sodium triacetoxyborohydride (23 mg, 0.0.11 mmol) were added to a solution of 5-(tert-butyl) 4-methyl (3aS,4S,6aR)-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate (27 mg, 0.055 mmol) in MeOH (1 mL). The reaction mixture was stirred at ambient temperature for 3.5 hours. More formaldehyde (37 wt % in water) (16 μL, 0.22 mmol) and sodium triacetoxyborohydride (23 mg, 0.0.11 mmol) were added to the solution which was held for an additional 18 hours at ambient temperature. A final addition of formaldehyde (37 wt % in water) (16 μL, 0.22 mmol) and sodium triacetoxyborohydride (23 mg, 0.0.11 mmol) was added and the mixture was stirred for an additional 1.5 hours at ambient temperature. The reaction mixture was diluted with saturated aqueous $NH_4Cl$ and ethyl acetate. The organic layer was separated, washed with brine, dried over $Na_2SO_4$, filtered and concentrated under reduced pressure. The resulting residue was purified by silica gel chromatography (EtOAc in hexanes) to afford 5-(tert-butyl) 4-methyl (3aS,4S,6aR)-1-methyl-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate. LCMS ($C_{27}H_{46}BN_2O_6^+$) (ES, m/z): 505 $[M+H]^+$.

Step 2: (3aR,4S,6aR)-3a-(3-boronopropyl)-1-methyloctahydropyrrolo[3,4-b]pyrrole-4-carboxylic Acid

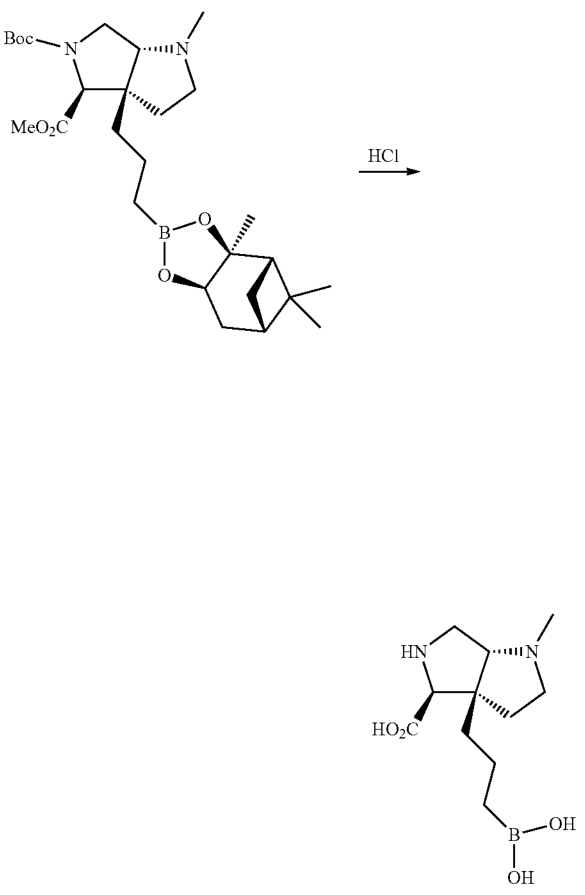

A mixture of 5-(tert-butyl) 4-methyl (3aS,4S,6aR)-1-methyl-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate (15 mg, 0.029 mmol) and 6 M HCl (0.75 mL, 4.5 mmol) was heated in a microwave reactor with stirring at 120° C. for 1 hour. The reaction mixture was washed with DCM and the resulting aqueous layer was concentrated to give (3aR,4S,6aR)-3a-(3-boronopropyl)-1-methyloctahydropyrrolo[3,4-b]pyrrole-4-carboxylic acid as an HCl salt. LCMS ($C_{11}H_{20}BN_2O_3^+$) (ES, m/z): 239 $[M-H_2O+H]^+$. $^1H$ NMR (499 MHz, $D_2O$) δ 4.22-4.12 (m, 2H), 3.99-3.75 (m, 2H), 3.72-3.60 (m, 1H), 3.57-3.41 (m, 1H), 2.92 (s, 3H), 2.42-2.27 (m, 2H), 1.65-1.50 (m, 2H), 1.49-1.31 (m, 2H), 0.80-0.70 (m, 2H).

Example 4: (3aR,4S,6aR)-1-(L-alanyl)-3a-(3-boronopropyl)octahydropyrrolo[3,4-b]pyrrole-4-carboxylic Acid

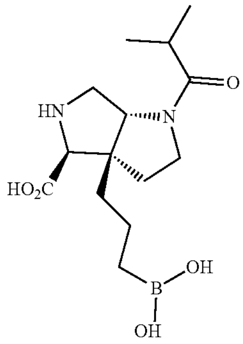 [SMILES: CC(C)C(=O)N1CC[C@]2(CCCB(O)O)[C@@H](C(=O)O)NC[C@H]12]

Step 1: 5-(tert-butyl) 4-methyl (3aS,4S,6aR)-1-((tert-butoxycarbonyl)-L-alanyl)-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate

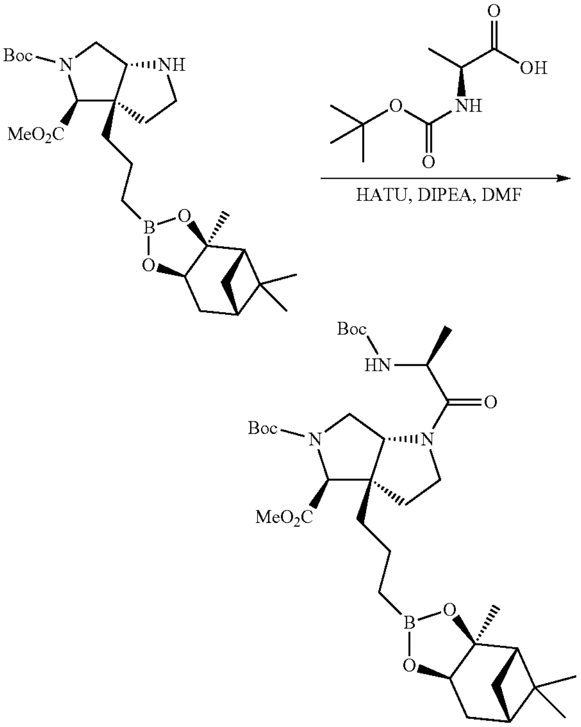

Boc-Ala-OH (39 mg, 0.21 mmol), DIPEA (140 μL, 0.82 mmol) and HATU (93 mg, 0.25 mmol) were added to a solution of 5-(tert-butyl) 4-methyl (3aS,4S,6aR)-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate (TFA salt, 150 mg, 0.21 mmol) in DMF (1 mL). The reaction mixture was stirred at ambient temperature for 18 hours then diluted with aqueous $NaHCO_3$ and ethyl acetate. The organic layer was separated, dried over $Na_2SO_4$, filtered and concentrated under reduced pressure. The resulting oil was purified by silica gel chromatography (EtOAc in hexanes) to afford 5-(tert-butyl) 4-methyl (3aS,4S,6aR)-1-((tert-butoxycarbonyl)-L-alanyl)-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate. LCMS ($C_{29}H_{49}BN_3O_7^+$) (ES, m/z): 562 [M−Boc+H]$^+$.

Step 2: (3aS,4S,6aR)-5-(tert-butoxycarbonyl)-1-((tert-butoxycarbonyl)-L-alanyl)-3a-(3-((3aS,4S,6S,7aR)-3a,5,5-trimethylhexahydro-4,6-methanobenzo[d][1,3,2]dioxaborol-2-yl)propyl)octahydropyrrolo[3,4-b]pyrrole-4-carboxylic Acid

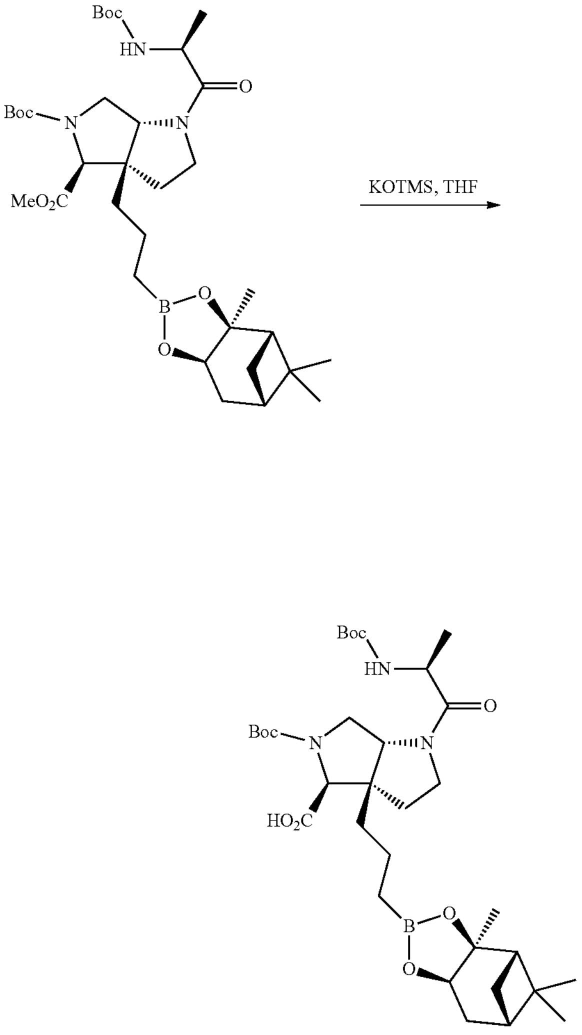

KOTMS (63 mg, 0.49 mmol) was added to a solution of 5-(tert-butyl) 4-methyl (3aS,4S,6aR)-1-((tert-butoxycarbonyl)-L-alanyl)-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate (130 mg, 0.20 mmol) in THF (2 mL). The reaction mixture stirred at ambient temperature for 5 hours. More KOTMS (63 mg, 0.49 mmol) was added to the reaction which was held at ambient temperature for an additional 17 hours. Reaction mixture was concentrated under reduced pressure and the resulting oil was purified by silica gel chromatography ((3:1 EtOAc/EtOH) in hexanes) to afford (3aS,4S,6aR)-5-(tert-butoxycarbonyl)-1-((tert-butoxycarbonyl)-L-alanyl)-3a-(3-((3aS,4S,6S,7aR)-3a,5,5-trimethylhexahydro-4,6-methanobenzo[d][1,3,2]dioxaborol-2-yl)propyl)octahydropyrrolo[3,4-b]pyrrole-4-carboxylic acid. LCMS ($C_{28}H_{47}BN_3O_7^+$) (ES, m/z): 548 [M−Boc+H]$^+$.

Step 3: (3aR,4S,6aR)-1-(L-alanyl)-3a-(3-boronopropyl)octahydropyrrolo[3,4-b]pyrrole-4-carboxylic Acid

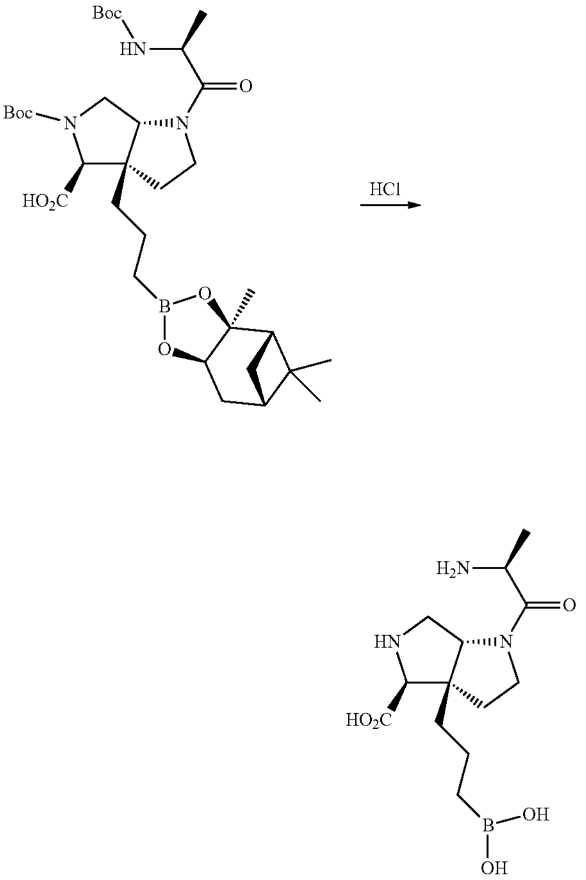

A mixture of (3aS,4S,6aR)-5-(tert-butoxycarbonyl)-1-((tert-butoxycarbonyl)-L-alanyl)-3a-(3-((3aS,4S,6S,7aR)-3a,5,5-trimethylhexahydro-4,6-methanobenzo[d][1,3,2]dioxaborol-2-yl)propyl)octahydropyrrolo[3,4-b]pyrrole-4-carboxylic acid (74 mg, 0.11 mmol) and 6 M HCl (1 mL, 6 mmol) was heated to 60° C. for 5 hours. The reaction mixture was washed with DCM and the resulting aqueous layer was concentrated to give (3aR,4S,6aR)-1-(L-alanyl)-3a-(3-boronopropyl)octahydropyrrolo[3,4-b]pyrrole-4-carboxylic acid as an HCl salt. LCMS ($C_{13}H_{23}BN_3O_4^+$) (ES, m/z): 296 [M−$H_2O$+H]$^+$. $^1H$ NMR (499 MHz, $D_2O$) δ 4.35-4.28 (m, 1H), 4.25-4.18 (m, 1H), 4.03-3.99 (m, 1H), 3.87-3.74 (m, 3H), 3.40-3.33 (m, 1H), 2.27-2.15 (m, 2H), 1.59-1.48 (m, 2H), 1.47-1.38 (m, 4H), 1.37-1.27 (m, 1H), 0.75-0.68 (m, 2H).

Step 4: (3aR,4S,6aR)-1-(L-alanyl)-3a-(3-boronopropyl)octahydropyrrolo[3,4-b]pyrrole-4-carboxylic Acid (Free Base)

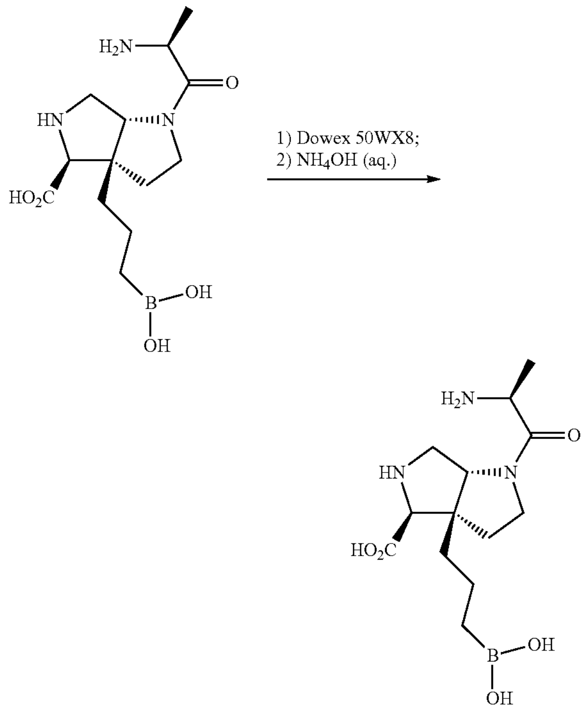

(3aR,4S,6aR)-1-(L-alanyl)-3a-(3-boronopropyl)octahydropyrrolo[3,4-b]pyrrole-4-carboxylic acid (2HCl salt, 25 mg, 0.065 mmol) was purified on 1.5 g of Dowex 50WX8 acidic resin (washed with water until pH neutral, then eluted with 2N aqueous ammonium hydroxide) to afford (3aR,4S,6aR)-1-(L-alanyl)-3a-(3-boronopropyl)octahydropyrrolo[3,4-b]pyrrole-4-carboxylic acid as a free base. LCMS ($C_{13}H_{23}BN_3O_4^+$) (ES, m/z): 296 $[M-H_2O+H]^+$. $^1H$ NMR (499 MHz, $D_2O$) δ 4.25-4.17 (m, 1H), 4.00-3.93 (m, 1H), 3.82-3.68 (m, 4H), 3.20-3.12 (m, 1H), 2.20-2.09 (m, 2H), 1.50-1.27 (m, 7H), 0.75-0.64 (m, 2H).

Example 5: (3aR,4S,6aR)-1-(L-valyl)-3a-(3-boronopropyl)octahydropyrrolo[3,4-b]pyrrole-4-carboxylic Acid

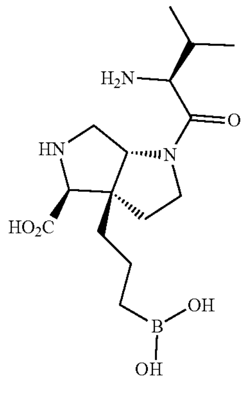 [SMILES: CC(C)[C@H](N)C(=O)N1CC[C@]2(CCCB(O)O)[C@@H](C(=O)O)NC[C@H]12]

Example 5 was synthesized according to the procedure described in Example 4, using appropriate starting materials. LCMS ($C_{15}H_{27}BN_3O_4^+$) (ES, m/z): 324 $[M-H_2O+H]^+$. $^1H$ NMR (499 MHz, $D_2O$) δ 4.45-4.29 (m, 1H), 4.15-3.71 (m, 5H), 3.42-3.25 (m, 1H), 2.32-2.11 (m, 3H), 1.66-1.25 (m, 4H), 1.13-0.89 (m, 6H), 0.84-0.66 (m, 2H).

Example 6: (3aR,4S,6aR)-3a-(3-boronopropyl)-1-ethyloctahydropyrrolo[3,4-b]pyrrole-4-carboxylic Acid

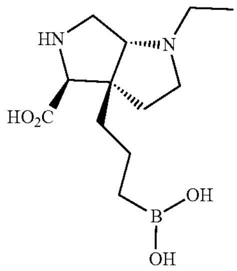 [SMILES: CCN1CC[C@]2(CCCB(O)O)[C@@H](C(=O)O)NC[C@H]12]

Step 1: 5-(tert-butyl) 4-methyl (3aS,4S,6aR)-1-ethyl-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate

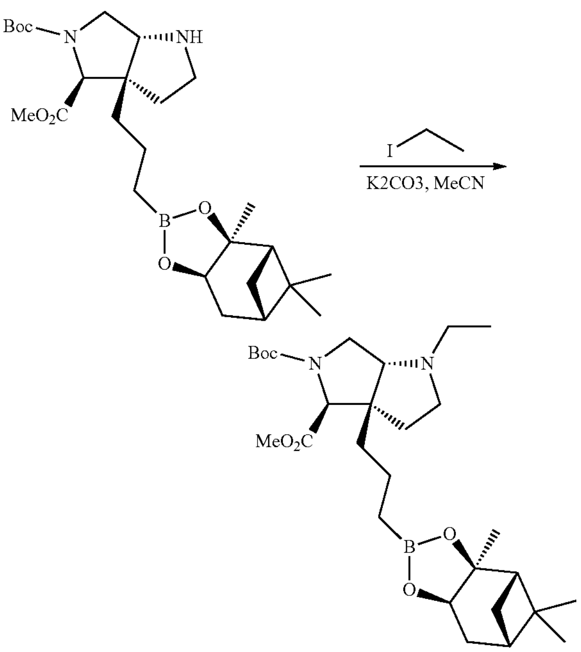

Potassium carbonate (69 mg, 0.5 mmol) and iodoethane (15 μL, 0.18 mmol) were added to a solution of 5-(tert-butyl) 4-methyl (3aS,4S,6aR)-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate (TFA salt, 100 mg, 0.17 mmol) in MeCN (1.7 mL). The resulting mixture was stirred at ambient temperature for 18 hours then filtered. The filtrate was concentrated under reduced pressure and the resulting residue was purified by silica gel chromatography (EtOAc in hexanes) to afford 5-(tert-butyl) 4-methyl (3aS,4S,6aR)-1-ethyl-3a-(3-((3aS, 4S,6S,7aR)-3a,5,5-trimethylhexahydro-4,6-methanobenzo [d][1,3,2]dioxaborol-2-yl)propyl)hexahydropyrrolo[3,4-b] pyrrole-4,5(1H)-dicarboxylate. LCMS ($C_{28}H_{48}BN_2O_6^+$) (ES, m/z): 519 $[M+H]^+$.

Step 2: (3aR,4S,6aR)-3a-(3-boronopropyl)-1-ethyl-octahydropyrrolo[3,4-b]pyrrole-4-carboxylic Acid

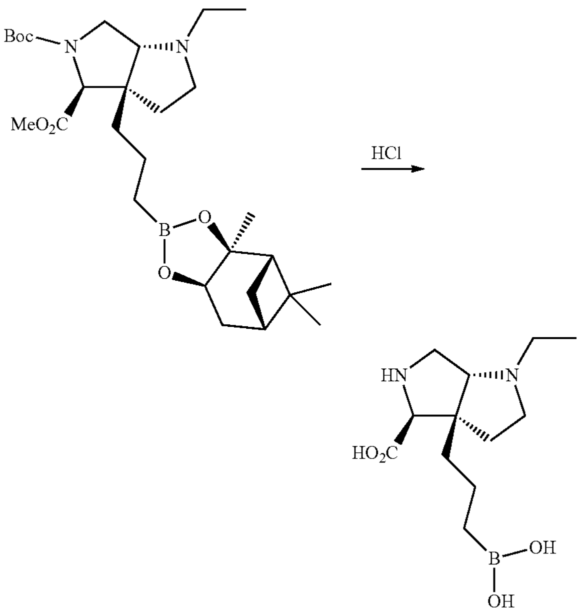

A mixture of 5-(tert-butyl) 4-methyl (3aS,4S,6aR)-1-ethyl-3a-(3-((3aS,4S,6S,7aR)-3a,5,5-trimethylhexahydro-4,6-methanobenzo[d][1,3,2]dioxaborol-2-yl)propyl)hexahydropyrrolo[3,4-b]pyrrole-4,5(1H)-dicarboxylate (28 mg, 0.054 mmol) and 6 M HCl (500 μL, 3.0 mmol) was heated in a microwave reactor with stirring at 120° C. for 1.5 hours. The reaction mixture was washed with DCM and the resulting aqueous layer was concentrated to give (3aR,4S,6aR)-3a-(3-boronopropyl)-1-ethyloctahydropyrrolo[3,4-b]pyrrole-4-carboxylic acid as an HCl salt. LCMS ($C_{12}H_{22}BN_2O_3^+$) (ES, m/z): 253 $[M-H_2O+H]^+$. $^1H$ NMR (499 MHz, $D_2O$) δ 4.28-4.05 (m, 2H), 4.03-3.79 (m, 2H), 3.65 (d, J=14.2 Hz, 1H), 3.54-3.28 (m, 2H), 3.27-3.15 (m, 1H), 2.44-2.23 (m, 2H), 1.68-1.49 (m, 2H), 1.48-1.32 (m, 2H), 1.32-1.22 (m, 3H), 0.80-0.69 (m, 2H).

Example 7: (3aR,4S,6aR)-1-(2-aminoethyl)-3a-(3-boronopropyl)octahydropyrrolo[3,4-b]pyrrole-4-carboxylic Acid

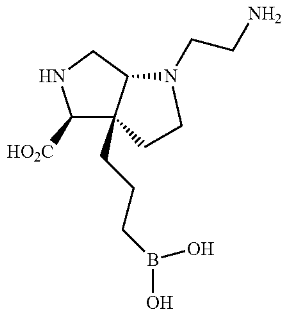 [SMILES: NCCN1CC[C@]2(CCCB(O)O)[C@@H](C(=O)O)NC[C@H]12]

Example 7 was made according to the reaction described in Example 6, using appropriate starting materials. LCMS ($C_{12}H_{23}BN_3O_3^+$) (ES, m/z): 268 $[M-H_2O+H]^+$. $^1H$ NMR (499 MHz, $D_2O$) δ 4.22 (s, 1H), 4.10-4.02 (m, 1H), 3.88 (dd, J=14.1, 7.3 Hz, 1H), 3.83-3.73 (m, 1H), 3.64 (dd, J=14.1, 3.7 Hz, 1H), 3.55-3.42 (m, 1H), 3.39-3.26 (m, 4H), 2.39-2.22 (m, 2H), 1.61-1.47 (m, 2H), 1.47-1.33 (m, 2H), 0.77-0.71 (m, 2H).

Example 8: (3aS,6aS)-3a-(3-boronopropyl)hexahydrocyclopenta[b]pyrrole-6a(1H)-carboxylic Acid

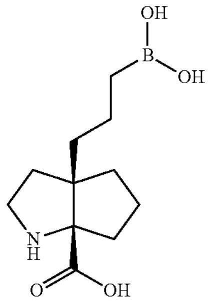 [SMILES: O=C(O)[C@]12CCC[C@@]1(CCCB(O)O)CCN2]

Step 1: 1-(tert-butyl) 2-methyl (2S,3S)-3-allyl-3-(3-((tert-butyldimethylsilyl)oxy)propyl)-4-oxopyrrolidine-1,2-dicarboxylate

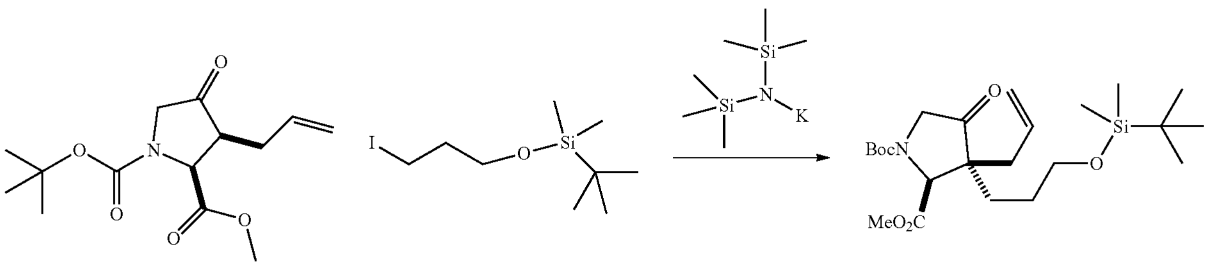

KHMDS (1.0 M in THF, 39 mL, 39 mmol) was added dropwise to a stirred solution of 1-(tert-butyl) 2-methyl (2S,3S)-3-allyl-4-oxopyrrolidine-1,2-dicarboxylate (10 g, 35 mmol) in THF (132 ml) and 1,3-dimethyl-3,4,5,6-tetrahydro-2(1H)-pyrimidinone (44 mL) at −78° C. The resulting mixture was stirred at −78° C. for 1 h, followed by dropwise addition of tert-butyl(3-iodopropoxy)dimethylsilane (21 g, 71 mmol) in THF (5.0 mL) at −78° C. The reaction mixture was stirred at −78° C. for 1 hour then at room temperature for 12 hours. The reaction mixture was quenched with saturated aqueous $NH_4Cl$, and extracted with EtOAc. The combined organic phases were concentrated and the residue was purified by silica gel column chromatography (EtOAc in hexanes) to afford 1-(tert-butyl) 2-methyl (2S,3S)-3-allyl-3-(3-((tert-butyldimethylsilyl)oxy)propyl)-4-oxopyrrolidine-1,2-dicarboxylate. LCMS ($C_{18}H_{34}NO_4Si^+$) (ES, m/z): 356 [M+H−Boc]$^+$.

Step 2: 1-(tert-butyl) 2-methyl (2S,3S)-3-allyl-3-(3-((tert-butyldimethylsilyl)oxy)propyl)-4-hydroxypyrrolidine-1,2-dicarboxylate

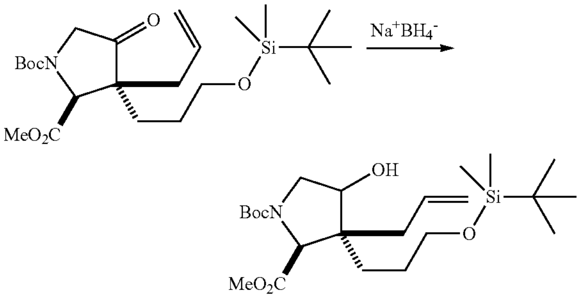

$NaBH_4$ (2.491 g, 65.8 mmol) was added in small portions to a stirred solution of 1-(tert-butyl) 2-methyl (2S,3S)-3-allyl-3-(3-((tert-butyldimethylsilyl)oxy)propyl)-4-oxopyrrolidine-1,2-dicarboxylate (10 g, 22 mmol) in methanol (200 mL) at 0° C., and the resulting mixture was stirred at 0° C. for 30 min then at room temperature for 12 h. The reaction mixture was diluted with brine and water, and extracted with EtOAc. The combined organic layers were washed with brine, dried over anhydrous $MgSO_4$, filtered, and concentrated under reduced pressure. The residue was purified by silica gel column chromatography (EtOAc in hexanes) to give 1-(tert-butyl) 2-methyl (2S,3S)-3-allyl-3-(3-((tert-butyldimethylsilyl)oxy)propyl)-4-hydroxypyrrolidine-1,2-dicarboxylate. LCMS ($C_{18}H_{36}NO_4Si^+$) (ES, m/z): 358 [M+H−Boc]$^+$.

Step 3: 1-(tert-butyl) 2-methyl (2S,3S)-3-allyl-3-(3-((tert-butyldimethylsilyl)oxy)propyl)-4-((4-methoxybenzyl)oxy)pyrrolidine-1,2-dicarboxylate

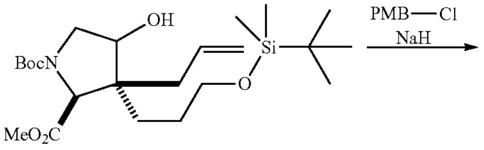

-continued

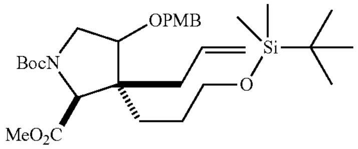

NaH (60 wt % in mineral oil, 262 mg, 6.6 mmol) was added to a stirred solution of 1-(tert-butyl) 2-methyl (2S,3S)-3-allyl-3-(3-((tert-butyldimethylsilyl)oxy)propyl)-4-hydroxypyrrolidine-1,2-dicarboxylate (2.0 g, 4.4 mmol) in DMF (10 mL) at 0° C., and the resulting mixture was stirred at 0° C. for 30 min, followed by dropwise addition of 4-methoxybenzyl chloride (0.65 mL, 4.8 mmol) at 0° C. The reaction mixture was then stirred at room temperature for 12 hours, then diluted with water and extracted with EtOAc. The combined organic phase was washed with brine, dried over anhydrous $MgSO_4$, filtered, and concentrated under reduced pressure. The residue was purified by silica gel column chromatography (EtOAc in hexanes) to give 1-(tert-butyl) 2-methyl (2S,3S)-3-allyl-3-(3-((tert-butyldimethylsilyl)oxy)propyl)-4-((4-methoxybenzyl)oxy)pyrrolidine-1,2-dicarboxylate. LCMS ($C_{26}H_{44}NO_5Si^+$) (ES, m/z): 478 [M+H−Boc]$^+$.

Step 4: 1-(tert-butyl) 2-methyl (2S,3S)-3-allyl-3-(3-hydroxypropyl)-4-((4-methoxybenzyl)oxy)pyrrolidine-1,2-dicarboxylate

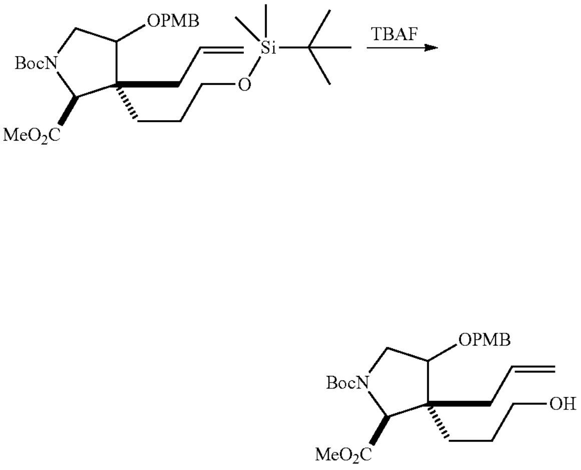

TBAF (1.0 M in THF, 19 mL, 19 mmol) was added to a stirred solution of 1-(tert-butyl) 2-methyl (2S,3S)-3-allyl-3-(3-((tert-butyldimethylsilyl)oxy)propyl)-4-((4-methoxybenzyl)oxy)pyrrolidine-1,2-dicarboxylate (2.2 g, 3.8 mmol) in THF (5.0 mL) and the resulting mixture was stirred at room temperature for 1 hour, then quenched with saturated aqueous $NH_4Cl$, and extracted with EtOAc. The combined organic phases were concentrated, and the residue was purified by silica gel column chromatography (EtOAc in hexanes) to give 1-(tert-butyl) 2-methyl (2S,3S)-3-allyl-3-(3-hydroxypropyl)-4-((4-methoxybenzyl)oxy)pyrrolidine-1,2-dicarboxylate. LCMS ($C_{20}H_{30}NO_5^+$) (ES, m/z): 364 [M+H−Boc]$^+$.

Step 5: 1-(tert-butyl) 2-methyl (2S,3S)-3-allyl-3-(3-bromopropyl)-4-((4-methoxybenzyl)oxy)pyrrolidine-1,2-dicarboxylate

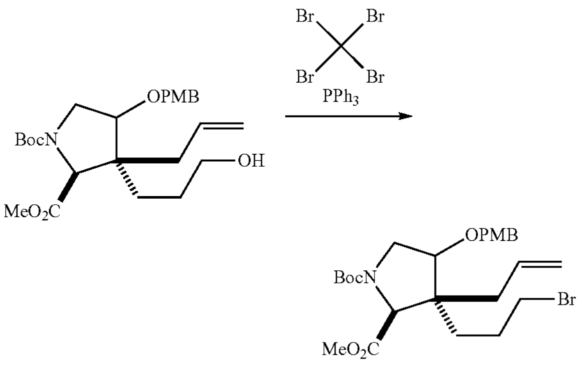

$CBr_4$ (973 mg, 2.93 mmol) was added to a stirred solution of 1-(tert-butyl) 2-methyl (2S,3S)-3-allyl-3-(3-hydroxypropyl)-4-((4-methoxybenzyl)oxy)pyrrolidine-1,2-dicarboxylate (1.4 g, 2.9 mmol) and $PPh_3$ (769 mg, 2.9 mmol) in DCM (15 mL) at 0° C., and the resulting mixture was stirred for 90 min at room temperature. The reaction mixture was concentrated and the residue was purified by silica gel column chromatography (EtOAc in hexanes) to give (1-(tert-butyl) 2-methyl (2S,3S)-3-allyl-3-(3-bromopropyl)-4-((4-methoxybenzyl)oxy)pyrrolidine-1,2-dicarboxylate. LCMS ($C_{20}H_{29}BrNO_4^+$) (ES, m/z): 426 [M+H−Boc]$^+$.

Step 6: 1-(tert-butyl) 6a-methyl (3aS,6aS)-3a-allyl-3-((4-methoxybenzyl)oxy)hexahydrocyclopenta[b]pyrrole-1,6a-dicarboxylate

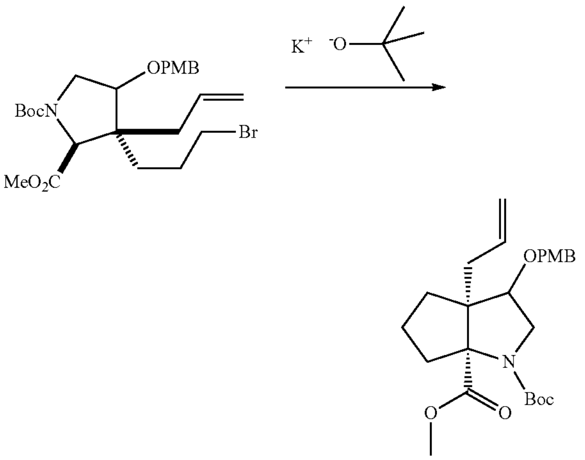

Potassium tert-butoxide (1.0 M in THF, 2.8 mL, 2.8 mmol) was added dropwise to a stirred solution of 1-(tert-butyl) 2-methyl (2S,3S)-3-allyl-3-(3-bromopropyl)-4-((4-methoxybenzyl)oxy)pyrrolidine-1,2-dicarboxylate (1.2 g, 2.3 mmol) in DCM (15 mL), and the resulting mixture was stirred at room temperature for 12 hours, then quenched with methanol and concentrated under reduced pressure. The residue was purified by silica gel column chromatography (EtOAc in hexanes) to give 1-(tert-butyl) 6a-methyl (3aS,6aS)-3a-allyl-3-((4-methoxybenzyl)oxy)hexahydrocyclopenta[b]pyrrole-1,6a-dicarboxylate. LCMS ($C_{20}H_{28}NO_4^+$) (ES, m/z): 346 [M+H−Boc]$^+$.

Step 7: 1-(tert-butyl) 6a-methyl (3aR,6aS)-3-((4-methoxybenzyl)oxy)-3a-(3-(4,4,5,5-tetramethyl-1,3,2-dioxaborolan-2-yl)propyl)hexahydrocyclopenta[b]pyrrole-1,6a-dicarboxylate

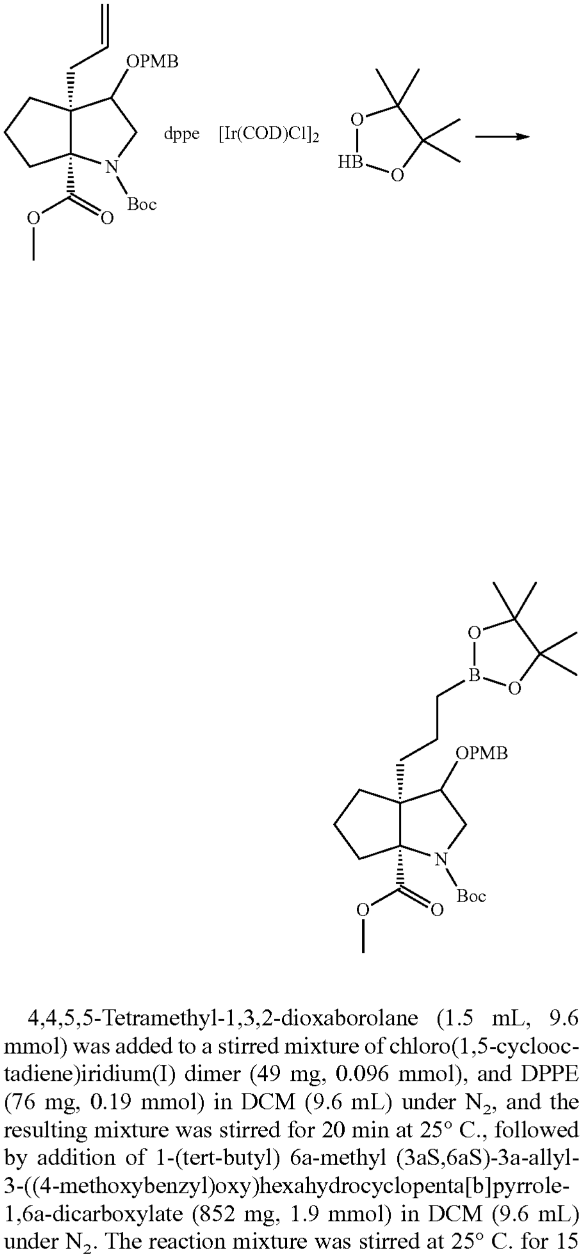

4,4,5,5-Tetramethyl-1,3,2-dioxaborolane (1.5 mL, 9.6 mmol) was added to a stirred mixture of chloro(1,5-cyclooctadiene)iridium(I) dimer (49 mg, 0.096 mmol), and DPPE (76 mg, 0.19 mmol) in DCM (9.6 mL) under $N_2$, and the resulting mixture was stirred for 20 min at 25° C., followed by addition of 1-(tert-butyl) 6a-methyl (3aS,6aS)-3a-allyl-3-((4-methoxybenzyl)oxy)hexahydrocyclopenta[b]pyrrole-1,6a-dicarboxylate (852 mg, 1.9 mmol) in DCM (9.6 mL) under $N_2$. The reaction mixture was stirred at 25° C. for 15 hours, and then concentrated. The residue was directly purified by silica gel column chromatography (EtOAc in hexanes) to give 1-(tert-butyl) 6a-methyl (3aR,6aS)-3-((4-methoxybenzyl)oxy)-3a-(3-(4,4,5,5-tetramethyl-1,3,2-dioxaborolan-2-yl)propyl)hexahydrocyclopenta[b]pyrrole-1,6a-dicarboxylate. LCMS ($C_{26}H_{41}BNO_6^+$) (ES, m/z): 474 [M+H−Boc]$^+$.

Step 8: 1-(tert-butyl) 6a-methyl (3aR,6aS)-3-hydroxy-3a-(3-(4,4,5,5-tetramethyl-1,3,2-dioxaborolan-2-yl)propyl)hexahydrocyclopenta[b]pyrrole-1,6a-dicarboxylate

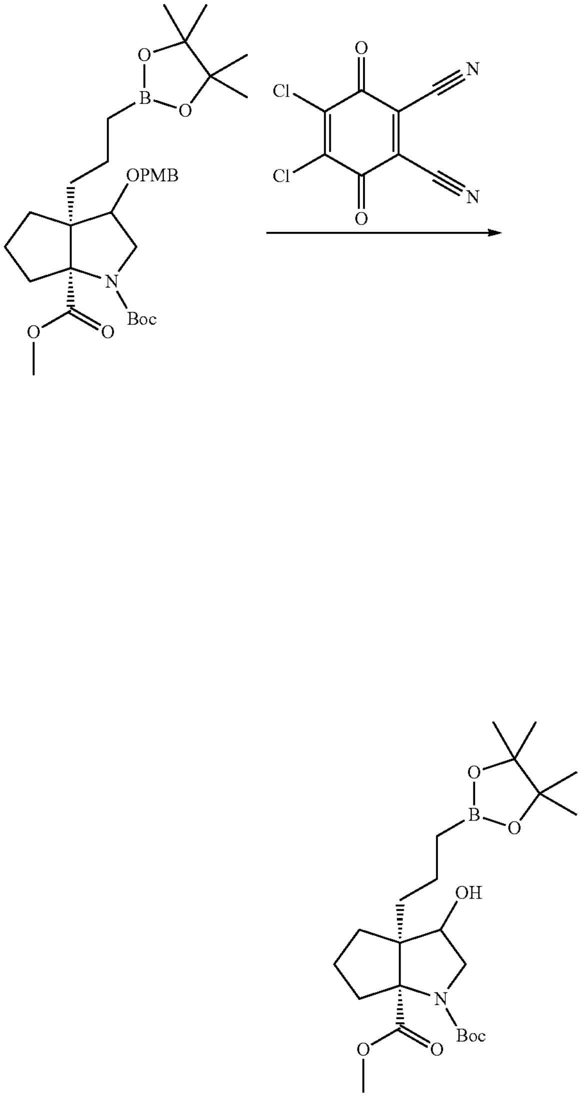

DDQ (387 mg, 1.7 mmol) was added to a stirred mixture of 1-(tert-butyl) 6a-methyl (3aR,6aS)-3-((4-methoxybenzyl)oxy)-3a-(3-(4,4,5,5-tetramethyl-1,3,2-dioxaborolan-2-yl)propyl)hexahydrocyclopenta[b]pyrrole-1,6a-dicarboxylate (978 mg, 1.7 mmol) in DCM (10 mL) and water (1.0 mL) at 0° C. under $N_2$. The reaction mixture was stirred at room temperature under $N_2$ for 2 hours, then quenched with saturated aqueous $NaHCO_3$ and extracted with DCM. The combined organic phases were dried over anhydrous $MgSO_4$, filtered, and concentrated. The residue was purified by silica gel column chromatography (EtOAc in hexanes) to give 1-(tert-butyl) 6a-methyl (3aR,6aS)-3-hydroxy-3a-(3-(4,4,5,5-tetramethyl-1,3,2-dioxaborolan-2-yl)propyl)hexahydrocyclopenta[b]pyrrole-1,6a-dicarboxylate. LCMS ($C_{18}H_{33}BNO_5^+$) (ES, m/z): 354 [M+H−Boc]$^+$.

Step 9: 1-(tert-butyl) 6a-methyl (3aR,6aS)-3a-(3-(4,4,5,5-tetramethyl-1,3,2-dioxaborolan-2-yl)propyl)-3-(((p-tolyloxy)carbonothioyl)oxy)hexahydrocyclopenta[b]pyrrole-1,6a-dicarboxylate

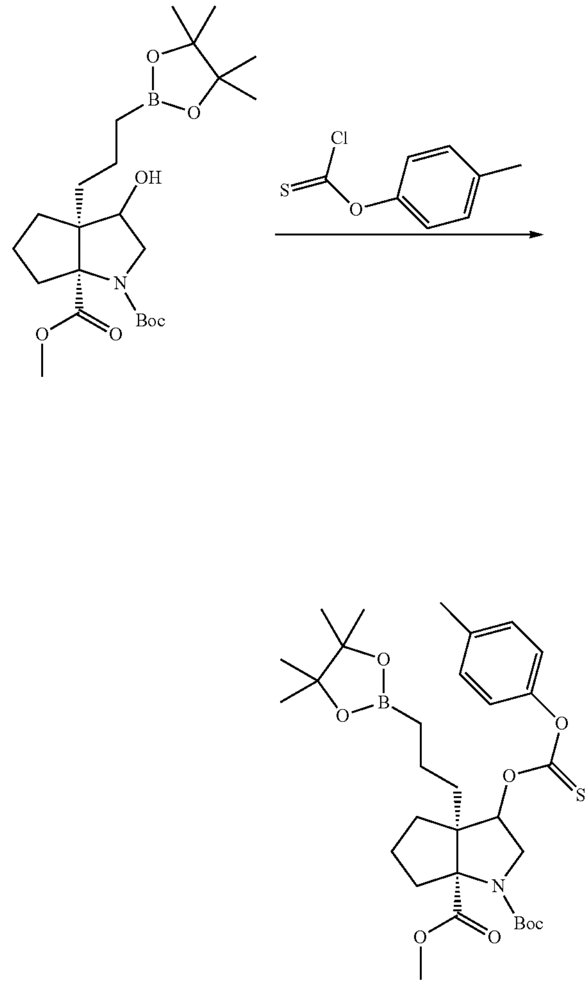

p-Tolyl chlorothionoformate (0.27 mL, 1.8 mmol) was added dropwise to a stirred mixture of 1-(tert-butyl) 6a-methyl (3aR,6aS)-3-hydroxy-3a-(3-(4,4,5,5-tetramethyl-1,3,2-dioxaborolan-2-yl)propyl)hexahydrocyclopenta[b]pyrrole-1,6a-dicarboxylate (160 mg, 0.35 mmol), DMAP (17 mg, 0.14 mmol), and pyridine (0.14 mL, 1.8 mmol) in DCM (5.0 mL) at 0° C., and the resulting mixture was stirred at room temperature for 15 hours. Additional DMAP (17 mg, 0.14 mmol), pyridine (0.14 mL, 1.8 mmol) and p-Tolyl chlorothionoformate (0.27 mL, 1.8 mmol) were added, and the reaction mixture was stirred at 40° C. for 2 hours. The reaction was then quenched by saturated aqueous $NaHCO_3$, and extracted with DCM. The combined organic phases were dried over anhydrous $Na_2SO_4$, filtered, and concentrated. The residue was purified by silica gel column chromatography (EtOAc in hexanes) to give 1-(tert-butyl) 6a-methyl (3aR,6aS)-3a-(3-(4,4,5,5-tetramethyl-1,3,2-dioxaborolan-2-yl)propyl)-3-(((p-tolyloxy)carbonothioyl)oxy)hexahydrocyclopenta[b]pyrrole-1,6a-dicarboxylate. LCMS ($C_{26}H_{39}BNO_6S^+$) (ES, m/z): 504 [M+H−Boc]$^+$.

Step 10: 1-(tert-butyl) 6a-methyl (3aS,6aS)-3a-(3-(4,4,5,5-tetramethyl-1,3,2-dioxaborolan-2-yl)propyl) hexahydrocyclopenta[b]pyrrole-1,6a-dicarboxylate

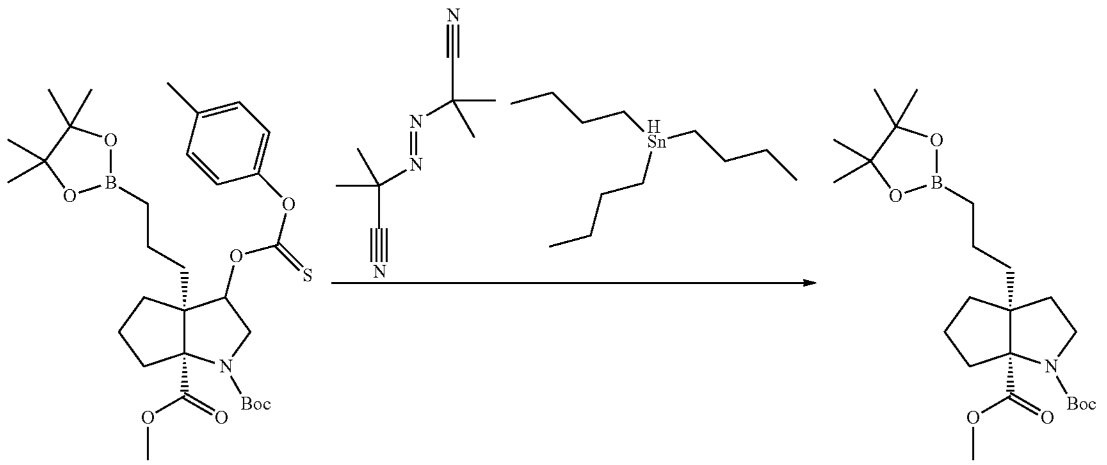

2,2'-Azobis(2-methylpropionitrile) (5.9 mg, 0.036 mmol) and tri-n-butyltin hydride (0.21 mL, 0.80 mmol) were added to a stirred solution of 1-(tert-butyl) 6a-methyl (3aR,6aS)-3a-(3-(4,4,5,5-tetramethyl-1,3,2-dioxaborolan-2-yl)propyl)-3-(((p-tolyloxy)carbonothioyl)oxy)hexahydrocyclopenta[b]pyrrole-1,6a-dicarboxylate (218 mg, 0.36 mmol) in toluene (5.0 mL) in one portion at room temperature under $N_2$, and the resulting mixture was stirred at 110° C. for 1 hour, then concentrated under reduced pressure. The residue was purified by silica gel column chromatography (EtOAc in hexanes) to give 1-(tert-butyl) 6a-methyl (3aS,6aS)-3a-(3-(4,4,5,5-tetramethyl-1,3,2-dioxaborolan-2-yl)propyl)hexahydrocyclopenta[b]pyrrole-1,6a-dicarboxylate. LCMS ($C_{18}H_{33}BNO_4^+$) (ES, m/z): 338 $[M+H]^+$.

Step 11: (3aS,6aS)-3a-(3-boronopropyl)hexahydrocyclopenta[b]pyrrole-6a(1H)-carboxylic Acid

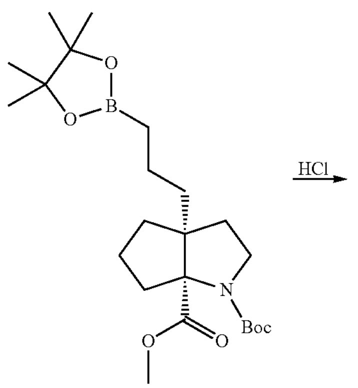

-continued

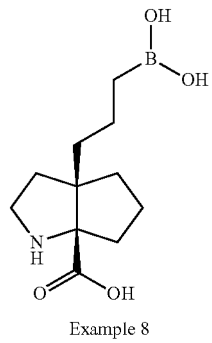

Example 8

A mixture of 1-(tert-butyl) 6a-methyl (3aS,6aS)-3a-(3-(4,4,5,5-tetramethyl-1,3,2-dioxaborolan-2-yl)propyl)hexahydrocyclopenta[b]pyrrole-1,6a-dicarboxylate (95 mg, 0.22 mmol) in 8 N HCl in water (3.0 mL, 24 mmol) was stirred at 130° C. for 90 min in a microwave reactor. The reaction mixture was diluted with water, washed with DCM, and the aqueous phase was concentrated in vacuo. The crude mixture was purified by RP-HPLC [C18 column, water (20 mM HFBA and 0.1% TFA)-$CH_3CN$]. The fractions containing desired product mass were combined and lyophilized, and the residue was dissolved in 1 N HCl (2.0 mL, 2.0 mmol) and lyophilized to give (3aS,6aS)-3a-(3-boronopropyl)hexahydrocyclopenta[b]pyrrole-6a(1H)-carboxylic acid as an HCl salt. LCMS ($C_{11}H_{19}BNO_3^+$) (ES, m/z): 224 $[M-H_2O+H]^+$. $^1H$ NMR ($D_2O$) δ: 3.44 (ddd, J=12.5, 7.1, 5.6 Hz, 1H), 3.37 (ddd, J=11.8, 8.5, 7.0 Hz, 1H), 2.57-2.47 (m, 1H), 2.03 (dh, J=14.0, 7.5 Hz, 3H), 1.95-1.86 (m, 1H), 1.80 (s, 2H), 1.84-1.74 (m, 1H), 1.57-1.38 (m, 3H), 1.32 (td, J=11.9, 4.2 Hz, 1H), 0.79 (t, J=7.6 Hz, 2H)

Example 9: (3aS,6aS)-3a-(3-((3aS,4S,6S,7aR)-3a,5,5-trimethylhexahydro-4,6-methanobenzo[d][1,3,2]dioxaborol-2-yl)propyl)hexahydrocyclopenta[b]pyrrole-6a(1H)-carboxylic Acid

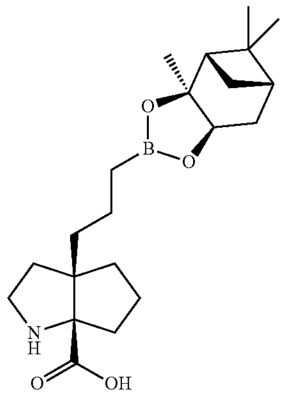

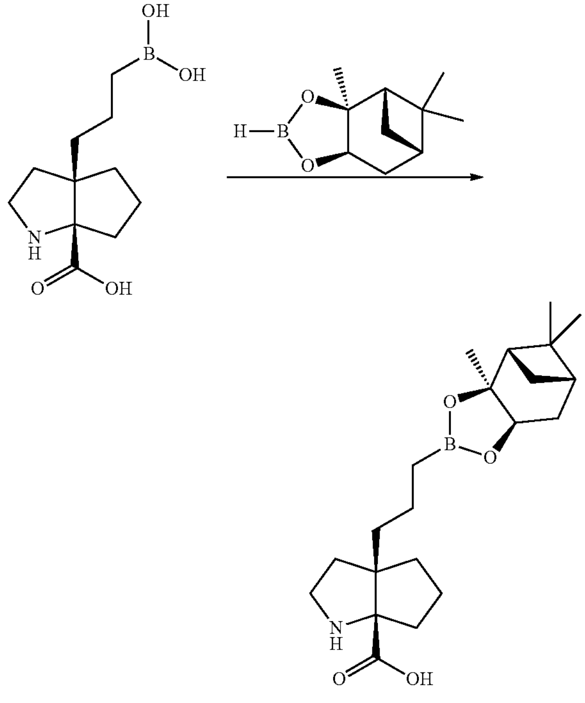

Example 9

A mixture of (3aS,6aS)-3a-(3-boronopropyl)hexahydrocyclopenta[b]pyrrole-6a(1H)-carboxylic acid (20 mg, 0.083 mmol) and (1R,2R,3S,5R)-(−)-2,3-pinanediol (28 mg, 0.17 mmol) in MeCN (3.0 mL) was stirred at 85° C. for 2 hours under $N_2$. The reaction mixture was concentrated, and the residue was purified by RP-HPLC [C18 column, water (0.1% TFA)-$CH_3CN$] to give (3aS,6aS)-3a-(3-((3aS,4S,6S,7aR)-3a,5,5-trimethylhexahydro-4,6-methanobenzo[d][1,3,2]dioxaborol-2-yl)propyl)hexahydrocyclopenta[b]pyrrole-6a(1H)-carboxylic acid as a TFA salt. LCMS ($C_{21}H_{35}BNO_4^+$) (ES, m/z): 376 $[M+H]^+$. $^1H$ NMR (DMSO-$d_6$) δ: 4.27 (dd, J=8.8, 1.9 Hz, 1H), 3.28-3.13 (m, 2H), 2.37-2.24 (m, 2H), 2.17 (dtd, J=10.8, 6.2, 2.1 Hz, 1H), 1.97-1.87 (m, 2H), 1.85 (tt, J=5.7, 2.8 Hz, 1H), 1.83-1.79 (m, 1H), 1.79-1.67 (m, 3H), 1.68-1.64 (m, 1H), 1.64-1.57 (m, 1H), 1.50-1.32 (m, 2H), 1.30 (s, 3H), 1.33-1.17 (m, 1H), 1.24 (s, 3H), 0.98 (d, J=10.7 Hz, 1H), 0.81 (s, 3H), 0.71 (t, J=7.4 Hz, 2H)

Example 10: (3aR,6aS)-3a-(3-boronopropyl)-3-hydroxyhexahydrocyclopenta[b]pyrrole-6a(1H)-carboxylic Acid

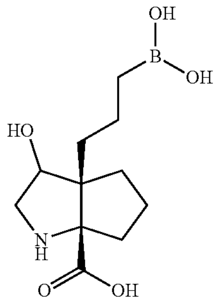 [SMILES: O=C(O)[C@]12CCC[C@@]1(CCCB(O)O)C(O)CN2]

Step 1: 1-(tert-butyl) 6a-methyl (3aR,6aS)-3-(((chloromethyl)sulfonyl)oxy)-3a-(3-(4,4,5,5-tetramethyl-1,3,2-dioxaborolan-2-yl)propyl)hexahydrocyclopenta[b]pyrrole-1,6a-dicarboxylate

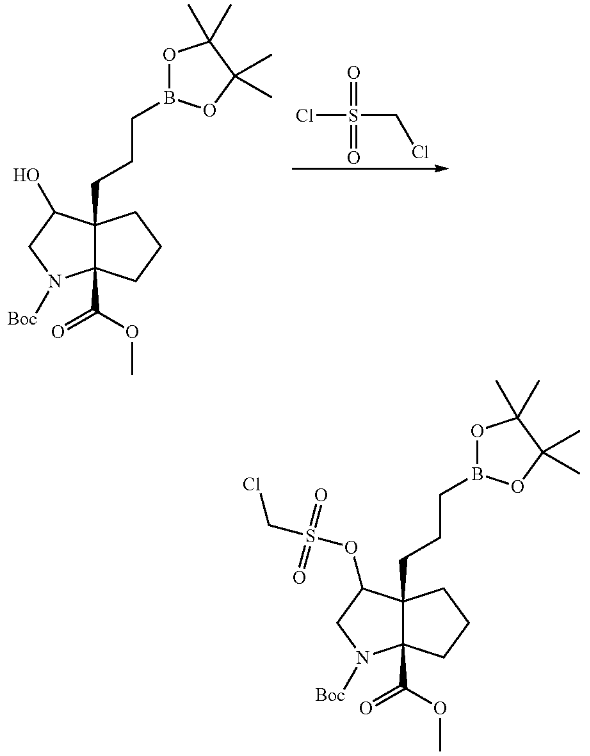

Chloromethansulfonyl chloride (0.15 mL, 1.5 mmol) was added dropwise to a stirred solution of 1-(tert-butyl) 6a-methyl (3aR,6aS)-3-hydroxy-3a-(3-(4,4,5,5-tetramethyl-1,3,2-dioxaborolan-2-yl)propyl)hexahydrocyclopenta[b]pyrrole-1,6a-dicarboxylate (230 mg, 0.51 mmol) and 2,6-lutidine (0.59 mL, 5.1 mmol) in DCM (1.7 mL) at 0° C., and the resulting mixture was stirred at 0° C. for 20 min, then at room temperature for 30 min. The reaction mixture was concentrated, then diluted with $H_2O$, and extracted with EtOAc. The combined organic phase was dried over anhydrous $Na_2SO_4$, filtered, and concentrated under reduced pressure. The residue was purified by silica gel column chromatography (EtOAc in hexanes) to give 1-(tert-butyl) 6a-methyl (3aR,6aS)-3-(((chloromethyl)sulfonyl)oxy)-3a-(3-(4,4,5,5-tetramethyl-1,3,2-dioxaborolan-2-yl)propyl) hexahydrocyclopenta[b]pyrrole-1,6a-dicarboxylate. LCMS ($C_{19}H_{34}BClNO_7S^+$) (ES, m/z): 466 [M+H−Boc]$^+$.

Step 2: 1-(tert-butyl) 6a-methyl (3aR,6aS)-3-acetoxy-3a-(3-(4,4,5,5-tetramethyl-1,3,2-dioxaborolan-2-yl)propyl)hexahydrocyclopenta[b]pyrrole-1,6a-dicarboxylate

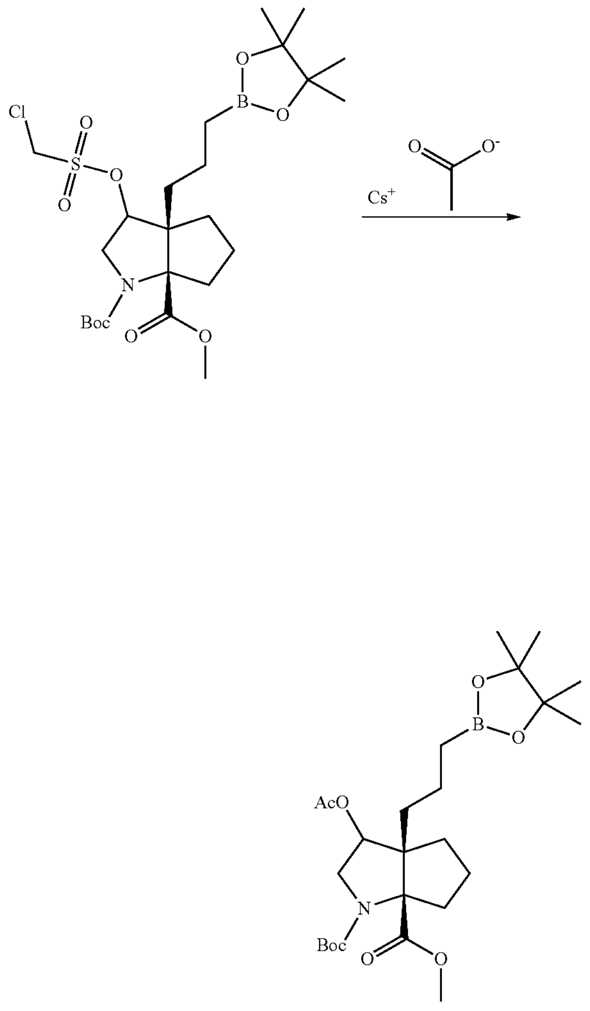

Cesium acetate (63 mg, 0.33 mmol) and 18-crown-6 (14 mg, 0.055 mmol) were added to a stirred solution of 1-(tert-butyl) 6a-methyl (3aR,6aS)-3-(((chloromethyl)sulfonyl)oxy)-3a-(3-(4,4,5,5-tetramethyl-1,3,2-dioxaborolan-2-yl)propyl)hexahydrocyclopenta[b]pyrrole-1,6a-dicarboxylate (62 mg, 0.11 mmol) in toluene (1.0 mL), and the resulting mixture was stirred at 80° C. for 2 hours. The reaction mixture was diluted with saturated aqueous $NaHCO_3$, and extracted with EtOAc. The combined organic layer was washed with brine, dried over anhydrous $MgSO_4$, filtered, and concentrated. The residue was purified by silica gel column chromatography (EtOAc in hexanes) to give 1-(tert-butyl) 6a-methyl (3aR,6aS)-3-acetoxy-3a-(3-(4,4,5,5-tetramethyl-1,3,2-dioxaborolan-2-yl)propyl)hexahydrocyclopenta[b]pyrrole-1,6a-dicarboxylate. LCMS ($C_{20}H_{35}BNO_6^+$) (ES, m/z): 396 [M+H]$^+$.

Step 3: (3aR,6aS)-3a-(3-boronopropyl)-3-hydroxyhexahydrocyclopenta[b]pyrrole-6a(1H)-carboxylic Acid

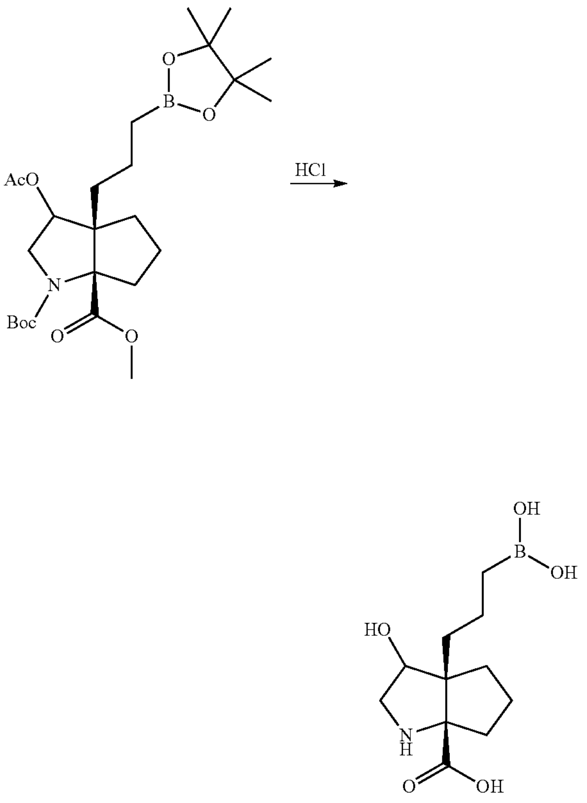

A mixture of 1-(tert-butyl) 6a-methyl (3aR,6aS)-3-acetoxy-3a-(3-(4,4,5,5-tetramethyl-1,3,2-dioxaborolan-2-yl)propyl)hexahydrocyclopenta[b]pyrrole-1,6a-dicarboxylate (25 mg, 0.050 mmol) in 8 N HCl in water (3.0 mL, 24 mmol) was stirred at 130° C. for 90 minutes in a microwave reactor. The reaction mixture was diluted with water, washed with DCM, and the aqueous layer was concentrated in vacuo. The crude mixture was purified by RP-HPLC [C18 column, water (20 mM HFBA and 0.1% TFA)-$CH_3CN$]. The fractions containing desired product mass were combined and lyophilized, and the residue was dissolved in 1 N HCl (2.0 mL, 2.0 mmol) and lyophilized to give (3aR,6aS)-3a-(3-boronopropyl)-3-hydroxyhexahydrocyclopenta[b]pyrrole-6a(1H)-carboxylic acid as an HCl salt. LCMS ($C_{11}H_{19}BNO_4^+$) (ES, m/z): 240 [M−$H_2O$+H]$^+$. $^1$H NMR ($D_2O$) δ: 4.33 (broad s, 1H), 3.49 (broad s, 2H), 2.53 (dt, J=15.3, 7.9 Hz, 1H), 2.11-2.03 (m, 1H), 1.99 (dt, J=13.7, 7.2 Hz, 1H), 1.92 (dt, J=13.2, 6.6 Hz, 1H), 1.73-1.70 (m, 1H), 1.60 (dt, J=13.4, 6.7 Hz, 1H), 1.52-1.44 (m, 4H), 0.82 (s, 2H)

Example 11: (1R)-7-(3-boronopropyl)-2-azabicyclo[2.2.1]heptane-1-carboxylic Acid

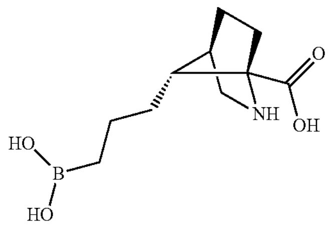 [SMILES: O=C(O)[C@]12CC[C@@H](CN1)[C@H]2CCCB(O)O]

Step 1: 1-(tert-butyl) 2-methyl (2R,3R,Z)-3-allyl-4-(2-(benzyloxy)-2-oxoethylidene)pyrrolidine-1,2-dicarboxylate

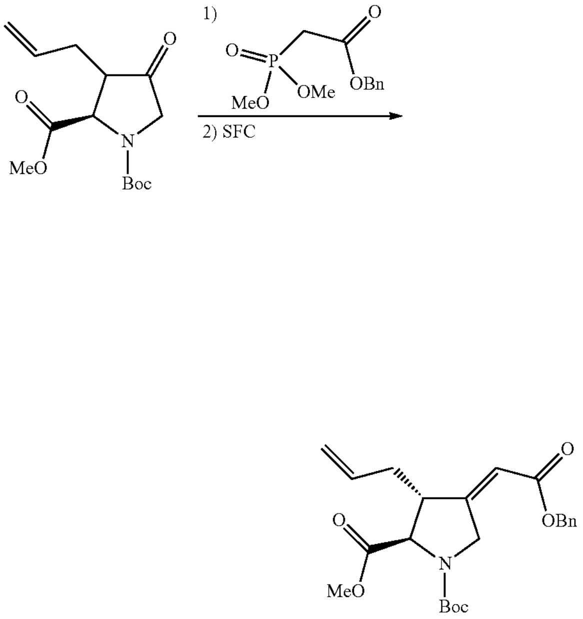

Benzyl 2-(dimethoxyphosphoryl)acetate (17 g, 66 mmol) was added to a mixture of sodium hydride (60 wt % in mineral oil, 2.3 g, 58 mmol) in THF (194 mL) at 0° C. The resulting mixture was stirred at room temperature for 30 minutes, followed by addition of a solution of 1-(tert-butyl) 2-methyl (2R)-3-allyl-4-oxopyrrolidine-1,2-dicarboxylate (11 g, 39 mmol) in THF (4.0 mL) at 0° C. The reaction mixture was stirred at 0° C. for 30 minutes, then quenched by saturated aqueous $NH_4Cl$, and extracted with EtOAc. The combined organic phase was washed with brine, dried over anhydrous sodium sulfate, filtered, and concentrated under vacuum. The crude mixture was purified by silica gel chromatography (EtOAc in Hexanes), then further resolved by SFC [Column: Lux-4 (250 mm*21 mm), Mobile phase: A: $CO_2$, B: MeOH w/0.1% $NH_4OH$, Gradient: 5% of B, Flow Rate (mL/min) 70] to give 1-(tert-butyl) 2-methyl (2R,3R,Z)-3-allyl-4-(2-(benzyloxy)-2-oxoethylidene)pyrrolidine-1,2-dicarboxylate as the second eluting peak (Rt=7.4 min). LCMS ($C_{18}H_{22}NO_4^+$) (ES, m/z): 316 $[M-C_5H_8O_2+H]^+$.

Step 2: 1-(tert-butyl) 2-methyl (2R,3R,Z)-4-(2-(benzyloxy)-2-oxoethylidene)-3-(3-((3aS,4S,6S,7aR)-3a,5,5-trimethylhexahydro-4,6-methanobenzo[d][1,3,2]dioxaborol-2-yl)propyl)pyrrolidine-1,2-dicarboxylate

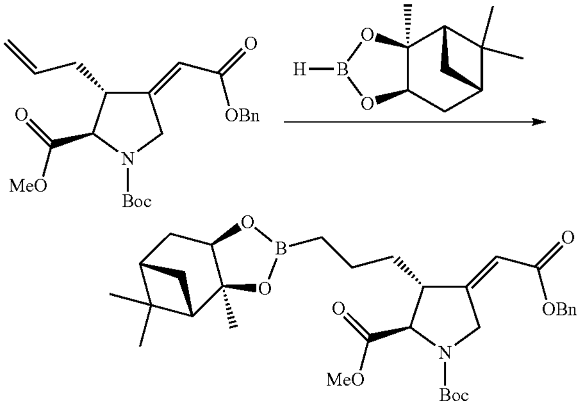

(3aS,4S,6S,7aR)-3a,5,5-trimethylhexahydro-4,6-methanobenzo[d][1,3,2]dioxaborole (16 g, 87 mmol) was added to a mixture of 1,2-bis(diphenylphosphino)ethane (0.60 g, 1.5 mmol), and chloro(1,5-cyclooctadiene)iridium(I) dimer (0.56 g, 1.1 mmol) in DCM (347 mL) under $N_2$, and the resulting mixture was stirred at 25° C. for 20 minutes, followed by addition of 1-(tert-butyl) 2-methyl (2R,3R,Z)-3-allyl-4-(2-(benzyloxy)-2-oxoethylidene)pyrrolidine-1,2-dicarboxylate (9.0 g, 22 mmol) in DCM (87 mL) under $N_2$. The reaction mixture was stirred at room temperature for 3 h, then quenched with MeOH, and concentrated under reduced pressure. The residue was purified by silica gel chromatography (ethyl acetate in hexanes) to give 1-(tert-butyl) 2-methyl (2R,3R,Z)-4-(2-(benzyloxy)-2-oxoethylidene)-3-(3-((3aS,4S,6S,7aR)-3a,5,5-trimethylhexahydro-4,6-methanobenzo[d][1,3,2]dioxaborol-2-yl)propyl)pyrrolidine-1,2-dicarboxylate. LCMS ($C_{28}H_{39}BNO_6^+$) (ES, m/z): 496 $[M-C_5H_8O_2+H]^+$.

Step 3: 2-((4R,5R)-1-(tert-butoxycarbonyl)-5-(methoxycarbonyl)-4-(3-((3aS,4S,6S,7aR)-3a,5,5-trimethylhexahydro-4,6-methanobenzo[d][1,3,2]dioxaborol-2-yl)propyl)pyrrolidin-3-yl)acetic Acid

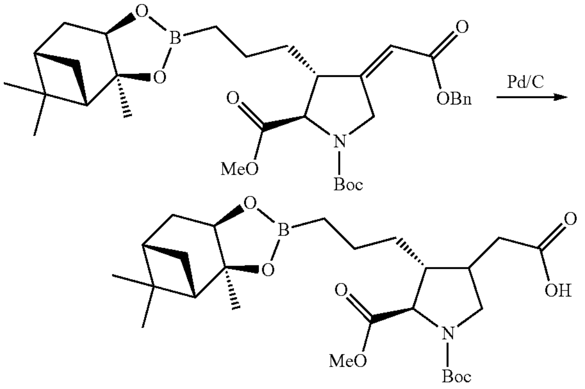

Pd/C (10% wt, 143 mg, 0.134 mmol) was added to a solution of 1-(tert-butyl) 2-methyl (2R,3R,Z)-4-(2-(benzyloxy)-2-oxoethylidene)-3-(3-((3aS,4S,6S,7aR)-3a,5,5-trimethylhexahydro-4,6-methanobenzo[d][1,3,2]dioxaborol-2-yl)propyl)pyrrolidine-1,2-dicarboxylate (400 mg, 0.67 mmol) in MeOH (6.7 mL) under $N_2$. The resulting mixture was evacuated under vacuum and refilled with hydrogen (3×). The reaction mixture was stirred under $H_2$ (balloon) at room temperature for 40 h, then filtered and concentrated under reduced pressure to give crude 2-((4R,5R)-1-(tert-butoxycarbonyl)-5-(methoxycarbonyl)-4-(3-((3aS,4S,6S,7aR)-3a,5,5-trimethylhexahydro-4,6-methanobenzo[d][1,3,2]dioxaborol-2-yl)propyl)pyrrolidin-3-yl)acetic acid, which was directly used in the next step without further purification. LCMS ($C_{21}H_{35}BNO_6^+$) (ES, m/z): 408 $[M-C_5H_8O_2+H]^+$.

Step 4: 1-(tert-butyl) 2-methyl (2R,3R)-4-(2-hydroxyethyl)-3-(3-((3aS,4S,6S,7aR)-3a,5,5-trimethylhexahydro-4,6-methanobenzo[d][1,3,2]dioxaborol-2-yl)propyl)pyrrolidine-1,2-dicarboxylate

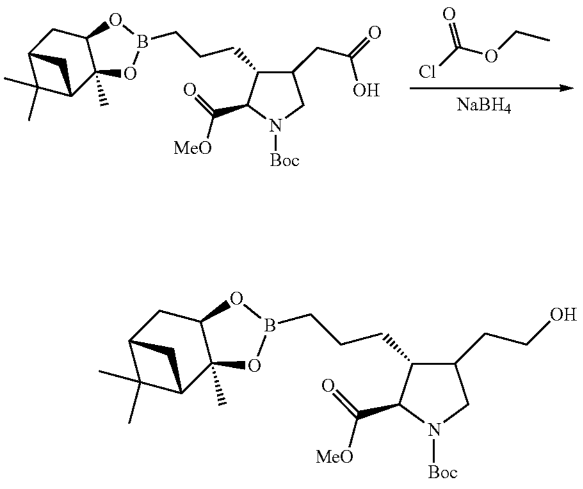

Triethylamine (1.0 mL, 7.0 mmol) and ethyl carbonochloridate (0.68 mL, 7.0 mmol) were added to a solution of 2-((4R,5R)-1-(tert-butoxycarbonyl)-5-(methoxycarbonyl)-4-(3-((3aS,4S,6S,7aR)-3a,5,5-trimethylhexahydro-4,6-methanobenzo[d][1,3,2]dioxaborol-2-yl)propyl)pyrrolidin-3-yl)acetic acid (2.8 g, 5.4 mmol) in THF (54 mL) at −10° C., and the resulting mixture was stirred at −10° C. for 30 minutes. The reaction mixture was diluted with $Et_2O$, filtered, and concentrated under reduced pressure. The crude mixture was dissolved in MeOH (54 mL) and sodium tetrahydroborate (410 mg, 11 mmol) was added in small portions at −10° C., and the reaction mixture was stirred at 0° C. for 1 h, then quenched with saturated aqueous $NH_4Cl$, and extracted with DCM. The combined organic layers were dried over anhydrous $Na_2SO_4$, filtered, and concentrated in vacuo. The residue was purified by silica gel chromatography (EtOAc in Hexanes) to provide 1-(tert-butyl) 2-methyl (2R,3R)-4-(2-hydroxyethyl)-3-(3-((3aS,4S,6S,7aR)-3a,5,5-trimethylhexahydro-4,6-methanobenzo[d][1,3,2]dioxaborol-2-yl)propyl)pyrrolidine-1,2-dicarboxylate. LCMS ($C_{21}H_{37}BNO_5^+$) (ES, m/z): 394 $[M-C_5H_8O_2+H]^+$.

Step 5: 1-(tert-butyl) 2-methyl (2R,3R)-4-(2-bromoethyl)-3-(3-((3aS,4S,6S,7aR)-3a,5,5-trimethylhexahydro-4,6-methanobenzo[d][1,3,2]dioxaborol-2-yl)propyl)pyrrolidine-1,2-dicarboxylate

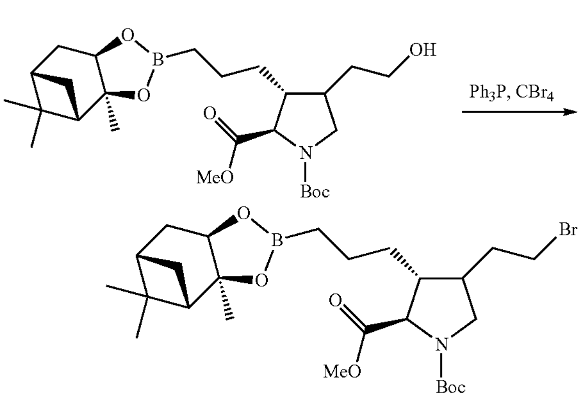

Perbromomethane (1.1 g, 3.5 mmol) was added to a solution of 1-(tert-butyl) 2-methyl (2R,3R)-4-(2-hydroxyethyl)-3-(3-((3aS,4S,6S,7aR)-3a,5,5-trimethylhexahydro-4,6-methanobenzo[d][1,3,2]dioxaborol-2-yl)propyl)pyrrolidine-1,2-dicarboxylate (1.2 g, 2.3 mmol) and triphenylphosphane (917 mg, 3.5 mmol) in DCM (47 mL) at 0° C., and the resulting mixture was stirred at room temperature for 90 minutes. The reaction mixture was concentrated under reduced pressure, and the residue was purified by silica gel chromatography (EtOAc in hexanes) to give 1-(tert-butyl) 2-methyl (2R,3R)-4-(2-bromoethyl)-3-(3-((3aS,4S,6S,7aR)-3a,5,5-trimethylhexahydro-4,6-methanobenzo[d][1,3,2]dioxaborol-2-yl)propyl)pyrrolidine-1,2-dicarboxylate. LCMS ($C_{21}H_{36}BBrNO_4^+$) (ES, m/z): 456 $[M-C_5H_8O_2+H]^+$.

Step 6: 2-(tert-butyl) 1-methyl (1R)-7-(3-((3aS,4S,6S,7aR)-3a,5,5-trimethylhexahydro-4,6-methanobenzo[d][1,3,2]dioxaborol-2-yl)propyl)-2-azabicyclo[2.2.1]heptane-1,2-dicarboxylate

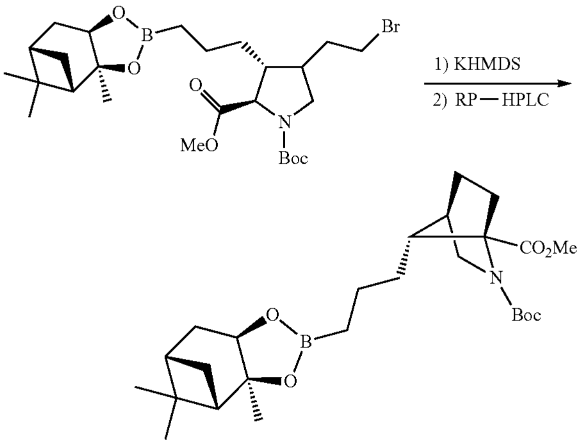

Potassium bis(trimethylsilyl)amid (1.0 M in THF, 1.7 mL, 1.7 mmol) was added to a solution of 1-(tert-butyl) 2-methyl (2R,3R)-4-(2-bromoethyl)-3-(3-((3aS,4S,6S,7aR)-3a,5,5-trimethylhexahydro-4,6-methanobenzo[d][1,3,2]dioxaborol-2-yl)propyl)pyrrolidine-1,2-dicarboxylate (800 mg, 1.4 mmol) in THF (58 mL) at −78° C., and the resulting mixture was stirred at −78° C. for 30 minutes, then at −20° C. for 10 hours. The reaction mixture was quenched with saturated aqueous $NH_4Cl$ and brine, and extracted with EtOAc. The combined organic layer was washed with brine, dried over anhydrous $Na_2SO_4$, filtered, and concentrated under reduced pressure. The residue was purified by silica gel chromatography (EtOAc in hexanes) and further purified by reverse-phase HPLC (C18 column, MeCN/water with 0.1% TFA modifier) to afford 2-(tert-butyl) 1-methyl (1R)-7-(3-((3aS,4S,6S,7aR)-3a,5,5-trimethylhexahydro-4,6-methanobenzo[d][1,3,2]dioxaborol-2-yl)propyl)-2-azabicyclo[2.2.1]heptane-1,2-dicarboxylate. LCMS ($C_{21}H_{35}BNO_4^+$) (ES, m/z): 376 $[M-C_5H_8O_2+H]^+$.

Step 7: methyl (1R)-7-(3-((3aS,4S,6S,7aR)-3a,5,5-trimethylhexahydro-4,6-methanobenzo[d][1,3,2]dioxaborol-2-yl)propyl)-2-azabicyclo[2.2.1]heptane-1-carboxylate

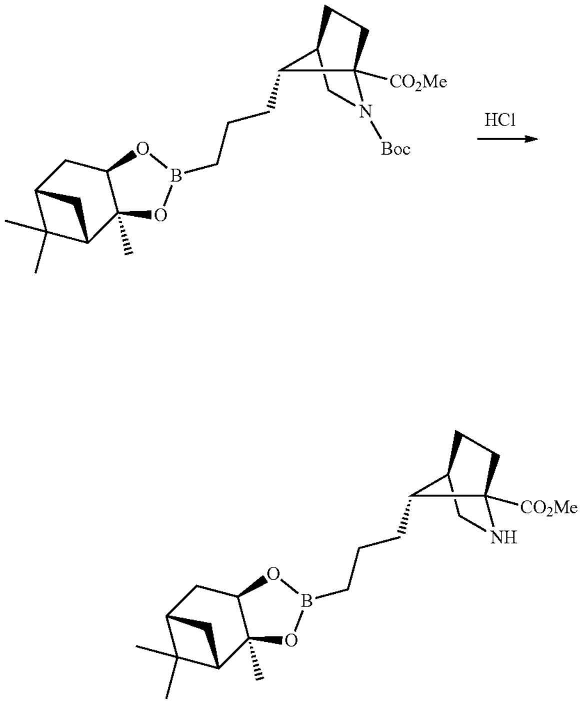

HCl (4.0 M in dixoane, 1.0 mL, 4.0 mmol) was added to a mixture of 2-(tert-butyl) 1-methyl (1R)-7-(3-((3aS,4S,6S,7aR)-3a,5,5-trimethylhexahydro-4,6-methanobenzo[d][1,3,2]dioxaborol-2-yl)propyl)-2-azabicyclo[2.2.1]heptane-1,2-dicarboxylate (105 mg, 0.22 mmol) in EtOAc (5.0 mL), and the reaction mixture was stirred at rom temperature for 16 hours, then concentrated under reduced pressure. The residue was purified by reverse-phase HPLC [C18 column, water (0.1% TFA)-$CH_3CN$] to afford methyl (1R)-7-(3-((3aS,4S,6S,7aR)-3a,5,5-trimethylhexahydro-4,6-methanobenzo[d][1,3,2]dioxaborol-2-yl)propyl)-2-azabicyclo[2.2.1]heptane-1-carboxylate. LCMS ($C_{21}H_{35}BNO_4^+$) (ES, m/z): 376 $[M+H]^+$.

Step 8: (1R)-7-(3-boronopropyl)-2-azabicyclo[2.2.1]heptane-1-carboxylic Acid

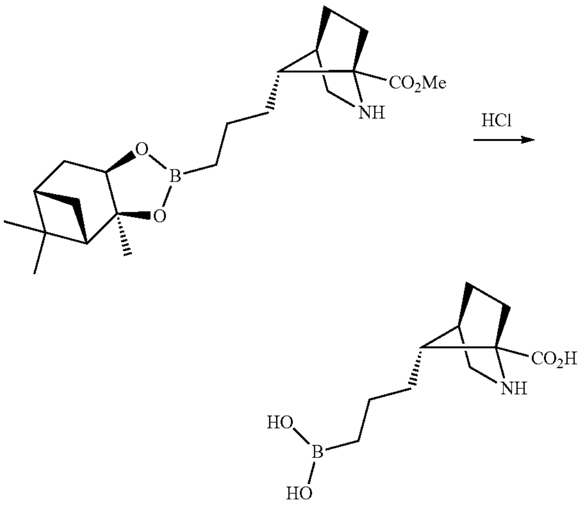

Example 11

A mixture of methyl (1R)-7-(3-((3aS,4S,6S,7aR)-3a,5,5-trimethylhexahydro-4,6-methanobenzo[d][1,3,2]dioxaborol-2-yl)propyl)-2-azabicyclo[2.2.1]heptane-1-carboxylate; (TFA salt, 105 mg, 0.22 mmol) in 12 N HCl in water (1.0 mL, 12 mmol), acetic acid (0.50 mL), and water (0.50 mL) was stirred at 130° C. for 75 minutes in a microwave reactor. The reaction mixture was diluted with water, and washed with DCM. The aqueous layer was concentrated under reduced pressure, and the residue was dissolved in 2N $NH_4OH$ in water (5.0 mL). The resulting solution was lyophilized overnight, and the crude product was dissolved in water, followed by addition of DOWEX 50WX8 resin (4.0 g). The mixture was stirred for 2 h, and the resin was washed with 2 N $NH_4OH$ in water (10 mL×4). The combined $NH_4OH$ solution was lyophilized to give (1R)-7-(3-boronopropyl)-2-azabicyclo[2.2.1]heptane-1-carboxylic acid as a free base. LCMS ($C_{10}H_{19}BNO_4^+$) (ES, m/z): 228 $[M+H]^+$. $^1H$ NMR (499 MHz, $D_2O$) δ 3.47 (dt, J=11.4, 3.3 Hz, 1H), 3.19 (d, J=11.4 Hz, 1H), 2.69 (q, J=3.0 Hz, 1H), 2.42 (dd, J=9.5, 5.1 Hz, 1H), 2.38-2.28 (m, 1H), 2.12-1.96 (m, 2H), 1.67 (tq, J=9.1, 4.0 Hz, 1H), 1.59-1.26 (m, 4H), 0.89-0.74 (m, 2H).

Example 12: (5R)-8-(3-boronopropyl)-2,6-diazabicyclo[3.2.1]octane-5-carboxylic Acid

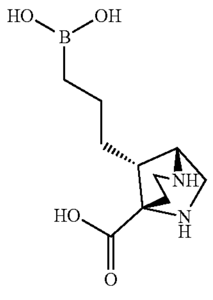 [SMILES: O=C(O)[C@@]12CCN[C@@H](CN1)[C@H]2CCCB(O)O]

Step 1: 1-(tert-butyl) 2-methyl (2S,3R,4R)-3-allyl-4-(benzylamino)pyrrolidine-1,2-dicarboxylate

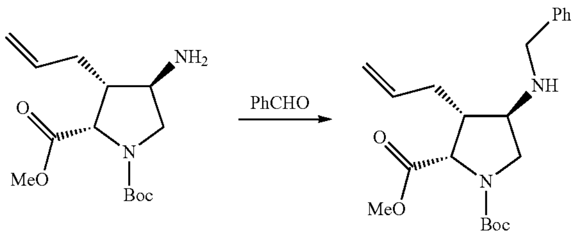 [SMILES: "PhCHO" ; C=CC[C@H]1[C@@H](C(=O)OC)N(C(=O)OC(C)(C)C)C[C@@H]1N ; C=CC[C@@H]1[C@@H](NCc2ccccc2)CN(C(=O)OC(C)(C)C)[C@@H]1C(=O)OC]

Benzaldehyde (33 uL, 0.32 mmol) and acetic acid (17 uL, 0.29 mmol) were added to a solution of 1-(tert-butyl) 2-methyl (2S,3R,4R)-3-allyl-4-aminopyrrolidine-1,2-dicarboxylate (83 mg, 0.29 mmol) in MeOH (2.0 mL), and the resulting mixture was stirred at room temperature for 1 hour, followed by addition of sodium cyanoborohydride (22 mg, 0.35 mmol) at 0° C. The reaction mixture was stirred at room temperature for 18 hours, followed by addition of triethylamine (81 uL, 0.58 mmol), and concentrated under reduced pressure. The residue was purified by silica gel chromatography (EtOAc in hexanes) to afford 1-(tert-butyl) 2-methyl (2S,3R,4R)-3-allyl-4-(benzylamino)pyrrolidine-1,2-dicarboxylate. LCMS ($C_{21}H_{31}N_2O_4^+$) (ES, m/z): 375 $[M+H]^+$.

Step 2: 1-(tert-butyl) 2-methyl (2S,3R,4R)-3-allyl-4-(benzyl(2-bromoethyl)amino)pyrrolidine-1,2-dicarboxylate

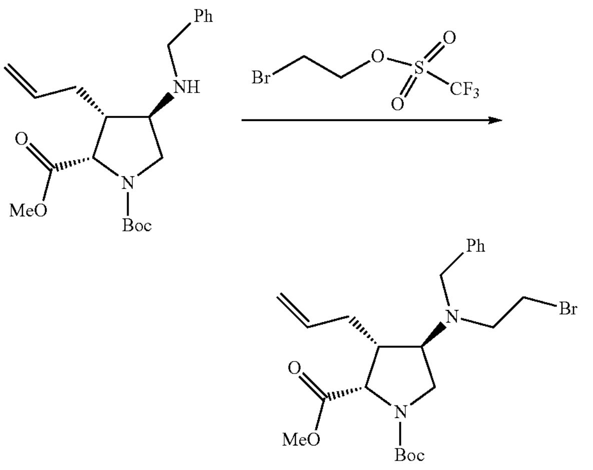

2-Bromoethyl trifluoromethanesulfonate (3.1 g, 12 mmol) was added to a solution of 1-(tert-butyl) 2-methyl (2S,3R,4R)-3-allyl-4-(benzylamino)pyrrolidine-1,2-dicarboxylate (1.5 g, 4.0 mmol) in toluene (20 mL) at 0° C., and the resulting mixture was stirred at room temperature for 30 hours. The reaction mixture was diluted with EtOAc and quenched with saturated aqueous $NaHCO_3$. The organic layer was washed with brine, dried over $Na_2SO_4$, filtered, and concentrated under reduced pressure. The residue was purified by silica gel chromatography (EtOAc in hexanes) to give 1-(tert-butyl) 2-methyl (2S,3R,4R)-3-allyl-4-(benzyl(2-bromoethyl)amino)pyrrolidine-1,2-dicarboxylate. LCMS ($C_{23}H_{34}BrN_2O_4^+$) (ES, m/z): 481 $[M+H]^+$.

Step 3: 6-(tert-butyl)-methyl 8-allyl-2-benzyl-2,6-diazabicyclo[3.2.1]octane-5,6-dicarboxylate

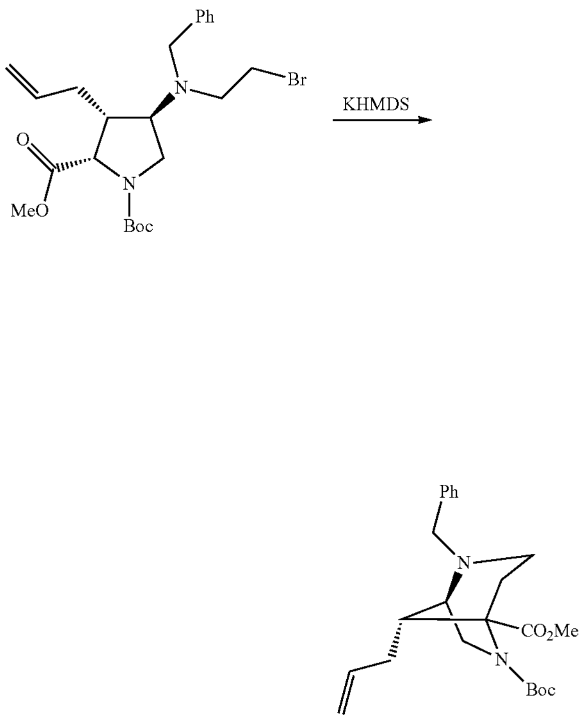

Potassium bis(trimethylsilyl)amide (1.0 M in THF, 4.5 mL, 4.5 mmol) was added dropwise to a solution of (2S, 3R,4R)-1-tert-butyl 2-methyl 3-allyl-4-(benzyl(2-bromoethyl)amino)pyrrolidine-1,2-dicarboxylate (1.9 g, 4.0 mmol) in THF (79 mL) at −78° C., and the resulting mixture was stirred at −78° C. for 30 minutes, then at −20° C. for 10 h. The reaction mixture was quenched with saturated aqueous $NH_4Cl$ and saturated aqueous $NaHCO_3$, then diluted with EtOAc. The organic layer was washed with brine, dried over anhydrous $Na_2SO_4$, filtered, and concentrated under reduced pressure. The residue was purified by silica gel chromatography (EtOAc in hexanes) to give 6-(tert-butyl) 5-methyl 8-allyl-2-benzyl-2,6-diazabicyclo[3.2.1]octane-5, 6-dicarboxylate. LCMS ($C_{23}H_{33}N_2O_4^+$) (ES, m/z): 401 $[M+H]^+$.

Step 4: 6-(tert-butyl) 5-methyl 2-benzyl-8-(3-(4,4,5,5-tetramethyl-1,3,2-dioxaborolan-2-yl)propyl)-2,6-diazabicyclo[3.2.1]octane-5,6-dicarboxylate

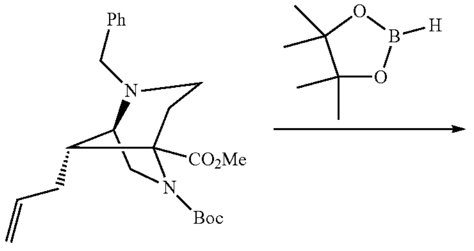

-continued

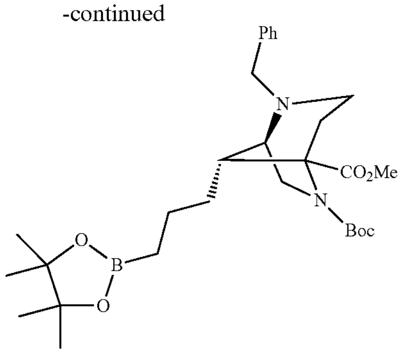

4,4,5,5-Tetramethyl-1,3,2-dioxaborolane (0.24 mL, 1.5 mmol) was added to a mixture of chloro(1,5-cyclooctadiene) iridium(I) dimer (19 mg, 0.037 mmol), DPPE (30 mg, 0.075 mmol) in DCM (2.5 mL) under $N_2$, and the resulting mixture was stirred at 25° C. for 20 minutes, followed by addition of 6-tert-butyl 5-methyl 8-allyl-2-benzyl-2,6-diazabicyclo [3.2.1]octane-5,6-dicarboxylate (100 mg, 0.25 mmol) in DCM (2.5 mL) under $N_2$. The reaction mixture was stirred at 25° C. for 3 h, then quenched with MeOH and water, and concentrated under reduced pressure. The residue was purified by silica gel chromatography (EtOAc in hexanes) to give 6-(tert-butyl) 5-methyl 2-benzyl-8-(3-(4,4,5,5-tetramethyl-1,3,2-dioxaborolan-2-yl)propyl)-2,6-diazabicyclo [3.2.1]octane-5,6-dicarboxylate. LCMS ($C_{29}H_{46}BN_2O_6^+$) (ES, m/z): 529 [M+H]$^+$.

Step 5: 6-(tert-butyl) 5-methyl 8-(3-(4,4,5,5-tetramethyl-1,3,2-dioxaborolan-2-yl)propyl)-2,6-diazabicyclo[3.2.1]octane-5,6-dicarboxylate

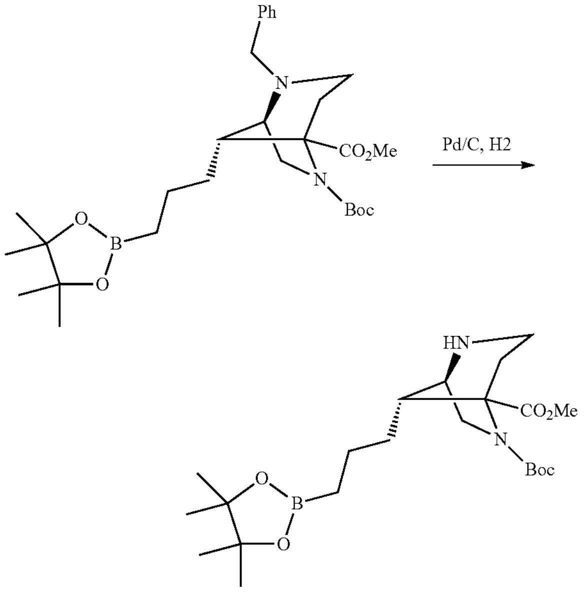

Pd/C (10% wt, 35 mg, 0.033 mmol) was added to a solution of 6-tert-butyl 5-methyl 2-benzyl-8-(3-(4,4,5,5-tetramethyl-1,3,2-dioxaborolan-2-yl)propyl)-2,6-diazabicyclo [3.2.1]octane-5,6-dicarboxylate (88 mg, 0.17 mmol) in EtOAc (5.0 mL). The resulting mixture was evacuated under vacuum and refilled with $H_2$ (3×), then stirred under $H_2$ (balloon) at room temperature for 15 hours. The reaction mixture was filtered, and concentrated under reduced pressure. The residue was purified by silica gel chromatography (MeOH in DCM) to afford 6-(tert-butyl) 5-methyl 8-(3-(4,4,5,5-tetramethyl-1,3,2-dioxaborolan-2-yl)propyl)-2,6-diazabicyclo[3.2.1]octane-5,6-dicarboxylate. LCMS ($C_{22}H_{40}BN_2O_6^+$) (ES, m/z): 439 [M+H]$^+$.

Step 6: (5R)-8-(3-boronopropyl)-2,6-diazabicyclo [3.2.1]octane-5-carboxylic Acid

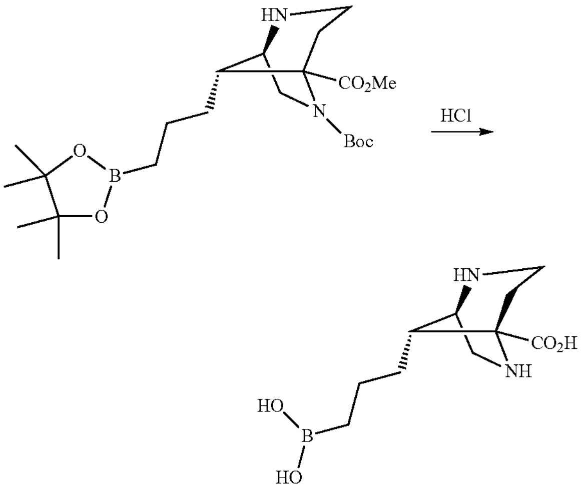

Example 12

A mixture of 6-tert-butyl 5-methyl 8-(3-(4,4,5,5-tetramethyl-1,3,2-dioxaborolan-2-yl)propyl)-2,6-diazabicyclo [3.2.1]octane-5,6-dicarboxylate (55 mg, 0.125 mmol) in 12 N HCl in water (2.0 mL, 24 mmol), acetic acid (1.0 mL), and water (1.0 mL) was stirred at 130° C. for 1 h in a microwave reactor. The reaction mixture was diluted with water, washed with DCM, and the aqueous layer was concentrated under reduced pressure to give (5R)-8-(3-boronopropyl)-2,6-diazabicyclo[3.2.1]octane-5-carboxylic acid as an HCl salt. LCMS ($C_{10}H_{18}BN_2O_3^+$) (ES, m/z): 225 [M−$H_2O$+H]$^+$. $^1$H NMR (499 MHz, $D_2O$) δ 4.36 (d, J=4.7 Hz, 1H), 3.84 (dd, J=14.8, 4.9 Hz, 1H), 3.76 (d, J=14.8 Hz, 1H), 3.61 (dd, J=14.6, 6.7 Hz, 1H), 3.24 (td, J=13.9, 5.5 Hz, 1H), 2.63-2.43 (m, 2H), 2.29 (dd, J=15.3, 5.3 Hz, 1H), 1.53-1.24 (m, 3H), 1.23-1.08 (m, 1H), 0.85-0.59 (m, 2H).

Example 13: (5R)-2-(L-alanyl)-8-(3-boronopropyl)-2,6-diazabicyclo[3.2.1]octane-5-carboxylic Acid

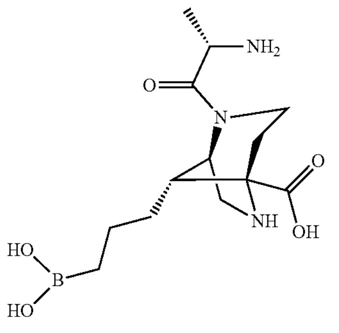 [SMILES: C[C@H](N)C(=O)N1CC[C@@]2(C(=O)O)NC[C@H]1[C@H]2CCCB(O)O]

Step 1: 6-(tert-butyl) 5-methyl (5R)-2-((tert-butoxycarbonyl)-L-alanyl)-8-(3-((3aS,4S,6S,7aR)-3a,5,5-trimethylhexahydro-4,6-methanobenzo[d][1,3,2]dioxaborol-2-yl)propyl)-2,6-diazabicyclo[3.2.1]octane-5,6-dicarboxylate

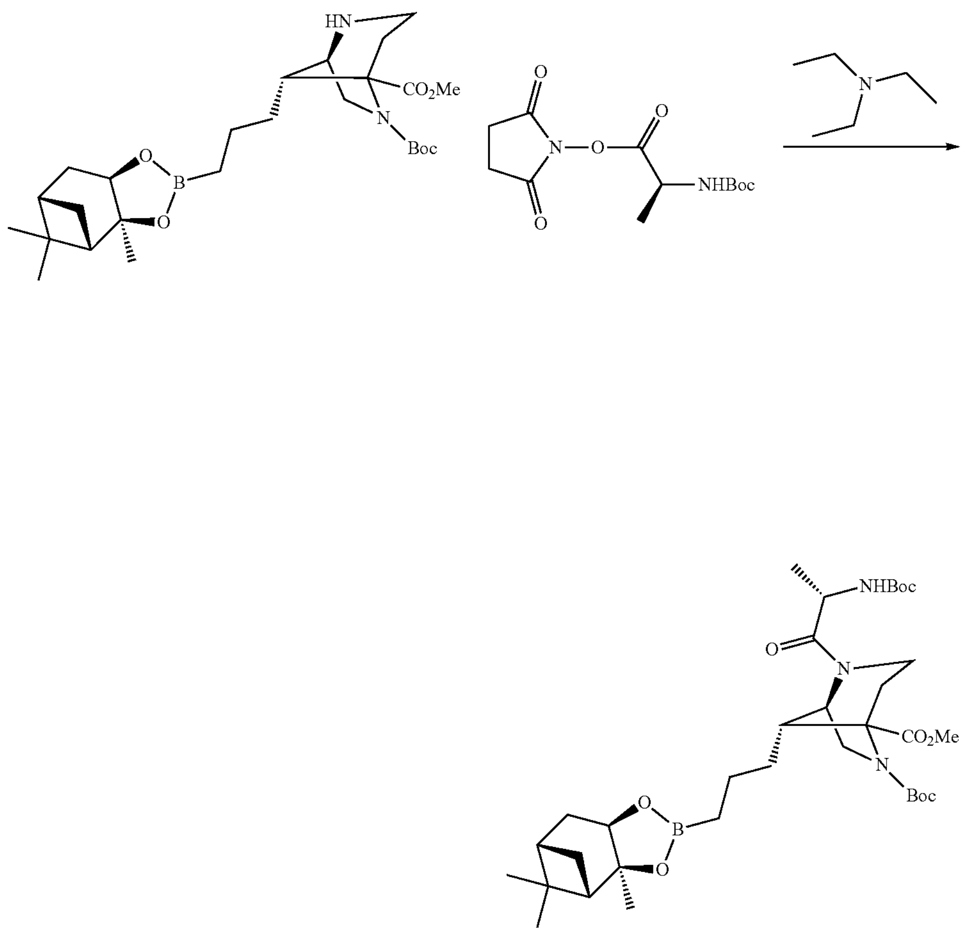

Triethylamine (0.029 mL, 0.20 mmol) and 2,5-dioxopyrrolidin-1-yl (tert-butoxycarbonyl)-L-alaninate (34 mg, 0.12 mmol) were added to a stirred solution of 6-(tert-butyl) 5-methyl 8-(3-((3aS,4S,6S,7aR)-3a,5,5-trimethylhexahydro-4,6-methanobenzo[d][1,3,2]dioxaborol-2-yl)propyl)-2,6-diazabicyclo[3.2.1]octane-5,6-dicarboxylate (50 mg, 0.10 mmol)) in DCM (1.0 mL), and the resulting mixture was stirred at room temperature for 2 hours. The reaction mixture was quenched with saturated aqueous $NH_4Cl$, diluted with water, and extracted with DCM. The combined organic phase was dried over anhydrous $Na_2SO_4$, filtered, and concentrated. The residue was purified by silica gel column chromatography (EtOAc in DCM) to give 6-(tert-butyl) 5-methyl (5R)-2-((tert-butoxycarbonyl)-L-alanyl)-8-(3-((3aS,4S,6S,7aR)-3a,5,5-trimethylhexahydro-4,6-methanobenzo[d][1,3,2]dioxaborol-2-yl)propyl)-2,6-diazabicyclo[3.2.1]octane-5,6-dicarboxylate. LCMS ($C_{34}H_{57}BN_3O_9^+$) (ES, m/z): 662 $[M+H]^+$.

Step 2: methyl (5R)-2-(L-alanyl)-8-(3-((3aS,4S,6S,7aR)-3a,5,5-trimethylhexahydro-4,6-methanobenzo[d][1,3,2]dioxaborol-2-yl)propyl)-2,6-diazabicyclo[3.2.1]octane-5-carboxylate

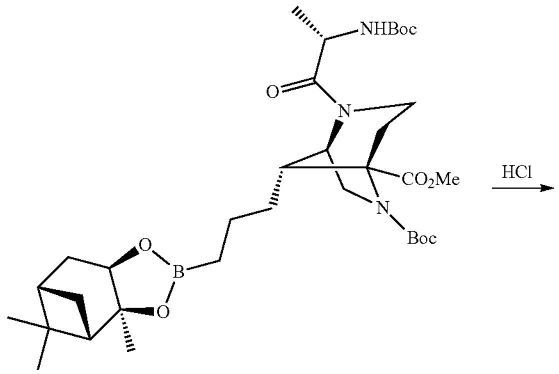

-continued

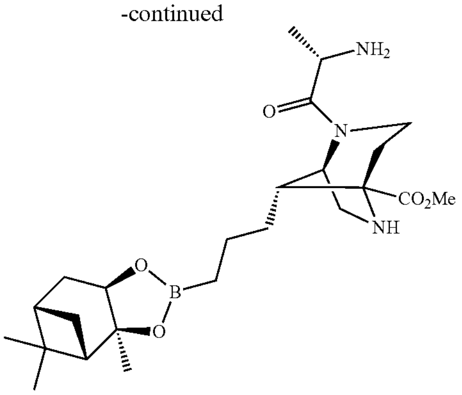

4 M HCl in dioxane (0.094 mL, 0.38 mmol) was added to a stirred solution of 6-(tert-butyl) 5-methyl (5R)-2-((tert-butoxycarbonyl)-L-alanyl)-8-(3-((3aS,4S,6S,7aR)-3a,5,5-trimethylhexahydro-4,6-methanobenzo[d][1,3,2]dioxaborol-2-yl)propyl)-2,6-diazabicyclo[3.2.1]octane-5,6-dicarboxylate (25 mg, 0.038 mmol) in DCM (0.50 mL) at room temperature. The reaction mixture was stirred at room temperature for 2 hours, then concentrated in vacuo to give crude methyl (5R)-2-(L-alanyl)-8-(3-((3aS,4S,6S,7aR)-3a,5,5-trimethylhexahydro-4,6-methanobenzo[d][1,3,2]dioxaborol-2-yl)propyl)-2,6-diazabicyclo[3.2.1]octane-5-carboxylate, which was used directly in the next step without further purification. LCMS ($C_{24}H_{41}BN_3O_5^+$) (ES, m/z): 462 $[M+H]^+$.

Step 3: (5R)-2-(L-alanyl)-8-(3-((3aS,4S,6S,7aR)-3a,5,5-trimethylhexahydro-4,6-methanobenzo[d][1,3,2]dioxaborol-2-yl)propyl)-2,6-diazabicyclo[3.2.1]octane-5-carboxylic Acid

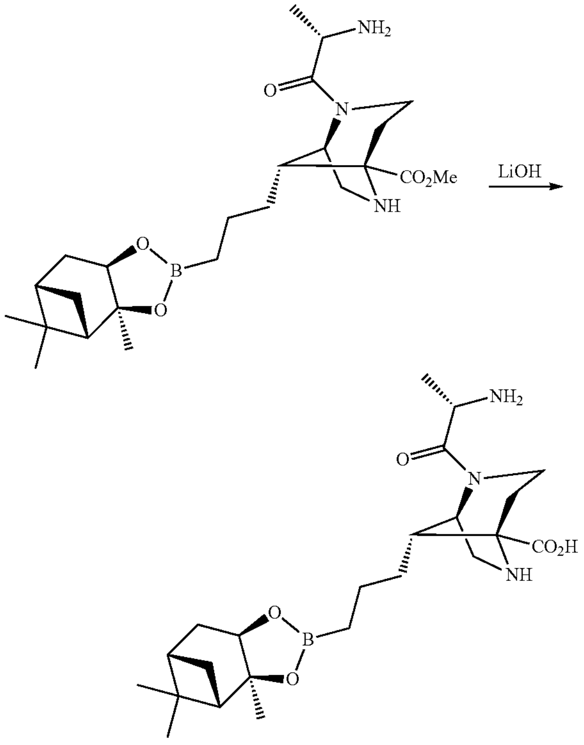

Lithium hydroxide (1.0 M in water, 0.22 mL, 0.22 mmol) was added to a stirred solution of methyl (5R)-2-(L-alanyl)-8-(3-((3aS,4S,6S,7aR)-3a,5,5-trimethylhexahydro-4,6-methanobenzo[d][1,3,2]dioxaborol-2-yl)propyl)-2,6-diazabicyclo[3.2.1]octane-5-carboxylate dihydrochloride (20 mg, 0.043 mmol) in THF (0.45 mL) and MeOH (0.22 mL), and the resulting mixture was stirred at room temperature for 12 hours, then at 50° C. for 15 hours. The reaction mixture was concentrated, diluted with water and washed with EtOAc. The aqueous phase was concentrated to give crude (5R)-2-(L-alanyl)-8-(3-((3aS,4S,6S,7aR)-3a,5,5-trimethylhexahydro-4,6-methanobenzo[d][1,3,2]dioxaborol-2-yl)propyl)-2,6-diazabicyclo[3.2.1]octane-5-carboxylic acid, which was used directly in the next step without further purification. LCMS ($C_{23}H_{39}BN_3O_5^+$) (ES, m/z): 448 $[M+H]^+$.

Step 4: (5R)-2-(L-alanyl)-8-(3-boronopropyl)-2,6-diazabicyclo[3.2.1]octane-5-carboxylic Acid

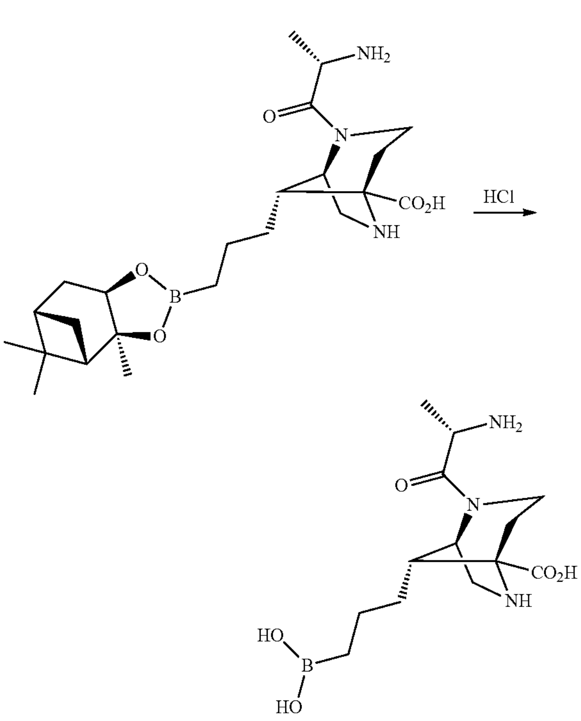

Example 13

12 N HCl in water (0.14 mL, 1.7 mmol) was added dropwise to a mixture of (5R)-2-(L-alanyl)-8-(3-((3aS,4S,6S,7aR)-3a,5,5-trimethylhexahydro-4,6-methanobenzo[d][1,3,2]dioxaborol-2-yl)propyl)-2,6-diazabicyclo[3.2.1]octane-5-carboxylic acid (19 mg, 0.042 mmol) in water (1.0 mL) at 0° C., and the resulting mixture was stirred at room temperature for 70 minutes. The reaction mixture was concentrated, and the residue was purified by RP-HPLC [C18 column, water (20 mM HFBA and 0.1% TFA)-$CH_3CN$] to give ((5R)-2-(L-alanyl)-8-(3-boronopropyl)-2,6-diazabicyclo[3.2.1]octane-5-carboxylic acid as an HFBA salt. LCMS ($C_{13}H_{23}BN_3O_4^+$) (ES, m/z): 296 $[M-H_2O+H]^+$. $^1H$ NMR ($D_2O$) δ: 5.34-5.21 (m, 0.7H), 4.69-4.53 (m, 0.6H), 4.51-4.36 (m, 0.7H), 4.03 (dd, J=15.0, 6.8 Hz, 0.7H), 3.89 (dd, J=13.6, 5.4 Hz, 0.3H), 3.86-3.71 (m, 1H), 3.69-3.52 (m, 1H), 3.68-3.48 (m, 0.7H), 3.19-3.01 (m, 0.3H), 2.55-2.41 (m, 0.7H), 2.43-2.32 (m, 0.3H), 2.26-2.17 (m, 2H), 1.73 (s, 0.3H), 1.65-1.55 (m, 0.7H), 1.53 (d, J=7.0 Hz, 2.1H), 1.48 (d, J=7.1 Hz, 0.9H), 1.47-1.31 (m, 1.3H), 1.36-1.14 (m, 1.7H), 0.95-0.68 (m, 2H).

Example 14: (5R)-2-(L-valyl)-8-(3-boronopropyl)-2,6-diazabicyclo[3.2.1]octane-5-carboxylic Acid

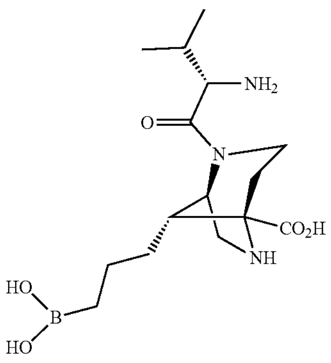 [SMILES: CC(C)[C@H](N)C(=O)N1CC[C@@]2(C(=O)O)NC[C@H]1[C@H]2CCCB(O)O]

Example 14 was made following the synthesis described in Example 13 and using appropriate starting materials. Mass [M−$H_2O$+H]+324.

Example 15: (1R,3S,4R,5R,6S)-4-(3-boronopropyl)-6-hydroxy-4-methyl-2-azabicyclo[3.2.0]heptane-3-carboxylic Acid

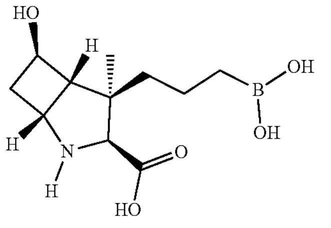 [SMILES: C[C@@]1(CCCB(O)O)[C@H]2[C@H](O)C[C@H]2N[C@@H]1C(=O)O]

Step 1: (2S,3S)-methyl 3-allyl-3-methyl-4-oxopyrrolidine-2-carboxylate

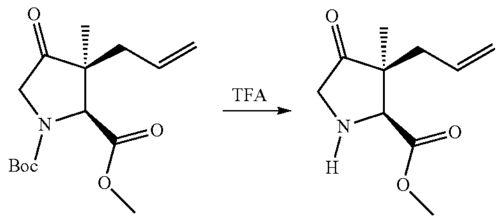 [SMILES: C=CC[C@]1(C)C(=O)CN(C(=O)OC(C)(C)C)[C@@H]1C(=O)OC ; C=CC[C@]1(C)C(=O)CN[C@@H]1C(=O)OC ; "TFA"]

A mixture of (2S,3S)-1-tert-butyl 2-methyl 3-allyl-3-methyl-4-oxopyrrolidine-1,2-dicarboxylate (10 g, 34 mmol) and TFA (13 mL, 169 mmol) in DCM (200 mL) was stirred at 25° C. for 14 hours. The reaction mixture was concentrated to give crude (2S,3S)-methyl 3-allyl-3-methyl-4-oxopyrrolidine-2-carboxylate, which was used in the next step directly without further purification. LCMS ($C_{10}H_{16}NO_3^+$) (ES, m/z): 198 $[M+H]^+$.

Step 2: (2S,3S)-1-benzyl 2-methyl 3-allyl-3-methyl-4-oxopyrrolidine-1,2-dicarboxylate

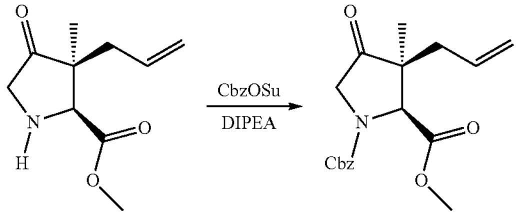 [SMILES: C=CC[C@]1(C)C(=O)CN[C@@H]1C(=O)OC ; "CbzOSu" ; "DIPEA" ; C=CC[C@]1(C)C(=O)CN(C(=O)OCc2ccccc2)[C@@H]1C(=O)OC]

A mixture of (2S,3S)-methyl 3-allyl-3-methyl-4-oxopyrrolidine-2-carboxylate (7.0 g, 34 mmol), CbzOSu (13 g, 53 mmol), DIPEA (12 mL, 71 mmol) and DMAP (0.43 g, 3.6 mmol) in DCM (120 mL) was stirred at 25° C. for 20 h. The reaction mixture was diluted with water and extracted with DCM, and the combined organic phases were washed with brine, dried over anhydrous $Na_2SO_4$, filtered, and concentrated under reduced pressure. The residue was purified by silica gel column chromatography (EtOAc in hexanes) to give (2S,3S)-1-benzyl 2-methyl 3-allyl-3-methyl-4-oxopyrrolidine-1,2-dicarboxylate, which was resolved by chiral-SFC [Column: OD (250 mm*50 mm, 10 um), Mobile phase: A: $CO_2$, B: EtOH (0.1% $NH_3 \cdot H_2O$), Gradient: 25% of B in 3.5 minutes, and hold 25% of B for 1 min, Flow Rate (mL/min) 200, Column temperature: 40° C.] to give (2S,3S)-1-benzyl 2-methyl 3-allyl-3-methyl-4-oxopyrrolidine-1,2-dicarboxylate (Peak 2, $t_R$=1.192 min) as the second eluting peak. The stereochemistry was assigned by 2D NMR. Peak 2: LCMS ($C_{18}H_{22}NO_5^+$) (ES, m/z): 332 $[M+H]^+$. $^1H$ NMR (500 MHz, $CDCl_3$) δ 7.30-7.19 (m, 5H), 5.89-5.52 (m, 1H), 5.33-4.72 (m, 4H), 4.52-4.23 (m, 1H), 4.10-3.83 (m, 2H), 3.65-3.45 (m, 3H), 2.46-2.16 (m, 1H), 2.09-1.76 (m, 1H), 1.12 (s, 3H).

Step 3: (2S,3S)-1-benzyl 2-methyl 3-allyl-4-hydroxy-3-methylpyrrolidine-1,2-dicarboxylate

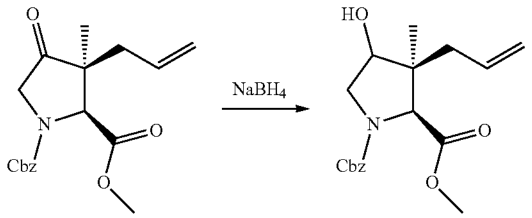 [SMILES: C=CC[C@]1(C)C(=O)CN(C(=O)OCc2ccccc2)[C@@H]1C(=O)OC ; "NaBH4" ; C=CC[C@]1(C)C(O)CN(C(=O)OCc2ccccc2)[C@@H]1C(=O)OC]

A mixture of (2S,3S)-1-benzyl 2-methyl 3-allyl-3-methyl-4-oxopyrrolidine-1,2-dicarboxylate (2.3 g, 6.9 mmol) and sodium borohydride (0.26 g, 6.9 mmol) in MeOH (30 mL) was stirred at 0° C. for 1 h. The reaction mixture was quenched with saturated aqueous $NH_4Cl$ and extracted with EtOAc, and the combined organic phases were washed with brine, dried over anhydrous $Na_2SO_4$, filtered, and concentrated under reduced pressure to give (2S,3S)-1-benzyl 2-methyl 3-allyl-4-hydroxy-3-methylpyrrolidine-1,2-dicarboxylate, which was used in the next step without further purification. LCMS ($C_{18}H_{24}NO_5$) (ESI, m/z): 334 $[M+H]^+$.

Step 4: (2S,3S)-1-benzyl 2-methyl 3-allyl-4-(((chloromethyl)sulfonyl)oxy)-3-methylpyrrolidine-1,2-dicarboxylate

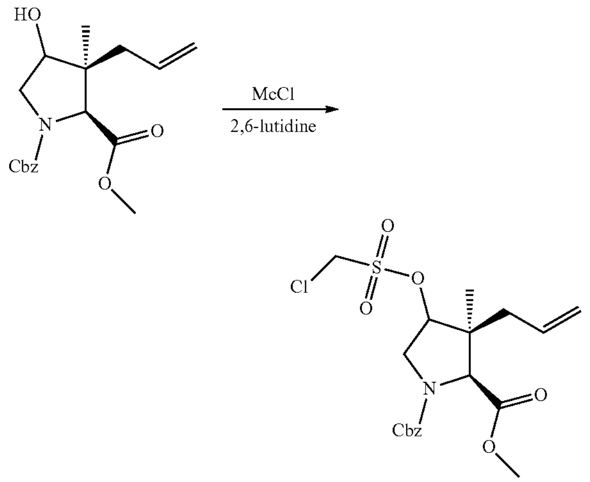

Chloromethanesulfonyl chloride (2.0 g, 13 mmol) was added dropwise to a solution of (2S,3S)-1-benzyl 2-methyl 3-allyl-4-hydroxy-3-methylpyrrolidine-1,2-dicarboxylate (2.2 g, 6.6 mmol) and 2,6-dimethylpyridine (4.2 g, 40 mmol) in DCM (30 mL) at 0° C. The resulting mixture was slowly warmed to 25° C. and stirred for additional 4 h, then diluted with water and extracted with DCM. The combined organic phases were dried over $Na_2SO_4$, filtered, and concentrated in vacuo to give the crude (2S,3S)-1-benzyl 2-methyl 3-allyl-4-(((chloromethyl)sulfonyl)oxy)-3-methylpyrrolidine-1,2-dicarboxylate, which was used in the next step without further purification. LCMS ($C_{19}H_{25}ClNO_7S^+$) (ES, m/z): 446 $[M+H]^+$.

Step 5: (2S,3R)-1-benzyl 2-methyl 3-allyl-3-methyl-2,3-dihydro-1H-pyrrole-1,2-dicarboxylate

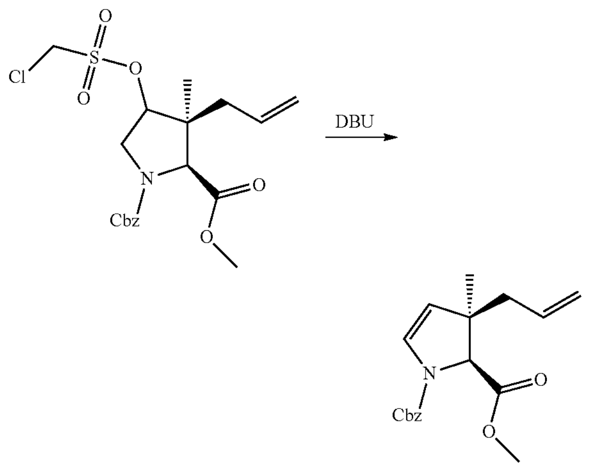

A mixture of (2S,3S)-1-benzyl 2-methyl 3-allyl-4-(((chloromethyl)sulfonyl)oxy)-3-methylpyrrolidine-1,2-dicarboxylate (2.9 g, 6.6 mmol) and DBU (2.0 mL, 13 mmol) in $CH_3CN$ (30 mL) was stirred at 80° C. for 48 hours. The reaction mixture was quenched with 0.5 N HCl in water and extracted with EtOAc. The combined organic layers were dried over anhydrous $Na_2SO_4$, filtered, and concentrated in vacuo. The residue was purified by silica gel column chromatography (EtOAc in hexanes) to give (2S,3R)-1-benzyl 2-methyl 3-allyl-3-methyl-2,3-dihydro-1H-pyrrole-1,2-dicarboxylate. LCMS ($C_{18}H_{22}NO_4^+$) (ES, m/z): 316 $[M+H]^+$.

Step 6: (3S,4R)-2-benzyl 3-methyl 4-allyl-7,7-dichloro-4-methyl-6-oxo-2-azabicyclo[3.2.0]heptane-2,3-dicarboxylate

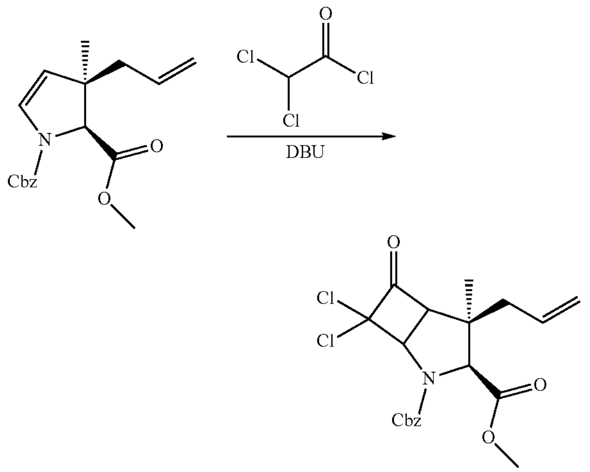

2,2-Dichloroacetyl chloride (0.32 mL, 3.3 mmol) in cyclohexane (3.0 mL) was added to a mixture of (2S,3R)-1-benzyl 2-methyl 3-allyl-3-methyl-2,3-dihydro-1H-pyrrole-1,2-dicarboxylate (400 mg, 1.3 mmol) and TEA (0.71 mL, 5.1 mmol) in cyclohexane (7.0 mL) at 45° C. The resulting mixture was stirred at 45° C. for 24 h, followed by addition of 2,2-dichloroacetyl chloride (0.16 mL, 1.6 mmol) and triethylamine (0.35 mL, 2.5 mmol). The reaction mixture was stirred for additional 16 hours at 45° C., then quenched with 1 N HCl in water and extracted with EtOAc. The combined organic phases were washed with brine, dried over anhydrous $Na_2SO_4$, filtered, and concentrated under reduced pressure. The residue was purified by RP-HPLC [C18 column, water (0.1% TFA)-$CH_3CN$] to give (3S,4R)-2-benzyl 3-methyl 4-allyl-7,7-dichloro-4-methyl-6-oxo-2-azabicyclo[3.2.0]heptane-2,3-dicarboxylate. LCMS ($C_{20}H_{22}Cl_2NO_5^+$) (ESI, m/z): 426 $[M+H]^+$.

Step 7: (1R,3S,4R,5R)-2-benzyl 3-methyl 4-allyl-4-methyl-6-oxo-2-azabicyclo[3.2.0]heptane-2,3-dicarboxylate

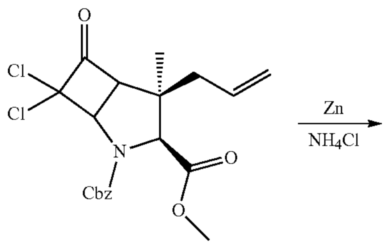

-continued

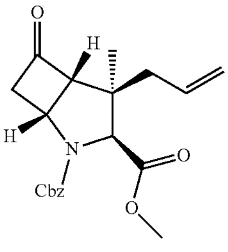

Zinc powder (391 mg, 6.0 mmol) was added to a mixture of (3S,4R)-2-benzyl 3-methyl 4-allyl-7,7-dichloro-4-methyl-6-oxo-2-azabicyclo[3.2.0]heptane-2,3-dicarboxylate (232 mg, 0.54 mmol) in MeOH (10 mL) and saturated aqueous $NH_4Cl$ (5.0 mL) at 28° C., and the resulting mixture was stirred for 2 hours at 28° C. The reaction mixture was diluted with MeOH, filtered, and concentrated under reduced pressure. The residue was purified by RP-HPLC [C18 column, water (0.1% TFA)-$CH_3CN$] to give (1R,3S,4R,5R)-2-benzyl 3-methyl 4-allyl-4-methyl-6-oxo-2-azabicyclo[3.2.0]heptane-2,3-dicarboxylate. The stereochemistry was assigned by 2D NMR. LCMS ($C_{20}H_{24}NO_5^+$) (ESI, m/z): 358 $[M+H]^+$. $^1H$ NMR (500 MHz, $CDCl_3$) δ 7.34-7.20 (m, 5H), 5.82-5.66 (m, 1H), 5.20-4.94 (m, 4H), 4.42-4.32 (m, 1H), 4.30 (s, 0.5H), 4.21 (s, 0.5H), 3.72 (s, 1.6H), 3.61-3.55 (m, 1.4H), 3.27-3.08 (m, 1H), 2.92-2.80 (m, 1H), 2.93-2.77 (m, 1H), 2.28 (m, 1H), 2.12-1.96 (m, 1H), 1.26-1.14 (m, 3H).

Step 8: 1: (1R,3S,4R,5R,6R)-2-benzyl 3-methyl 4-allyl-6-hydroxy-4-methyl-2-azabicyclo[3.2.0]heptane-2,3-dicarboxylate and 2: (1R,3S,4R,5R,6S)-2-benzyl 3-methyl 4-allyl-6-hydroxy-4-methyl-2-azabicyclo[3.2.0]heptane-2,3-dicarboxylate

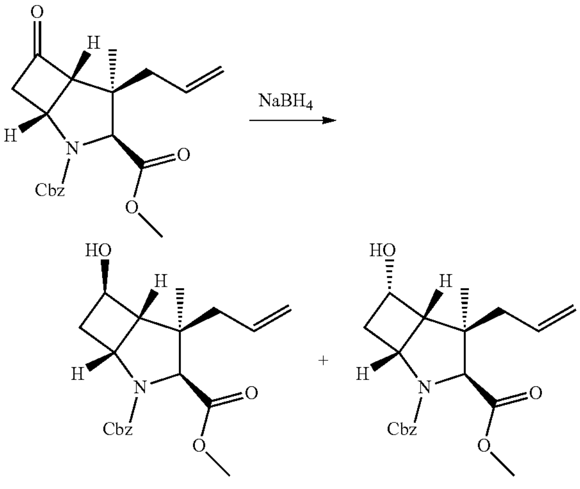

1 2

A mixture of (1R,3S,4R,5R)-2-benzyl 3-methyl 4-allyl-4-methyl-6-oxo-2-azabicyclo[3.2.0]heptane-2,3-dicarboxylate (60 mg, 0.17 mmol) and sodium borohydride (6.4 mg, 0.17 mmol) in MeOH (5.0 mL) was stirred at 0° C. for 2 h, then at 26° C. for 8 h. The reaction mixture was quenched with acetone and concentrated under reduced pressure, and the residue was purified by RP-HPLC [C18 column, water (0.1% TFA)-$CH_3CN$] to give (1R,3S,4R,5R,6R)-2-benzyl 3-methyl 4-allyl-6-hydroxy-4-methyl-2-azabicyclo[3.2.0]heptane-2,3-dicarboxylate as the first eluting peak (Peak-1) and (1R,3S,4R,5R,6S)-2-benzyl 3-methyl 4-allyl-6-hydroxy-4-methyl-2-azabicyclo[3.2.0]heptane-2,3-dicarboxylate as the second eluting peak (Peak-2). The stereochemistry was assigned by 2D NMR. Peak-1: LCMS ($C_{20}H_{26}NO_5^+$) (ESI, m/z): 360 $[M+H]^+$. $^1H$ NMR (400 MHz, $CDCl_3$) δ 7.40-7.27 (m, 5H), 5.85-5.64 (m, 1H), 5.23-4.93 (m, 4H), 4.30-4.17 (m, 2H), 4.14 (s, 0.6H), 4.10 (s, 0.4H), 3.76 (s, 1.6H), 3.48 (s, 1.4H), 2.69 (m, 1H), 2.47-2.18 (m, 1H), 2.12-1.91 (m, 2H), 1.84-1.71 (m, 1H), 1.27-1.19 (m, 3H). Peak-2: LCMS ($C_{20}H_{26}NO_5^+$) (ESI, m/z): 360 $[M+H]^+$. $^1H$ NMR (400 MHz, $CDCl_3$) δ 7.38-7.26 (m, 5H), 5.85-5.67 (m, 1H), 5.24-5.16 (m, 1H), 5.12-4.97 (m, 3H), 4.68 (s, 0.5H), 4.64 (s, 0.5H), 4.58-4.44 (m, 1H), 4.29-4.15 (m, 1H), 3.76 (s, 1.6H), 3.49 (s, 1.4H), 2.85 (m, 1H), 2.63-2.48 (m, 1H), 2.10-1.98 (m, 1H), 1.94-1.71 (m, 2H), 1.43 (s, 1.6H), 1.40 (s, 1.4H)

Step 9: (3-((1R,3S,4R,5R,6R)-2-((benzyloxy)carbonyl)-6-hydroxy-3-(methoxycarbonyl)-4-methyl-2-azabicyclo[3.2.0]heptan-4-yl)propyl)boronic Acid

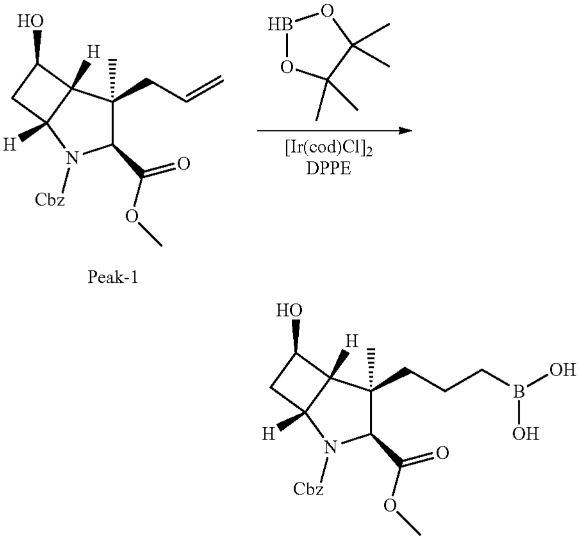

Peak-1

4,4,5,5-Tetramethyl-1,3,2-dioxaborolane (0.046 mL, 0.32 mmol) in DCM (1.0 mL) was added to a mixture of dppe (2.0 mg, 5.1 μmol) and $[Ir(cod)Cl]_2$ (2.6 mg, 3.8 μmol) in DCM (1.0 mL) under $N_2$ at 0° C. The resulting mixture was stirred for 20 minutes at 0° C., followed by addition of (1R,3S,4R,5R,6R)-2-benzyl 3-methyl 4-allyl-6-hydroxy-4-methyl-2-azabicyclo[3.2.0]heptane-2,3-dicarboxylate (23 mg, 0.064 mmol) in DCM (1.0 mL). The reaction mixture was stirred at 26° C. for 16 hours, then quenched with MeOH and concentrated under reduced pressure. The residue was purified by RP-HPLC [C18 column, water (0.1% TFA)-$CH_3CN$] to give (3-((1R,3S,4R,5R,6R)-2-((benzyloxy)carbonyl)-6-hydroxy-3-(methoxycarbonyl)-4-methyl-2-azabicyclo[3.2.0]heptan-4-yl)propyl)boronic acid. LCMS ($C_{20}H_{29}BNO_7^+$) (ESI, m/z): 406 $[M+H]^+$.

Step 10: (1R,3S,4R,5R,6R)-4-(3-boronopropyl)-6-hydroxy-4-methyl-2-azabicyclo[3.2.0]heptane-3-carboxylic Acid

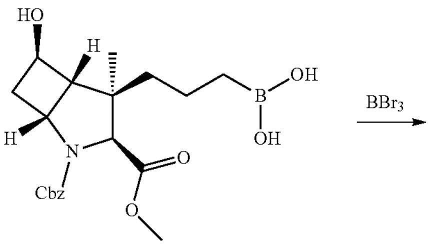

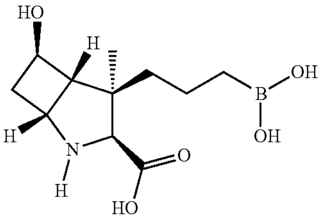

Example 15

Example 16: (1R,3S,4R,5R,6S)-4-(3-boronopropyl)-6-hydroxy-4-methyl-2-azabicyclo[3.2.0]heptane-3-carboxylic Acid

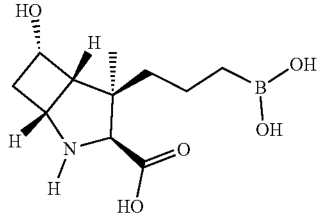 [SMILES: C[C@@]1(CCCB(O)O)[C@H]2[C@@H](O)C[C@H]2N[C@@H]1C(=O)O]

$BBr_3$ (500 µL, 5.3 mmol) was added to a solution of (3-((1R,3S,4R,5R,6R)-2-((benzyloxy)carbonyl)-6-hydroxy-3-(methoxycarbonyl)-4-methyl-2-azabicyclo[3.2.0]heptan-4-yl)propyl)boronic acid (15 mg, 0.037 mmol) in DCM (1.0 mL) at 0° C., and the resulting mixture was stirred for 40 hours. The solvent was removed by a stream of $N_2$, and the residue was purified by RP-HPLC [C18 column, water (20 mM HFBA and 0.1% TFA)-$CH_3CN$] to give (1R,3S,4R,5R,6R)-4-(3-boronopropyl)-6-hydroxy-4-methyl-2-azabicyclo[3.2.0]heptane-3-carboxylic acid as an HFBA salt. LCMS ($C_{11}H_{19}BNO_4^+$) (ESI, m/z): 240 $[M+H-H_2O]^+$. $^1H$ NMR (500 MHz, $D_2O$) δ 4.44-4.35 (m, 1H), 4.25-4.19 (m, 1H), 4.17 (s, 1H), 2.93 (t, J=5.8 Hz, 1H), 2.46-2.31 (m, 2H), 1.42-1.25 (m, 2H), 1.23 (s, 3H), 1.17-1.02 (m, 2H), 0.76-0.63 (m, 2H).

Step 1: (3-((1R,3S,4R,5R,6S)-2-((benzyloxy)carbonyl)-6-hydroxy-3-(methoxycarbonyl)-4-methyl-2-azabicyclo[3.2.0]heptan-4-yl)propyl)boronic Acid

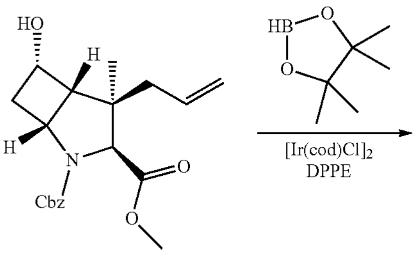

Peak-2

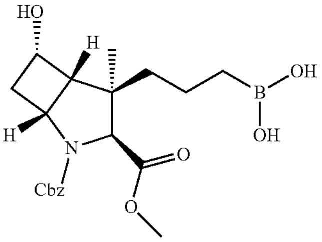

4,4,5,5-Tetramethyl-1,3,2-dioxaborolane (0.046 mL, 0.32 mmol) in DCM (1.0 mL) was added to a mixture of dppe (2.0 mg, 5.1 µmol) and $[Ir(cod)Cl]_2$ (2.6 mg, 3.8 µmol) in DCM (1.0 mL) under $N_2$ at 0° C., and the resulting mixture was stirred for 20 minutes at 0° C., followed by addition of (1R,3S,4R,5R,6S)-2-benzyl 3-methyl 4-allyl-6-hydroxy-4-methyl-2-azabicyclo[3.2.0]heptane-2,3-dicarboxylate (23 mg, 0.064 mmol) in DCM (1.0 mL). The reaction mixture was stirred at 26° C. for 16 h, then quenched with MeOH and concentrated under reduced pressure. The residue was purified by RP-HPLC [C18 column, water (0.1% TFA)-$CH_3CN$] to give (3-((1R,3S,4R,5R,6S)-2-((benzyloxy)carbonyl)-6-hydroxy-3-(methoxycarbonyl)-4-methyl-2-azabicyclo[3.2.0]heptan-4-yl)propyl)boronic acid. LCMS ($C_{20}H_{29}BNO_7^+$) (ESI, m/z): 406 $[M+H]^+$.

Step 2: (1R,3S,4R,5R,6S)-4-(3-boronopropyl)-6-hydroxy-4-methyl-2-azabicyclo[3.2.0]heptane-3-carboxylic Acid

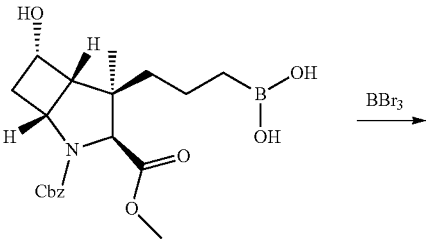

-continued

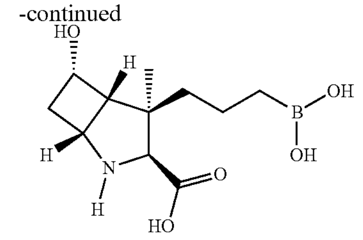

Example 16

$BBr_3$ (500 μL, 5.3 mmol) was added to a solution of (3-((1R,3S,4R,5R,6S)-2-((benzyloxy)carbonyl)-6-hydroxy-3-(methoxycarbonyl)-4-methyl-2-azabicyclo[3.2.0]heptan-4-yl)propyl)boronic acid (7.0 mg, 0.017 mmol) in DCM (1.0 mL) at 0° C., and the resulting mixture was stirred for 40 h. The solvent was removed by a stream of $N_2$, and the residue was purified by Pre-HPLC RP-HPLC [C18 column, water (20 mM HFBA and 0.1% TFA)-$CH_3CN$] to give (1R,3S,4R,5R,6S)-4-(3-boronopropyl)-6-hydroxy-4-methyl-2-azabicyclo[3.2.0]heptane-3-carboxylic acid as an HFBA salt. LCMS ($C_{11}H_{19}BNO_4^+$) (ESI, m/z): 240 $[M+H-H_2O]^+$. $^1H$ NMR (500 MHz, $D_2O$) δ 4.55 (s, 1H), 4.53-4.48 (m, 1H), 4.05-3.98 (m, 1H), 3.22-3.12 (m, 1H), 3.00-2.85 (m, 1H), 1.95-1.85 (m, 1H), 1.41-1.32 (m, 4H), 1.32-1.25 (m, 1H), 1.07-0.95 (m, 2H), 0.74-0.62 (m, 2H).

Example 17: (1R,3S,4R,5R)-4-(3-boronopropyl)-4-methyl-2-azabicyclo[3.2.0]heptane-3-carboxylic Acid

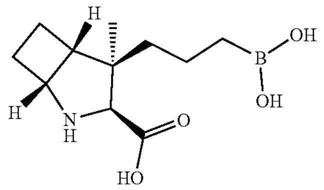

Step 1: (1R,3S,4R,5R)-2-benzyl 3-methyl 4-allyl-6-hydroxy-4-methyl-2-azabicyclo[3.2.0]heptane-2,3-dicarboxylate

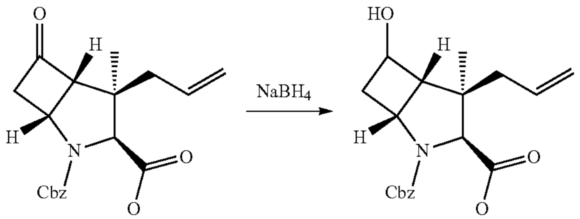 [SMILES: C=CC[C@]1(C)[C@H]2C(=O)C[C@H]2N(C(=O)OCc2ccccc2)[C@@H]1C(=O)O ; "NaBH4" ; C=CC[C@]1(C)[C@H]2C(O)C[C@H]2N(C(=O)OCc2ccccc2)[C@@H]1C(=O)O]

A mixture of (1R,3S,4R,5R)-2-benzyl 3-methyl 4-allyl-4-methyl-6-oxo-2-azabicyclo[3.2.0]heptane-2,3-dicarboxylate (500 mg, 1.4 mmol) and sodium borohydride (27 mg, 0.70 mmol) in MeOH (10 mL) was stirred at 24° C. for 70 minutes to give a colorless solution. The reaction mixture was quenched with saturated aqueous $NH_4Cl$ and extracted with EtOAc, and the combined organic phases were washed with brine, dried over anhydrous $Na_2SO_4$, filtered, and concentrated under reduced pressure to give (1R,3S,4R,5R)-2-benzyl 3-methyl 4-allyl-6-hydroxy-4-methyl-2-azabicyclo[3.2.0]heptane-2,3-dicarboxylate, which was used in the next steps without further purification. LCMS ($C_{20}H_{26}NO_5^+$) (ES, m/z): 360 $[M+H]^+$.

Step 2: (1R,3S,4R,5R)-2-benzyl 3-methyl 6-((1H-imidazole-1-carbonothioyl)oxy)-4-allyl-4-methyl-2-azabicyclo[3.2.0]heptane-2,3-dicarboxylate

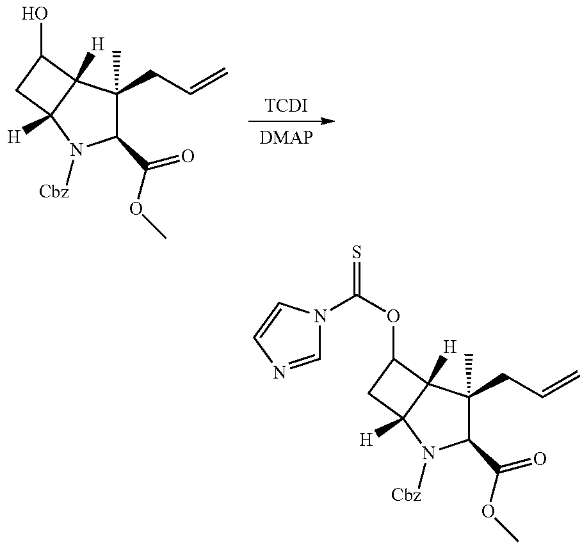

A mixture of (1R,3S,4R,5R)-2-benzyl 3-methyl 4-allyl-6-hydroxy-4-methyl-2-azabicyclo[3.2.0]heptane-2,3-dicarboxylate (480 mg, 1.3 mmol), N,N-dimethylpyridin-4-amine (245 mg, 2.0 mmol) and di(1H-imidazol-1-yl)methanethione (476 mg, 2.7 mmol) in THF (15 mL) was stirred for 50 h at 75° C. The reaction mixture was diluted with EtOAc, filtered and the filtrate was concentrated under reduced pressure. The residue was purified by silica gel column chromatography (EtOAc in hexanes) to give (1R,3S,4R,5R)-2-benzyl 3-methyl 6-((1H-imidazole-1-carbonothioyl)oxy)-4-allyl-4-methyl-2-azabicyclo[3.2.0]heptane-2,3-dicarboxylate. LCMS ($C_{24}H_{28}N_3O_5S^+$) (ES, m/z): 470 $[M+H]^+$.

Step 3: (1R,3S,4R,5R)-2-benzyl 3-methyl 4-allyl-4-methyl-2-azabicyclo[3.2.0]heptane-2,3-dicarboxylate

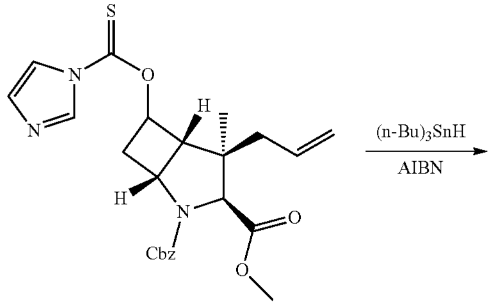

-continued

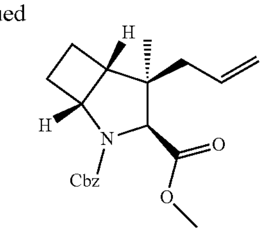

AIBN (53 mg, 0.32 mmol) was added to a mixture of (1R,3S,4R,5R)-2-benzyl 3-methyl 6-((1H-imidazole-1-carbonothioyl)oxy)-4-allyl-4-methyl-2-azabicyclo[3.2.0]heptane-2,3-dicarboxylate (300 mg, 0.64 mmol) and (n-Bu)$_3$SnH (1.0 mL, 3.7 mmol) in toluene (15 mL) at 25° C. under $N_2$. The reaction mixture was stirred at 120° C. under $N_2$ for 14 hours, and was then quenched with saturated aqueous KF and extracted with EtOAc. The combined organic phases were washed with brine, dried over anhydrous $Na_2SO_4$, filtered and concentrated under reduced pressure. The resulting residue was purified by RP-HPLC [C18 column, water (0.1% TFA)-$CH_3CN$] to give (1R,3S,4R,5R)-2-benzyl 3-methyl 4-allyl-4-methyl-2-azabicyclo[3.2.0]heptane-2,3-dicarboxylate. LCMS ($C_{20}H_{26}NO_4^+$) (ES, m/z): 344 $[M+H]^+$.

Step 4: (1R,3S,4R,5R)-2-benzyl 3-methyl 4-methyl-4-(3-(4,4,5,5-tetramethyl-1,3,2-dioxaborolan-2-yl)propyl)-2-azabicyclo[3.2.0]heptane-2,3-dicarboxylate

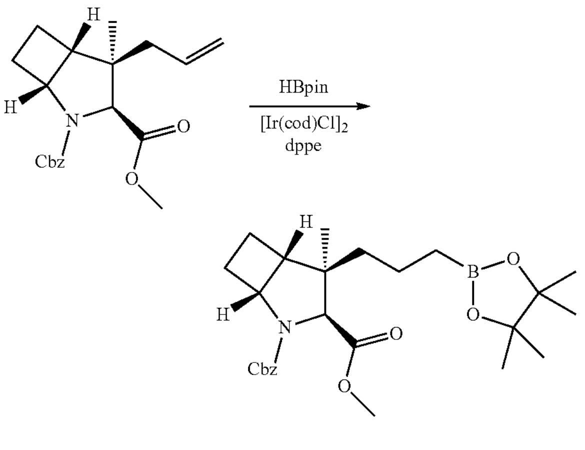

A mixture of $[Ir(cod)Cl]_2$ (4.9 mg, 7.3 μmol) and 1,2-bis(diphenylphosphino)ethane (5.8 mg, 0.015 mmol) in DCM (2.0 mL) was stirred at 0° C. under $N_2$ for 5 minutes, followed by addition of 4,4,5,5-tetramethyl-1,3,2-dioxaborolane (0.13 mL, 0.73 mmol), and a solution of (1R,3S,4R,5R)-2-benzyl 3-methyl 4-allyl-4-methyl-2-azabicyclo[3.2.0]heptane-2,3-dicarboxylate (50 mg, 0.15 mmol) in DCM (0.50 mL). The reaction mixture was stirred at 20° C. under $N_2$ for 15 hours, and was then concentrated under reduced pressure. The resulting residue was purified by RP-HPLC [C18 column, water (0.1% TFA)-$CH_3CN$] to give (1R,3S,4R,5R)-2-benzyl 3-methyl 4-methyl-4-(3-(4,4,5,5-tetramethyl-1,3,2-dioxaborolan-2-yl)propyl)-2-azabicyclo[3.2.0]heptane-2,3-dicarboxylate. LCMS ($C_{26}H_{39}BNO_6^+$) (ES, m/z): 472 $[M+H]^+$.

Step 5: (1R,3S,4R,5R)-4-(3-boronopropyl)-4-methyl-2-azabicyclo[3.2.0]heptane-3-carboxylic Acid

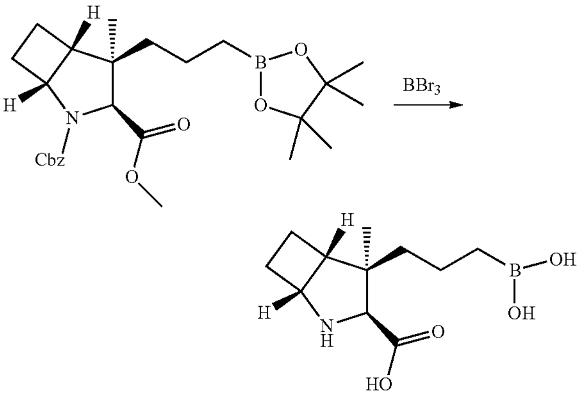

Example 17

$BBr_3$ (500 μL, 5.3 mmol) was added to a solution of (1R,3S,4R,5R)-2-benzyl 3-methyl 4-methyl-4-(3-(4,4,5,5-tetramethyl-1,3,2-dioxaborolan-2-yl)propyl)-2-azabicyclo[3.2.0]heptane-2,3-dicarboxylate (11 mg, 0.023 mmol) in DCM (1.0 mL) at 0° C., and the resulting mixture was stirred for 40 h. The solvent was removed by a stream of $N_2$, and the residue was purified by RP-HPLC [C18 column, water (20 mM HFBA and 0.1% TFA)-$CH_3CN$] to give (1R,3S,4R,5R)-4-(3-boronopropyl)-4-methyl-2-azabicyclo[3.2.0]heptane-3-carboxylic acid as an HFBA salt. LCMS ($C_{11}H_{19}BNO_3^+$) (ES, m/z): 224 $[M+H-H_2O]^+$. $^1H$ NMR (500 MHz, $D_2O$) δ 4.51 (s, 1H), 4.25-4.23 (m, 1H), 3.22-3.14 (m, 1H), 2.59-2.45 (m, 1H), 2.18-1.99 (m, 2H), 1.98-1.89 (m, 1H), 1.43-1.26 (m, 2H), 1.19 (s, 3H), 1.18-1.04 (m, 2H), 0.80-0.65 (m, 2H).

Example 18: (2S,3S,4R)-2-amino-3-(3-boronopropyl)-7-azabicyclo[2.2.1]heptane-2-carboxylic Acid

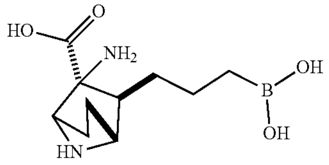

Step 1: tert-butyl 2-allyl-3-oxo-7-azabicyclo[2.2.1]heptane-7-carboxylate

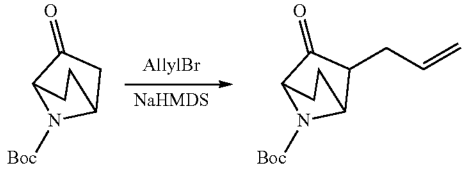

NaHMDS (10 mL, 10 mmol, 1.0 M in THF) was added to a mixture of tert-butyl 2-oxo-7-azabicyclo[2.2.1]heptane-7-carboxylate (2.0 g, 9.5 mmol) in THF (30 mL) at −40° C. under $N_2$. The resulting mixture was stirred at −40° C. for 0.5 h, followed by dropwise addition of pyrrolidine (0.34 g, 4.7 mmol) in THF (1.0 mL) at −40° C., and subsequent dropwise addition of 3-bromoprop-1-ene (0.86 mL, 9.9 mmol) in THF (1.0 mL) at −40° C. under $N_2$. The reaction mixture was stirred at −40° C. for 0.5 h, then warmed to 25° C. and stirred for additional 14 h. The reaction mixture was quenched with water, and extracted with EtOAc. The combined organic layers were washed with brine, dried over anhydrous $Na_2SO_4$, filtered and concentrated in vacuo to give a crude mixture of tert-butyl 2,2-diallyl-3-oxo-7-azabicyclo[2.2.1]heptane-7-carboxylate, tert-butyl 2-allyl-3-oxo-7-azabicyclo[2.2.1]heptane-7-carboxylate, and tert-butyl 2-oxo-7-azabicyclo[2.2.1]heptane-7-carboxylate, which was used in the next steps without further purification. LCMS ($C_{10}H_{14}NO_3^+$ (ES, m/z): 196 $[M+H-C_4H_8]^+$.

Step 2: 3-allyl-7-azabicyclo[2.2.1]heptan-2-one

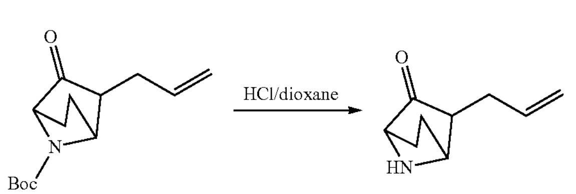 [SMILES: C=CCC1C(=O)C2CCC1N2C(=O)OC(C)(C)C ; "HCl/dioxane" ; C=CCC1C(=O)C2CCC1N2]

4N HCl in dioxane (20 mL, 80 mmol) was added to a mixture of tert-butyl 2,2-diallyl-3-oxo-7-azabicyclo[2.2.1]heptane-7-carboxylate, tert-butyl 2-allyl-3-oxo-7-azabicyclo[2.2.1]heptane-7-carboxylate, and tert-butyl 2-oxo-7-azabicyclo[2.2.1]heptane-7-carboxylate (6.3 g, 8.4 mmol) in DCM (4.0 mL) at 25° C., and the mixture was stirred at 25° C. for 2 h. The reaction mixture was concentrated in vacuo to give a crude mixture of 3,3-diallyl-7-azabicyclo[2.2.1]heptan-2-one, 3-allyl-7-azabicyclo[2.2.1]heptan-2-one, and 7-azabicyclo[2.2.1]heptan-2-one, which was used in the next step without further purification. LCMS ($C_9H_{14}NO^+$) (ES, m/z): 152 $[M+H]^+$.

Step 3: (1R,2S)-benzyl 2-allyl-3-oxo-7-azabicyclo[2.2.1]heptane-7-carboxylate

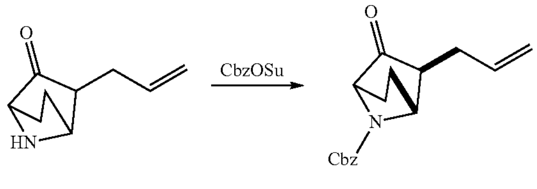 [SMILES: C=CCC1C(=O)C2CCC1N2 ; "CbzOSu" ; C=CC[C@@H]1C(=O)C2CC[C@H]1N2C(=O)OCc1ccccc1]

Benzyl (2,5-dioxopyrrolidin-1-yl) carbonate (7.0 g, 28 mmol) was added to a mixture of 3,3-diallyl-7-azabicyclo[2.2.1]heptan-2-one, 3-allyl-7-azabicyclo[2.2.1]heptan-2-one, and 7-azabicyclo[2.2.1]heptan-2-one (6.3 g, 14 mmol) and triethylamine (10 mL, 72 mmol) in DCM (80 mL) at 25° C., and the mixture was stirred at 25° C. for 3 h. The reaction mixture was quenched with saturated aqueous $NaHCO_3$ and extracted with DCM. The combined organic layers were washed with brine, dried over anhydrous $Na_2SO_4$, filtered, and concentrated, and the residue was purified by silica gel column chromatography (EtOAc in hexanes) to give a mixture of benzyl 2-allyl-3-oxo-7-azabicyclo[2.2.1]heptane-7-carboxylate compound with benzyl 2,2-diallyl-3-oxo-7-azabicyclo[2.2.1]heptane-7-carboxylate and benzyl 2-allyl-3-oxo-7-azabicyclo[2.2.1]heptane-7-carboxylate, which was further purified by RP-HPLC [C18 column, water (0.1% TFA)-$CH_3CN$] to give (1R,2S)-benzyl 2-allyl-3-oxo-7-azabicyclo[2.2.1]heptane-7-carboxylate, and the stereochemistry was assigned by 2D NMR. LCMS ($C_{17}H_{20}NO_3^+$) (ES, m/z): 286 $[M+H]^+$. $^1H$ NMR (400 MHz, MeOD) δ 7.41-7.27 (m, 5H), 5.88-5.75 (m, 1H), 5.14 (s, 2H), 5.11-5.01 (m, 2H), 4.55-4.50 (m, 1H), 4.32-4.27 (m, 1H), 2.62-2.53 (m, 1H), 2.52-2.42 (m, 1H), 2.09-2.02 (m, 1H), 1.99-1.90 (m, 1H), 1.89-1.71 (m, 2H), 1.57-1.47 (m, 1H).

Step 4: (3S,4R)-benzyl 2-acetamido-3-allyl-2-(tert-butylcarbamoyl)-7-azabicyclo[2.2.1]heptane-7-carboxylate

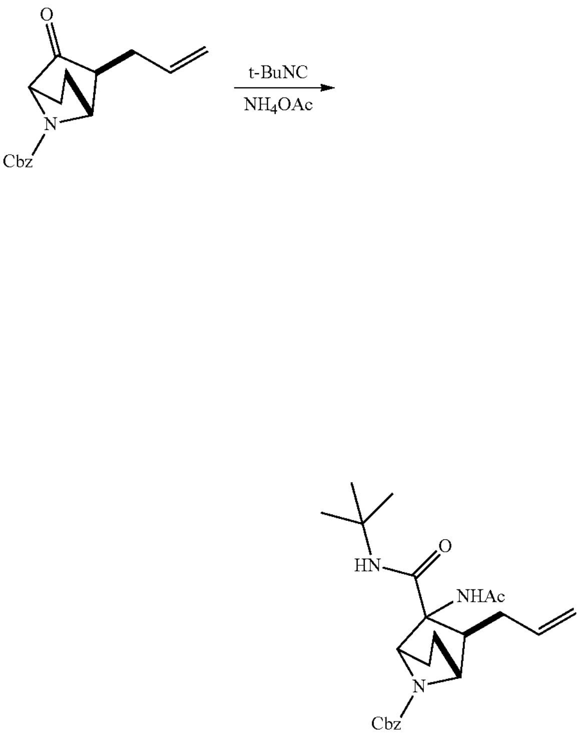

Tert-butyl isocyanide (0.60 mL, 5.3 mmol) was added to a mixture of (R,2S)-benzyl 2-allyl-3-oxo-7-azabicyclo[2.2.1]heptane-7-carboxylate (500 mg, 1.8 mmol) and ammonium acetate (540 mg, 7.0 mmol) in 2,2,2-trifluoroethyl alcohol (5.0 mL) under $N_2$. The reaction mixture was allowed to stir at 40° C. for 13 h, and then quenched with water and extracted with EtOAc. The combined organic layers were washed with brine, dried over anhydrous $Na_2SO_4$, filtered, and concentrated in vacuo. The residue was purified by silica gel column chromatography (EtOAc in hexanes) to give (3S,4R)-benzyl 2-acetamido-3-allyl-2-(tert-butylcarbamoyl)-7-azabicyclo[2.2.1]heptane-7-carboxylate as a mixture of isomers. LCMS ($C_{24}H_{34}N_3O_4^+$) (ES, m/z): 428 $[M+H]^+$.

Step 5: (2S,3S,4R)-benzyl 2-acetamido-3-allyl-2-(tert-butylcarbamoyl)-7-azabicyclo[2.2.1]heptane-7-carboxylate

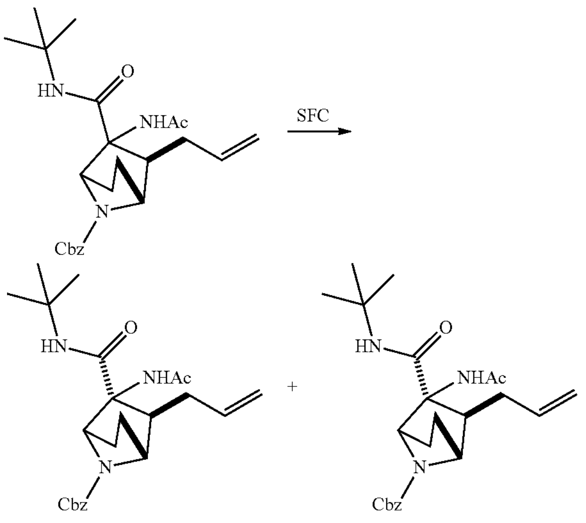

Peak 1

Peak 2

The (3S,4R)-benzyl 2-acetamido-3-allyl-2-(tert-butylcarbamoyl)-7-azabicyclo[2.2.1]heptane-7-carboxylate as a mixture of isomers (660 mg, 1.5 mmol) was resolved by chiral SFC [Column: DAICEL CHIRALPAK IC (250 mm*30 mm, 5 um), Mobile phase: A: $CO_2$, B: IPA (0.1% $NH_3 \cdot H_2O$), Gradient: 35% of B in 5.5 minutes, and hold 35% of B for 1 min, Flow Rate (mL/min) 60, Column temperature: 40° C.] to give (2S,3S,4R)-benzyl 2-acetamido-3-allyl-2-(tert-butylcarbamoyl)-7-azabicyclo[2.2.1]heptane-7-carboxylate (Peak 1, $t_r$=4.50 min) as the first eluting peak, and (2S,3S,4R)-benzyl 2-acetamido-3-allyl-2-(tert-butylcarbamoyl)-7-azabicyclo[2.2.1]heptane-7-carboxylate (Peak 2, $t_r$=4.96 min) as the second eluting peak. The stereochemistry was assigned by 2D NMR. LCMS ($C_{24}H_{34}N_3O_4^+$) (ES, m/z): 428 $[M+H]^+$. Peak 1: $^1H$ NMR (400 MHz, $CDCl_3$) δ 7.39-7.27 (m, 5H), 6.81 (br s, 1H), 5.94 (s, 1H), 5.86-5.73 (m, 1H), 5.24-5.05 (m, 5H), 4.23 (t, J=3.9 Hz, 1H), 2.77-2.66 (m, 1H), 2.27-2.06 (m, 2H), 2.00 (s, 3H), 1.69-1.59 (m, 4H), 1.23 (s, 9H).

Step 6: (2S,3S,4R)-benzyl 2-acetamido-2-(tert-butylcarbamoyl)-3-(3-(4,4,5,5-tetramethyl-1,3,2-dioxaborolan-2-yl)propyl)-7-azabicyclo[2.2.1]heptane-7-carboxylate

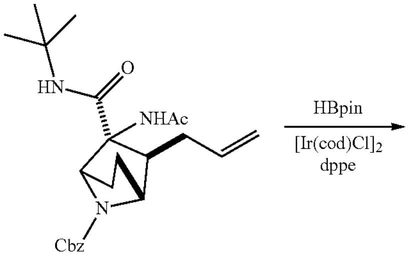

Peak 1

-continued

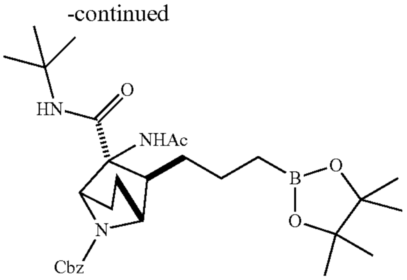

$[Ir(cod)Cl]_2$ (19 mg, 0.028 mmol) and dppe (22 mg, 0.056 mmol) were added to a stirred mixture of 4,4,5,5-tetramethyl-1,3,2-dioxaborolane (0.24 mL, 1.7 mmol) in anhydrous DCM (5.0 mL) at 25° C. under $N_2$ for 20 minutes, and the resulting mixture was treated with (2S,3S,4R)-benzyl 2-acetamido-3-allyl-2-(tert-butylcarbamoyl)-7-azabicyclo[2.2.1]heptane-7-carboxylate (240 mg, 0.56 mmol) and stirred at 25° C. for 12 h under $N_2$. The reaction mixture was concentrated in vacuo and the residue was purified by silica gel column chromatography (EtOAc in hexanes) to give (2S,3S,4R)-benzyl 2-acetamido-2-(tert-butylcarbamoyl)-3-(3-(4,4,5,5-tetramethyl-1,3,2-dioxaborolan-2-yl)propyl)-7-azabicyclo[2.2.1]heptane-7-carboxylate LCMS ($C_{30}H_{47}BN_3O_6^+$) (ES, m/z): 556 $[M+H]^+$.

Step 7: (2S,3S,4R)-2-amino-3-(3-boronopropyl)-7-azabicyclo[2.2.1]heptane-2-carboxylic Acid

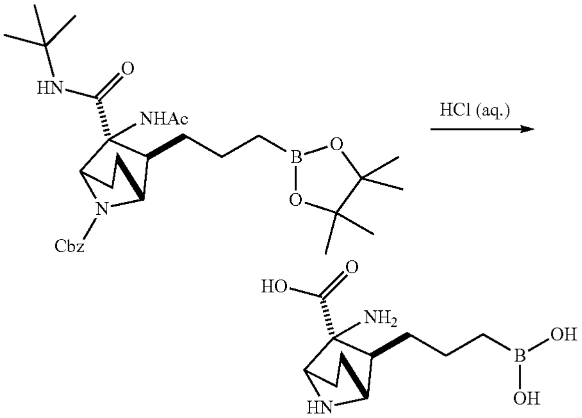

Example 18

A mixture of (2S,3S,4R)-benzyl 2-acetamido-2-(tert-butylcarbamoyl)-3-(3-(4,4,5,5-tetramethyl-1,3,2-dioxaborolan-2-yl)propyl)-7-azabicyclo[2.2.1]heptane-7-carboxylate (290 mg, 0.52 mmol) and 12N HCl in water (5.0 mL, 60 mmol) was stirred at 105° C. for 13 h. The reaction mixture was washed with DCM, and the aqueous layer was concentrated in vacuum. The residue was dissolved in saturated aqueous $Na_2CO_3$ and washed with DCM, and the aqueous layer was concentrated in vacuum. The crude product was purified by RP-HPLC [C18 column, water (20 mM HFBA and 0.1% TFA)-$CH_3CN$] to give (2S,3S,4R)-2-amino-3-(3-boronopropyl)-7-azabicyclo[2.2.1]heptane-2-carboxylic acid as an HFBA salt. LCMS ($C_{10}H_{18}BN_2O_3^+$) (ES, m/z): 225 $[M+H-H_2O]^+$. $^1H$ NMR (400 MHz, $D_2O$) δ 4.52-4.39 (m, 1H), 4.36-4.17 (m, 1H), 2.79-2.29 (m, 1H), 2.07-1.72 (m, 5H), 1.56-0.91 (m, 3H), 0.84-0.36 (m, 2H)

Example 19: (4aS,5S,7aR)-4a-(3-boronopropyl)octahydro-1H-pyrrolo[3,4-b]pyridine-5-carboxylic Acid

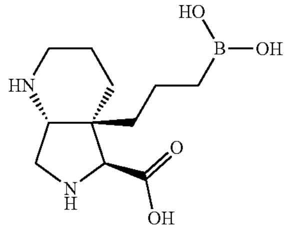

Step 1: 1-(tert-butyl) 2-methyl (2S,3S)-3-allyl-3-(3-((tert-butyldimethylsilyl)oxy)propyl)-4-oxopyrrolidine-1,2-dicarboxylate

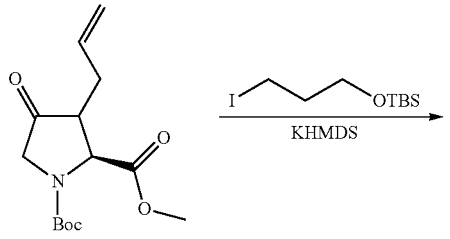

1

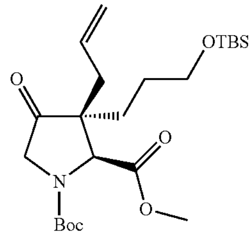

2

Potassium bis(trimethylsilyl)amide (4.2 mL, 2.1 mmol, 0.5 M in toluene) was added dropwise to a stirred solution of (2S)-1-tert-butyl 2-methyl 3-allyl-4-oxopyrrolidine-1,2-dicarboxylate (500 mg, 1.8 mmol) in THF (6.0 mL) and DMPU (2.0 mL) at −78° C. under $N_2$, and the resulting mixture was stirred at −78° C. for 1 h, followed by addition of tert-butyl(3-iodopropoxy)dimethylsilane (636 mg, 2.1 mmol) in one portion. The reaction mixture was stirred at −78° C. for 1 h, then warmed to 25° C. and stirred at 25° C. for additional 16 h. The reaction mixture was quenched by saturated aqueous $NH_4Cl$, then diluted with water, and extracted with EtOAc. The combined organic layers were washed with brine, dried over anhydrous $Na_2SO_4$, filtered, and concentrated in vacuo. The residue was purified by flash silica gel chromatography (EtOAc in hexanes) to give (2S,3S)-1-tert-butyl 2-methyl 3-allyl-3-(3-((tert-butyldimethylsilyl)oxy)propyl)-4-oxopyrrolidine-1,2-dicarboxylate. LCMS ($C_{18}H_{34}NO_4Si^+$) (ES, m/z): 356 [M+H−Boc]$^+$.

Step 2: 1-(tert-butyl) 2-methyl (2S,3S,4S)-3-allyl-3-(3-((tert-butyldimethylsilyl)oxy)propyl)-4-hydroxypyrrolidine-1,2-dicarboxylate

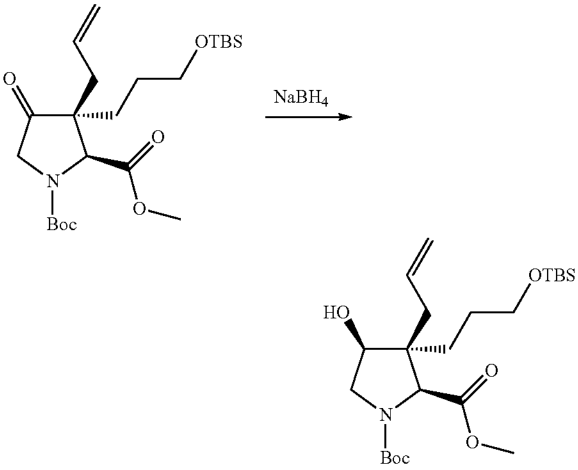

$NaBH_4$ (264 mg, 3.5 mmol) was added to a stirred solution of (2S,3S)-1-tert-butyl 2-methyl 3-allyl-3-(3-((tert-butyldimethylsilyl)oxy)propyl)-4-oxopyrrolidine-1,2-dicarboxylate (530 mg, 1.2 mmol) in MeOH (10 mL) at 0° C. under $N_2$, and the reaction mixture was stirred at 0° C. for 1 h, then at 25° C. for additional 12 h. The reaction mixture was quenched by addition of saturated aqueous $NH_4Cl$, then diluted with water, and extracted with EtOAc. The combined organic layers were washed with brine, dried over anhydrous $Na_2SO_4$, filtered, and concentrated in vacuo. The residue was purified by flash silica gel chromatography (EtOAc in hexanes) to give (2S,3S,4S)-1-tert-butyl 2-methyl 3-allyl-3-(3-((tert-butyldimethylsilyl)oxy)propyl)-4-hydroxypyrrolidine-1,2-dicarboxylate. LCMS ($C_{18}H_{36}NO_4Si^+$) (ES, m/z): 358 [M+H−Boc]$^+$.

Step 3: 1-(tert-butyl) 2-methyl (2S,3S,4S)-3-allyl-4-hydroxy-3-(3-hydroxypropyl)pyrrolidine-1,2-dicarboxylate

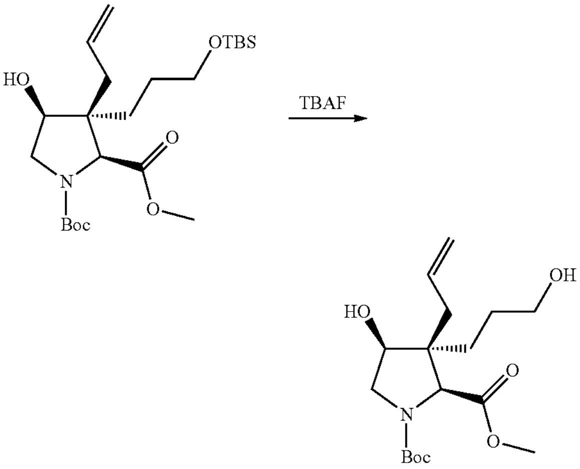

A mixture of TBAF (1.0 M in THF, 1.1 mL, 1.1 mmol) and (2S,3S,4S)-1-tert-butyl 2-methyl 3-allyl-3-(3-((tert-butyldimethylsilyl)oxy)propyl)-4-hydroxypyrrolidine-1,2-dicarboxylate (350 mg, 0.77 mmol) in THF (5.0 mL) was stirred at 0° C. for 1 h, and the reaction mixture was quenched by saturated aqueous $NH_4Cl$, then diluted with water, and extracted with EtOAc. The combined organic layers were washed with brine, dried over anhydrous $Na_2SO_4$, filtered, and concentrated in vacuo. The residue was purified by flash silica gel chromatography (EtOAc in hexanes) to give (2S,3S,4S)-1-tert-butyl 2-methyl 3-allyl-4-hydroxy-3-(3-hydroxypropyl)pyrrolidine-1,2-dicarboxylate. LCMS ($C_{17}H_{29}NO_6Na^+$) (ES, m/z): 366 $[M+Na]^+$.

Step 4: 1-(tert-butyl) 2-methyl (2S,3S,4S)-3-allyl-4-(((chloromethyl)sulfonyl)oxy)-3-(3-chloropropyl)pyrrolidine-1,2-dicarboxylate

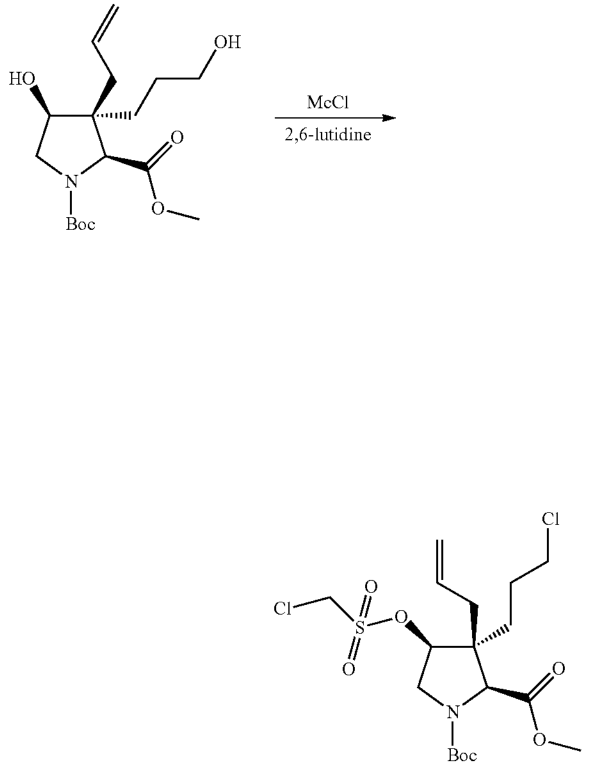

Chloromethanesulfonyl chloride (39 mg, 0.26 mmol) was added to a solution of 2,6-dimethylpyridine (187 mg, 1.7 mmol) and (2S,3S,4S)-1-tert-butyl 2-methyl 3-allyl-4-hydroxy-3-(3-hydroxypropyl)pyrrolidine-1,2-dicarboxylate (30 mg, 0.087 mmol) in DCM (1.0 mL) at 0° C., and the resulting mixture was stirred at 0° C. for 2 h, then at 28° C. for additional 12 h. The reaction mixture was quenched by addition of saturated aqueous $NH_4Cl$, then diluted with water, and extracted with DCM. The combined organic layers were washed with brine, dried over anhydrous $Na_2SO_4$, filtered, and concentrated in vacuo to give crude (2S,3S,4S)-1-tert-butyl 2-methyl 3-allyl-4-(((chloromethyl)sulfonyl)oxy)-3-(3-chloropropyl)pyrrolidine-1,2-dicarboxylate, which was used in the next step without further purification. LCMS ($C_{18}H_{29}Cl_2NO_7SNa^+$) (ES, m/z): 496 $[M+Na]^+$.

Step 5: 6-(tert-butyl) 5-methyl (4aR,5S,7aR)-4a-allyl-1-benzyloctahydro-6H-pyrrolo[3,4-b]pyridine-5,6-dicarboxylate

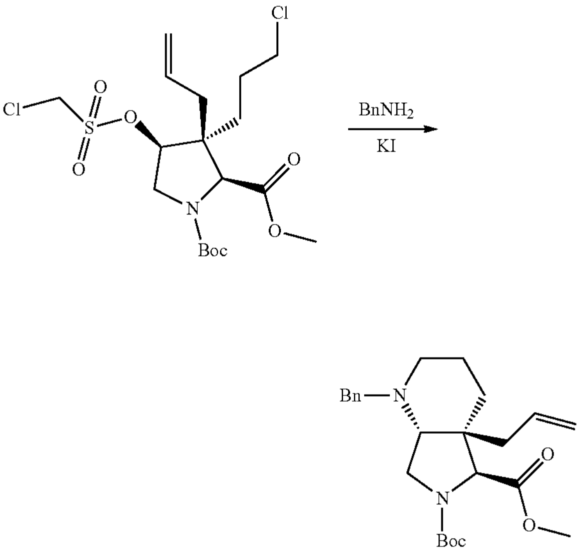

Benzylamine (1.7 g, 16 mmol) was added to a mixture of (2S,3S,4S)-1-tert-butyl 2-methyl 3-allyl-4-(((chloromethyl)sulfonyl)oxy)-3-(3-chloropropyl)pyrrolidine-1,2-dicarboxylate (150 mg, 0.32 mmol) and KI (5.3 mg, 0.032 mmol) in DMF (5.0 mL) under $N_2$. The resulting mixture was stirred at 70° C. for 2 h, then at 50° C. for additional 12 h. The reaction mixture was filtered and concentrated in vacuo, and the residue was purified by flash silica gel chromatography (EtOAc in hexanes) to give ((4aR,5S,7aR)-6-tert-butyl 5-methyl 4a-allyl-1-benzylhexahydro-1H-pyrrolo[3,4-b]pyridine-5,6(2H)-dicarboxylate. The stereochemistry was assigned by 2D NMR. LCMS ($C_{24}H_{35}N_2O_4^+$) (ES, m/z): 415 $[M+H]^+$. $^1H$ NMR (400 MHz, $CDCl_3$) δ 7.30-7.22 (m, 5H), 6.02-5.56 (m, 1H), 5.27-4.95 (m, 2H), 4.13-3.88 (m, 1H), 3.70-3.64 (m, 3H), 3.63-3.41 (m, 3H), 3.36-3.13 (m, 1H), 2.78 (m, 1H), 2.57-2.33 (m, 2H), 1.94-1.77 (m, 1H), 1.68 (m, 1H), 1.47-1.46 (m, 4H), 1.44-1.34 (m, 7H), 1.29-1.18 (m, 1H), 0.95-0.72 (m, 1H).

Step 6: 6-(tert-butyl) 5-methyl (4aS,5S,7aR)-1-benzyl-4a-(3-(4,4,5,5-tetramethyl-1,3,2-dioxaborolan-2-yl)octahydro-6H-pyrrolo[3,4-b]pyridine-5,6-dicarboxylate

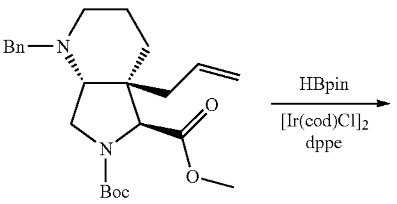

-continued

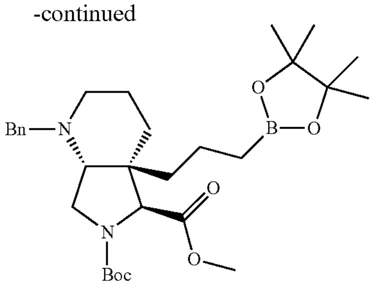

(4aR,5S,7aR)-6-tert-butyl 5-methyl 4a-allyl-1-benzyl-hexahydro-1H-pyrrolo[3,4-b]pyridine-5,6(2H)-dicarboxylate (80 mg, 0.19 mmol) in DCM (1.0 mL) was added to a stirred solution of 1,2-bis(diphenylphosphino)ethane (6.2 mg, 0.015 mmol), $[Ir(cod)Cl]_2$ (6.5 mg, 9.7 μmol) and 4,4,5,5-tetramethyl-1,3,2-dioxaborolane (0.14 mL, 0.97 mmol) in anhydrous DCM (2.0 mL) under $N_2$, and the resulting mixture was stirred at 25° C. for 15 h under $N_2$. The reaction mixture was concentrated, and the residue was purified by flash silica gel chromatography (EtOAc in hexanes) to give (4aS,5S,7aR)-6-tert-butyl 5-methyl 1-benzyl-4a-(3-(4,4,5,5-tetramethyl-1,3,2-dioxaborolan-2-yl)propyl)hexahydro-1H-pyrrolo[3,4-b]pyridine-5,6(2H)-dicarboxylate. LCMS ($C_{30}H_{48}BN_2O_6^+$) (ES, m/z): 543 $[M+H]^+$.

Step 7: 6-(tert-butyl) 5-methyl (4aS,5S,7aR)-4a-(3-(4,4,5,5-tetramethyl-1,3,2-dioxaborolan-2-yl)propyl) octahydro-6H-pyrrolo[3,4-b]pyridine-5,6-dicarboxylate

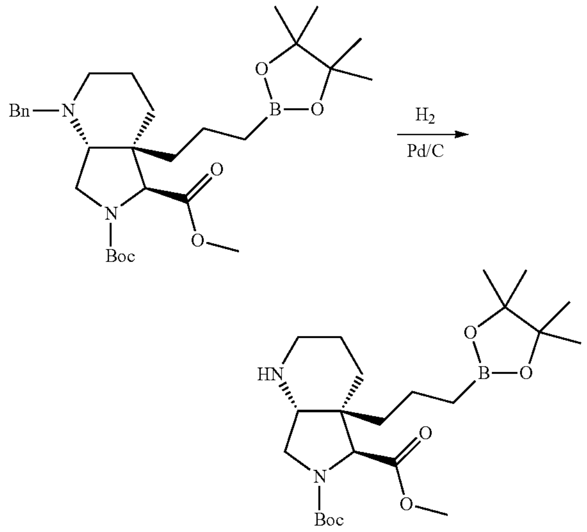

10% Pd—C (12 mg, 0.011 mmol) was added to a solution of (4aS,5S,7aR)-6-tert-butyl 5-methyl 1-benzyl-4a-(3-(4,4,5,5-tetramethyl-1,3,2-dioxaborolan-2-yl)propyl)hexahydro-1H-pyrrolo[3,4-b]pyridine-5,6(2H)-dicarboxylate (60 mg, 0.11 mmol) in MeOH (2.0 mL) under $N_2$. The resulting mixture was degassed and backfilled with $H_2$, and then stirred under $H_2$ (Pressure: 15 psi) at 25° C. for 2 h. The reaction mixture was filtered, and then concentrated under reduced pressure to give a crude mixture of 6-(tert-butyl) 5-methyl (4aS,5S,7aR)-4a-(3-(4,4,5,5-tetramethyl-1,3,2-dioxaborolan-2-yl)propyl)octahydro-6H-pyrrolo[3,4-b]pyridine-5,6-dicarboxylate which contained corresponding boronic acid. The crude mixture was used in next step directly without further purification. LCMS ($C_{17}H_{32}BN_2O_6^+$) (ES, m/z): 371 $[M-C_6H_{10}+H]^+$.

Step 8: (4aS,5S,7aR)-4a-(3-boronopropyl)octahydro-1H-pyrrolo[3,4-b]pyridine-5-carboxylic Acid

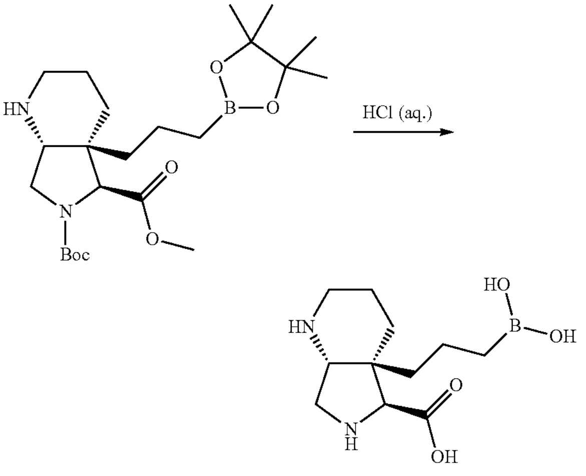

Example 19

A mixture of (4aS,5S,7aR)-6-tert-butyl 5-methyl 4a-(3-(4,4,5,5-tetramethyl-1,3,2-dioxaborolan-2-yl)propyl)hexahydro-1H-pyrrolo[3,4-b]pyridine-5,6(2H)-dicarboxylate (50 mg, 0.111 mmol) and 12 N HCl in water (5.0 mL, 60 mmol) was stirred at 110° C. for 12 h under $N_2$, and the resulting mixture was concentrated in vacuo. The residue was purified by RP-HPLC [C18 column, water (20 mM HFBA and 0.1% TFA)-$CH_3CN$] to give (4aS,5S,7aR)-4a-(3-boronopropyl)octahydro-1H-pyrrolo[3,4-b]pyridine-5-carboxylic acid as an HFBA salt. LCMS ($C_{11}H_{20}BN_2O_3^+$) (ES, m/z): 239 $[M+H-H_2O]^+$. $^1H$ NMR (500 MHz, $D_2O$) δ 4.27 (br s, 1H), 3.95-3.93 (m, 2H), 3.54-3.51 (m, 1H), 3.36-3.33 (m, 1H), 2.99-2.94 (m, 1H), 2.04-2.01 (m, 1H), 1.90-1.74 (m, 3H), 1.42-1.41 (m, 2H), 1.35-1.24 (m, 2H), 0.74 (br s, 2H).

Example 20: (4aR,5S,7aR)-1-(L-alanyl)-4a-(3-boronopropyl)octahydro-1H-pyrrolo[3,4-b]pyridine-5-carboxylic Acid

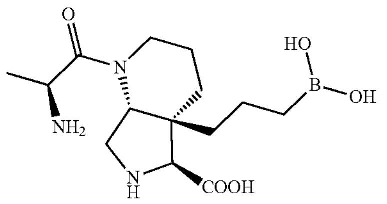 [SMILES: C[C@H](N)C(=O)N1CCC[C@]2(CCCB(O)O)[C@@H](C(=O)O)NC[C@H]12]

Step 1: 6-(tert-butyl) 5-methyl (4aS,5S,7aR)-1-((tert-butoxycarbonyl)-L-alanyl)-4a-(3-(4,4,5,5-tetramethyl-1,3,2-dioxaborolan-2-yl)propyl)octahydro-6H-pyrrolo[3,4-b]pyridine-5,6-dicarboxylate

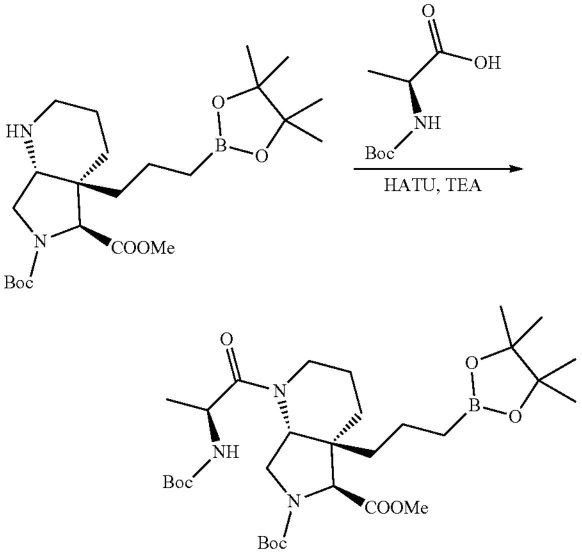

HATU (109 mg, 0.29 mmol) was added to a mixture of (4aS,5S,7aR)-6-tert-butyl 5-methyl 4a-(3-(4,4,5,5-tetramethyl-1,3,2-dioxaborolan-2-yl)propyl)hexahydro-1H-pyrrolo[3,4-b]pyridine-5,6(2H)-dicarboxylate (100 mg, 0.22 mmol), (S)-2-((tert-butoxycarbonyl)amino)propanoic acid (50 mg, 0.27 mmol), and $Et_3N$ (0.092 mL, 0.66 mmol) in DMF (2.0 mL) at 20° C., and the resulting mixture was stirred at 20° C. for 1 h. The reaction mixture was quenched by water and extracted with EtOAc, and the combined organic phases were dried over $Na_2SO_4$, filtered, and concentrated in vacuo. The residue was purified by flash silica gel chromatography (EtOAc in hexanes) to give (4aS,5S,7aR)-6-tert-butyl 5-methyl 1-((S)-2-((tert-butoxycarbonyl)amino)propanoyl)-4a-(3-(4,4,5,5-tetramethyl-1,3,2-dioxaborolan-2-yl)propyl)hexahydro-1H-pyrrolo[3,4-b]pyridine-5,6(2H)-dicarboxylate. LCMS ($C_{31}H_{55}BN_3O_9^+$) (ES, m/z): 624 $[M+H]^+$.

Step 2: (4aR,5S,7aR)-1-(L-alanyl)-4a-(3-boronopropyl)octahydro-1H-pyrrolo[3,4-b]pyridine-5-carboxylic Acid

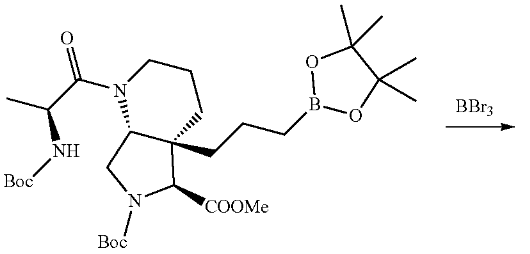

-continued

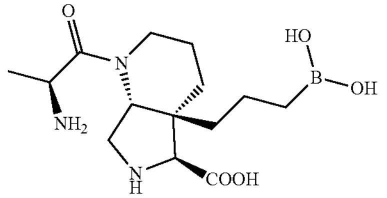

Example 20

$BBr_3$ (0.70 mL, 0.11 mmol) was added to a solution of (4aS,5S,7aR)-6-tert-butyl 5-methyl 1-((S)-2-((tert-butoxycarbonyl)amino)propanoyl)-4a-(3-(4,4,5,5-tetramethyl-1,3,2-dioxaborolan-2-yl)propyl)hexahydro-1H-pyrrolo[3,4-b]pyridine-5,6(2H)-dicarboxylate (70 mg, 0.11 mmol) in DCM (1.0 mL) at 0° C., and the resulting mixture was stirred for 16 h at 15° C. The reaction mixture was concentrated in vacuo, and the residue was purified by RP-HPLC [C18 column, water (20 mM HFBA and 0.1% TFA)-$CH_3CN$] to give the (4aR,5S,7aR)-1-((S)-2-aminopropanoyl)-4a-(3-boronopropyl)octahydro-1H-pyrrolo[3,4-b]pyridine-5-carboxylic acid as an HFBA salt. LCMS ($C_{14}H_{25}BN_3O_4^+$) (ES, m/z): 310 $[M+H-H_2O]^+$. $^1H$ NMR (400 MHz, $D_2O$) δ 4.76-4.71 (m, 1H), 4.36-4.31 (m, 1H), 4.02 (s, 1H), 3.60-3.52 (m, 2H), 3.36-3.30 (m, 1H), 3.17-3.10 (m, 1H), 1.87-1.83 (m, 1H), 1.62-1.46 (m, 3H), 1.41-1.26 (m, 6H), 1.08-1.01 (m, 1H), 0.64-0.53 (m, 2H).

Example 21: (4aR,5S,7aR)-1-(L-valyl)-4a-(3-boronopropyl)octahydro-1H-pyrrolo[3,4-b]pyridine-5-carboxylic Acid

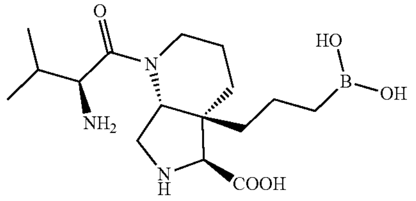 [SMILES: CC(C)[C@H](N)C(=O)N1CCC[C@]2(CCCB(O)O)[C@@H](C(=O)O)NC[C@H]12]

Step 1: 6-(tert-butyl) 5-methyl (4aS,5S,7aR)-1-((tert-butoxycarbonyl)-L-valyl)-4a-(3-(4,4,5,5-tetramethyl-1,3,2-dioxaborolan-2-yl)propyl)octahydro-6H-pyrrolo[3,4-b]pyridine-5,6-dicarboxylate

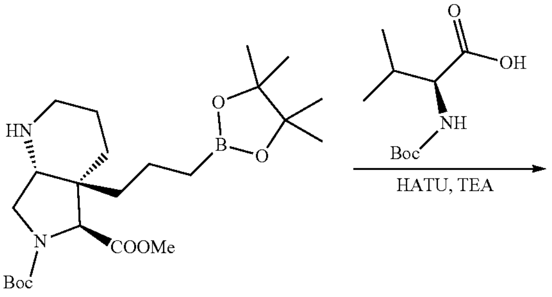

-continued

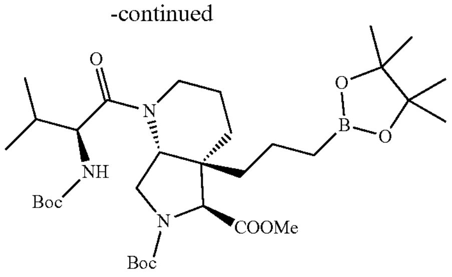

HATU (109 mg, 0.29 mmol) was added to a mixture of (4aS,5S,7aR)-6-tert-butyl 5-methyl 4a-(3-(4,4,5,5-tetramethyl-1,3,2-dioxaborolan-2-yl)propyl)hexahydro-1H-pyrrolo[3,4-b]pyridine-5,6(2H)-dicarboxylate (100 mg, 0.22 mmol), (S)-2-((tert-butoxycarbonyl)amino)-3-methylbutanoic acid (58 mg, 0.27 mmol) and $Et_3N$ (0.092 mL, 0.66 mmol) in DMF (2.0 mL) at 20° C., and the resulting mixture was stirred at 20° C. for 1 h. The reaction mixture was quenched by water and extracted with EtOAc, and the combined organic phases were dried over $Na_2SO_4$, filtered, and concentrated in vacuo. The residue was purified by flash silica gel chromatography (EtOAc in hexanes) to give (4aS,5S,7aR)-6-tert-butyl 5-methyl 1-((S)-2-((tert-butoxycarbonyl)amino)-3-methylbutanoyl)-4a-(3-(4,4,5,5-tetramethyl-1,3,2-dioxaborolan-2-yl)propyl)hexahydro-1H-pyrrolo[3,4-b]pyridine-5,6(2H)-dicarboxylate. LCMS ($C_{33}H_{59}BN_3O_9^+$) (ES, m/z): 652 $[M+H]^+$.

Step 2: (4aR,5S,7aR)-1-(L-valyl)-4a-(3-boronopropyl)octahydro-1H-pyrrolo[3,4-b]pyridine-5-carboxylic Acid

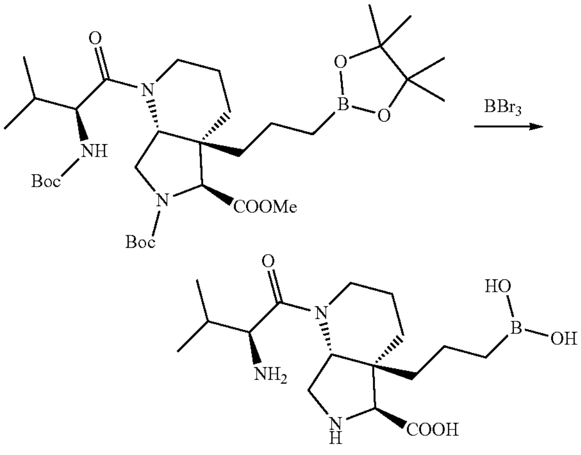

Example 21

$BBr_3$ (0.50 mL, 0.14 mmol) was added to a solution of (4aS,5S,7aR)-6-tert-butyl 5-methyl 1-((S)-2-((tert-butoxycarbonyl)amino)-3-methylbutanoyl)-4a-(3-(4,4,5,5-tetramethyl-1,3,2-dioxaborolan-2-yl)propyl)hexahydro-1H-pyrrolo[3,4-b]pyridine-5,6(2H)-dicarboxylate (90 mg, 0.14 mmol) in DCM (1.0 mL) at 0° C., and the resulting mixture was stirred for 16 h. The reaction mixture was concentrated in vacuo, and the residue was purified by RP-HPLC [C18 column, water (20 mM HFBA and 0.1% TFA)-$CH_3CN$]) to give the (4aR,5S,7aR)-1-((S)-2-amino-3-methylbutanoyl)-4a-(3-boronopropyl)octahydro-1H-pyrrolo[3,4-b]pyridine-5-carboxylic acid as an HFBA salt. LCMS ($C_{16}H_{29}BN_3O_4^+$) (ES, m/z): 338 $[M+H-H_2O]^+$. $^1H$ NMR (500 MHz, $D_2O$) δ 4.81-4.77 (m, 1H), 4.32-4.31 (m, 1H), 4.10 (s, 1H), 3.75-3.70 (m, 1H), 3.64-3.59 (m, 1H), 3.40-3.36 (m, 1H), 3.21-3.15 (m, 1H), 2.17-2.16 (m, 1H), 1.92-1.90 (m, 1H), 1.65-1.55 (m, 3H), 1.44-1.29 (m, 3H), 1.14-1.08 (m, 1H), 1.01 (d, J=6.9 Hz, 3H), 0.88 (d, J=6.9 Hz, 3H), 0.74-0.56 (m, 2H).

Example 22: (1S,2R,4R)-2-(3-boronopropyl)-7-azabicyclo[2.2.1]heptane-1-carboxylic Acid

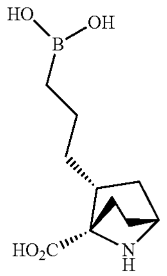 [SMILES: O=C(O)[C@]12CC[C@H](C[C@H]1CCCB(O)O)N2]

Step 1: methyl (1S,2S,4R)-7-benzoyl-2-((E)-3-(4,4,5,5-tetramethyl-1,3,2-dioxaborolan-2-yl)prop-1-en-1-yl)-7-azabicyclo[2.2.1]heptane-1-carboxylate

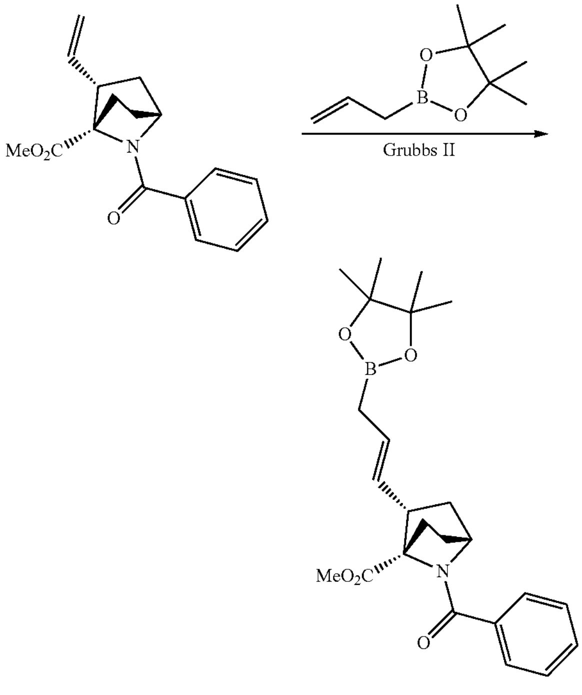

Grubbs' catalyst G2 (74 mg, 0.088 mmol) was added to a mixture of (1S,2S,4R)-methyl 7-benzoyl-2-vinyl-7-azabicyclo[2.2.1]heptane-1-carboxylate (500 mg, 1.8 mmol) and 2-allyl-4,4,5,5-tetramethyl-1,3,2-dioxaborolane (883 mg, 5.3 mmol) in DCM (13 mL) under argon at ambient temperature, and the resulting mixture was stirred at 35° C. for 48 h. The reaction mixture was concentrated in vacuo, and the residue was purified by flash silica gel chromatography (EtOAc in hexanes) to give (1S,2S,4R)-methyl 7-benzoyl-2-((E)-3-(4,4,5,5-tetramethyl-1,3,2-dioxaborolan-2-yl)prop-1-en-1-yl)-7-azabicyclo[2.2.1]heptane-1-carboxylate. LCMS ($C_{24}H_{33}BNO_5^+$) (ES, m/z): 426 $[M+H]^+$.

Step 2: methyl (1S,2R,4R)-7-benzoyl-2-(3-(4,4,5,5-tetramethyl-1,3,2-dioxaborolan-2-yl)propyl)-7-azabicyclo[2.2.1]heptane-1-carboxylate

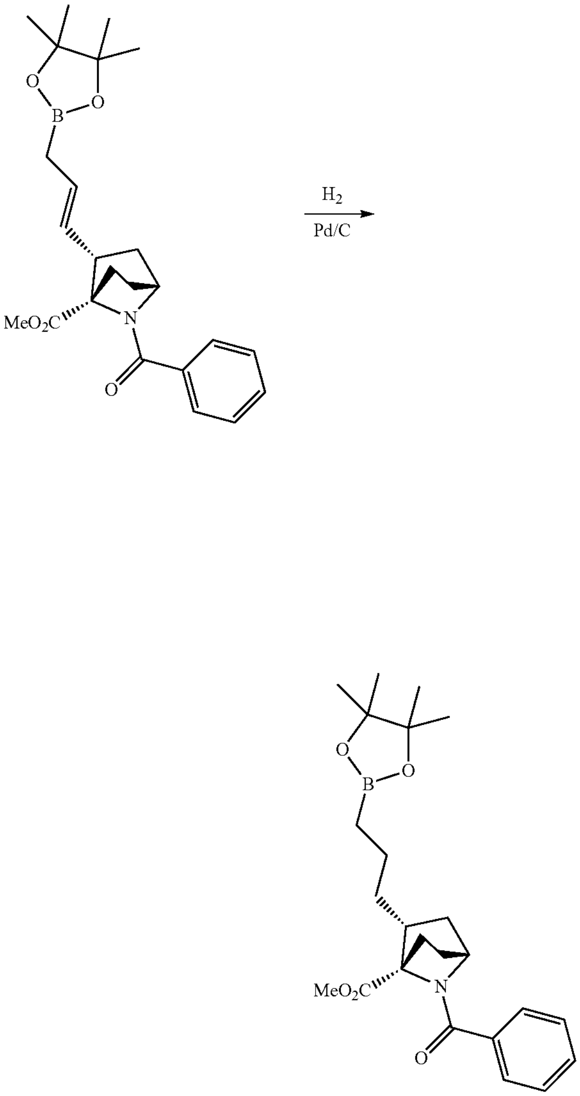

10% Pd—C (78 mg, 0.073 mmol) was added to a solution of (1S,2S,4R)-methyl 7-benzoyl-2-((E)-3-(4,4,5,5-tetramethyl-1,3,2-dioxaborolan-2-yl)prop-1-en-1-yl)-7-azabicyclo[2.2.1]heptane-1-carboxylate (310 mg, 0.73 mmol) in MeOH (4.0 mL) under $N_2$. The resulting mixture was degassed and backfilled with $H_2$, then stirred under $H_2$ (Pressure: 15 psi) at 15° C. for 1 h. The reaction mixture was filtered and concentrated under reduced pressure to give crude (1S,2R,4R)-methyl 7-benzoyl-2-(3-(4,4,5,5-tetramethyl-1,3,2-dioxaborolan-2-yl)propyl)-7-azabicyclo[2.2.1]heptane-1-carboxylate, which was used in next step directly without further purification. LCMS ($C_{24}H_{35}BNO_5^+$) (ES, m/z): 428 $[M+H]^+$.

Step 3: (1S,2R,4R)-2 (3-boronopropyl)-7-azabicyclo[2.2.1]heptane-1-carboxylic Acid

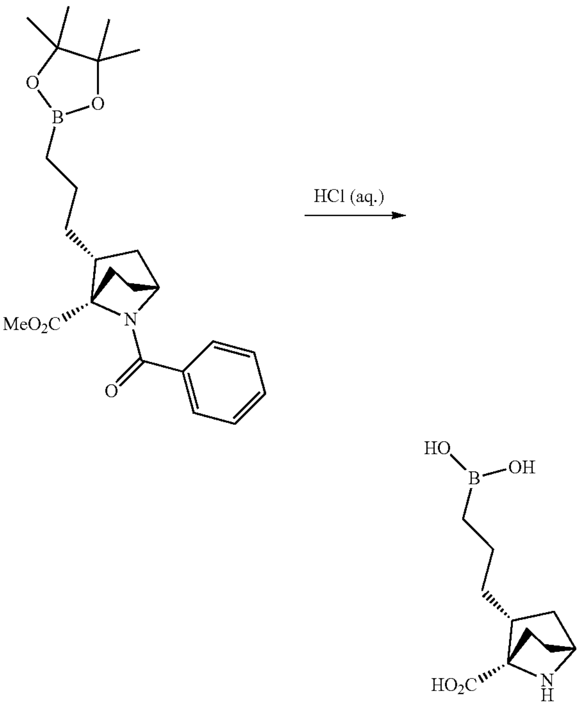

Example 22

A mixture of methyl (1S,2R,4R)-7-benzoyl-2-(3-(4,4,5,5-tetramethyl-1,3,2-dioxaborolan-2-yl)propyl)-7-azabicyclo[2.2.1]heptane-1-carboxylate (120 mg, 0.28 mmol) and 12 N HCl in water (4.0 mL, 48 mmol) was stirred at 100° C. for 12 h, and the reaction mixture was concentrated in vacuo. The residue was purified by RP-HPLC [C18 column, water (20 mM HFBA and 0.1% TFA)-$CH_3CN$] to give (1S,2R,4R)-2-(3-boronopropyl)-7-azabicyclo[2.2.1]heptane-1-carboxylic acid as an HFBA salt. LCMS ($C_{10}H_{17}BNO_3^+$) (ES, m/z): 210 $[M+H-H_2O]^+$. $^1H$ NMR (500 MHz, $D_2O$) δ 4.05-4.03 (m, 1H), 2.24-2.14 (m, 1H), 2.09-1.91 (m, 4H), 1.80-1.69 (m, 1H), 1.68-1.53 (m, 1H), 1.39-1.25 (m, 2H), 1.23-0.96 (m, 2H), 0.80-0.44 (m, 2H).

Example 23: (3aR,4S,6aR)-3a-(3-boronopropyl)-5-(tert-butoxycarbonyl)hexahydro-2H-thieno[2,3-c]pyrrole-4-carboxylic Acid

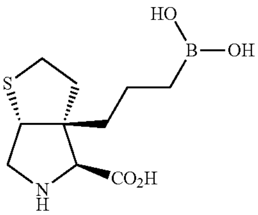 [SMILES: O=C(O)[C@H]1NC[C@@H]2SCC[C@@]21CCCB(O)O]

Step 1: 1-(tert-butyl) 2-methyl (2S,3R)-3-allyl-3-(2-((tert-butyldimethylsilyl)oxy)ethyl)-4-oxopyrrolidine-1,2-dicarboxylate

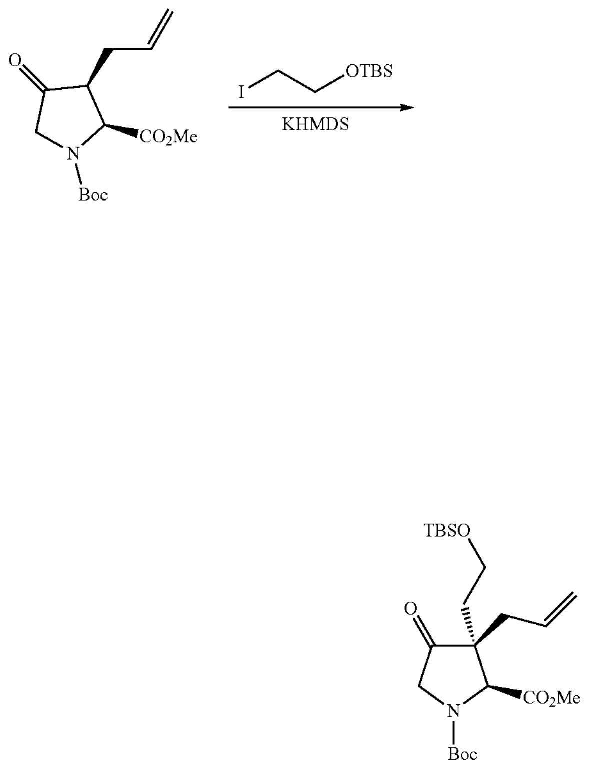

KHMDS (25 mL, 13 mmol, 0.5 M in toluene) was added dropwise to a stirred solution of (2S)-1-tert-butyl 2-methyl 3-allyl-4-oxopyrrolidine-1,2-dicarboxylate (3.0 g, 11 mmol) in THF (36 mL) and DMPU (12 mL) at −78° C. under $N_2$. Upon completion of addition, the reaction mixture was stirred at −78° C. for 1 h, followed by addition of tert-butyl (2-iodoethoxy)dimethylsilane (2.6 mL, 12 mmol) in one portion and the resulting mixture was allowed to warm to 14° C. and stirred for additional 16 h. The reaction mixture was quenched by addition of saturated aqueous $NH_4Cl$, then diluted with water, and extracted with EtOAc. The combined organic layers were washed with brine, dried over anhydrous $Na_2SO_4$, filtered, and concentrated in vacuo. The residue was purified by flash silica gel chromatography (EtOAc in hexanes) to give (2S,3R)-1-tert-butyl 2-methyl 3-allyl-3-(2-((tert-butyldimethylsilyl)oxy)ethyl)-4-oxopyrrolidine-1,2-dicarboxylate, which was further resolved by Chiral-SFC [Column: DAICEL CHIRALPAK IC (250 mm*30 mm, 5 um), Mobile phase: A: $CO_2$, B: EtOH (0.1% $NH_3 \cdot H_2O$), Gradient: 7% of B in 3.5 minutes, and hold 7% of B for 1 min, Flow Rate (mL/min) 50, Column temperature: 40° C.] to give (2S,3R)-1-tert-butyl 2-methyl 3-allyl-3-(2-((tert-butyldimethylsilyl)oxy)ethyl)-4-oxopyrrolidine-1,2-dicarboxylate ($t_r$=1.565 min). LCMS ($C_{17}H_{32}NO_4Si^+$) (ES, m/z): 342 $[M+H-Boc]^+$. $^1$H NMR (500 MHz, $CDCl_3$) δ 5.94-5.64 (m, 1H), 5.22-4.90 (m, 2H), 4.63-4.62 (m, 1H), 4.07-4.00 (m, 1H), 3.93-3.82 (m, 1H), 3.75-3.59 (m, 5H), 2.43-2.39 (m, 1H), 2.15-1.95 (m, 2H), 1.87-1.73 (m, 1H), 1.46-1.44 (m, 9H), 0.86-0.85 (m, 9H), 0.09-0.06 (m, 6H).

Step 2: 1-(tert-butyl) 2-methyl (2S,3R,4S)-3-allyl-3-(2-((tert-butyldimethylsilyl)oxy)ethyl)-4-hydroxypyrrolidine-1,2-dicarboxylate

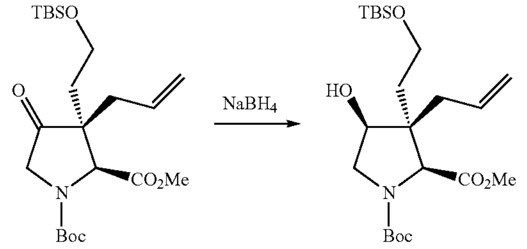 [SMILES: C=CC[C@]1(CCO[Si](C)(C)C(C)(C)C)C(=O)CN(C(=O)OC(C)(C)C)[C@@H]1C(=O)OC ; "NaBH4" ; C=CC[C@]1(CCO[Si](C)(C)C(C)(C)C)[C@H](O)CN(C(=O)OC(C)(C)C)[C@@H]1C(=O)OC]

$NaBH_4$ (86 mg, 2.3 mmol) was added to a solution of (2S,3R)-1-tert-butyl 2-methyl 3-allyl-3-(2-((tert-butyldimethylsilyl)oxy)ethyl)-4-oxopyrrolidine-1,2-dicarboxylate (500 mg, 1.1 mmol) in MeOH (10 mL) at 0° C. under $N_2$, and the resulting mixture was stirred for 60 minutes at 0° C. under $N_2$. The reaction mixture was quenched by addition of saturated aqueous $NaHCO_3$, then diluted with water, and extracted with EtOAc. The combined organic layers were washed with brine, dried over anhydrous $Na_2SO_4$, filtered, and concentrated in vacuo. The residue was purified by flash silica gel chromatography (EtOAc in hexanes) to give (2S,3R,4R)-1-tert-butyl 2-methyl 3-allyl-3-(2-((tert-butyldimethylsilyl)oxy)ethyl)-4-hydroxypyrrolidine-1,2-dicarboxylate. The stereochemistry was assigned by 2D NMR. LCMS ($C_{17}H_{34}NO_4Si^+$) (ES, m/z): 344 $[M+H-Boc]^+$. $^1$H NMR (500 MHz, $CDCl_3$) δ 5.88-5.61 (m, 1H), 5.22-5.05 (m, 2H), 3.96-3.78 (m, 2H), 3.78-3.72 (m, 5H), 3.71-3.66 (m, 1H), 3.66-3.56 (m, 1H), 2.43-2.10 (m, 2H), 1.62-1.51 (m, 2H), 1.47-1.36 (m, 9H), 0.92-0.86 (m, 9H), 0.11-0.01 (m, 6H).

Step 3: 1-(tert-butyl) 2-methyl (2S,3R,4S)-3-allyl-4-hydroxy-3-(2-hydroxyethyl)pyrrolidine-1,2-dicarboxylate

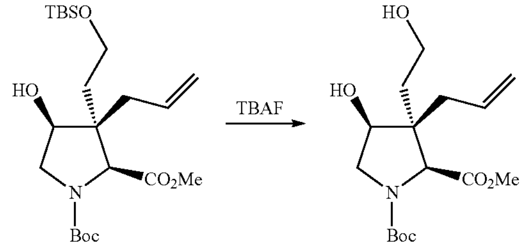

A mixture of 1M TBAF in THF (1.3 mL, 1.3 mmol) and (2S,3R,4R)-1-tert-butyl 2-methyl 3-allyl-3-(2-((tert-butyldimethylsilyl)oxy)ethyl)-4-hydroxypyrrolidine-1,2-dicarboxylate (380 mg, 0.86 mmol) in THF (5.0 mL) was stirred at 0° C. for 1 h, and the reaction mixture was quenched by addition of saturated aqueous $NH_4Cl$, then diluted with water, and extracted with EtOAc. The combined organic layers were washed with brine, dried over anhydrous $Na_2SO_4$, filtered, and concentrated in vacuo. The residue was purified by flash silica gel chromatography (EtOAc in hexanes) to give (2S,3R,4R)-1-tert-butyl 2-methyl 3-allyl- 4-hydroxy-3-(2-hydroxyethyl)pyrrolidine-1,2-dicarboxylate. LCMS ($C_{11}H_{20}NO_4^+$) (ES, m/z): 230 [M+H−Boc]$^+$.

Step 4: 1-(tert-butyl) 2-methyl (2S,3R,4S)-3-allyl-4-((methylsulfonyl)oxy)-3-(2-((methylsulfonyl)oxy)ethyl)pyrrolidine-1,2-dicarboxylate

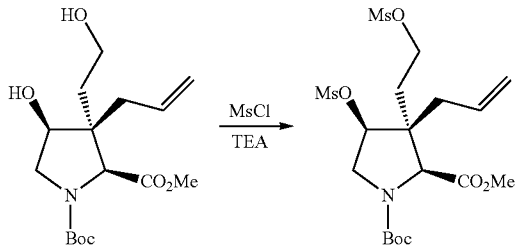 [SMILES: "MsCl" ; C=CC[C@]1(CCO)[C@H](O)CN(C(=O)OC(C)(C)C)[C@@H]1C(=O)OC ; "TEA" ; C=CC[C@]1(CCOS(C)(=O)=O)[C@H](OS(C)(=O)=O)CN(C(=O)OC(C)(C)C)[C@@H]1C(=O)OC]

Methanesulfonyl chloride (522 mg, 4.6 mmol) was added dropwise to a solution of (2S,3R,4R)-1-tert-butyl 2-methyl 3-allyl-4-hydroxy-3-(2-hydroxyethyl)pyrrolidine-1,2-dicarboxylate (250 mg, 0.76 mmol) and triethylamine (1.1 mL, 7.6 mmol) in DCM (6.0 mL) at 0° C., and the resulting mixture was stirred at 0-10° C. for 2 h. The reaction mixture was quenched by addition of acetic acid to pH~7, then diluted with water and extracted with DCM. The combined organic layers were washed with brine, dried over anhydrous $Na_2SO_4$, filtered, and concentrated in vacuo. The residue was purified by flash silica gel chromatography (EtOAc in hexanes) to give (2S,3R,4R)-1-tert-butyl 2-methyl 3-allyl-4-((methylsulfonyl)oxy)-3-(2-((methylsulfonyl)oxy)ethyl)pyrrolidine-1,2-dicarboxylate. LCMS ($C_{13}H_{24}NO_8S_2^+$) (ES, m/z): 386 [M+H−Boc]$^+$.

Step 5: 5-(tert-butyl) 4-methyl (3aR,4S,6aR)-3a-allylhexahydro-5H-thieno[2,3-c]pyrrole-4,5-dicarboxylate

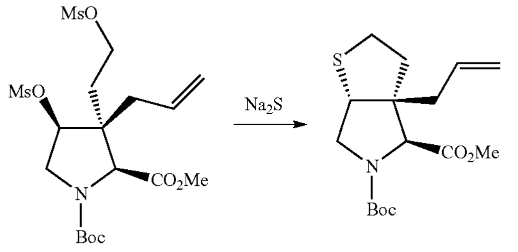

Sodium sulfide (24 mg, 0.31 mmol) and triethylamine (0.13 mL, 0.93 mmol) were added to a stirred solution of (2S,3R,4R)-1-tert-butyl 2-methyl 3-allyl-4-((methylsulfonyl)oxy)-3-(2-((methylsulfonyl)oxy)ethyl)pyrrolidine-1,2-dicarboxylate (150 mg, 0.31 mmol) dissolved in DMF (3.0 mL), and the resulting mixture was stirred at 40° C. for 12 h. The reaction mixture was diluted with water and extracted with EtOAc, and the combined organic layers were washed with brine, dried over anhydrous $Na_2SO_4$, filtered, and concentrated in vacuo. The residue was purified by flash silica gel chromatography (EtOAc in hexanes) to give (3aR,4S,6aR)-5-tert-butyl 4-methyl 3a-allyltetrahydro-2H-thieno[2,3-c]pyrrole-4,5(3H)-dicarboxylate. LCMS ($C_{16}H_{25}NO_4SNa^+$) (ES, m/z): 350 [M+Na]$^+$.

Step 6: 5-(tert-butyl) 4-methyl (3aR,4S,6aR)-3a-(3-(4,4,5,5-tetramethyl-1,3,2-dioxaborolan-2-yl)propyl)hexahydro-5H-thieno[2,3-c]pyrrole-4,5-dicarboxylate

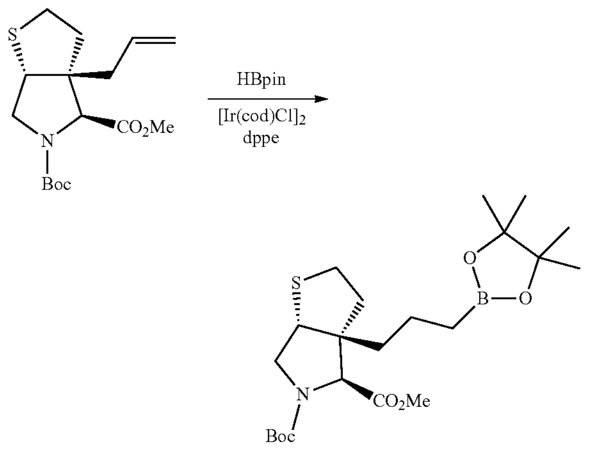

4,4,5,5-Tetramethyl-1,3,2-dioxaborolane (0.21 mL, 1.5 mmol) and (3aR,4S,6aR)-5-tert-butyl 4-methyl 3a-allyltetrahydro-2H-thieno[2,3-c]pyrrole-4,5(3H)-dicarboxylate (95 mg, 0.29 mmol) were added to a mixture of dppe (14 mg, 0.035 mmol) and $[Ir(cod)Cl]_2$ (16 mg, 0.023 mmol) in DCM (2.0 mL) at 20° C. under $N_2$, and the resulting mixture was stirred at 20° C. under $N_2$ for 14 h. The reaction mixture was concentrated under reduced pressure and the residue was purified directly by flash silica gel chromatography (EtOAc in hexanes) to give (3aR,4S,6aR)-5-tert-butyl 4-methyl 3a-(3-(4,4,5,5-tetramethyl-1,3,2-dioxaborolan-2-yl)propyl)tetrahydro-2H-thieno[2,3-c]pyrrole-4,5(3H)-dicarboxylate. LCMS ($C_{22}H_{38}BNO_6SNa^+$) (ES, m/z): 478 [M+Na]$^+$.

Step 7: (3aR,4S,6aR)-3a-(3-boronopropyl)-5-(tert-butoxycarbonyl)hexahydro-2H-thieno[2,3-c]pyrrole-4-carboxylic Acid

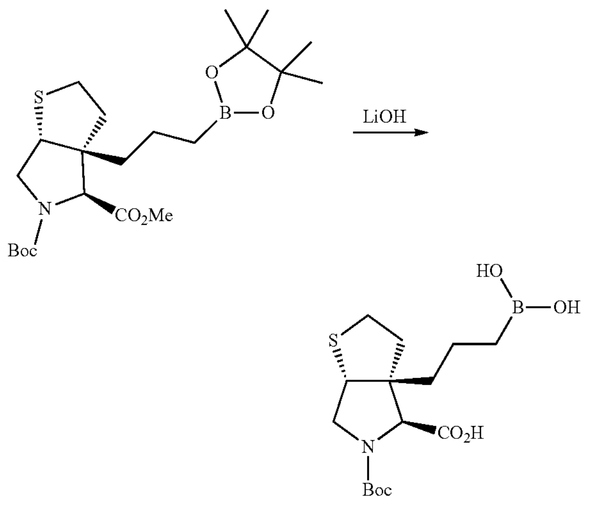

A mixture of (3aR,4S,6aR)-5-tert-butyl 4-methyl 3a-(3-(4,4,5,5-tetramethyl-1,3,2-dioxaborolan-2-yl)propyl)tetrahydro-2H-thieno[2,3-c]pyrrole-4,5(3H)-dicarboxylate (45 mg, 0.099 mmol) and lithium hydroxide monohydrate (25 mg, 0.59 mmol) in MeOH (1.0 mL) and water (0.50 mL) was stirred at 45° C. under $N_2$ for 40 h. The reaction mixture was concentrated under reduced pressure to give crude (3aR,4S,6aR)-3a-(3-boronopropyl)-5-(tert-butoxycarbonyl) hexahydro-2H-thieno[2,3-c]pyrrole-4-carboxylic acid, which was used in the next step directly without further purification. LCMS ($C_{10}H_{17}BNO_3S^+$) (ES, m/z): 242 $[M+H-Boc-H_2O]^+$.

Step 8: (3aR,4S,6aR)-3a-(3-boronopropyl)hexahydro-2H-thieno[2,3-c]pyrrole-4-carboxylic Acid

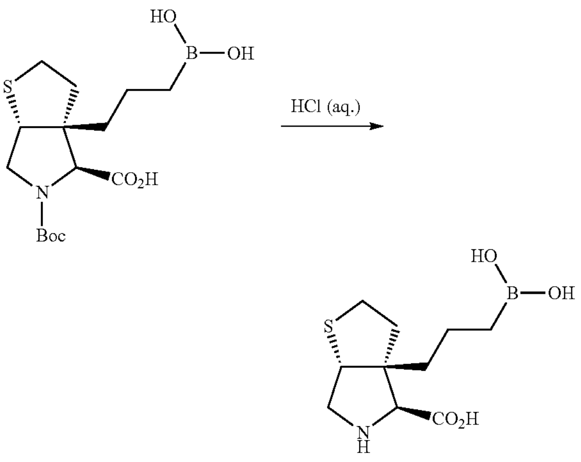

Example 23

A mixture of (3aR,4S,6aR)-3a-(3-boronopropyl)-5-(tert-butoxycarbonyl)hexahydro-2H-thieno[2,3-c]pyrrole-4-carboxylic acid (56 mg, 0.099 mmol) and 4 N HCl in water (0.50 mL, 2.0 mmol) in MeOH (1.0 mL) was stirred at 20° C. under $N_2$ for 60 minutes. The reaction mixture was purified directly by RP-HPLC [C18 column, water (20 mM HFBA and 0.1% TFA)-$CH_3CN$] to give [(3aR,4S,6aR)-3a-(3-boronopropyl)hexahydro-2H-thieno[2,3-c]pyrrole-4-carboxylic acid as an HFBA salt. LCMS ($C_{10}H_{17}BNO_3S^+$) (ES, m/z): 242 $[M+H-H_2O]^+$. $^1H$ NMR (500 MHz, $D_2O$) δ 4.10 (s, 1H), 3.84-2.82 (m, 1H), 3.72-3.69 (m, 1H), 3.33-3.32 (m, 1H), 3.04 (m, 1H), 2.96-2.80 (m, 1H), 2.34-2.31 (m, 1H), 2.13 (m, 1H), 1.58-1.20 (m, 4H), 0.67 (t, J=7.2 Hz, 2H).

Example 24: (1S,3S,4R,5S)-4-(3-boronopropyl)-4-methyl-2-azabicyclo[3.1.0]hexane-3-carboxylic Acid

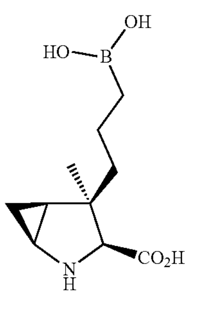 [SMILES: C[C@]1(CCCB(O)O)[C@@H](C(=O)O)N[C@H]2C[C@H]21]

Step 1: 1-benzyl 2-methyl (2S,3S)-3-allyl-3-methyl-4-oxopyrrolidine-1,2-dicarboxylate

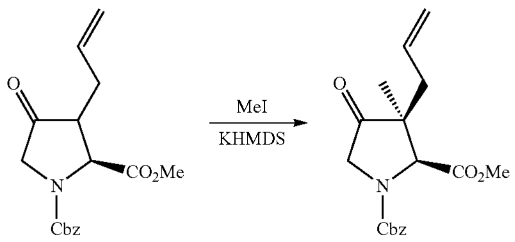

KHMDS (15 mL, 7.6 mmol, 0.5 M in toluene) was added dropwise to a stirred solution of (2S)-1-benzyl 2-methyl 3-allyl-4-oxopyrrolidine-1,2-dicarboxylate (2.0 g, 6.3 mmol) in THF (40 mL) at −78° C. under $N_2$ over 10 minutes, and the resulting mixture was stirred at −78° C. for 1 h, followed by addition of iodomethane (3.5 mL, 54 mmol) in one portion. The reaction mixture was stirred at 15° C. for 10 h, then quenched with saturated aqueous $NH_4Cl$, and extracted with EtOAc. The combined organic phases were washed with brine, dried over anhydrous $Na_2SO_4$, filtered, and concentrated under reduced pressure. The residue was purified by flash silica gel chromatography (EtOAc in hexanes) to give 1-benzyl 2-methyl (2S)-3-allyl-3-methyl-4-oxopyrrolidine-1,2-dicarboxylate as a mixture of diastereomers, which was resolved by Chiral-SFC [Column: DAICEL CHIRALPAK AD-H (250 mm*30 mm, 5 um), Mobile phase: A: $CO_2$, B: EtOH (0.1% $NH_3 \cdot H_2O$), Gradient: 25% of B in 4.5 minutes, and hold 25% of B for 1 min, Flow Rate (mL/min) 50, Column temperature: 40° C.] to give (2S,3S,4S)-1-benzyl 2-methyl 3-allyl-3-methyl-4-oxopyrrolidine-1,2-dicarboxylate ($t_r$=3.085 min) as the second eluting peak. LCMS ($C_{18}H_{22}NO_5^+$) (ES, m/z): 332 $[M+H]^+$. $^1H$ NMR (500 MHz, $CDCl_3$) δ 7.32-7.18 (m, 5H), 5.83-5.53 (m, 1H), 5.17-4.97 (m, 4H), 4.41 (s, 0.5H), 4.34 (s, 0.5H), 4.06-3.87 (m, 2H), 3.63 (s, 1.5H), 3.48 (s, 1.5H), 2.33-2.37 (m, 1H), 1.99-1.92 (m, 1H), 1.12 (s, 3H).

Step 2: 1-benzyl 2-methyl (2S,3S)-3-allyl-3-methyl-4-(((trifluoromethyl)sulfonyl)oxy)-2,3-dihydro-1H-pyrrole-1,2-dicarboxylate

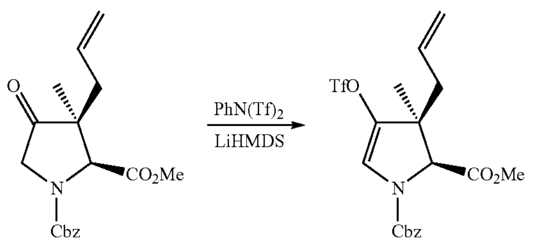

LiHMDS (3.02 mL, 3.02 mmol, 1.0 M in THF) was added dropwise to a stirred solution of (2S,3S,4S)-1-benzyl 2-methyl 3-allyl-3-methyl-4-oxopyrrolidine-1,2-dicarboxylate (0.50 g, 1.5 mmol) in THF (7.0 mL) at −78° C. under argon, and the resulting mixture was stirred at −78° C. for 40 min. A cold (−78° C.) solution of 1,1,1-trifluoro-N-phenyl-N-((trifluoromethyl)sulfonyl)methanesulfonamide (0.70 g, 2.0 mmol) in THF (7.0 mL) and DMPU (0.50 mL) was added dropwise and the reaction mixture was allowed to warm to 10° C., and stirred for additional 16 h. The reaction mixture was quenched by water, and extracted with EtOAc. The combined organic phases were washed with saturated aqueous $NaHCO_3$, water, and brine, then dried over anhydrous $Na_2SO_4$, filtered, and concentrated in vacuo. The residue was purified by flash silica gel chromatography (EtOAc in hexanes) to give (2S,3S,4S)-1-benzyl 2-methyl 3-allyl-3-methyl-4-(((trifluoromethyl)sulfonyl)oxy)-2,3-dihydro-1H-pyrrole-1,2-dicarboxylate. LCMS ($C_{19}H_{21}F_3NO_7S^+$) (ES, m/z): 464 $[M+H]^+$.

Step 3: 1-benzyl 2-methyl (2S,3R)-3-allyl-3-methyl-2,3-dihydro-1H-pyrrole-1,2-dicarboxylate

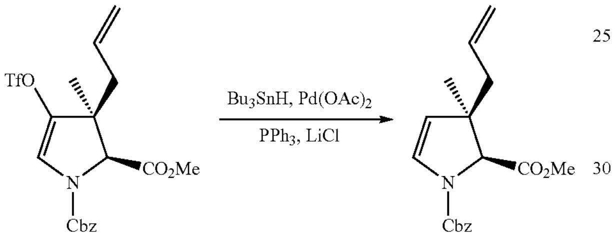

Lithium chloride (80 mg, 1.9 mmol) and triphenylphosphine (49 mg, 0.19 mmol) were added to a suspension of palladium(II) acetate (14 mg, 0.063 mmol) in THF (5.0 mL) under $N_2$, followed by addition of a solution of (2S,3S,4S)-1-benzyl 2-methyl 3-allyl-3-methyl-4-(((trifluoromethyl)sulfonyl)oxy)-2,3-dihydro-1H-pyrrole-1,2-dicarboxylate (290 mg, 0.626 mmol) in THF (2.0 mL), and subsequently tributylstannane (1.2 mL, 4.3 mmol). The resulting mixture was stirred at 10° C. for 1 h, then quenched with saturated aqueous KF and extracted with EtOAc. The combined organic phases were washed with brine, dried over anhydrous $Na_2SO_4$, filtered, and concentrated in vacuo. The residue was purified by flash silica gel chromatography (EtOAc in hexanes) to give (2S,3R)-1-benzyl 2-methyl 3-allyl-3-methyl-2,3-dihydro-1H-pyrrole-1,2-dicarboxylate, which was further resolved by Chiral-SFC [Column: Phenomenex-Amylose-1 (250 mm*30 mm, 5 um), Mobile phase: A: $CO_2$, B: EtOH (0.1% $NH_3 \cdot H_2O$), Gradient: 35% of B in 5.5 min, and hold 35% of B for 1 min, Flow Rate (mL/min) 50, Column temperature: 40° C.] to give (2S,3R)-1-benzyl 2-methyl 3-allyl-3-methyl-2,3-dihydro-1H-pyrrole-1,2-dicarboxylate. The stereochemistry was assigned by 2D NMR. LCMS ($C_{18}H_{22}NO_4^+$) (ES, m/z): 316 $[M+H]^+$. $^1H$ NMR (500 MHz, $CDCl_3$) δ 7.32-7.11 (m, 5H), 6.55-6.44 (m, 1H), 5.68-5.58 (m, 1H), 5.15-4.82 (m, 5H), 4.22-4.17 (m, 1H), 3.65 (s, 1.5H), 3.43 (s, 1.5H), 2.06-2.04 (m, 2H), 1.15-1.10 (m, 3H).

Step 5: 1-benzyl 2-methyl (2S,3R)-3-methyl-3-(3-((3aS,4S,6S)-3a,5,5-trimethylhexahydro-4,6-methanobenzo[d][1,3,2]dioxaborol-2-yl)propyl)-2,3-dihydro-1H-pyrrole-1,2-dicarboxylate

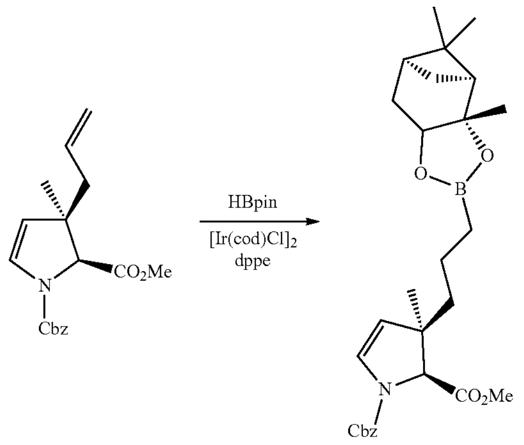

(3aS,4S,6S)-3a,5,5-Trimethylhexahydro-4,6-methanobenzo[d][1,3,2]dioxaborole (285 mg, 1.6 mmol) and (2S,3R)-1-benzyl 2-methyl 3-allyl-3-methyl-2,3-dihydro-1H-pyrrole-1,2-dicarboxylate (100 mg, 0.32 mmol) were added to a mixture of 1,2-bis(diphenylphosphino)ethane (10 mg, 0.025 mmol) and $[Ir(cod)Cl]_2$ (11 mg, 0.016 mmol) in DCM (4.0 mL) at 20° C. under $N_2$. The reaction mixture was stirred at 20° C. under $N_2$ for 14 h, then purified directly by flash silica gel chromatography (EtOAc in hexanes) to give 1-benzyl 2-methyl (2S,3R)-3-methyl-3-(3-((3aS,4S,6S)-3a,5,5-trimethylhexahydro-4,6-methanobenzo[d][1,3,2]dioxaborol-2-yl)propyl)-2,3-dihydro-1H-pyrrole-1,2-dicarboxylate. LCMS ($C_{28}H_{39}BNO_6^+$) (ES, m/z): 496 $[M+H]^+$.

Step 6: 2-benzyl 3-methyl (3S,4R)-4-methyl-4-(3-((3aS,4S,6S)-3a,5,5-trimethylhexahydro-4,6-methanobenzo[d][1,3,2]dioxaborol-2-yl)propyl)-2-azabicyclo[3.1.0]hexane-2,3-dicarboxylate

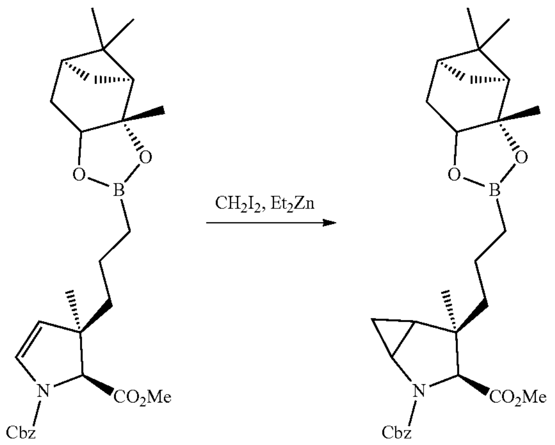

Diethylzinc (0.76 mL, 0.76 mmol, 1 M in toluene) was added dropwise to a solution of diiodomethane (0.098 mL, 1.2 mmol) in DCM (0.50 mL) over 1 min at −40° C. under $N_2$, and the resulting mixture was stirred at −40° C. for 0.5 h, followed by dropwise addition of 1-benzyl 2-methyl (2S,3R)-3-methyl-3-(3-((3aS,4S,6S)-3a,5,5-trimethylhexahydro-4,6-methanobenzo[d][1,3,2]dioxaborol-2-yl)propyl)-2,3-dihydro-1H-pyrrole-1,2-dicarboxylate (75 mg, 0.15 mmol) and TFA (0.035 mL, 0.45 mmol) in DCM (1.0 mL) over 1 min. The reaction mixture was stirred at −40° C. for 0.3 h and then at 20° C. for additional 12 h before concentrated in vacuo. The crude mixture was diluted with saturated aqueous $NaHCO_3$ and extracted with DCM. The combined organic phase was dried over anhydrous $Na_2SO_4$, filtered, and concentrated in vacuo. The residue was purified by flash silica gel chromatography (EtOAc in hexanes) to give 2-benzyl 3-methyl (3S,4R)-4-methyl-4-(3-((3aS,4S,6S)-3a,5,5-trimethylhexahydro-4,6-methanobenzo[d][1,3,2]dioxaborol-2-yl)propyl)-2-azabicyclo[3.1.0]hexane-2,3-dicarboxylate. LCMS ($C_{29}H_{41}BNO_6^+$) (ES, m/z): 510 $[M+H]^+$.

Step 7: (3S,4R)-2-((benzyloxy)carbonyl)-4-methyl-4-(3-((3aS,4S,6S)-3a,5,5-trimethylhexahydro-4,6-methanobenzo[d][1,3,2]dioxaborol-2-yl)propyl)-2-azabicyclo[3.1.0]hexane-3-carboxylic Acid

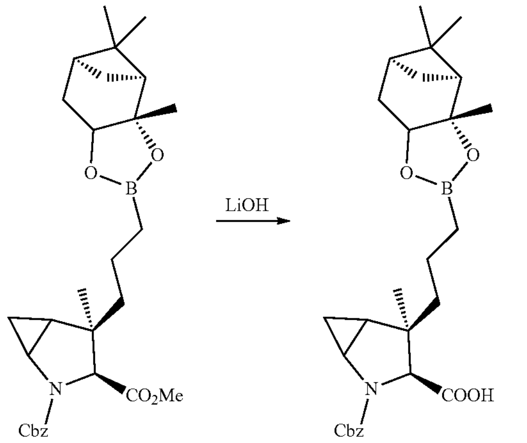

A mixture of 2-benzyl 3-methyl (3S,4R)-4-methyl-4-(3-((3aS,4S,6S)-3a,5,5-trimethylhexahydro-4,6-methanobenzo[d][1,3,2]dioxaborol-2-yl)propyl)-2-azabicyclo[3.1.0]hexane-2,3-dicarboxylate (40 mg, 0.079 mmol) and lithium hydroxide monohydrate (20 mg, 0.47 mmol) in MeOH (1.0 mL) and water (0.50 mL) was stirred at 20° C. under $N_2$ for 12 h, then at 60° C. for 36 h. The reaction mixture was concentrated under reduced pressure, diluted with MeOH (5.0 mL), then filtered, and concentrated in vacuo to give crude (3S,4R)-2-((benzyloxy)carbonyl)-4-methyl-4-(3-((3aS,4S,6S)-3a,5,5-trimethylhexahydro-4,6-methanobenzo[d][1,3,2]dioxaborol-2-yl)propyl)-2-azabicyclo[3.1.0]hexane-3-carboxylic acid, which was used in the next step directly without further purification. LCMS ($C_{27}H_{39}BNO_4^+$) (ES, m/z): 452 $[M+H-CO_2]^+$.

Step 8: (3S,4R)-4-methyl-4-(3-((3aS,4S,6S)-3a,5,5-trimethylhexahydro-4,6-methanobenzo[d][1,3,2]dioxaborol-2-yl)propyl)-2-azabicyclo[3.1.0]hexane-3-carboxylic Acid

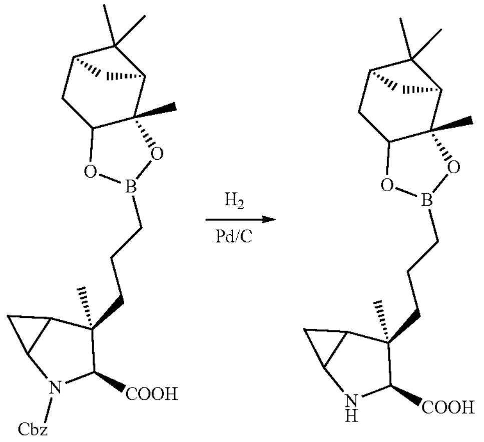

10% Pd—C (1.5 mg, 0.014 mmol) was added to a solution of (3S,4R)-2-((benzyloxy)carbonyl)-4-methyl-4-(3-((3aS,4S,6S)-3a,5,5-trimethylhexahydro-4,6-methanobenzo[d][1,3,2]dioxaborol-2-yl)propyl)-2-azabicyclo[3.1.0]hexane-3-carboxylic acid (60 mg, 0.068 mmol) in MeOH (1.0 mL) under $N_2$. The resulting mixture was degassed and backfilled with $H_2$ (three times), and stirred under $H_2$ (Pressure: 15 psi) at 20° C. for 1 h. The reaction mixture was filtered and concentrated under reduced pressure to give crude (3S,4R)-4-methyl-4-(3-((3aS,4S,6S)-3a,5,5-trimethylhexahydro-4,6-methanobenzo[d][1,3,2]dioxaborol-2-yl)propyl)-2-azabicyclo[3.1.0]hexane-3-carboxylic acid, which was used in the next step directly without further purification. LCMS ($C_{20}H_{33}BNO_4^+$) (ES, m/z): 362 $[M+H]^+$.

Step 9: (1S,3S,4R,5S)-4-(3-boronopropyl)-4-methyl-2-azabicyclo[3.1.0]hexane-3-carboxylic Acid

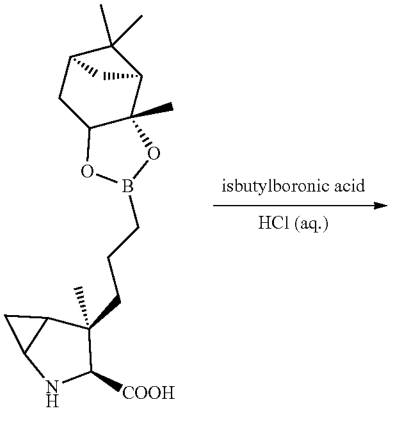

-continued

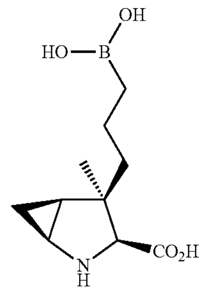

Example 24

(3S,4R)-4-methyl-4-(3-((3aS,4S,6S)-3a,5,5-trimethylhexahydro-4,6-methanobenzo[d][1,3,2]dioxaborol-2-yl)propyl)-2-azabicyclo[3.1.0]hexane-3-carboxylic acid (20 mg, 0.028 mmol) and isobutylboronic acid (4.8 mg, 0.047 mmol) were dissolved in methanol (0.20 mL) and hexane (0.20 mL), followed by addition of 3 M HCl in water (0.16 mL, 0.47 mmol) at 20° C. The reaction mixture was stirred at 20° C. for 12 h, then concentrated in vacuo. The residue was purified by RP-HPLC [C18 column, water (20 mM HFBA and 0.1% TFA)-$CH_3CN$] to give (1S,3S,4R,5S)-4-(3-boronopropyl)-4-methyl-2-azabicyclo[3.1.0]hexane-3-carboxylic acid as an HFBA salt. The stereochemistry was assigned by 2D-NMR. LCMS ($C_{10}H_{17}BNO_3^+$) (ES, m/z): 210 $[M+H-H_2O]^+$. $^1H$ NMR (500 MHz, $D_2O$) δ 3.83 (s, 1H), 3.37-3.21 (m, 1H), 1.64-1.57 (m, 1H), 1.54-1.44 (m, 2H), 1.35-1.29 (m, 1H), 1.25 (s, 3H), 1.20-1.14 (m, 1H), 1.04-0.93 (m, 1H), 0.77-0.65 (m, 2H).

Example 25: 7-(boronomethyl)-2-azaspiro[4.5]decane-1-carboxylic Acid

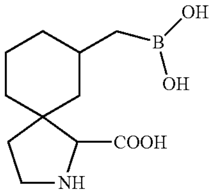 [SMILES: O=C(O)C1NCCC12CCCC(CB(O)O)C2]

Step 1: methyl 3-((tert-butyldiphenylsilyl)oxy)cyclohexanecarboxylate

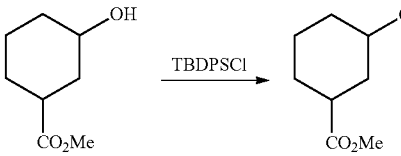

Imidazole (17 g, 253 mmol) and TBDPS-Cl (39 mL, 152 mmol) were added to a solution of methyl 3-hydroxycyclohexanecarboxylate (20 g, 126 mmol) in DCM (250 mL) at 10° C., and the resulting mixture was stirred at 10° C. for 16 h, then diluted with water, and extracted with DCM.

The combined organic phases were washed with brine, dried over anhydrous $Na_2SO_4$, filtered, and concentrated under reduced pressure. The residue was purified by silica gel column chromatography (EtOAc in hexanes) to give methyl 3-((tert-butyldiphenylsilyl)oxy)cyclohexanecarboxylate. LCMS ($C_{24}H_{33}O_3Si^+$) (ES, m/z): 397 $[M+H]^+$.

Step 2: methyl 3-((tert-butyldiphenylsilyl)oxy)-1-(cyanomethyl)cyclohexanecarboxylate

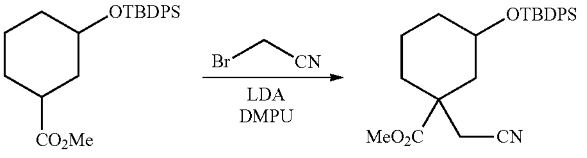

n-BuLi (39 mL, 97 mmol, 2.5M in hexanes) was added to a solution of diisopropylamine (9.8 g, 97 mmol) in THF (200 mL) at −78° C., and the resulting mixture was stirred for 1 h at −78° C., followed by addition of methyl 3-((tert-butyldiphenylsilyl)oxy)cyclohexanecarboxylate (35 g, 88 mmol) at −78° C. The resulting mixture was stirred for additional 2 h, followed by addition of a solution of DMPU (5.3 mL, 44 mmol) and 2-bromoacetonitrile (7.4 mL, 106 mmol) in THF (50 mL) at −78° C. The reaction mixture was stirred at 10° C. for additional 3 h, then quenched with saturated aqueous $NH_4Cl$ and extracted with EtOAc. The combined organic phases were washed with brine, dried over anhydrous $Na_2SO_4$, filtered, and concentrated under reduced pressure. The residue was purified by silica gel column chromatography (EtOAc in hexanes) to give methyl 3-((tert-butyldiphenylsilyl)oxy)-1-(cyanomethyl)cyclohexanecarboxylate. LCMS ($C_{26}H_{33}NO_3SiNa^+$) (ES, m/z): 458 $[M+Na]^+$.

Step 3: 7-((tert-butyldiphenylsilyl)oxy)-2-azaspiro[4.5]decan-1-one

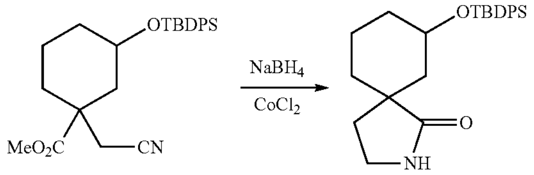

$NaBH_4$ (4.8 g, 126 mmol) was added to a solution of methyl 3-((tert-butyldiphenylsilyl)oxy)-1-(cyanomethyl)cyclohexanecarboxylate (11 g, 25 mmol) and cobalt(II) chloride hexahydrate (3.0 g, 13 mmol) in THF (100 mL) and water (50 mL) at 0° C., and the resulting mixture was stirred at 25° C. for 16 h. The reaction mixture was quenched with $H_2O$ and extracted with EtOAc. The combined organic phases were washed with brine, dried over anhydrous $Na_2SO_4$, filtered, and concentrated under reduced pressure. The residue was purified by silica gel column chromatography (EtOAc in hexanes) to give 7-((tert-butyldiphenylsilyl)oxy)-2-azaspiro[4.5]decan-1-one. LCMS ($C_{25}H_{34}NO_2Si^+$) (ES, m/z): 408 $[M+H]^+$.

Step 4: 2-benzyl-7-((tert-butyldiphenylsilyl)oxy)-2-azaspiro[4.5]decan-1-one

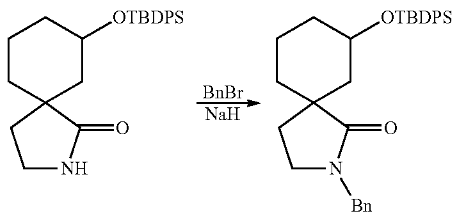

NaH (0.95 g, 24 mmol, 60 wt % in mineral oil) was added to a solution of 7-((tert-butyldiphenylsilyl)oxy)-2-azaspiro[4.5]decan-1-one (8.8 g, 22 mmol) in THF (100 mL) at 0° C. under $N_2$. The resulting mixture was stirred for 1 h at 0° C., followed by addition of (bromomethyl)benzene (2.8 mL, 24 mmol) at 0° C. The reaction mixture was stirred at 0° C. for 16 h, then quenched with saturated aqueous $NH_4Cl$ and extracted with EtOAc. The combined organic phases were washed with brine, dried over anhydrous $Na_2SO_4$, filtered, and concentrated under reduced pressure. The residue was purified by flash silica gel column chromatography (EtOAc in hexanes) to give 2-benzyl-7-((tert-butyldiphenylsilyl)oxy)-2-azaspiro[4.5]decan-1-one. LCMS ($C_{32}H_{40}NO_2Si^+$) (ES, m/z): 498 $[M+H]^+$.

Step 5: 2-benzyl-7-((tert-butyldiphenylsilyl)oxy)-2-azaspiro[4.5]decane-1-carbonitrile

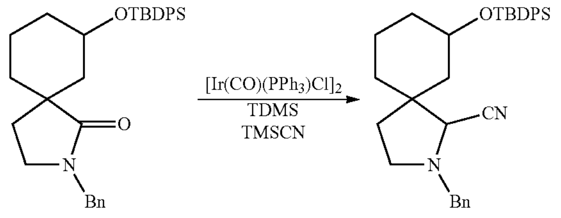

Carbonylchlorobis(triphenylphosphine)iridium(I) (0.47 g, 0.60 mmol) was added to a solution of 2-benzyl-7-((tert-butyldiphenylsilyl)oxy)-2-azaspiro[4.5]decan-1-one (4.0 g, 8.0 mmol) in toluene (40 mL) at 15° C., and the resulting mixture was stirred for 5 minutes, followed by addition of 1,1,3,3-tetramethyldisiloxane (5.7 mL, 32 mmol), then stirred for another 15 minutes. Trimethylsilanecarbonitrile (4.0 mL, 32 mmol) was added, and the reaction mixture was stirred at 15° C. for 15 h, then washed with 1 M aqueous NaOH, and extracted with EtOAc. The combined organic phases were dried over $Na_2SO_4$, filtered, and concentrated under reduced pressure. The residue was purified by silica gel column chromatography (EtOAc in hexanes) to give 2-benzyl-7-((tert-butyldiphenylsilyl)oxy)-2-azaspiro[4.5]decane-1-carbonitrile. LCMS ($C_{33}H_{41}N_2OSi^+$) (ES, m/z): 509 $[M+H]^+$.

Step 6: 2-benzyl-7-((tert-butyldiphenylsilyl)oxy)-2-azaspiro[4.5]decane-1-carboxamide

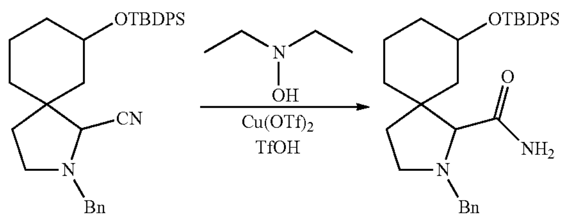

Trifluoromethanesulfonic acid (0.026 mL, 0.30 mmol) was added to a solution of 2-benzyl-7-((tert-butyldiphenylsilyl)oxy)-2-azaspiro[4.5]decane-1-carbonitrile (1.5 g, 3.0 mmol) in DCE (15 mL) at 30° C. under $N_2$, followed by addition of N,N-diethylhydroxylamine (0.91 mL, 8.8 mmol) and bis(((trifluoromethyl)sulfonyl)oxy)copper (107 mg, 0.30 mmol). The reaction mixture was stirred at 50° C. for 16 h, then quenched with water and extracted with DCM. The combined organic phases were washed with brine, dried over anhydrous $Na_2SO_4$, filtered, and concentrated under reduced pressure. The residue was purified by silica gel column chromatography (EtOAc in hexanes) to give 2-benzyl-7-((tert-butyldiphenylsilyl)oxy)-2-azaspiro[4.5]decane-1-carboxamide. LCMS ($C_{33}H_{43}N_2O_2Si^+$) (ES, m/z): 527 $[M+H]^+$.

Step 7: methyl 2-benzyl-7-((tert-butyldiphenylsilyl)oxy)-2-azaspiro[4.5]decane-1-carboxylate

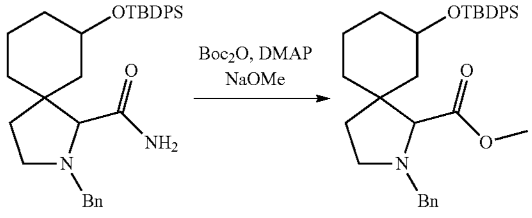

$Boc_2O$ (0.62 mL, 2.7 mmol) was added to a solution of 2-benzyl-7-((tert-butyldiphenylsilyl)oxy)-2-azaspiro[4.5]decane-1-carboxamide (350 mg, 0.66 mmol) and DMAP (81 mg, 0.66 mmol) in DCE (3.0 mL) at 25° C., and the resulting mixture was stirred at 60-80° C. for additional 13 h, then concentrated. Sodium methoxide (72 mg, 1.3 mmol) and MeOH (1.5 mL) were added to the crude mixture and the reaction mixture was stirred at 80° C. for 12 h, then concentrated, quenched by addition of saturated aqueous $NH_4Cl$ and extracted with EtOAc. The combined organic phases were dried over anhydrous $Na_2SO_4$, filtered, and concentrated under reduced pressure. The residue was purified by silica gel column chromatography (EtOAc in hexanes) to give methyl 2-benzyl-7-((tert-butyldiphenylsilyl)oxy)-2-azaspiro[4.5]decane-1-carboxylate. LCMS ($C_{34}H_{44}NO_3Si^+$) (ES, m/z): 542 $[M+H]^+$.

Step 8: methyl 2-benzyl-7-hydroxy-2-azaspiro[4.5]decane-1-carboxylate

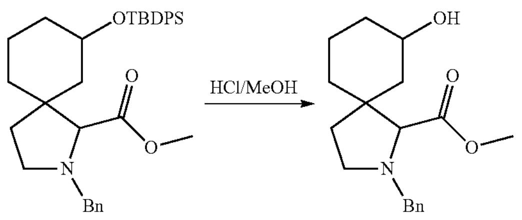

A mixture of 4 M HCl in MeOH (5.0 mL, 20 mmol) and methyl 2-benzyl-7-((tert-butyldiphenylsilyl)oxy)-2-azaspiro[4.5]decane-1-carboxylate (400 mg, 0.74 mmol) was stirred at 60° C. for 16 h. The reaction mixture was concentrated, then quenched by addition of saturated aqueous $NaHCO_3$ and extracted with EtOAc. The combined organic phases were dried over anhydrous $Na_2SO_4$, filtered, and concentrated under reduced pressure. The residue was purified by silica gel column chromatography (EtOAc in hexanes) to give methyl 2-benzyl-7-hydroxy-2-azaspiro[4.5]decane-1-carboxylate. LCMS ($C_{18}H_{26}NO_3^+$) (ES, m/z): 304 $[M+H]^+$.

Step 9: methyl 2-benzyl-7-oxo-2-azaspiro[4.5]decane-1-carboxylate

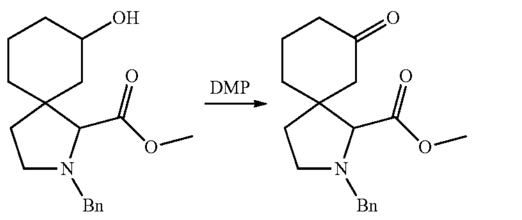 [SMILES: COC(=O)C1N(Cc2ccccc2)CCC12CCCC(O)C2 ; COC(=O)C1N(Cc2ccccc2)CCC12CCCC(=O)C2]

Dess-Martin Periodinane (559 mg, 1.3 mmol) was added to a mixture of methyl 2-benzyl-7-hydroxy-2-azaspiro[4.5]decane-1-carboxylate (200 mg, 0.66 mmol) and DCM (2.0 mL) and the resulting mixture was stirred at 26° C. for 12 h, then quenched by addition of saturated aqueous $NaHCO_3$ and extracted with EtOAc. The combined organic phases were washed with brine, dried over anhydrous $Na_2SO_4$, filtered, and concentrated under reduced pressure. The residue was purified by silica gel column chromatography (EtOAc in hexanes) to give methyl 2-benzyl-7-oxo-2-azaspiro[4.5]decane-1-carboxylate. LCMS ($C_{18}H_{24}NO_3^+$) (ES, m/z): 302 $[M+H]^+$.

Step 10: methyl 2-benzyl-7-methylene-2-azaspiro[4.5]decane-1-carboxylate

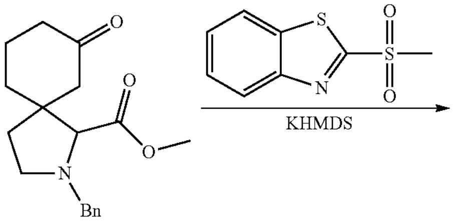

-continued

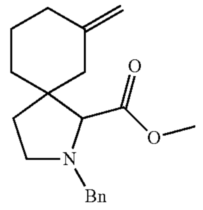

LiHMDS (0.64 mL, 0.64 mmol, 1.0 M in THF) was added to a mixture of methyl 2-benzyl-7-oxo-2-azaspiro[4.5]decane-1-carboxylate (80 mg, 0.27 mmol) and 2-(methylsulfonyl)benzo[d]thiazole (113 mg, 0.53 mmol) in THF (2.0 mL) at −78° C. under $N_2$, and the resulting mixture was stirred at −78° C. for 0.5 h, then at 26° C. for 12 h under $N_2$. The reaction mixture was quenched with saturated aqueous $NH_4Cl$ and extracted with DCM. The combined organic layers were washed with brine, dried over anhydrous $Na_2SO_4$, filtered, and concentrated. The residue was purified by silica gel column chromatography (EtOAc in hexanes) to give methyl 2-benzyl-7-methylene-2-azaspiro[4.5]decane-1-carboxylate. LCMS ($C_{19}H_{26}NO_2^+$) (ES, m/z): 300 $[M+H]^+$.

Step 11: methyl 2-benzyl-7-((4,4,5,5-tetramethyl-1,3,2-dioxaborolan-2-yl)methyl)-2-azaspiro[4.5]decane-1-carboxylate

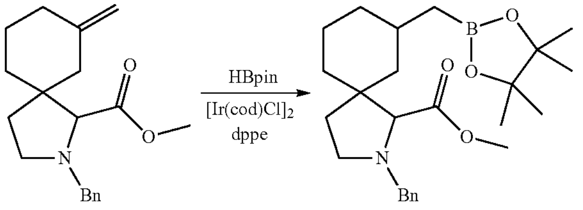 [SMILES: C=C1CCCC2(CCN(Cc3ccccc3)C2C(=O)OC)C1 ; COC(=O)C1N(Cc2ccccc2)CCC12CCCC(CB1OC(C)(C)C(C)(C)O1)C2]

4,4,5,5-Tetramethyl-1,3,2-dioxaborolane (0.044 mL, 0.30 mmol) was added to a solution of $[Ir(cod)Cl]_2$ (4.7 mg, 7.0 μmol) and dppe (6.0 mg, 0.015 mmol) in DCM (2.0 mL) under $N_2$, followed by addition of methyl 2-benzyl-7-methylene-2-azaspiro[4.5]decane-1-carboxylate (30 mg, 0.10 mmol), and the resulting mixture was stirred at 30° C. for 12 h. The reaction mixture was concentrated, and the residue was purified by RP-HPLC [C18 column, water (0.1% TFA)-$CH_3CN$] to give methyl 2-benzyl-7-((4,4,5,5-tetramethyl-1,3,2-dioxaborolan-2-yl)methyl)-2-azaspiro[4.5]decane-1-carboxylate. LCMS ($C_{25}H_{39}BNO_4^+$) (ES, m/z): 428 $[M+H]^+$.

Step 12: methyl 7-((4,4,5,5-tetramethyl-1,3,2-dioxaborolan-2-yl)methyl)-2-azaspiro[4.5]decane-1-carboxylate

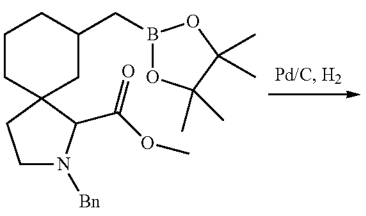

-continued

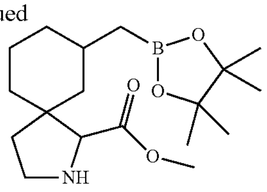

10% Pd—C (50 mg, 0.047 mmol) and 10% $Pd(OH)_2$ (33 mg, 0.047 mmol) were added to a solution of methyl 2-benzyl-7-((4,4,5,5-tetramethyl-1,3,2-dioxaborolan-2-yl)methyl)-2-azaspiro[4.5]decane-1-carboxylate (20 mg, 0.047 mmol) in MeOH (5.0 mL) under $N_2$. The resulting mixture was degassed and backfilled with $H_2$ (three times), then stirred under $H_2$ (50 psi) at 35° C. for 16 h. The reaction mixture was filtered, and concentrated under reduced pressure to give a mixture of methyl 7-((4,4,5,5-tetramethyl-1,3,2-dioxaborolan-2-yl)methyl)-2-azaspiro[4.5]decane-1-carboxylate and its corresponding boronic acid, which was used in next step directly without further purification. LCMS ($C_{18}H_{33}BNO_4^+$) (ES, m/z): 338 $[M+H]^+$.

Step 13: 7-(boronomethyl)-2-azaspiro[4.5]decane-1-carboxylic Acid

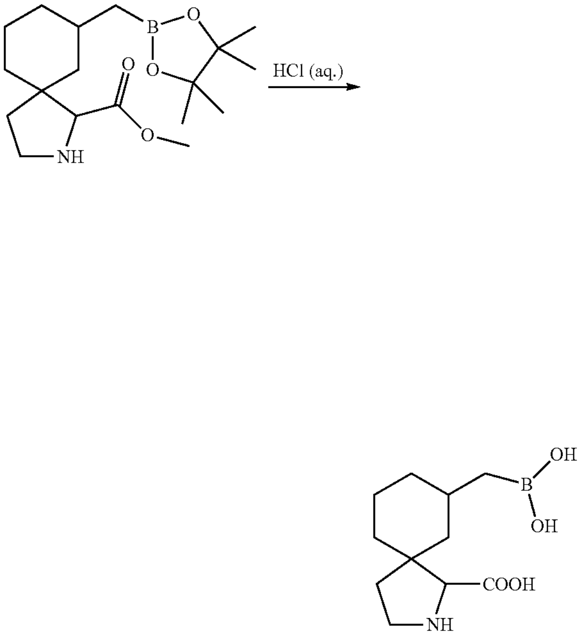

Example 25

A mixture of 12 N HCl in water (2.0 mL, 24 mmol) and methyl 7-((4,4,5,5-tetramethyl-1,3,2-dioxaborolan-2-yl)methyl)-2-azaspiro[4.5]decane-1-carboxylate (15 mg, 0.044 mmol) was stirred at 100° C. for 12 h. The reaction mixture was concentrated, and the residue was purified by RP-HPLC [C18 column, water (20 mM HFBA and 0.1% TFA)-$CH_3CN$] to give 7-(boronomethyl)-2-azaspiro[4.5]decane-1-carboxylic acid as an HFBA salt. LCMS ($C_{11}H_{21}BNO_4^+$) (ES, m/z): 242 $[M+H]^+$. $^1H$ NMR (500 MHz, $D_2O$) δ 3.74 (s, 1H), 3.45-3.28 (m, 2H), 2.21-2.16 (m, 1H), 1.88-1.78 (m, 1H), 1.63-1.60 (m, 2H), 1.55-1.47 (m, 2H), 1.45-1.28 (m, 3H), 1.12-1.01 (m, 1H), 0.89-0.73 (m, 1H), 0.66 (d, J=7.0 Hz, 2H).

Example 26: (1S,2S,5R)-1-(3-boronopropyl)-6-oxa-3-azabicyclo[3.2.0]heptane-2-carboxylic Acid

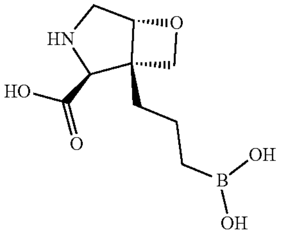 [SMILES: O=C(O)[C@H]1NC[C@@H]2OC[C@@]21CCCB(O)O]

Step 1: (2S,3S)-1-benzyl 2-methyl 3-allyl-3-(hydroxymethyl)-4-oxopyrrolidine-1,2-dicarboxylate

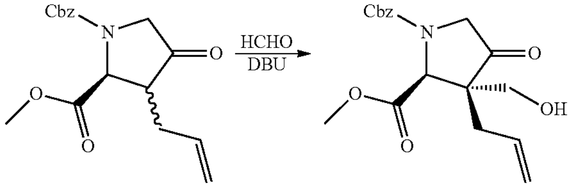

DBU (0.14 mL, 0.95 mmol) in THF (0.30 mL) was added to a mixture of (2S)-1-benzyl 2-methyl 3-allyl-4-oxopyrrolidine-1,2-dicarboxylate (3.0 g, 9.5 mmol) and 37 wt % formaldehyde in $H_2O$ (0.70 mL, 9.5 mmol) in THF (40 mL) at 0° C. The resulting mixture was stirred at 0° C. for 1 h, then at 20° C. for 14 h. The reaction mixture was concentrated and the residue was purified by flash silica gel chromatography (EtOAc in hexanes) to give (2S,3S)-1-benzyl 2-methyl 3-allyl-3-(hydroxymethyl)-4-oxopyrrolidine-1,2-dicarboxylate. LCMS ($C_{18}H_{22}NO_6^+$) (ES, m/z): 348 $[M+H]^+$.

Step 2: (2S,3S)-1-benzyl 2-methyl 3-allyl-3-(((tert-butyldimethylsilyl)oxy)methyl)-4-oxopyrrolidine-1,2-dicarboxylate

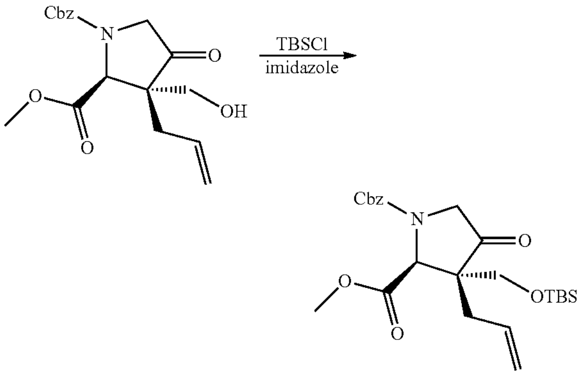

TBSCl (2.1 g, 14 mmol) was added to a mixture of (2S,3S)-1-benzyl 2-methyl 3-allyl-3-(hydroxymethyl)-4-oxopyrrolidine-1,2-dicarboxylate (2.4 g, 6.9 mmol) and imidazole (1.2 g, 17 mmol) in DCM (30 mL) at 0° C. The resulting mixture was stirred at 0° C. for 1 h, then at 20° C. for 14 h. The reaction mixture was quenched with saturated aqueous $NH_4Cl$ and extracted with DCM. The combined organic phases were washed with brine, dried over anhydrous $Na_2SO_4$, filtered, and concentrated under reduced pressure. The residue was purified by flash silica gel chromatography (EtOAc in hexanes) to give (2S,3S)-1-benzyl 2-methyl 3-allyl-3-(((tert-butyldimethylsilyl)oxy)methyl)-4-oxopyrrolidine-1,2-dicarboxylate. LCMS ($C_{24}H_{36}NO_6Si^+$) (ES, m/z): 462 $[M+H]^+$.

Step 3: (2S,3S,4R)-1-benzyl 2-methyl 3-allyl-3-(((tert-butyldimethylsilyl)oxy)methyl)-4-hydroxy-pyrrolidine-1,2-dicarboxylate

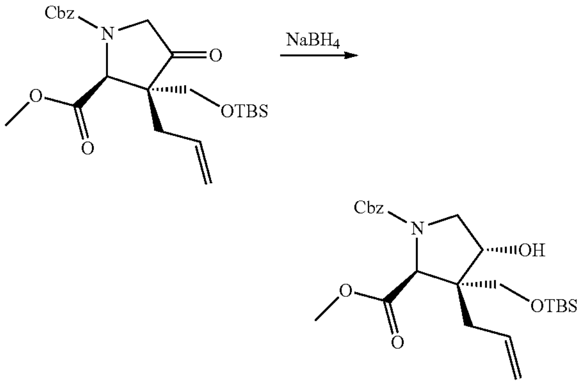

$NaBH_4$ (0.25 g, 6.5 mmol) was added to a mixture of (2S,3S)-1-benzyl 2-methyl 3-allyl-3-(((tert-butyldimethylsilyl)oxy)methyl)-4-oxopyrrolidine-1,2-dicarboxylate (3.0 g, 6.5 mmol) in MeOH (40 mL), and the resulting mixture was stirred at 25° C. for 0.5 h, then quenched with acetone. The reaction mixture was concentrated, and the residue was purified by flash silica gel chromatography (EtOAc in hexanes) to give (2S,3S,4R)-1-benzyl 2-methyl 3-allyl-3-(((tert-butyldimethylsilyl)oxy)methyl)-4-hydroxypyrrolidine-1,2-dicarboxylate. The stereochemistry was assigned by 2D NMR. LCMS ($C_{24}H_{38}NO_6Si^+$) (ES, m/z): 464 $[M+H]^+$. $^1H$ NMR (400 MHz, $CDCl_3$) δ 7.38-7.26 (m, 5H), 5.89-5.73 (m, 1H), 5.22-4.99 (m, 4H), 4.42-4.32 (m, 2H), 3.94-3.76 (m, 3H), 3.76-3.51 (m, 4H), 3.49-3.40 (m, 1H), 2.32-2.17 (m, 1H), 2.15-2.05 (m, 1H), 0.91-0.87 (m, 9H), 0.12-0.02 (m, 6H).

Step 4: (2S,3S,4R)-1-benzyl 2-methyl 3-allyl-4-hydroxy-3-(hydroxymethyl)pyrrolidine-1,2-dicarboxylate

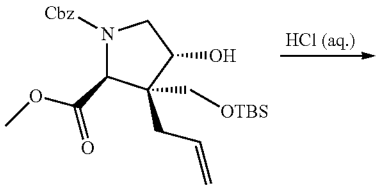

-continued

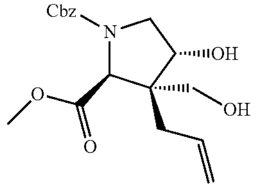

2 N HCl in water (7.0 mL, 14 mmol) was added to a mixture of (2S,3S,4R)-1-benzyl 2-methyl 3-allyl-3-(((tert-butyldimethylsilyl)oxy)methyl)-4-hydroxypyrrolidine-1,2-dicarboxylate (400 mg, 0.86 mmol) in THF (6.0 mL), and the resulting mixture was stirred at 35° C. for 2 h, then quenched with $NaHCO_3$ to pH 7-8 at 0° C. and extracted with EtOAc. The combined organic phases were washed with brine, dried over anhydrous $Na_2SO_4$, filtered, and concentrated under reduced pressure. The residue was purified by flash silica gel chromatography (EtOAc in hexanes) to give (2S,3S,4R)-1-benzyl 2-methyl 3-allyl-4-hydroxy-3-(hydroxymethyl)pyrrolidine-1,2-dicarboxylate. LCMS ($C_{18}H_{24}NO_6^+$) (ES, m/z): 350 $[M+H]^+$.

Step 5: (2S,3S,4R)-1-benzyl 2-methyl 3-allyl-4-hydroxy-3-((((4-(trifluoromethyl)phenyl)sulfonyl)oxy)methyl)pyrrolidine-1,2-dicarboxylate

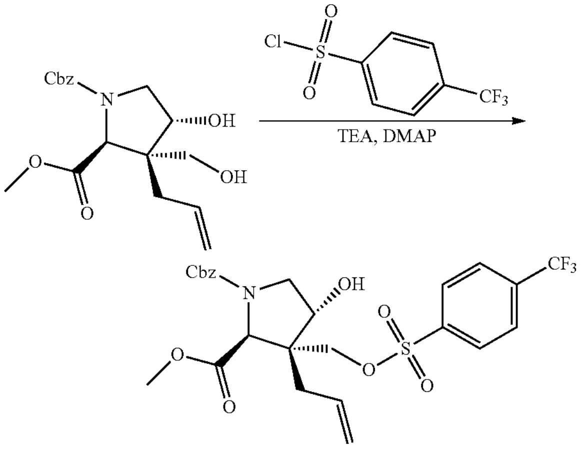

N,N-dimethylpyridin-4-amine (3.9 mg, 0.031 mmol) was added to a mixture of (2S,3S,4R)-1-benzyl 2-methyl 3-allyl-4-hydroxy-3-(hydroxymethyl)pyrrolidine-1,2-dicarboxylate (110 mg, 0.32 mmol), 4-(trifluoromethyl)benzene-1-sulfonyl chloride (81 mg, 0.33 mmol) and triethylamine (0.22 mL, 1.6 mmol) in DCM (8.0 mL) at 0° C. The resulting mixture was stirred at 0° C. for 2.5 h, followed by addition of 4-(trifluoromethyl)benzene-1-sulfonyl chloride (77 mg, 0.32 mmol). The reaction mixture was stirred at 0° C. for 1 h, then at 25° C. for 13 h, before quenched with saturated aqueous $NH_4Cl$ and extracted with DCM. The combined organic layers were washed with brine, dried over anhydrous $Na_2SO_4$, filtered, and concentrated. The residue was purified by flash silica gel chromatography (EtOAc in hexanes) to give (2S,3S,4R)-1-benzyl 2-methyl 3-allyl-4-hydroxy-3-((((4-(trifluoromethyl)phenyl)sulfonyl)oxy)methyl)pyrrolidine-1,2-dicarboxylate. LCMS ($C_{24}H_{27}F_3NO_6S^+$) (ES, m/z): 514 $[M+H-CO_2]^+$.

Step 6: (1S,2S,5R)-3-benzyl 2-methyl 1-allyl-6-oxa-3-azabicyclo[3.2.0]heptane-2,3-dicarboxylate

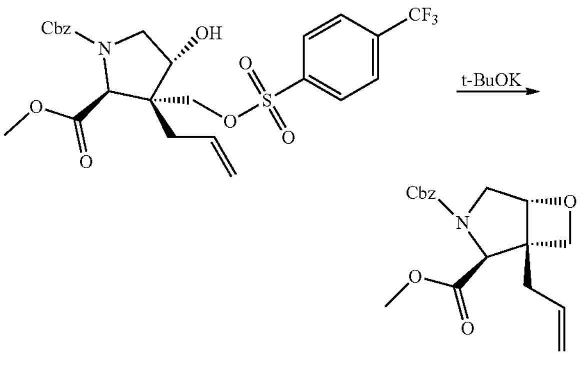

Potassium 2-methylpropan-2-olate (0.63 mL, 0.63 mmol, 1.0 M in THF) was added to a mixture of (2S,3S,4R)-1-benzyl 2-methyl 3-allyl-4-hydroxy-3-((((4-(trifluoromethyl)phenyl)sulfonyl)oxy)methyl)pyrrolidine-1,2-dicarboxylate (320 mg, 0.57 mmol) in THF (7.0 mL) at 0° C. under $N_2$, and the resulting mixture was stirred at 0° C. for 1 h, then quenched with saturated aqueous $NH_4Cl$ and extracted with DCM. The combined organic layers were washed with brine, dried over anhydrous $Na_2SO_4$, filtered, and concentrated. The residue was purified by flash silica gel chromatography (EtOAc in hexanes) to give (1S,2S,5R)-3-benzyl 2-methyl 1-allyl-6-oxa-3-azabicyclo[3.2.0]heptane-2,3-dicarboxylate. LCMS ($C_{18}H_{22}NO_5^+$) (ES, m/z): 332 [M+H]$^+$.

Step 7: (1S,2S,5R)-3-benzyl 2-methyl J-(3-(4,4,5,5-tetramethyl-1,3,2-dioxaborolan-2-yl)propyl)-6-oxa-3-azabicyclo[3.2.0]heptane-2,3-dicarboxylate

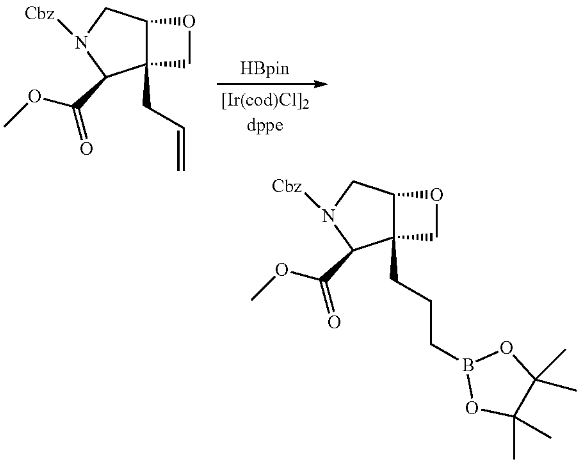

A mixture of 1,2-bis(diphenylphosphino)ethane (6.7 mg, 0.017 mmol), $[Ir(cod)Cl]_2$ (8.1 mg, 0.012 mmol) and 4,4,5,5-tetramethyl-1,3,2-dioxaborolane (0.18 mL, 1.2 mmol) in DCM (8.0 mL) was stirred at 25° C. for 15 minutes under $N_2$, followed by addition of (1S,2S,5R)-3-benzyl 2-methyl 1-allyl-6-oxa-3-azabicyclo[3.2.0]heptane-2,3-dicarboxylate (80 mg, 0.24 mmol) in DCM (1.5 mL). The reaction mixture was stirred at 25° C. for 15 h under $N_2$, then concentrated and the residue was purified by flash silica gel chromatography (EtOAc in hexanes) to give (1S,2S,5R)-3-benzyl 2-methyl 1-(3-(4,4,5,5-tetramethyl-1,3,2-dioxaborolan-2-yl)propyl)-6-oxa-3-azabicyclo[3.2.0]heptane-2,3-dicarboxylate. LCMS ($C_{24}H_{35}BNO_7^+$) (ES, m/z): 460 [M+H]$^+$.

Step 8: (1S,2S,5R)-methyl 1-(3-(4,4,5,5-tetramethyl-1,3,2-dioxaborolan-2-yl)propyl)-6-oxa-3-azabicyclo[3.2.0]heptane-2-carboxylate

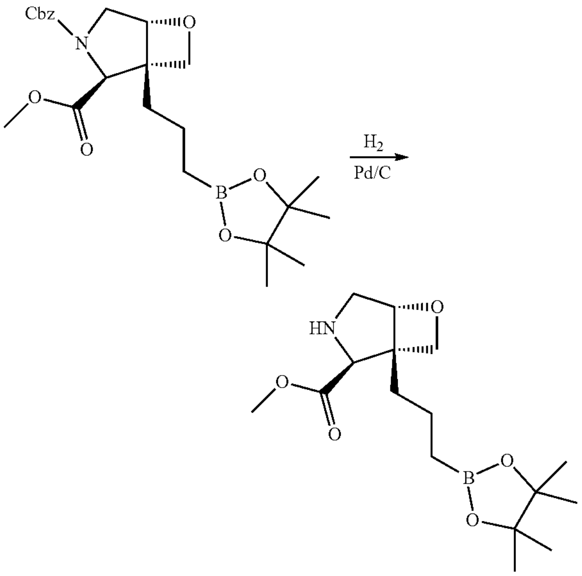

10% Pd—C (139 mg, 0.13 mmol) was added to a mixture of (1S,2S,5R)-3-benzyl 2-methyl 1-(3-(4,4,5,5-tetramethyl-1,3,2-dioxaborolan-2-yl)propyl)-6-oxa-3-azabicyclo[3.2.0]heptane-2,3-dicarboxylate (60 mg, 0.13 mmol) in MeOH (8.0 mL) under $N_2$. The resulting mixture was degassed and backfilled with $H_2$ (three times), then stirred under $H_2$ (15 psi) at 25° C. for 1 h. The reaction mixture was filtered and concentrated under reduced pressure to give crude (1S,2S,5R)-methyl 1-(3-(4,4,5,5-tetramethyl-1,3,2-dioxaborolan-2-yl)propyl)-6-oxa-3-azabicyclo[3.2.0]heptane-2-carboxylate with corresponding boronic acid, which was used in next step directly without further purification. LCMS ($C_{16}H_{29}BNO_5^+$) (ES, m/z): 326 [M+H]$^+$.

Step 9: (1S,2S,5R)-1-(3-boronopropyl)-6-oxa-3-azabicyclo[3.2.0]heptane-2-carboxylic Acid

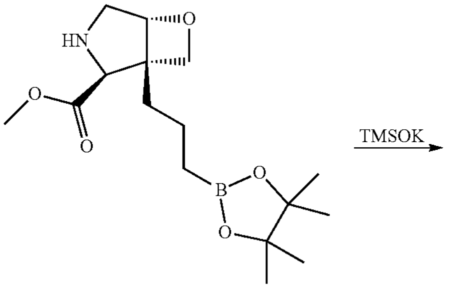

-continued

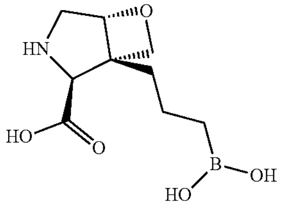

Example 26

Potassium trimethylsilanolate (160 mg, 1.2 mmol) was added to a mixture of (1S,2S,5R)-methyl 1-(3-(4,4,5,5-tetramethyl-1,3,2-dioxaborolan-2-yl)propyl)-6-oxa-3-azabicyclo[3.2.0]heptane-2-carboxylate (80 mg, 0.14 mmol) and THF (6.0 mL) at 25° C., and the resulting mixture was stirred at 25° C. for 12 h, followed by addition of 30 wt % $NH_3{\cdot}H_2O$ (0.50 mL) and $H_2O$ (6.0 mL). The reaction mixture was stirred at 25° C. for 24 h, then concentrated under reduced pressure. The residue was purified by RP-HPLC [C18 column, water (10 mM $NH_4HCO_3$)—$CH_3CN$] to give (1S,2S,5R)-1-(3-boronopropyl)-6-oxa-3-azabicyclo[3.2.0]heptane-2-carboxylic acid. LCMS ($C_9H_{15}BNO_4^+$) (ES, m/z): 212 $[M+H-H_2O]^+$. $^1H$ NMR (400 MHz, $D_2O$) δ 5.18 (d, J=3.1 Hz, 1H), 4.71-4.65 (m, 1H), 4.39 (d, J=7.0 Hz, 1H), 4.17 (s, 1H), 3.66-3.58 (m, 1H), 3.50-3.42 (m, 1H), 1.80-1.68 (m, 1H), 1.68-1.51 (m, 2H), 1.50-1.37 (m, 1H), 0.82-0.74 (m, 2H).

Example 27: (3aS,4S,6aR)-3a-(3-boronopropyl)hexahydro-1H-furo[3,4-c]pyrrole-4-carboxylic Acid

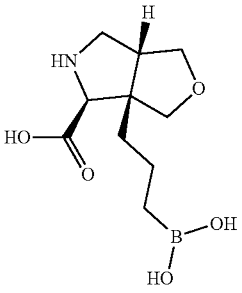 [SMILES: O=C(O)[C@H]1NC[C@@H]2COC[C@@]21CCCB(O)O]

Step 1: (2S,3S,Z)-1-benzyl 2-methyl 3-allyl-3-(((tert-butyldimethylsilyl)oxy)methyl)-4-(methoxymethylene)pyrrolidine-1,2-dicarboxylate

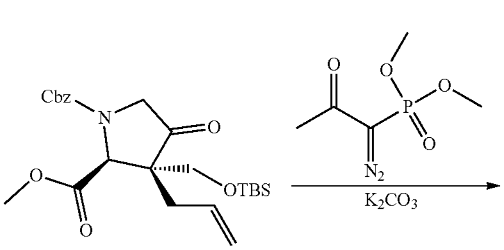

-continued

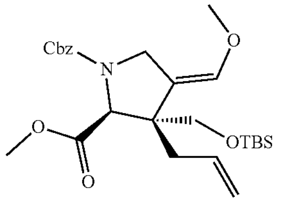

Dimethyl (1-diazo-2-oxopropyl)phosphonate (1.0 g, 5.3 mmol) was added to a solution of (2S,3S)-1-benzyl 2-methyl 3-allyl-3-(((tert-butyldimethylsilyl)oxy)methyl)-4-oxopyrrolidine-1,2-dicarboxylate (1.6 g, 3.5 mmol) and potassium carbonate (0.97 g, 7.0 mmol) in MeOH (30 mL) at 30° C., and the resulting mixture was stirred for 12 h. The reaction mixture was quenched with saturated aqueous $NH_4Cl$ and extracted with EtOAc. The combined organic phases were washed with brine, dried over anhydrous $Na_2SO_4$, filtered, and concentrated under reduced pressure. The residue was purified by silica gel column chromatography (EtOAc in hexanes) to give (2S,3S)-1-benzyl 2-methyl 3-allyl-3-(((tert-butyldimethylsilyl)oxy)methyl)-4-(methoxymethylene)pyrrolidine-1,2-dicarboxylate. LCMS ($C_{26}H_{40}NO_6Si^+$) (ESI, m/z): 490 $[M+H]^+$.

Step 2: (3aS,4S)-5-benzyl 4-methyl 3a-allyl-1-hydroxytetrahydro-1H-furo[3,4-c]pyrrole-4,5(3H)-dicarboxylate

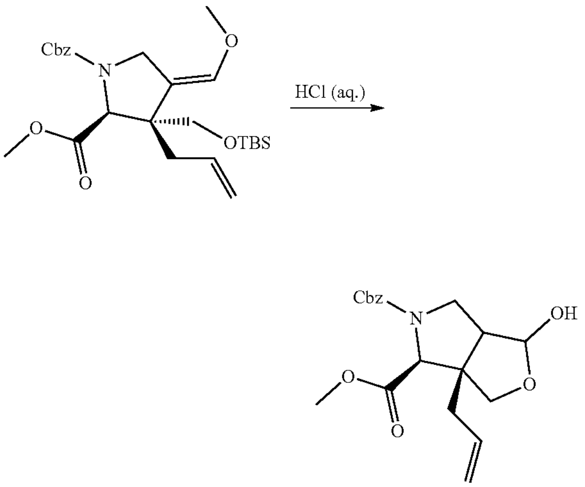

A mixture of (2S,3S)-1-benzyl 2-methyl 3-allyl-3-(((tert-butyldimethylsilyl)oxy)methyl)-4-(methoxymethylene)pyrrolidine-1,2-dicarboxylate (618 mg, 1.3 mmol) and 2 N HCl in water (30 mL, 60 mmol) in THF (16 mL) was stirred at 50° C. for 30 h. The reaction mixture was diluted with brine and extracted with EtOAc. The combined organic phases were washed with brine, dried over anhydrous $Na_2SO_4$, filtered, and concentrated under reduced pressure. The residue was purified by silica gel column chromatography (EtOAc in hexanes) to give (3aS,4S)-5-benzyl 4-methyl 3a-allyl-1-hydroxytetrahydro-1H-furo[3,4-c]pyrrole-4,5(3H)-dicarboxylate. LCMS ($C_{19}H_{24}NO_6^+$) (ESI, m/z): 362 $[M+H]^+$.

Step 3: (3aS,4S,6aR)-5-benzyl 4-methyl 3a-allyltetrahydro-1H-furo[3,4-c]pyrrole-4,5(3H)-dicarboxylate

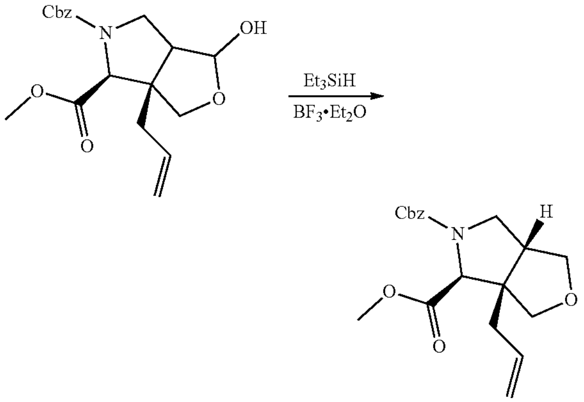

$BF_3$·$Et_2O$ (0.13 mL, 1.1 mmol) was added to a solution of (3aS,4S)-5-benzyl 4-methyl 3a-allyl-1-hydroxytetrahydro-1H-furo[3,4-c]pyrrole-4,5(3H)-dicarboxylate (190 mg, 0.53 mmol) and triethylsilane (0.14 mL, 0.89 mmol) in DCM (6.0 mL) at 0° C., and the resulting mixture was stirred for 1.5 h at 0° C. The reaction mixture was quenched with methanol and concentrated under reduced pressure. The residue was purified by silica gel column chromatography (EtOAc in hexanes) to give (3aS,4S,6aR)-5-benzyl 4-methyl 3a-allyltetrahydro-1H-furo[3,4-c]pyrrole-4,5(3H)-dicarboxylate. LCMS ($C_{19}H_{24}NO_5^+$) (ESI, m/z): 346 $[M+H]^+$.

Step 4: (3aS,4S)-5-benzyl 4-methyl 3a-(3-(4,4,5,5-tetramethyl-1,3,2-dioxaborolan-2-yl)propyl)tetrahydro-1H-furo[3,4-c]pyrrole-4,5(3H)-dicarboxylate

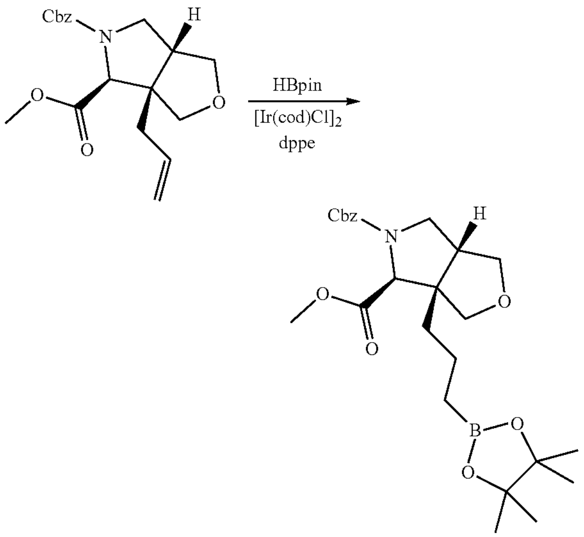

4,4,5,5-Tetramethyl-1,3,2-dioxaborolane (0.29 mL, 2.0 mmol) was added to a mixture of dppe (13 mg, 0.032 mmol) and $[Ir(cod)Cl]_2$ (16 mg, 0.024 mmol) in DCM (2.0 mL) under $N_2$ at 0° C., followed by addition of (3aS,4S,6aR)-5-benzyl 4-methyl 3a-allyltetrahydro-1H-furo[3,4-c]pyrrole-4,5(3H)-dicarboxylate (140 mg, 0.41 mmol) in DCM (2.0 mL), and the resulting mixture was stirred at 28° C. for 16 h. The reaction mixture was quenched with MeOH and concentrated under reduced pressure. The residue was purified by RP-HPLC [C18 column, water (0.1% TFA)-$CH_3CN$] to give a mixture of (3aS,4S,6aR)-5-benzyl 4-methyl 3a-(3-(4,4,5,5-tetramethyl-1,3,2-dioxaborolan-2-yl)propyl)tetrahydro-1H-furo[3,4-c]pyrrole-4,5(3H)-dicarboxylate and its corresponding boronic acid. LCMS ($C_{25}H_{37}BNO_7^+$) (ESI, m/z): 474 $[M+H]^+$.

Step 5: (3aS,4S,6aR)-3a-(3-boronopropyl)hexahydro-1H-furo[3,4-c]pyrrole-4-carboxylic Acid

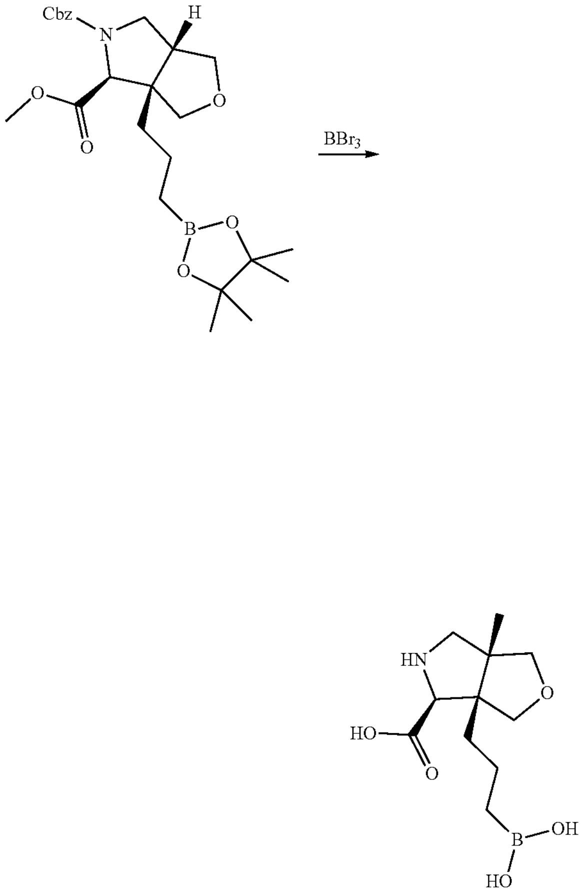

Example 27

A mixture of (3aS,4S,6aR)-5-benzyl 4-methyl 3a-(3-(4,4,5,5-tetramethyl-1,3,2-dioxaborolan-2-yl)propyl)tetrahydro-1H-furo[3,4-c]pyrrole-4,5(3H)-dicarboxylate (90 mg, 0.19 mmol) and $BBr_3$ (1.8 mL, 19 mmol) in DCM (10 mL) was stirred at 28° C. for 40 h, and the solvent was removed by a stream of $N_2$. The residue was purified by RP-HPLC [C18 column, water (20 mM HFBA and 0.1% TFA)-$CH_3CN$] to give (3aS,4S,6aR)-3a-(3-boronopropyl)hexahydro-1H-furo[3,4-c]pyrrole-4-carboxylic acid as an HFBA salt. LCMS ($C_{10}H_{17}BNO_4^+$) (ESI, m/z): 226 $[M+H-H_2O]^+$. $^1H$ NMR (500 MHz, $D_2O$) δ 4.01 (s, 1H), 3.96 (d, J=9.9 Hz, 1H), 3.81-3.62 (m, 3H), 3.52 (d, J=9.9 Hz, 1H), 3.02-2.93 (m, 1H), 2.92-2.83 (m, 1H), 1.56-1.43 (m, 2H), 1.41-1.22 (m, 2H), 0.66 (t, J=7.5 Hz, 2H).

Example 28: (1S,2S,5R)-1-(3-boronopropyl)-6-thia-3-azabicyclo[3.2.0]heptane-2-carboxylic Acid Hydrochloride

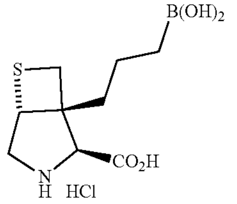

Step 1: 1-(tert-butyl) 2-methyl (2S,3S,4S)-3-allyl-4-((chloromethyl)sulfonyl)-3-(((chloromethyl)sulfonyl)methyl)pyrrolidine-1,2-dicarboxylate

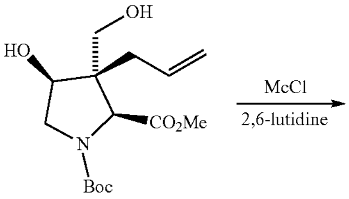

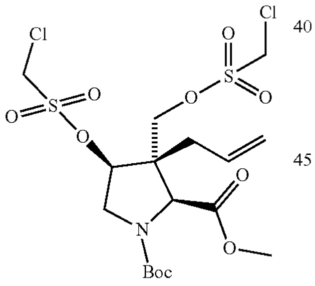

Chloromethanesulfonyl chloride (36 mL, 400 mmol) was added dropwise into a mixture of (2S,3S,4S)-1-tert-butyl 2-methyl 3-allyl-4-hydroxy-3-(hydroxymethyl)pyrrolidine-1,2-dicarboxylate (42 g, 133 mmol), 2,6-dimethylpyridine (124 mL, 1065 mmol) in anhydrous DCM (600 mL) at 0° C., and the resulting mixture was stirred at 0° C. for 0.5 h, then at 25° C. for 1 h. The reaction mixture was diluted with $H_2O$ and extracted with DCM. The combined organic phases were washed with 1 N HCl in water, saturated aqueous $NaHCO_3$ and brine, dried over $Na_2SO_4$, filtered, and concentrated. The residue was purified by flash silica gel chromatography (EtOAc in hexanes) to give (2S,3S,4S)-1-tert-butyl 2-methyl 3-allyl-4-(((chloromethyl)sulfonyl)oxy)-3-((((chloromethyl)sulfonyl)oxy)methyl)pyrrolidine-1,2-dicarboxylate. LCMS ($C_{12}H_{20}Cl_2NO_8S_2^+$) (ES, m/z): 440 [M+H−Boc]$^+$.

Step 2: 1-(tert-butyl) 2-methyl (2S,3S,4S)-4-((chloromethyl)sulfonyl)-3-(((chloromethyl)sulfonyl)methyl)-3-(3-(4,4,5,5-tetramethyl-1,3,2-dioxaborolan-2-yl)propyl)pyrrolidine-1,2-dicarboxylate

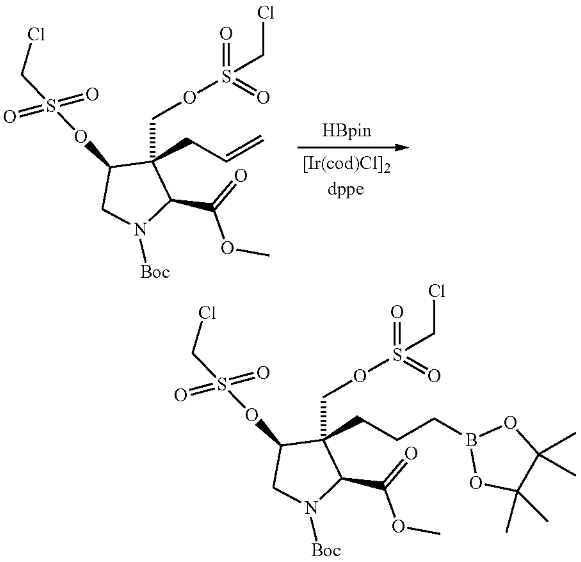

4,4,5,5-Tetramethyl-1,3,2-dioxaborolane (21 mL, 148 mmol) was added dropwise to a mixture of dppe (1.2 g, 3.0 mmol) and $[Ir(cod)Cl]_2$ (0.99 g, 1.5 mmol) in DCM (350 mL) at 0° C. under $N_2$ over 10 minutes, followed by dropwise addition of a solution of (2S,3S,4S)-1-tert-butyl 2-methyl 3-allyl-4-(((chloromethyl)sulfonyl)oxy)-3-((((chloromethyl)sulfonyl)oxy)methyl)pyrrolidine-1,2-dicarboxylate (16 g, 30 mmol) in DCM (300 mL) over 1 h at 0° C. under $N_2$. The reaction mixture was stirred at 25° C. for 12 h, and concentrated in vacuo. The residue was directly purified by silica gel chromatography (EtOAc in hexanes) to give (2S,3S,4S)-1-tert-butyl 2-methyl 4-(((chloromethyl)sulfonyl)oxy)-3-((((chloromethyl)sulfonyl)oxy)methyl)-3-(3-(4,4,5,5-tetramethyl-1,3,2-dioxaborolan-2-yl)propyl)pyrrolidine-1,2-dicarboxylate. LCMS ($C_{18}H_{33}BCl_2NO_{10}S_2^+$) (ES, m/z): 568 [M+H−Boc]$^+$.

Step 3: 1-(tert-butyl) 2-methyl (2S,3S,4S)-3-((acetylthio)methyl)-4-((chloromethyl)sulfonyl)-3-(3-(4,4,5,5-tetramethyl-1,3,2-dioxaborolan-2-yl)propyl)pyrrolidine-1,2-dicarboxylate

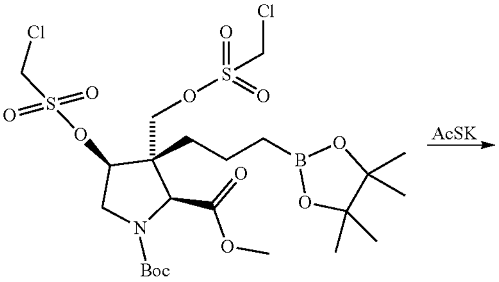

-continued

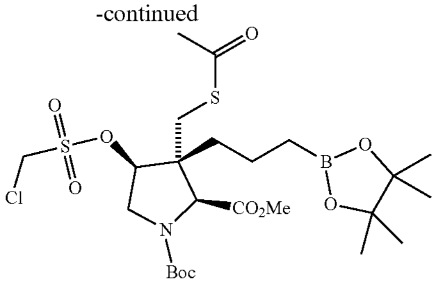

A mixture of potassium thioacetate (4.3 g, 38 mmol) in DMF (45 mL) was added dropwise to a mixture of ((2S,3S,4S)-1-tert-butyl 2-methyl 4-(((chloromethyl)sulfonyl)oxy)-3-((((chloromethyl)sulfonyl)oxy)methyl)-3-(3-(4,4,5,5-tetramethyl-1,3,2-dioxaborolan-2-yl)propyl)pyrrolidine-1,2-dicarboxylate (19 g, 29 mmol) in DMF (57 mL) over 2 h at 35° C. under $N_2$, and the resulting mixture was stirred at 40° C. for 28 h under $N_2$. The reaction mixture was diluted with EtOAc and washed with water. The organic layer was separated, dried over anhydrous $Na_2SO_4$, filtered, and concentrated in vacuo. The residue was purified by silica gel chromatography (EtOAc in hexanes) to give (2S,3R,4S)-1-tert-butyl 2-methyl 3-((acetylthio)methyl)-4-(((chloromethyl)sulfonyl)oxy)-3-(3-(4,4,5,5-tetramethyl-1,3,2-dioxaborolan-2-yl)propyl)pyrrolidine-1,2-dicarboxylate. LCMS ($C_{19}H_{34}BClNO_8S_2^+$) (ES, m/z): 514 [M+H−Boc]$^+$.

Step 4: 3-(tert-butyl) 2-methyl (1S,2S,5R)-1-(3-(4,4,5,5-tetramethyl-1,3,2-dioxaborolan-2-yl)propyl)-6-thia-3-azabicyclo[3.2.0]heptane-2,3-dicarboxylate

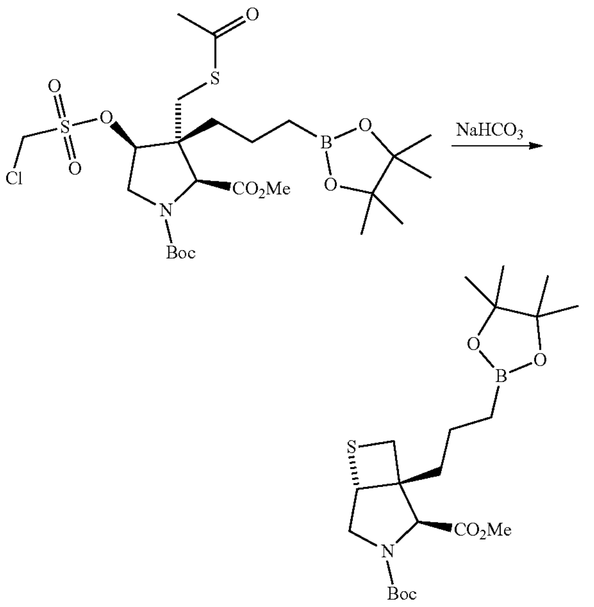

$NaHCO_3$ (8.8 g, 104 mmol) was added to a mixture of (2S,3R,4S)-1-tert-butyl 2-methyl 3-((acetylthio)methyl)-4-(((chloromethyl)sulfonyl)oxy)-3-(3-(4,4,5,5-tetramethyl-1,3,2-dioxaborolan-2-yl)propyl)pyrrolidine-1,2-dicarboxylate (16 g, 26 mmol) in EtOH (410 mL) and water (21 mL) under $N_2$, and the resulting mixture was stirred at 90° C. for 8 h. The reaction mixture was concentrated, and the crude mixture was diluted with DCM, filtered, and concentrated in vacuo. The residue was purified by SFC [Column: DAICEL CHIRALPAK AD (250 mm*50 mm, 10 um), Mobile phase: A: $CO_2$, B: Heptane-EtOH (0.1% $NH_3 \cdot H_2O$), Gradient: 10% of B in 3.5 minutes, and hold 10% of B for 1 min, Flow Rate (mL/min) 180, Column temperature: 40° C.] to give (1S,2S,5R)-3-tert-butyl 2-methyl 1-(3-(4,4,5,5-tetramethyl-1,3,2-dioxaborolan-2-yl)propyl)-6-thia-3-azabicyclo[3.2.0]heptane-2,3-dicarboxylate. LCMS ($C_{16}H_{29}BNO_4S^+$) (ES, m/z): 342 [M+H−Boc]$^+$.

Step 5: (1S,2S,5R)-1-(3-boronopropyl)-6-thia-3-azabicyclo[3.2.0]heptane-2-carboxylic Acid Hydrochloride

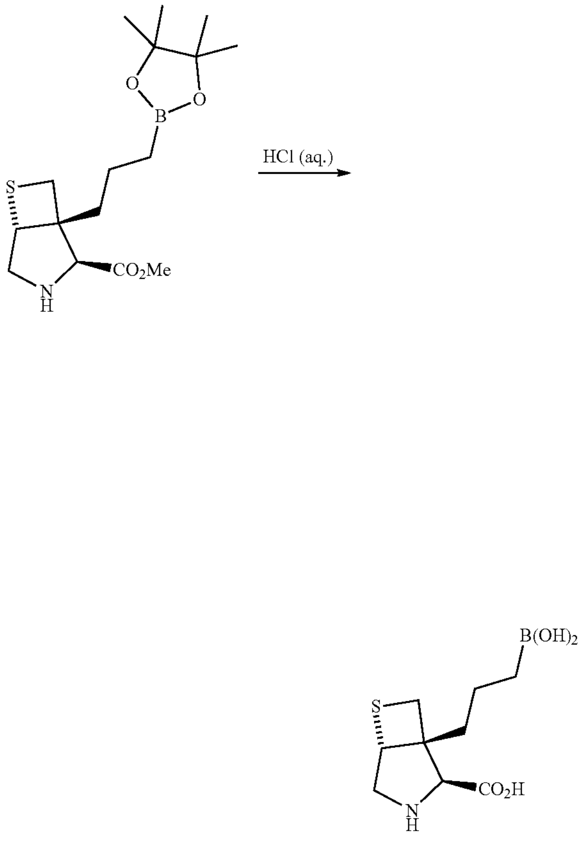

Example 28

A mixture of (1S,2S,5R)-3-tert-butyl 2-methyl 1-(3-(4,4,5,5-tetramethyl-1,3,2-dioxaborolan-2-yl)propyl)-6-thia-3-azabicyclo[3.2.0]heptane-2,3-dicarboxylate (14 g, 32 mmol) and 12 N HCl in water (20 mL, 240 mmol) was stirred at 80° C. for 12 h under $N_2$. The reaction mixture was concentrated in vacuo, and the residue was diluted in water, washed with EtOAc and DCM. The aqueous phase was concentrated in vacuo to give (1S,2S,5R)-1-(3-boronopropyl)-6-thia-3-azabicyclo[3.2.0]heptane-2-carboxylic acid as an HCl salt. LCMS ($C_9H_{15}BNO_3S^+$) (ES, m/z): 228 [M+H−$H_2O$]$^+$. $^1H$ NMR (500 MHz, $D_2O$) δ 4.74 (s, 1H), 4.01 (d, J=6.0 Hz, 1H), 3.76-3.72 (m, 1H), 3.55-3.49 (m, 1H), 3.35-3.33 (m, 1H), 2.91-2.89 (m, 1H), 1.59-1.41 (m, 4H), 0.76-0.67 (m, 2H).

Example 29: 1-(2-boronoethyl)-5-azaspiro 2.4 heptane-4-carboxylic Acid

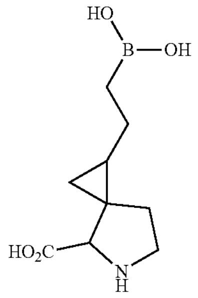 [SMILES: O=C(O)C1NCCC12CC2CCB(O)O]

Step 1: 1-tert-butyl 2-ethyl 3-(2-methoxy-2-oxoethylidene)pyrrolidine-1,2-dicarboxylate

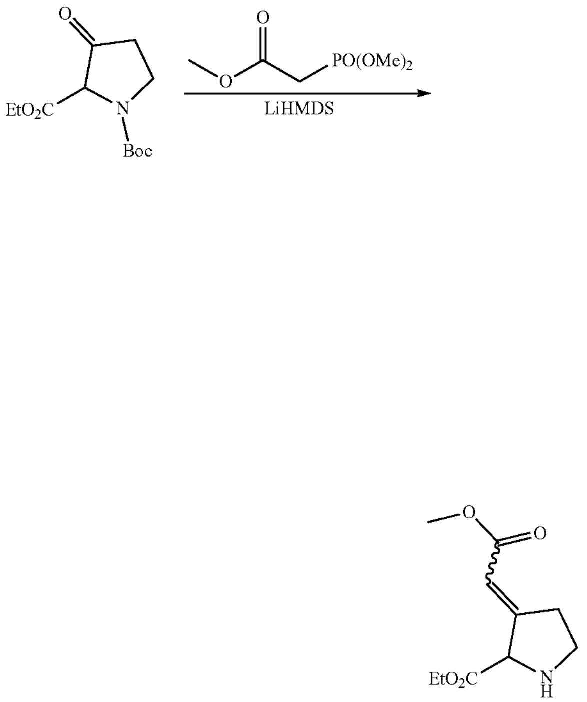

LiHMDS (12 mL, 12 mmol, 1.0 M in THF) was added to a mixture of methyl 2-(dimethoxyphosphoryl)acetate (2.3 g, 12 mmol) in THF (13 mL) at 20° C. under $N_2$, and the resulting mixture was stirred for 0.5 h at 20° C., followed by addition of a solution of 1-tert-butyl 2-ethyl 3-oxopyrrolidine-1,2-dicarboxylate (2.8 g, 11 mmol) in THF (12 mL) at 0° C. The reaction mixture was stirred for 15 minutes at 0° C., then for 1 h at 20° C. under $N_2$, before quenched with saturated aqueous $NH_4Cl$ and extracted with EtOAc. The combined organic phases were washed with brine, dried over anhydrous $Na_2SO_4$, filtered, and concentrated under reduced pressure. The residue was purified by flash silica gel chromatography (EtOAc in hexanes) to give 1-tert-butyl 2-ethyl 3-(2-methoxy-2-oxoethylidene)pyrrolidine-1,2-dicarboxylate. LCMS ($C_{10}H_{16}NO_4^+$) (ES, m/z): 214 [M+H−Boc]$^+$.

Step 2 1-tert-butyl 2-ethyl 3-(2-hydroxyethylidene) pyrrolidine-1,2-dicarboxylate

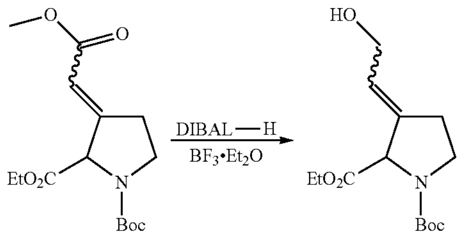

$BF_3$·$OEt_2$ (0.28 mL, 2.2 mmol) was added to a solution of 1-tert-butyl 2-ethyl 3-(2-methoxy-2-oxoethylidene)pyrrolidine-1,2-dicarboxylate (350 mg, 1.1 mmol) in DCM (32 mL) at −78° C. under $N_2$, and the resulting mixture was stirred at −78° C. for 15 minutes, followed by dropwise addition of DIBAL-H (6.7 mL, 6.7 mmol, 1 M in toluene) at −78° C. The reaction mixture was stirred at −78° C. for 1 h under $N_2$, then quenched with saturated aqueous potassium sodium tartrate and extracted with DCM. The combined organic phases were washed with brine, dried over anhydrous $Na_2SO_4$, filtered, and concentrated under reduced pressure. The residue was purified by flash silica gel chromatography (EtOAc in hexanes) to give 1-tert-butyl 2-ethyl 3-(2-hydroxyethylidene)pyrrolidine-1,2-dicarboxylate. LCMS ($C_{10}H_{16}NO_5^+$) (ES, m/z): 230 [M+H−$C_4H_8$]$^+$.

Step 3: 5-tert-butyl 4-ethyl 1-(hydroxyethyl)-5-azaspiro[2.4]heptane-4,5-dicarboxylate

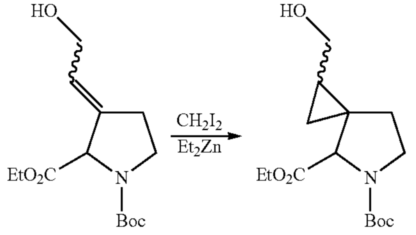

Diethylzinc (0.88 mL, 0.88 mmol, 1 M in toluene) was added dropwise over 5 minutes to a solution of 1-tert-butyl 2-ethyl 3-(2-hydroxyethylidene)pyrrolidine-1,2-dicarboxylate (100 mg, 0.35 mmol) in DCM (3.0 mL) at −78° C. under $N_2$. The resulting mixture was stirred for 5 minutes at −78° C., followed by dropwise addition of a solution of diiodomethane (0.057 mL, 0.70 mmol) in DCM (2.0 mL) over 5 minutes at −78° C. under $N_2$. The reaction mixture was stirred at 25° C. for 15 h, then quenched with saturated aqueous $NH_4Cl$ and extracted with DCM. The combined organic phases were washed with brine, dried over $Na_2SO_4$, filtered, and concentrated in vacuo. The residue was purified by RP-HPLC [C18 column, water (0.05% HCl)—$CH_3CN$] to give 5-tert-butyl 4-ethyl 1-(hydroxymethyl)-5-azaspiro[2.4]heptane-4,5-dicarboxylate. LCMS ($C_{10}H_{18}NO_3^+$) (ES, m/z): 200 [M+H−Boc]$^+$.

Step 4: 5-tert-butyl 4-ethyl 1-formyl-5-azaspiro[2.4]heptane-4,5-dicarboxylate

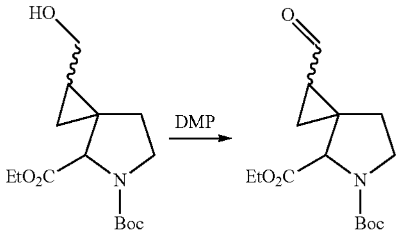 [SMILES: CCOC(=O)C1N(C(=O)OC(C)(C)C)CCC12CC2CO ; CCOC(=O)C1N(C(=O)OC(C)(C)C)CCC12CC2C=O]

Dess-Martin Periodinane (179 mg, 0.42 mmol) was added to a solution of 5-tert-butyl 4-ethyl 1-(hydroxymethyl)-5-azaspiro[2.4]heptane-4,5-dicarboxylate (70 mg, 0.23 mmol) in DCM (3.0 mL) at 25° C., and the resulting mixture was stirred for 16 h at 25° C., then quenched with saturated aqueous $NaHCO_3$ and extracted with DCM. The combined organic phases were washed with brine, dried over anhydrous $Na_2SO_4$, filtered, and concentrated under reduced pressure. The residue was purified by flash silica gel chromatography (EtOAc in hexanes) to give 5-tert-butyl 4-ethyl 1-formyl-5-azaspiro[2.4]heptane-4,5-dicarboxylate. LCMS ($C_{10}H_{15}NO_3^+$) (ES, m/z): 198 [M+H−Boc]$^+$.

Step 5: 5-tert-butyl 4-ethyl 1-vinyl-5-azaspiro[2.4]heptane-4,5-dicarboxylate (PELN: 1007783-037)

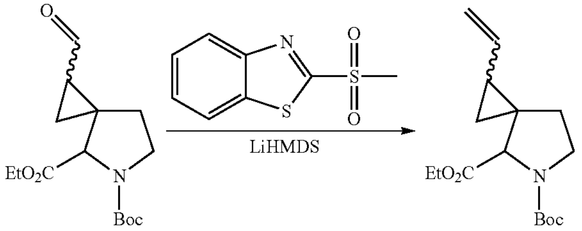

LiHMDS (0.65 mL, 0.65 mmol, 1.0 M in THF) was added to a mixture of 5-tert-butyl 4-ethyl 1-formyl-5-azaspiro[2.4]heptane-4,5-dicarboxylate (80 mg, 0.27 mmol) and 2-(methylsulfonyl)benzo[d]thiazole (75 mg, 0.35 mmol) in THF (3.0 mL) at −78° C. under $N_2$, and the resulting mixture was stirred at −78° C. for 0.5 h, then for 3 h at 25° C. under $N_2$. The reaction mixture was quenched with saturated aqueous $NH_4Cl$ and extracted with EtOAc. The combined organic phases were washed with brine, dried over anhydrous $Na_2SO_4$, filtered, and concentrated under reduced pressure. The residue was purified by flash silica gel chromatography (EtOAc in hexanes) to give 5-tert-butyl 4-ethyl 1-vinyl-5-azaspiro[2.4]heptane-4,5-dicarboxylate. LCMS ($C_{16}H_{26}NO_4^+$) (ES, m/z): 296 [M+H]$^+$.

Step 6: 5-tert-butyl 4-ethyl 1-(2-(4,4,5,5-tetramethyl-1,3,2-dioxaborolan-2-yl)ethyl)-5-azaspiro[2.4]heptane-4,5-dicarboxylate

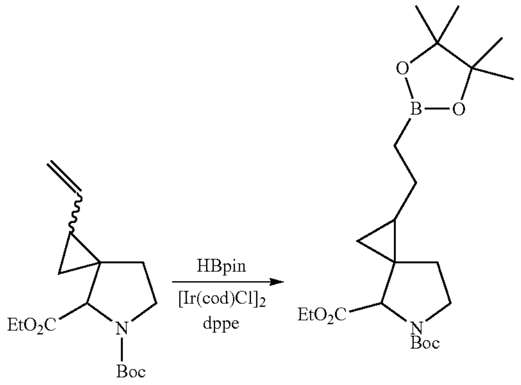 [SMILES: C=CC1CC12CCN(C(=O)OC(C)(C)C)C2C(=O)OCC ; CCOC(=O)C1N(C(=O)OC(C)(C)C)CCC12CC2CCB1OC(C)(C)C(C)(C)O1]

4,4,5,5-Tetramethyl-1,3,2-dioxaborolane (43 mg, 0.34 mmol) was added to a mixture of $[Ir(cod)Cl]_2$ (2.3 mg, 3.4 μmol) and dppe (1.9 mg, 4.7 μmol) in DCM (1.0 mL) at 25° C. under $N_2$, and the resulting mixture was stirred for 10 minutes, followed by addition of a solution of 5-tert-butyl 4-ethyl 1-vinyl-5-azaspiro[2.4]heptane-4,5-dicarboxylate (20 mg, 0.068 mmol) in DCM (0.50 mL) under $N_2$. The mixture was stirred for 15 h at 25° C. under $N_2$. The reaction mixture was diluted with water and extracted with EtOAc. The combined organic phases were washed with brine, dried over anhydrous $Na_2SO_4$, filtered, and concentrated under reduced pressure. The residue was purified by RP-HPLC [C18 column, water (0.1% TFA)-$CH_3CN$] to give a mixture of 5-tert-butyl 4-ethyl 1-(2-(4,4,5,5-tetramethyl-1,3,2-dioxaborolan-2-yl)ethyl)-5-azaspiro[2.4]heptane-4,5-dicarboxylate and its corresponding boronic acid. LCMS ($C_{17}H_{31}BNO_4^+$) (ES, m/z): 324 [M+H−Boc]$^+$.

Step 7 1-(2-boronoethyl)-5-azaspiro[2.4]heptane-4-carboxylic Acid

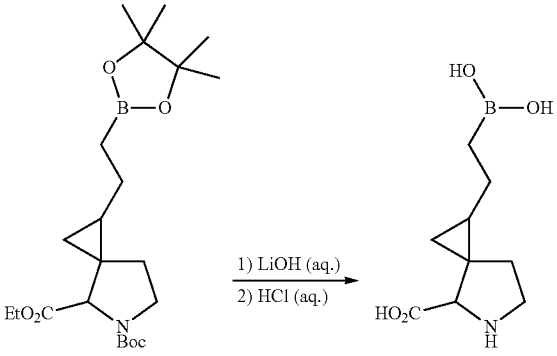

Example 29

A mixture of 5-tert-butyl 4-ethyl 1-(2-(4,4,5,5-tetramethyl-1,3,2-dioxaborolan-2-yl)ethyl)-5-azaspiro[2.4]heptane-4,5-dicarboxylate (12 mg, 0.028 mmol) and 3 M LiOH in water (0.094 mL, 0.28 mmol) in THF (1.0 mL) was stirred for 20 h at 25° C., followed by addition of more 3 M LiOH in water (0.047 mL, 0.14 mmol), and the resulting mixture was stirred at 50° C. for 53 h. Then a third portion of 3 M LiOH in water (0.094 mL, 0.28 mmol) was added, and the reaction mixture was stirred at 50° C. for 20 h, followed by addition of 3N HCl in water (0.50 mL, 1.5 mmol). The reaction mixture was stirred at 25° C. for 17 h. The reaction mixture was concentrated, and the residue was purified by RP-HPLC [C18 column, water (20 mM HFBA and 0.1% TFA)-$CH_3CN$] 1-(2-boronoethyl)-5-azaspiro[2.4]heptane-4-carboxylic acid as an HFBA salt. LCMS ($C_9H_{17}BNO_4^+$) (ES, m/z): 214 $[M+H]^+$. $^1H$ NMR (400 MHz, $D_2O$) δ 3.69 (s, 1H), 3.59-3.48 (m, 1H), 3.45-3.31 (m, 1H), 2.17-2.03 (m, 1H), 1.81-1.70 (m, 1H), 1.36-1.33 (m, 2H), 1.24-1.15 (m, 1H), 0.87-0.85 (m, 1H), 0.83-0.80 (m, 2H), 0.43-0.40 (m, 1H).

Example 30: (3aS,6aR)-5-(boronomethyl)octahydro-cyclopenta[c]pyrrole-1-carboxylic Acid

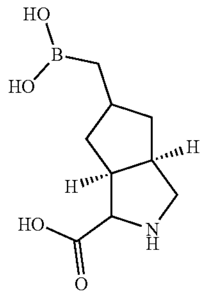 [SMILES: O=C(O)C1NC[C@@H]2CC(CB(O)O)C[C@H]12]

Step 1: (3aR,6aS)-tert-butyl tetrahydro-1H-spiro[cyclopenta[c]pyrrole-5,2'-[1,3]dioxolane]-2(3H)-carboxylate

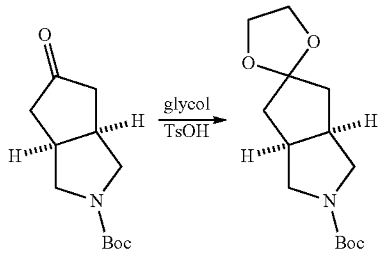

A mixture of (3aR,6aS)-tert-butyl 5-oxohexahydrocyclopenta[c]pyrrole-2(1H)-carboxylate (2.0 g, 8.9 mmol), ethane-1,2-diol (2.2 g, 36 mmol) and TsOH·$H_2O$ (400 mg, 2.1 mmol) in toluene (40 mL) was stirred at 120° C. under $N_2$ for 96 h. The reaction mixture was quenched with saturated aqueous $NaHCO_3$ to pH~7 and extracted with DCM. The combined organic phase was washed with brine, dried over anhydrous magnesium sulfate, filtered, and concentrated under reduced pressure. The residue was purified by flash silica gel chromatography (EtOAc in hexanes) to give (3aR,6aS)-tert-butyl tetrahydro-1H-spiro[cyclopenta[c]pyrrole-5,2'-[1,3]dioxolane]-2(3H)-carboxylate. LCMS ($C_{14}H_{24}NO_4^+$) (ES, m/z): 270 $[M+H]^+$.

Step 2: (3aR,6aS)-2-tert-butyl 1-methyl tetrahydro-1H-spiro[cyclopenta[c]pyrrole-5,2'-[1,3]dioxolane]-1,2(3H)-dicarboxylate

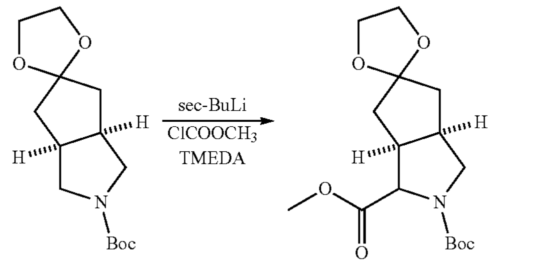 [SMILES: CC(C)(C)OC(=O)N1C[C@@H]2CC3(C[C@@H]2C1)OCCO3 ; "ClCOOCH3TMEDA" ; COC(=O)C1[C@H]2CC3(C[C@H]2CN1C(=O)OC(C)(C)C)OCCO3]

Sec-butyllithium (1.3 mL, 1.7 mmol, 1.3 M in n-hexane) was added to a mixture of N1,N1,N2,N2-tetramethylethane-1,2-diamine (0.13 g, 1.1 mmol) and (3aR,6aS)-tert-butyl tetrahydro-1H-spiro[cyclopenta[c]pyrrole-5,2'-[1,3]dioxolane]-2(3H)-carboxylate (0.30 g, 1.1 mmol) in THF (7.0 mL) at −78° C. under $N_2$ The resulting mixture was stirred at −78° C. for 1.5 h under $N_2$, followed by addition of methyl carbonochloridate (0.10 mL, 1.3 mmol). The reaction mixture was stirred at −78° C. for 1 h, then at 15° C. for 13 h under $N_2$, before being quenched with saturated aqueous $NH_4Cl$ and extracted with DCM. The combined organic layers were washed with brine, dried over anhydrous $Na_2SO_4$, filtered, and concentrated. The residue was purified by flash silica gel chromatography (EtOAc in hexanes) to give (3aR,6aS)-2-tert-butyl 1-methyl tetrahydro-1H-spiro[cyclopenta[c]pyrrole-5,2'-[1,3]dioxolane]-1,2(3H)-dicarboxylate. LCMS ($C_{16}H_{26}NO_6^+$) (ES, m/z): 328 $[M+H]^+$.

Step 3: (3aS,6aR)-2-tert-butyl 1-methyl 5-oxohexahydrocyclopenta[c]pyrrole-1,2(1H)-dicarboxylate

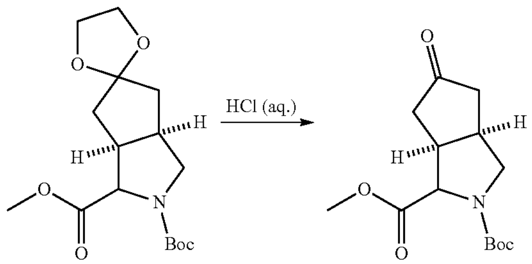 [SMILES: COC(=O)C1[C@H]2CC3(C[C@H]2CN1C(=O)OC(C)(C)C)OCCO3 ; COC(=O)C1[C@H]2CC(=O)C[C@H]2CN1C(=O)OC(C)(C)C]

0.2 N HCl in water (15 mL, 3.0 mmol) was added to a mixture of (3aS,6aR)-2-tert-butyl 1-methyl tetrahydro-1H-spiro[cyclopenta[c]pyrrole-5,2'-[1,3]dioxolane]-1,2(3H)-dicarboxylate (0.98 g, 3.0 mmol) in THF (7.0 mL), and the resulting mixture was stirred at 0° C. for 4 h. The reaction mixture was quenched with anhydrous $NaHCO_3$ to pH 7-8 at 0° C., and extracted with EtOAc. The combined organic layers were washed with brine, dried over anhydrous $Na_2SO_4$, filtered, and concentrated to give crude (3aS,6aR)-2-tert-butyl 1-methyl 5-oxohexahydrocyclopenta[c]pyrrole-1,2(1H)-dicarboxylate, which was used in the next step directly without further purification. LCMS ($C_9H_{13}NO_3^+$) (ES, m/z): 184 [M+H−Boc]+.

Step 4: (3aS,6aR)-2-tert-butyl 1-methyl 5-methylenehexahydrocyclopenta[c]pyrrole-1,2(1H)-dicarboxylate

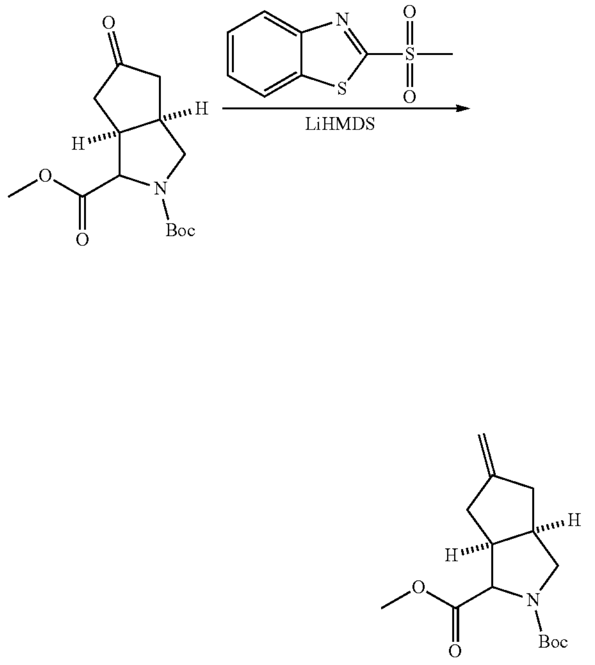

LiHMDS (5.1 mL, 5.1 mmol, 1.0 M in THF) was added to a mixture of (3aS,6aR)-2-tert-butyl 1-methyl 5-oxohexahydrocyclopenta[c]pyrrole-1,2(1H)-dicarboxylate (600 mg, 2.1 mmol) and 2-(methylsulfonyl)benzo[d]thiazole (587 mg, 2.8 mmol) in THF (10 mL) at −78° C. under $N_2$. The resulting mixture was stirred at −78° C. for 0.5 h, then at 20° C. for 12 h under $N_2$. The reaction mixture was quenched with saturated aqueous $NH_4Cl$ and extracted with DCM. The combined organic layers were washed with brine, dried over anhydrous $Na_2SO_4$, filtered, and concentrated. The residue was purified by flash silica gel chromatography (EtOAc in hexanes) to give (3aS,6aR)-2-tert-butyl 1-methyl 5-methylenehexahydrocyclopenta[c]pyrrole-1,2(1H)-dicarboxylate. LCMS ($C_{15}H_{24}NO_4^+$) (ES, m/z): 282 $[M+H]^+$.

Step 5: (3aS,6aR)-2-tert-butyl 1-methyl 5-((4,4,5,5-tetramethyl-1,3,2-dioxaborolan-2-yl)methyl)hexahydrocyclopenta[c]pyrrole-1,2(1H)-dicarboxylate A mixture of bis(diphenylphosphino)methane (14 mg, 0.037 mmol), $[Ir(cod)Cl]_2$ (18 mg, 0.027 mmol) and 4,4,5,5-tetramethyl-1,3,2-dioxaborolane (0.39 mL, 2.7 mmol) in DCM (8.0 mL) was stirred at 25° C. for 15 minutes under $N_2$, followed by addition of (3aS,6aR)-2-tert-butyl 1-methyl 5-methylenehexahydrocyclopenta[c]pyrrole-1,2(1H)-dicarboxylate (150 mg, 0.53 mmol) in DCM (0.50 mL). The resulting mixture was stirred at 25° C. for 15 h under $N_2$, then concentrated. The residue was purified by flash silica gel chromatography (EtOAc in hexanes) to give (3aS,6aR)-2-tert-butyl 1-methyl 5-((4,4,5,5-tetramethyl-1,3,2-dioxaborolan-2-yl)methyl)hexahydrocyclopenta[c]pyrrole-1,2(1)-dicarboxylate. LCMS ($C_{21}H_{37}BNO_6^+$) (ES, m/z): 410 $[M+H]^+$.

Step 6: (3aS,6aR)-5-(boronomethyl)octahydrocyclopenta[c]pyrrole-1-carboxylic Acid

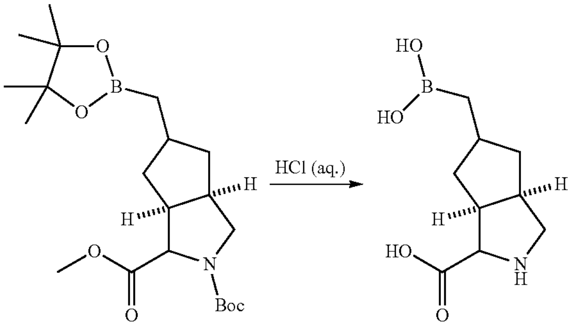 [SMILES: COC(=O)C1[C@H]2CC(CB3OC(C)(C)C(C)(C)O3)C[C@H]2CN1C(=O)OC(C)(C)C ; O=C(O)C1NC[C@@H]2CC(CB(O)O)C[C@H]12]

A mixture of (3aS,6aR)-2-tert-butyl 1-methyl 5-((4,4,5,5-tetramethyl-1,3,2-dioxaborolan-2-yl)methyl)hexahydrocyclopenta[c]pyrrole-1,2(1H)-dicarboxylate (70 mg, 0.17 mmol) and 12 N HCl in water (4.0 mL, 48 mmol) was stirred at 105° C. for 13 h. The reaction mixture was washed with DCM, and the aqueous layer was concentrated to give (3aS,6aR)-5-(boronomethyl)octahydrocyclopenta[c]pyrrole-1-carboxylic acid as an HCl salt. LCMS ($C_9H_{17}BNO_4^+$) (ES, m/z): 214 $[M+H]^+$. $^1H$ NMR (400 MHz, $D_2O$) δ 4.42-3.84 (m, 1H), 3.65-2.98 (m, 3H), 2.97-2.77 (m, 1H), 2.30-1.81 (m, 2H), 1.69-1.23 (m, 2H), 1.16-0.88 (m, 1H), 0.87-0.69 (m, 2H).

Example 31: 3-[3-(dihydroxyboranyl)propyl]octahydro-1H-pyrrolo[3,2-b]pyridine-2-carboxylic Acid

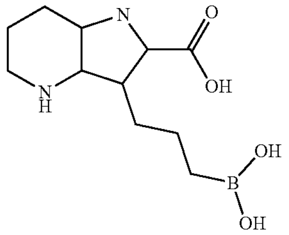 [SMILES: O=C(O)C1NC2CCCNC2C1CCCB(O)O]

Step 1: 1-tert-butyl 2-ethyl 3-bromo-1H-pyrrolo[3,2-b]pyridine-1,2-dicarboxylate

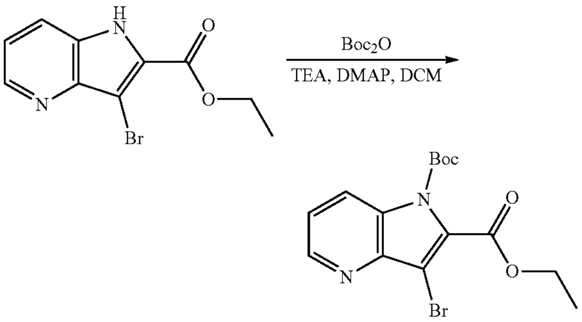

$Boc_2O$ (2.1 g, 9.7 mmol), DMAP (454 mg, 3.7 mmol) and TEA (1.5 g, 15 mmol) were added to a mixture of ethyl 3-bromo-1H-pyrrolo[3,2-b]pyridine-2-carboxylate (2.0 g, 7.4 mmol) in DCM (15 mL), and the reaction mixture was stirred at 25° C. for 1 h. The mixture was concentrated and the residue was purified by flash silica gel chromatography (EtOAc in hexanes) to give 1-tert-butyl 2-ethyl 3-bromo-1H-pyrrolo[3,2-b]pyridine-1,2-dicarboxylate. LCMS ($C_{10}H_{10}BrN_2O_2^+$) (ES, m/z): 269 $[M-CO_2C_4H_8+H]^+$.

Step 2: 1-tert-butyl 2-ethyl 3-allyl-1H-pyrrolo[3,2-b]pyridine-1,2-dicarboxylate

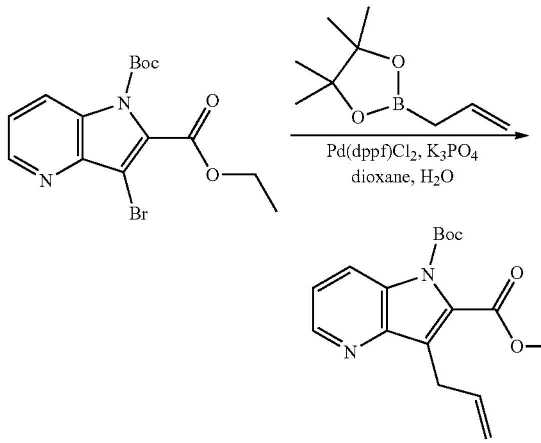

A mixture of 2-allyl-4,4,5,5-tetramethyl-1,3,2-dioxaborolane (2.3 g, 14 mmol), 1-tert-butyl 2-ethyl 3-bromo-1H-pyrrolo[3,2-b]pyridine-1,2-dicarboxylate (2.5 g, 6.8 mmol), $Pd(dppf)Cl_2$ (495 mg, 0.68 mmol) and $K_3PO_4$ (4.3 g, 20 mmol) in 1,4-dioxane (60 mL) and water (15 mL) was degassed and backfilled with $N_2$ (three times), and the reaction mixture was heated to 90° C. for 15 h. The mixture was filtered at room temperature and the filtrate was concentrated under reduced pressure. To the residue was added $Boc_2O$ (3.0 g, 14 mmol), DMAP (413 mg, 3.4 mmol), TEA (1.4 g, 14 mmol) and DCM (50 mL), and the resulting mixture was stirred at 25° C. for 1 h. The solvent was removed and the residue was purified by flash silica gel chromatography (EtOAc in hexanes) to give 1-tert-butyl 2-ethyl 3-allyl-1H-pyrrolo[3,2-b]pyridine-1,2-dicarboxylate. LCMS ($C_{13}H_{15}N_2O_2^+$) (ES, m/z): 231 $[M-CO_2C_4H_8+H]^+$.

Step 3: 1-tert-butyl 2-ethyl 3-(3-(4,4,5,5-tetramethyl-1,3,2-dioxaborolan-2-yl)propyl)-1H-pyrrolo[3,2-b]pyridine-1,2-dicarboxylate

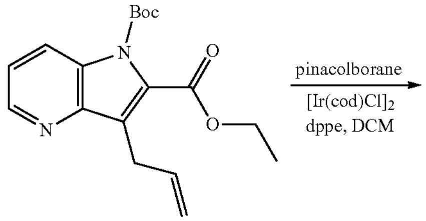

-continued

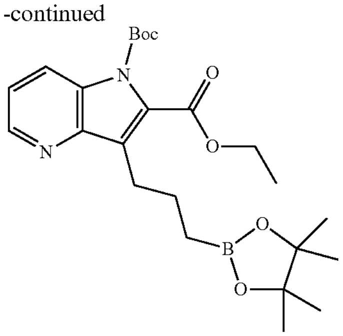

4,4,5,5-Tetramethyl-1,3,2-dioxaborolane (4.4 g, 34 mmol) was added to a mixture of DPPE (271 mg, 0.68 mmol) and $[Ir(cod)Cl]_2$ (229 mg, 0.34 mmol) in DCM (100 mL), and the resulting mixture was stirred at 25° C. for 30 minutes, followed by addition of 1-tert-butyl 2-ethyl 3-allyl-1H-pyrrolo[3,2-b]pyridine-1,2-dicarboxylate (2.3 g, 6.8 mmol) in DCM (20 mL). The reaction mixture was stirred at 25° C. for 15 h, and concentrated. The residue was purified by flash silica gel chromatography (EtOAc in hexanes) to give 1-tert-butyl 2-ethyl 3-(3-(4,4,5,5-tetramethyl-1,3,2-dioxaborolan-2-yl)propyl)-1H-pyrrolo[3,2-b]pyridine-1,2-dicarboxylate. LCMS ($C_{19}H_{28}BN_2O_4^+$) (ES, m/z): 359 $[M-CO_2C_4H_8+H]^+$.

Step 4: 1-tert-butyl 2-ethyl 3-(3-(4,4,5,5-tetramethyl-1,3,2-dioxaborolan-2-yl)propyl)octahydro-1H-pyrrolo[3,2-b]pyridine-1,2-dicarboxylate

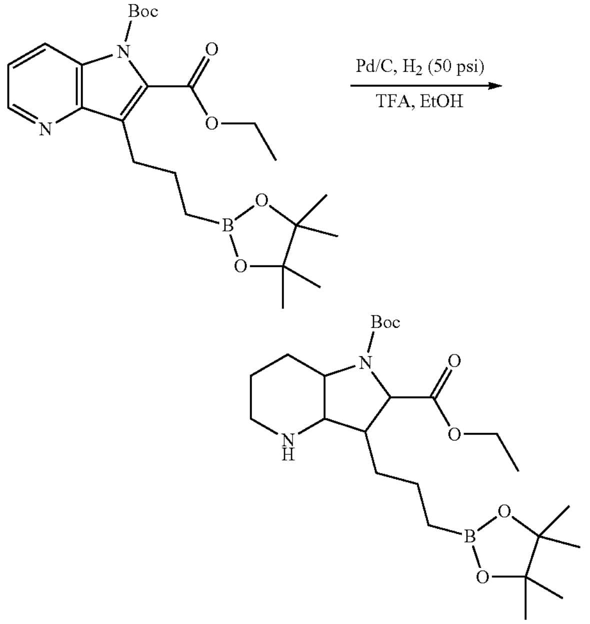

TFA (32 mg, 0.33 mmol) and 10% Pd/C (10 mg) were added to a mixture of 1-tert-butyl 2-ethyl 3-(3-(4,4,5,5-tetramethyl-1,3,2-dioxaborolan-2-yl)propyl)-1H-pyrrolo[3,2-b]pyridine-1,2-dicarboxylate (100 mg, 0.22 mmol) in EtOH (10 mL) under Ar, and the resulting mixture was degassed and backfilled with $H_2$ (three times). The reaction mixture was stirred under $H_2$ (50 psi) at 50° C. for 20 h, then the mixture was filtered, and the filtrate was concentrated under reduced pressure. The residue was purified by RP-HPLC [C18 column, water (0.1% TFA)-$CH_3CN$] to give 1-tert-butyl 2-ethyl 3-(3-(4,4,5,5-tetramethyl-1,3,2-dioxaborolan-2-yl)propyl)octahydro-1H-pyrrolo[3,2-b]pyridine-1,2-dicarboxylate. LCMS ($C_{18}H_{34}BN_2O_6^+$) (ES, m/z): 385 $[M-C_6H_{10}+H]^+$.

Step 5: 3-[3-(dihydroxyboranyl)propyl]octahydro-1H-pyrrolo[3,2-b]pyridine-2-carboxylic Acid

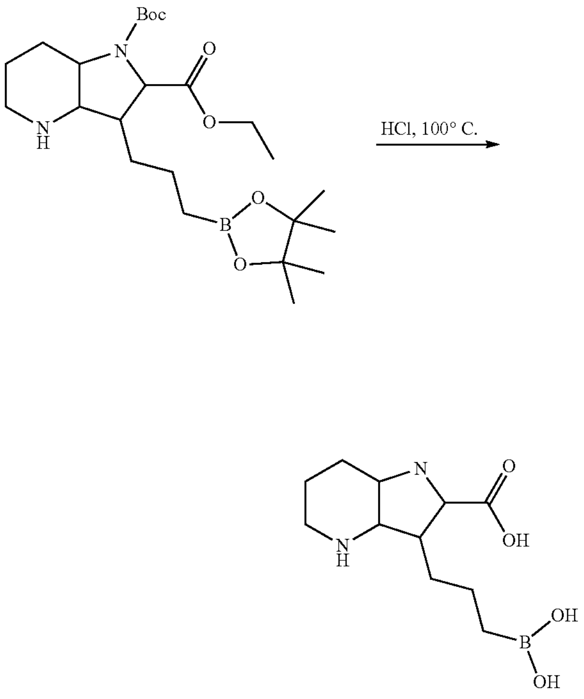 [SMILES: CCOC(=O)C1C(CCCB2OC(C)(C)C(C)(C)O2)C2NCCCC2N1C(=O)OC(C)(C)C ; O=C(O)C1NC2CCCNC2C1CCCB(O)O]

A mixture of 1-tert-butyl 2-ethyl 3-(3-(4,4,5,5-tetramethyl-1,3,2-dioxaborolan-2-yl)propyl)octahydro-1H-pyrrolo[3,2-b]pyridine-1,2-dicarboxylate (35 mg, 0.075 mmol) and 12 M HCl in water (2.0 mL, 24 mmol) was stirred at 100° C. for 16 h, and the mixture was concentrated under reduced pressure to give 3-[3-(dihydroxyboranyl)propyl]octahydro-1H-pyrrolo[3,2-b]pyridine-2-carboxylic acid as a HCl salt. $^1H$ NMR (400 MHz, $CD_3OD$) δ 4.88-4.70 (m, 2H), 4.36-3.95 (m, 2H), 3.58 (br s, 1H), 3.26-2.89 (m, 2H), 2.34-1.91 (m, 3H), 1.59 (br s, 4H), 0.85 (br s, 2H).

Example 32: (3aR,4S,6aR)-3a-(3-boronopropyl)hexahydro-2H-furo[2,3-c]pyrrole-4-carboxylic Acid

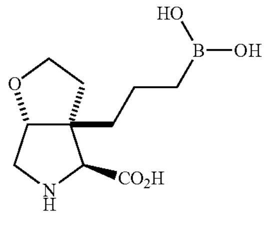

Step 1: 1-(tert-butyl) 2-methyl (2S,3R)-3-allyl-3-(2-((tert-butyldimethylsilyl)oxy)ethyl)-4-oxopyrrolidine-1,2-dicarboxylate

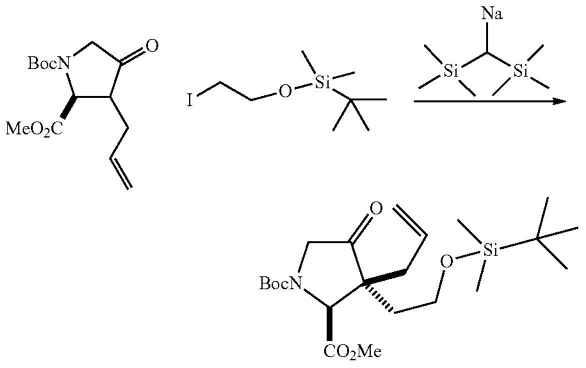

Sodium bis(trimethylsilyl)amide (1.0 M in THF, 2.3 mL, 2.3 mmol) was added dropwise to a stirred solution of (2S)-1-tert-butyl 2-methyl 3-allyl-4-oxopyrrolidine-1,2-dicarboxylate (582 mg, 2.1 mmol) in THF (7.7 mL) and 1,3-dimethyl-3,4,5,6-tetrahydro-2(1H)-pyrimidinone (DMPU) (2.6 mL) at −78° C. The resulting mixture was stirred at −78° C. for 1 h. Then tert-butyl(2-iodoethoxy)dimethylsilane (0.9 mL, 4.1 mmol) in THF (0.5 mL) was added dropwise at −78° C. The reaction mixture was stirred at −78° C. for 2 h and warmed to room temperature overnight. The reaction mixture was quenched with saturated aqueous $NH_4Cl$ and extracted with EtOAc. The combined organic phases were concentrated and purified by silica gel chromatography (EtOAc in hexanes) to give to afford 1-(tert-butyl) 2-methyl (2S,3R)-3-allyl-3-(2-((tert-butyldimethylsilyl)oxy)ethyl)-4-oxopyrrolidine-1,2-dicarboxylate. LCMS ($C_{17}H_{32}NO_4Si^+$) (ES, m/z): 342 $[M+H-Boc]^+$.

Step 2: 1-(tert-butyl) 2-methyl (2S,3R)-3-allyl-3-(2-((tert-butyldimethylsilyl)oxy)ethyl)-4-hydroxypyrrolidine-1,2-dicarboxylate

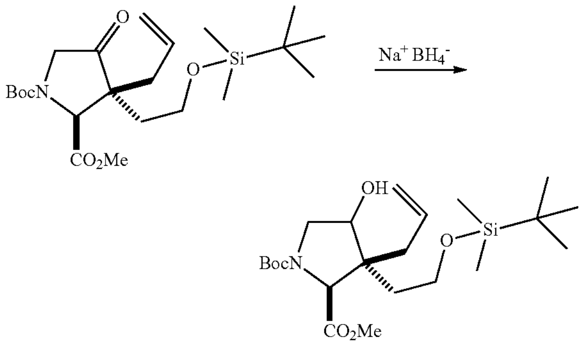

Sodium borohydride (39 mg, 1.0 mmol) was added to a stirred solution of 1-(tert-butyl) 2-methyl (2S,3R)-3-allyl-3-(2-((tert-butyldimethylsilyl)oxy)ethyl)-4-oxopyrrolidine-1,2-dicarboxylate (300 mg, 0.68 mmol) in MeOH (2.3 mL) at 0° C. The reaction mixture was allowed to warm to room temperature for 2 h. The reaction mixture was quenched with saturated aqeuous $NH_4Cl$, and extracted with EtOAc. The combined organic phases were concentrated and purified by silica gel chromatography (EtOAc in hexanes) to give to afford 1-(tert-butyl) 2-methyl (2S,3R)-3-allyl-3-(2-((tert-butyldimethylsilyl)oxy)ethyl)-4-hydroxypyrrolidine-1,2-dicarboxylate. LCMS ($C_{22}H_{41}NO_6SiNa^+$) (ES, m/z): 466 $[M+Na]^+$.

Step 3:1-(tert-butyl) 2-methyl (2S,3R,4S)-3-allyl-3-(2-((tert-butyldimethylsilyl)oxy)ethyl)-4-((methylsulfonyl)oxy)pyrrolidine-1,2-dicarboxylate

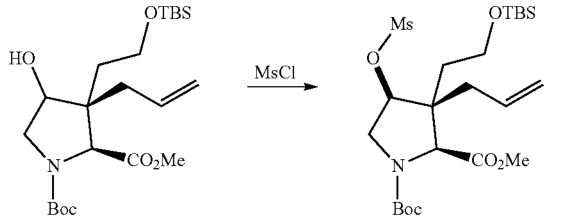 [SMILES: "MsCl" ; C=CC[C@]1(CCO[Si](C)(C)C(C)(C)C)C(O)CN(C(=O)OC(C)(C)C)[C@@H]1C(=O)OC ; C=CC[C@]1(CCO[Si](C)(C)C(C)(C)C)[C@H](OS(C)(=O)=O)CN(C(=O)OC(C)(C)C)[C@@H]1C(=O)OC]

$Et_3N$ (0.28 mL, 2.0 mmol) was added to a stirred solution of 1-(tert-butyl) 2-methyl (2S,3R)-3-allyl-3-(2-((tert-butyldimethylsilyl)oxy)ethyl)-4-hydroxypyrrolidine-1,2-dicarboxylate (300 mg, 0.68 mmol) in THF (3.4 mL) at 0° C., followed by dropwise addition of methanesulfonyl chloride (0.11 mL, 1.4 mmol). The resulting mixture was then stirred at room temperature for 1 h, quenched with saturated aqueous $NaHCO_3$, and extracted with EtOAc twice. The combined organic phases were washed with brine, dried over anhydrous $Na_2SO_4$, filtered, and concentrated under reduced pressure to give 1-(tert-butyl) 2-methyl (2S,3R,4S)-3-allyl-3-(2-((tert-butyldimethylsilyl)oxy)ethyl)-4-((methylsulfonyl)oxy)pyrrolidine-1,2-dicarboxylate, which was used for next step without further purification. LCMS ($C_{23}H_{43}NO_8SSiNa^+$) (ES, m/z): 544 $[M+Na]^+$.

Step 4: 1-(tert-butyl) 2-methyl (2S,3R,4S)-3-allyl-3-(2-hydroxyethyl)-4-((methylsulfonyl)oxy)pyrrolidine-1,2-dicarboxylate

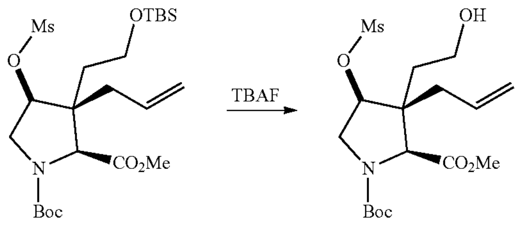

1-(tert-butyl) 2-methyl (2S,3R,4S)-3-allyl-3-(2-((tert-butyldimethylsilyl)oxy)ethyl)-4-((methylsulfonyl)oxy)pyrrolidine-1,2-dicarboxylate (340 mg, 0.67 mmol) was treated with TBAF (1.0 M in THF, 3.3 mL, 3.26 mmol) and stirred at room temperature for 2 h. The reaction mixture was quenched with saturated aqueous $NH_4Cl$, and extracted with EtOAC. The combined organic phases were washed with brine, dried over anhydrous $Na_2SO_4$, filtered, and concentrated under reduced pressure to give 1-(tert-butyl) 2-methyl (2S,3R,4S)-3-allyl-3-(2-hydroxyethyl)-4-((methylsulfonyl)oxy)pyrrolidine-1,2-dicarboxylate, which was used for next step without further purification. LCMS ($C_{17}H_{29}NO_8SNa^+$) (ES, m/z): 430 $[M+Na]^+$.

Step 5: 5-(tert-butyl) 4-methyl (3aR,4S,6aR)-3a-allylhexahydro-5H-furo[2,3-c]pyrrole-4,5-dicarboxylate

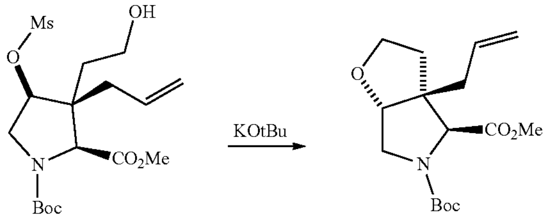

1-(tert-butyl) 2-methyl (2S,3R,4S)-3-allyl-3-(2-hydroxyethyl)-4-((methylsulfonyl)oxy)pyrrolidine-1,2-dicarboxylate (271 mg, 0.67 mmol) in DCM (6.5 mL) was treated with potassium tert-butoxide (1.0 M in THF, 1.0 mL, 1.0 mmol) and stirred at room temperature for 1 h. The reaction mixture was quenched with saturated aqueous $NH_4Cl$, and extracted with EtOAc. The combined organic phases were washed with brine, dried over anhydrous $Na_2SO_4$, filtered, and concentrated under reduced pressure. The residue was purified by flash silica gel chromatography (EtOAc in hexanes) to give 5-(tert-butyl) 4-methyl (3aR,4S,6aR)-3a-allylhexahydro-5H-furo[2,3-c]pyrrole-4,5-dicarboxylate. LCMS ($C_{16}H_{25}NO_5Na^+$) (ES, m/z): 340 $[M+Na]^+$.

Step 6: 5-(tert-butyl) 4-methyl (3aR,4S,6aR)-3a-(3-(4,4,5,5-tetramethyl-1,3,2-dioxaborolan-2-yl)propyl)hexahydro-5H-furo[2,3-c]pyrrole-4,5-dicarboxylate

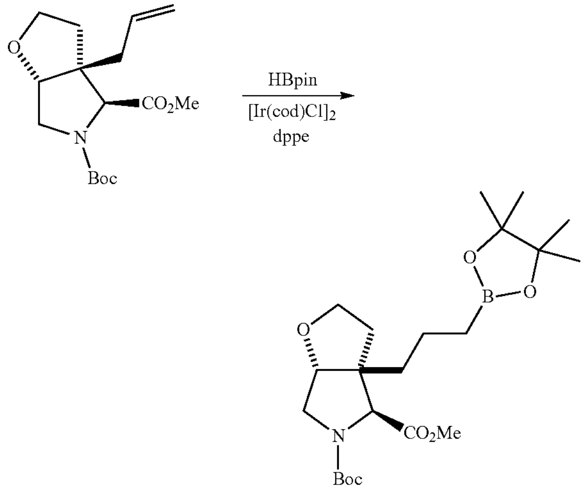

4,4,5,5-Tetramethyl-1,3,2-dioxaborolane (210 μl, 1.445 mmol) was added dropwise to a mixture of dppe (23.03 mg, 0.058 mmol) and $[Ir(cod)Cl]_2$ (19.42 mg, 0.029 mmol) in DCM (0.6 mL) at 0° C. under $N_2$, followed by dropwise addition of a solution of (3aR,4S,6aR)-5-tert-butyl 4-methyl 3a-allyltetrahydro-2H-furo[2,3-c]pyrrole-4,5(3H)-dicarboxylate (90 mg, 0.289 mmol) in DCM (0.6 mL) under $N_2$. The reaction mixture was stirred at 25° C. for 12 h, and concentrated in vacuo. The residue was directly purified by silica gel chromatography (EtOAc in hexanes) to give 5-(tert-butyl) 4-methyl (3aR,4S,6aR)-3a-(3-(4,4,5,5-tetramethyl-1,3,2-dioxaborolan-2-yl)propyl)hexahydro-5H-furo[2,3-c]pyrrole-4,5-dicarboxylate. LCMS ($C_{22}H_{39}BNO_7^+$) (ES, m/z): 340 [M+H−Boc]$^+$.

Step 7: (3aR,4S,6aR)-3a-(3-boronopropyl)hexahydro-2H-furo[2,3-c]pyrrole-4-carboxylic Acid

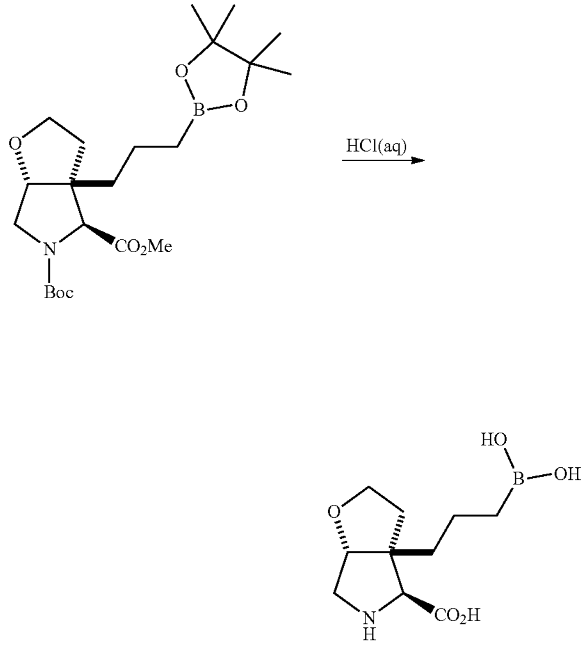

(3aR,4S,6aR)-5-tert-butyl 4-methyl 3a-(3-(4,4,5,5-tetramethyl-1,3,2-dioxaborolan-2-yl)propyl)tetrahydro-2H-furo[2,3-c]pyrrole-4,5(3H)-dicarboxylate (55 mg, 0.125 mmol) was treated with 1 mL of 6M HCl and stirred at 90° C. for 4 h. The reaction mixture was diluted in water, washed with DCM. The aqueous phase was concentrated in vacuo to give (1S,2S,5R)-1-(3-boronopropyl)-3,6-diazabicyclo[3.2.0]heptane-2-carboxylic acid as an HCl salt. LCMS ($C_{10}H_{17}BNO_3^+$) (ES, m/z): 226 [M+H−$H_2O$]$^+$. $^1H$ NMR (500 MHz, $D_2O$) δ 4.39 (d, J=3.5 Hz, 1H), 4.13 (s, 1H), 4.07 (q, J=7.7 Hz, 1H), 3.96 (td, J=9.0, 4.5 Hz, 1H), 3.63 (dd, J=13.5, 4.8 Hz, 1H), 3.37 (dd, J=13.5, 1.2 Hz, 1H), 2.23 (ddd, J=12.0, 7.3, 4.6 Hz, 1H), 2.15 (dt, J=13.4, 8.4 Hz, 1H), 1.60-1.50 (m, 1H), 1.46-1.37 (m, 2H), 1.33 (dtd, J=16.3, 12.4, 10.4, 5.9 Hz, 1H), 0.71 (t, J=7.3 Hz, 2H).

Example 33: 5-(3-boronopropyl)-2-azabicyclo[3.2.0]heptane-1-carboxylic Acid

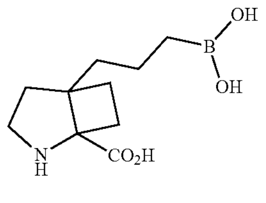 [SMILES: O=C(O)C12CCC1(CCCB(O)O)CCN2]

Step 1: 2-benzyl 1-methyl 5-(3-(4,4,5,5-tetramethyl-1,3,2-dioxaborolan-2-yl)propyl)-2-azabicyclo[3.2.0]heptane-1,2-dicarboxylate

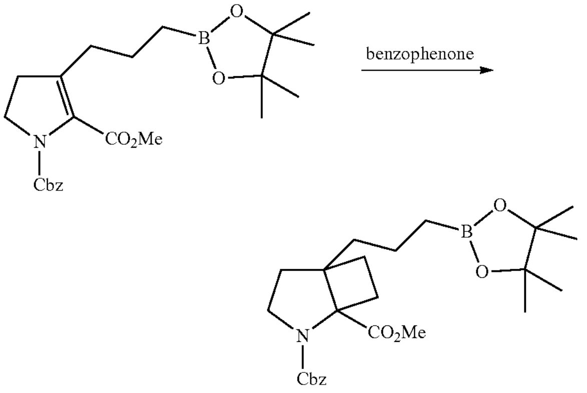

A solution of 1-benzyl 2-methyl 3-(3-(4,4,5,5-tetramethyl-1,3,2-dioxaborolan-2-yl)propyl)-4,5-dihydro-1H-pyrrole-1,2-dicarboxylate (290 mg, 0.68 mmol) and benzophenone (25 mg, 0.14 mmol) in toluene (14 mL) was bubbled with ethene gas for 10 min and irradiated with Na/Hg lump at rt for 3 h. The reaction mixture was concentrated and purified by flash silica gel chromatography (MeOH in DCM) to give 2-benzyl 1-methyl 5-(3-(4,4,5,5-tetramethyl-1,3,2-dioxaborolan-2-yl)propyl)-2-azabicyclo[3.2.0]heptane-1,2-dicarboxylate. LCMS ($C_{25}H_{37}BNO_6^+$) (ES, m/z): 458 [M+H]$^+$.

Step 2: 5-(3-boronopropyl-2-azabicyclo[3.2.0]heptane-1-carboxylic Acid

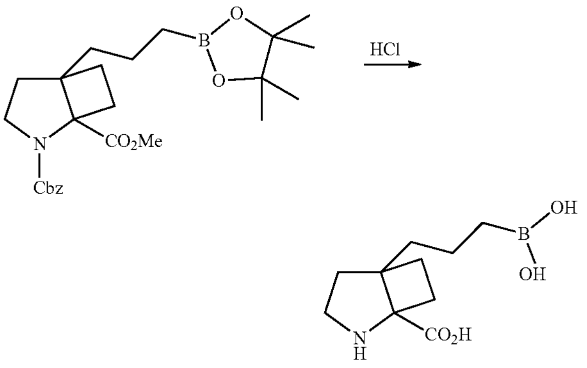

2-benzyl 1-methyl 5-(3-(4,4,5,5-tetramethyl-1,3,2-dioxaborolan-2-yl)propyl)-2-azabicyclo[3.2.0]heptane-1,2-dicarboxylate (44 mg, 0.096 mmol) was treated with 6 M HCl in water (1.0 mL, 6.0 mmol), and stirred at 90° C. overnight, and the reaction mixture was diluted in water, washed with DCM. The aqueous phase was concentrated in vacuo to give 5-(3-boronopropyl)-2-azabicyclo[3.2.0]heptane-1-carboxylic acid as an HCl salt. LCMS ($C_{10}H_{17}BNO_3^+$) (ES, m/z): 210 [M+H−$H_2O$]$^+$. $^1H$ NMR (500 MHz, $D_2O$) δ 3.61 (dh, J=24.4, 6.9, 6.2 Hz, 2H), 2.69 (ddd, J=15.4, 11.5, 6.5 Hz, 1H), 2.08-1.60 (m, 5H), 1.47-1.09 (m, 4H), 0.71 (dt, J=14.6, 7.3 Hz, 2H).

Example 34: (1S,2S,5R)-1-(3-boronopropyl)-3,6-diazabicyclo[3.2.0]heptane-2-carboxylic Acid

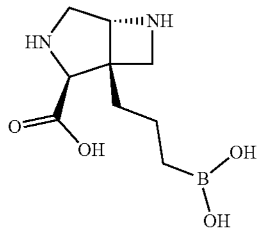 [SMILES: O=C(O)[C@H]1NC[C@@H]2NC[C@@]21CCCB(O)O]

Step 1: 1-(tert-butyl) 2-methyl (2S,3S,4S)-3-allyl-4-((chloromethyl)sulfonyl)-3-(((chloromethyl)sulfonyl)methyl)pyrrolidine-1,2-dicarboxylate

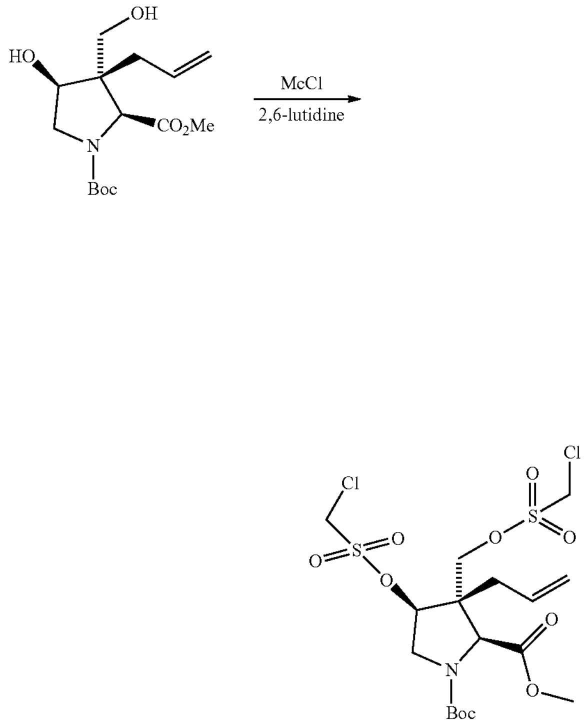

Chloromethanesulfonyl chloride (36 mL, 0.40 mol) was added dropwise into a mixture of (2S,3S,4S)-1-tert-butyl 2-methyl 3-allyl-4-hydroxy-3-(hydroxymethyl)pyrrolidine-1,2-dicarboxylate (42 g, 133 mmol), 2,6-dimethylpyridine (124 mL, 1.1 mol) in DCM (600 mL) at 0° C. The resulting mixture was stirred at 0° C. for 0.5 h, then at 25° C. for 1 h. The reaction mixture was diluted with $H_2O$ and extracted with DCM. The combined organic phases were washed with 1 N HCl in water, saturated aqueous $NaHCO_3$ and brine, dried over $Na_2SO_4$, filtered, and concentrated. The residue was purified by flash silica gel chromatography (EtOAc in hexanes) to give (2S,3S,4S)-1-tert-butyl 2-methyl 3-allyl-4-(((chloromethyl)sulfonyl)oxy)-3-((((chloromethyl)sulfonyl)oxy)methyl)pyrrolidine-1,2-dicarboxylate. LCMS ($C_{12}H_{20}Cl_2NO_8S_2^+$) (ES, m/z): 440 [M+H−Boc]$^+$.

Step 2: 3-(tert-butyl) 2-methyl (1S,2S,5R)-1-allyl-6-benzyl-3,6-diazabicyclo[3.2.0]heptane-2,3-dicarboxylate

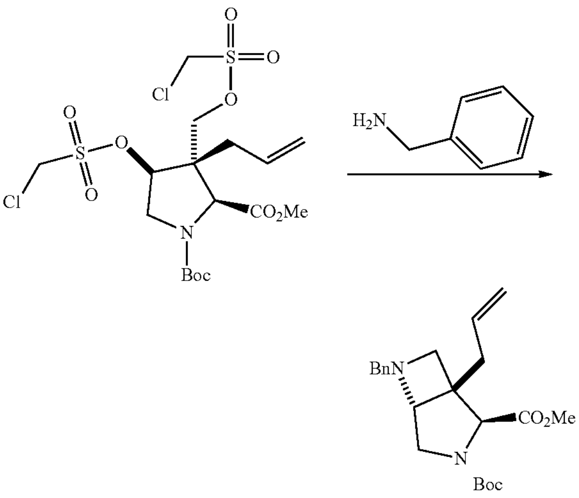

Benzylamine (1.8 mL, 16 mmol) was added to 1-(tert-butyl) 2-methyl (2S,3S,4S)-3-allyl-4-(((chloromethyl)sulfonyl)oxy)-3-((((chloromethyl)sulfonyl)oxy)methyl)pyrrolidine-1,2-dicarboxylate (435 mg, 0.81 mmol) in 1,4-dioxane (2.7 mL). The resulting mixture was heated up to 90° C. and stirred for 12 h. The reaction mixture was concentrated in vacuo, and the residue was purified by flash silica gel chromatography (EtOAc in hexanes) to afford 3-(tert-butyl) 2-methyl (1S,2S,5R)-6-benzyl-1-(3-(4,4,5,5-tetramethyl-1,3,2-dioxaborolan-2-yl)propyl)-3,6-diazabicyclo[3.2.0]heptane-2,3-dicarboxylate. LCMS ($C_{22}H_{31}N_2O_4^+$) (ES, m/z): 387 [M+H]$^+$.

Step 3: 3-(tert-butyl) 2-methyl (1S,2S,5R)-6-benzyl-1-(3-(4,4,5,5-tetramethyl-1,3,2-dioxaborolan-2-yl)propyl)-3,6-diazabicyclo[3.2.0]heptane-2,3-dicarboxylate

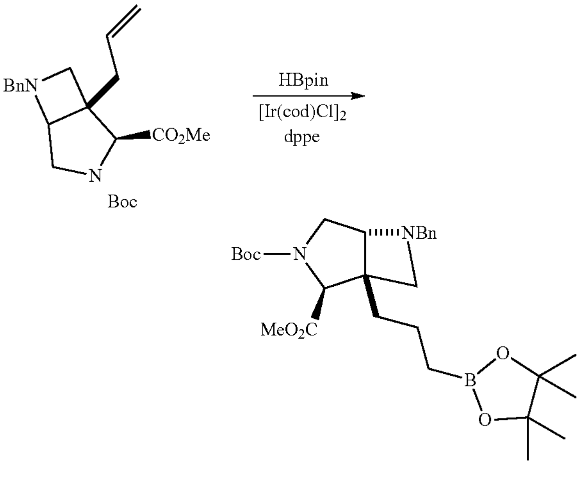

4,4,5,5-Tetramethyl-1,3,2-dioxaborolane (98 µL, 0.67 mmol) was added dropwise to a mixture of dppe (13 mg, 0.034 mmol) and $[Ir(cod)Cl]_2$ (11 mg, 0.017 mmol) in DCM (0.30 mL) at 0° C. under $N_2$, followed by dropwise addition of a solution of 3-(tert-butyl) 2-methyl (1S,2S)-1-allyl-6-benzyl-3,6-diazabicyclo[3.2.0]heptane-2,3-dicarboxylate (65 mg, 0.17 mmol) in DCM (0.40 mL) under $N_2$. The reaction mixture was stirred at 25° C. for 12 h, and concentrated in vacuo. The residue was directly purified by silica gel chromatography (EtOAc in hexanes) to give 3-(tert-butyl) 2-methyl (1S,2S,5R)-6-benzyl-1-(3-(4,4,5,5-tetramethyl-1,3,2-dioxaborolan-2-yl)propyl)-3,6-diazabicyclo[3.2.0]heptane-2,3-dicarboxylate. LCMS ($C_{28}H_{44}BN_2O_6^+$) (ES, m/z): 515 $[M+H]^+$.

Step 4: 3-(tert-butyl) 2-methyl (1S,2S,5R)-1-(3-(4,4,5,5-tetramethyl-1,3,2-dioxaborolan-2-yl)propyl)-3,6-diazabicyclo[3.2.0]heptane-2,3-dicarboxylate

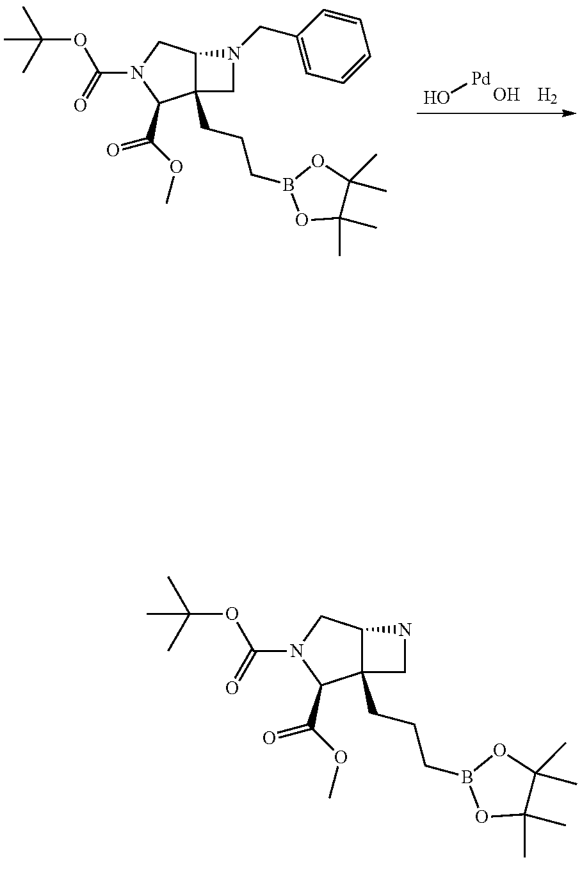

Palladium hydroxide on carbon (59 mg, 0.084 mmol) was added to a solution of 3-(tert-butyl) 2-methyl (1S,2S,5R)-6-benzyl-1-(3-(4,4,5,5-tetramethyl-1,3,2-dioxaborolan-2-yl)propyl)-3,6-diazabicyclo[3.2.0]heptane-2,3-dicarboxylate (86 mg, 0.17 mmol) in THF (3.5 mL). The resulting mixture was sealed and degassed under $H_2$ balloon multiple times and stirred at room temperature for 3 h. The reaction mixture was filtered and concentrated to afford 3-(tert-butyl) 2-methyl (1S,2S,5R)-1-(3-(4,4,5,5-tetramethyl-1,3,2-dioxaborolan-2-yl)propyl)-3,6-diazabicyclo[3.2.0]heptane-2,3-dicarboxylate. LCMS ($C_{21}H_{38}BN_2O_6^+$) (ES, m/z): 425 $[M+H]^+$.

Step 5: (1S,2S,5R)-1-(3-boronopropyl)-3,6-diazabicyclo[3.2.0]heptane-2-carboxylic Acid

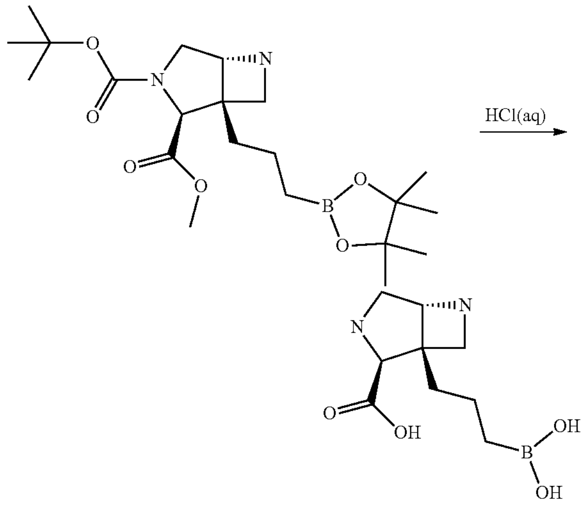

3-(tert-butyl) 2-methyl (1S,2S,5R)-1-(3-(4,4,5,5-tetramethyl-1,3,2-dioxaborolan-2-yl)propyl)-3,6-diazabicyclo[3.2.0]heptane-2,3-dicarboxylate (17 mg, 0.040 mmol) was treated with 6 M HCl in water (0.06 mL, 3.6 mmol) and stirred at 90° C. for 3 h, and the reaction mixture was diluted in water, and washed with DCM. The aqueous phase was concentrated in vacuo to give (1S,2S,5R)-1-(3-boronopropyl)-3,6-diazabicyclo[3.2.0]heptane-2-carboxylic acid as an HCl salt. LCMS ($C_9H_{16}BN_2O_3^+$) (ES, m/z): 211 $[M+H-H_2O]^+$. $^1H$ NMR (500 MHz, $D_2O$) δ 4.86-4.77 (m, 1H), 4.36 (d, J=10.7 Hz, 1H), 4.12 (d, J=11.9 Hz, 1H), 4.06 (dd, J=14.5, 6.9 Hz, 1H), 4.00 (d, J=12.2 Hz, 1H), 3.93 (t, J=12.9 Hz, 1H), 1.84-1.75 (m, 1H), 1.74-1.61 (m, 1H), 1.58-1.50 (m, 1H), 1.49-1.20 (m, 1H), 0.89-0.73 (m, 2H).

Assay

Arginase Thioornithine Generating Assay (TOGA)

Compounds were serially diluted in ten 3-fold steps in DMSO starting from 10 mM DMSO stocks. Compound dilutions or DMSO alone were then dispensed from the dilution plate into a Greiner black 384-well assay plate (catalog #781086) using an Echo 555 acoustic liquid handler (Labcyte).

Arginase protein was recombinantly expressed in *Escherichia coli*. Purified protein was then diluted in assay buffer (50 mM Tris pH 7.5, 50 mM NaCl, 1 mM manganese chloride, 0.05% bovine serum albumin to obtain a final Arginase concentration of 1.88 nM. Arginase solution (20 μL) or buffer alone (20 μL) were dispensed to wells of the assay plate using a BioRAPTR liquid dispenser (Beckman Coulter). Assay plates containing compound and arginase enzyme were incubated at room temperature for 30 minutes. Afterwards, 5 μL of 2.5 mM thioarginine (Cayman Chemicals) in assay buffer were added to each well of the assay plate using a BioRAPTR liquid dispenser. Plates were incubated at room temperature for 60 minutes and reactions were quenched by addition of 15 μL of 200 uM 7-Diethylamine-3-(4-maleimidophenyl)-4-methylcoumarin (Sigma Chemical) in 70% ethanol. Plates were briefly shaken to mix and the fluorescence was measured in an Spectramax plate reader (Molecular Devices) with a 410 nm excitation wavelength and an 490 nm emission wavelength.

The fluorescence intensity of each well was corrected for the background observed in wells that did not receive arginase and was expressed as a fraction of the intensity observed in wells that received arginase enzyme and DMSO only. Potencies were calculated by linear least squares fit to the four parameter logistic IC50 equation.

| Example | TOGA IC50 (nM) |
|---|---|
| 1 | 1.611 |
| 2 | 1524 |
| 3 | 27.55 |
| 4 | 11.49 |
| 5 | 216.7 |
| 6 | 162.4 |
| 7 | 1.738 |
| 8 | 377.1 |
| 9 | 653.5 |
| 10 | 5824 |
| 11 | 3.937 |
| 12 | 2.288 |
| 13 | 2.128 |
| 14 | 8.783 |
| 15 | 14.22 |
| 16 | 19.64 |
| 17 | 66.49 |
| 18 | 1172 |
| 19 | 3.273 |
| 20 | 892.1 |
| 21 | 13610 |
| 22 | 181.3 |
| 23 | 114.4 |
| 24 | 5742 |
| 25 | 10000 |
| 26 | 444.2 |
| 27 | 5.083 |
| 28 | 25.88 |
| 29 | 1222 |
| 30 | 1860 |
| 31 (racemic) | 5724 |
| 32 | 51.63 |
| 33 (racemic) | 370 |
| 34 | 104.5 |

What is claimed:

1. A compound which is:

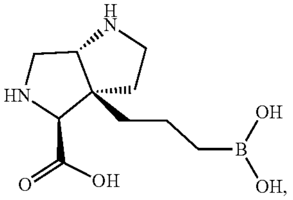

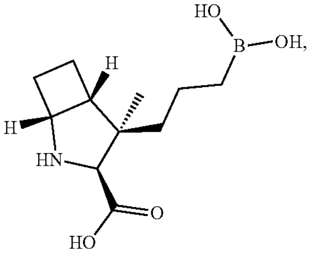

-continued

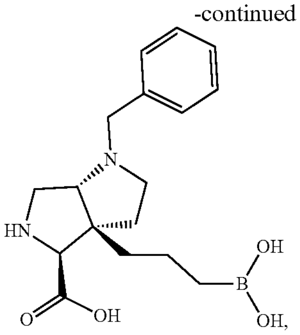

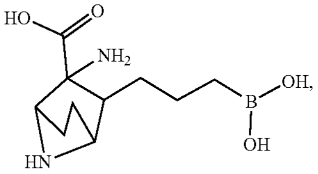

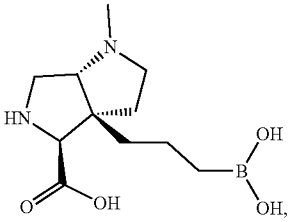

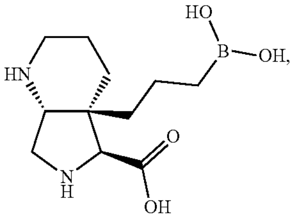

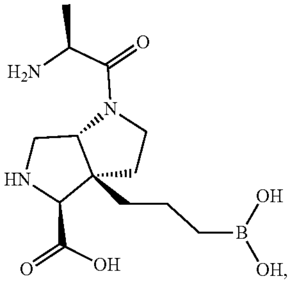

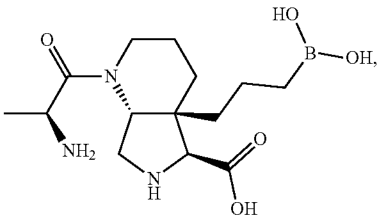

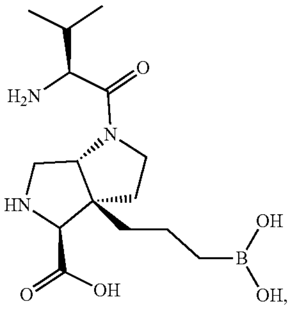

-continued
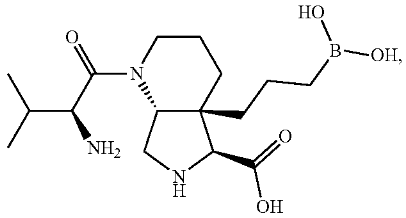
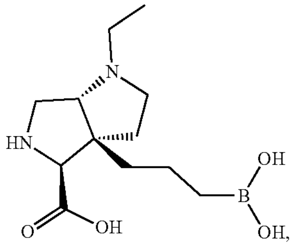
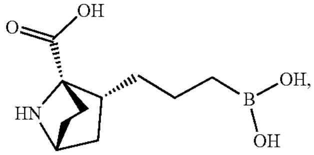
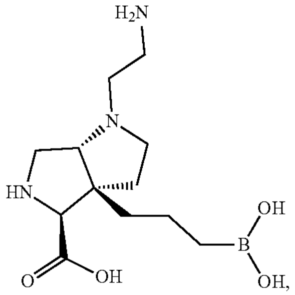
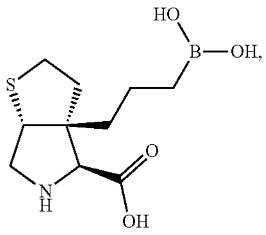
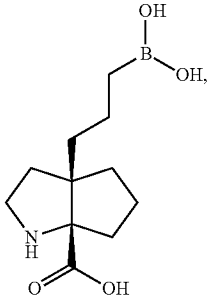
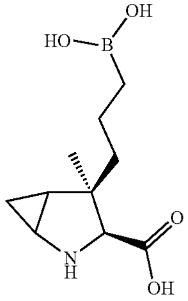
,
-continued
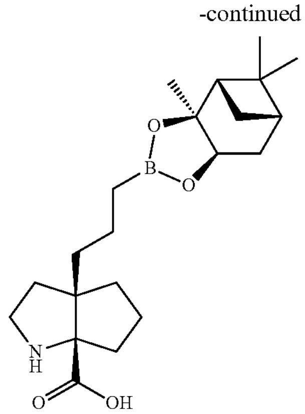
,
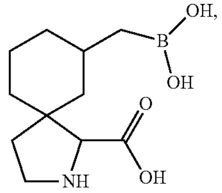
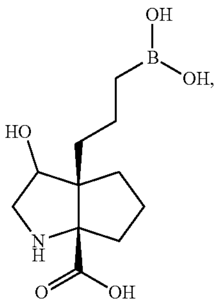
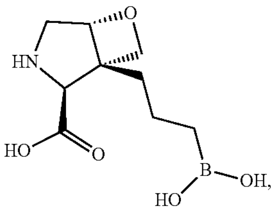
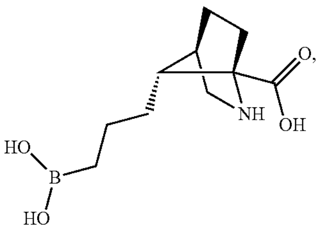
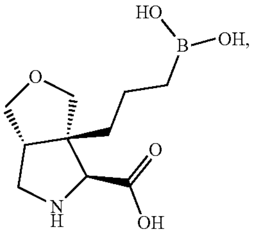
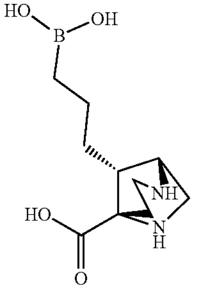
,
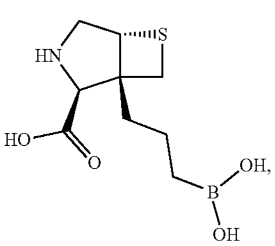

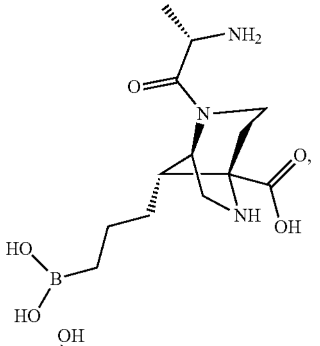
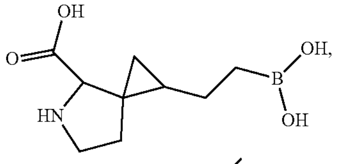
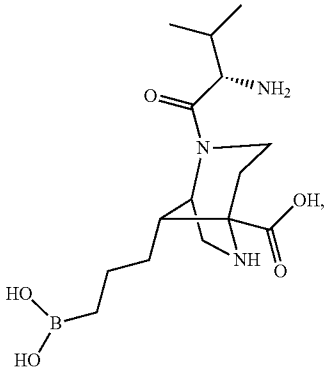
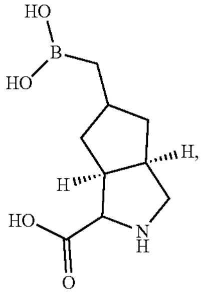
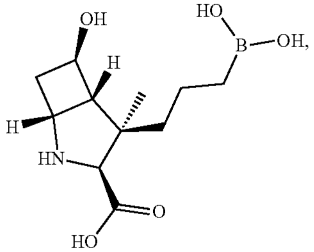
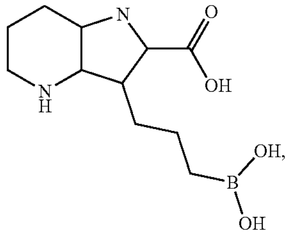
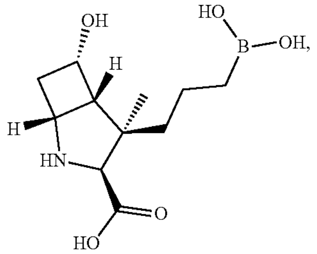
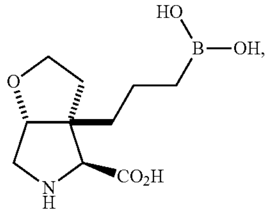
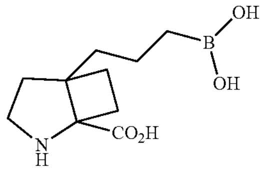
or
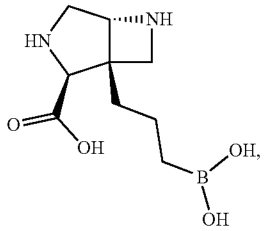
or a pharmaceutically acceptable salt thereof.
2. A pharmaceutical composition comprising a compound of claim 1, or a pharmaceutically acceptable salt thereof, and a pharmaceutically acceptable carrier.
3. A pharmaceutical composition comprising a compound of claim 1 and a pharmaceutically acceptable carrier.
* * * * *